US012785161B2

(12) United States Patent
Sim et al.

(10) Patent No.: US 12,785,161 B2
(45) Date of Patent: Nov. 3, 2026

(54) SYSTEMS AND METHODS FOR GENERATING ROLL MAP AND MANUFACTURING BATTERY USING ROLL MAP

(71) Applicant: LG Energy Solution, Ltd., Seoul (KR)

(72) Inventors: Min Kyu Sim, Daejeon (KR); Jong Seok Park, Daejeon (KR); Min Su Kim, Daejeon (KR); Jae Hwan Lee, Daejeon (KR); Ki Deok Han, Daejeon (KR); Eun Ji Jo, Daejeon (KR); Su Wan Park, Daejeon (KR); Gi Yeong Jeon, Daejeon (KR); June Hee Kim, Daejeon (KR); Wi Dae Park, Daejeon (KR); Dong Min Seo, Daejeon (KR); Seol Hee Kim, Daejeon (KR); Dong Yeop Lee, Daejeon (KR); Jun Hyo Su, Daejeon (KR); Byoung Eun Han, Daejeon (KR); Seung Huh, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 520 days.

(21) Appl. No.: 18/241,098

(22) Filed: Aug. 31, 2023

(65) Prior Publication Data

US 2024/0097218 A1 Mar. 21, 2024

(30) Foreign Application Priority Data

Sep. 15, 2022 (KR) ........................ 10-2022-0116302
Jan. 31, 2023 (KR) ........................ 10-2023-0013307
(Continued)

(51) Int. Cl.
*H01M 10/48* (2006.01)
*G06F 3/04812* (2022.01)
(Continued)

(52) U.S. Cl.
CPC ........ *H01M 10/48* (2013.01); *G06F 3/04812* (2013.01); *H01M 4/04* (2013.01);
(Continued)

(58) Field of Classification Search
CPC ............... H01M 10/48; H01M 10/425; H01M 10/0404; H01M 4/04; G06F 3/04812
See application file for complete search history.

(56) References Cited

U.S. PATENT DOCUMENTS

2006/0040181 A1 2/2006 Kim et al.
2006/0090319 A1 5/2006 Howe
(Continued)

FOREIGN PATENT DOCUMENTS

EP 4156317 3/2023
EP 4266394 10/2023
(Continued)

OTHER PUBLICATIONS

How and Why You should Use Serial Number Management in Assembly. by Aptean Staff Writer, available at https://www.aptean.com/en-US/insights/blog/how-and-why-you-should-use-serial-number-management-in-assembly, last visited Nov. 6, 2025 (Year 2020).

*Primary Examiner* — Sarah A. Slifka
(74) *Attorney, Agent, or Firm* — Bryan Cave Leighton Paisner LLP

(57) ABSTRACT

Methods and systems for executing tracking and monitoring manufacturing data of a battery are disclosed. One method includes: receiving, by a server system, sensing data of the battery from a sensing system; generating, by the server system, mapping data based on the sensing data; generating, by the server system, identification data of the battery based on the sensing data; generating, by the server system, monitoring data of the battery based on the sensing data, the identification data, and the mapping data; and generating, by
(Continued)

the server system, display data for displaying a simulated electrode of the battery on a graphical user interface based on the monitoring data of the battery.

20 Claims, 78 Drawing Sheets

(30) Foreign Application Priority Data

Jun. 9, 2023 (KR) ........................ 10-2023-0074503
Jun. 9, 2023 (KR) ........................ 10-2023-0074504

(51) Int. Cl.
*H01M 4/04* (2006.01)
*H01M 10/04* (2006.01)
*H01M 10/42* (2006.01)

(52) U.S. Cl.
CPC ..... *H01M 10/0404* (2013.01); *H01M 10/425* (2013.01); *H01M 10/0409* (2013.01); *H01M 2010/4271* (2013.01)

(56) References Cited

U.S. PATENT DOCUMENTS

| | | | |
|---|---|---|---|
| 2009/0030544 | A1 | 1/2009 | Floeder |
| 2011/0224918 | A1 | 9/2011 | Floeder et al. |
| 2014/0257719 | A1 | 9/2014 | Figiel |
| 2015/0115976 | A1 | 4/2015 | Adams et al. |
| 2015/0292163 | A1 | 10/2015 | Bomstad et al. |
| 2016/0164069 | A1 | 6/2016 | Takahashi et al. |
| 2019/0113871 | A1 | 4/2019 | Tokuchi |
| 2021/0083314 | A1 | 3/2021 | Xia et al. |
| 2021/0252559 | A1 | 8/2021 | Yang et al. |
| 2023/0289541 | A1 | 9/2023 | Modi |

FOREIGN PATENT DOCUMENTS

| | | | |
|---|---|---|---|
| EP | 4266439 | | 10/2023 |
| EP | 4283695 | | 11/2023 |
| JP | 2007026844 | A | 2/2007 |
| JP | 2007517232 | A | 6/2007 |
| JP | 2007523810 | A | 8/2007 |
| JP | 2008077559 | A | 4/2008 |
| JP | 2009266739 | A | 11/2009 |
| JP | 2013-088247 | A | 5/2013 |
| JP | 2013522595 | A | 6/2013 |
| JP | 2014-083801 | A | 5/2014 |
| JP | 2015-2149 | A1 | 1/2015 |
| JP | 6065702 | B2 | 1/2017 |
| JP | 6417810 | B2 | 11/2018 |
| JP | 2019-029065 | A | 2/2019 |
| JP | 6465914 | B2 | 2/2019 |
| JP | 6471647 | B2 | 2/2019 |
| JP | 2021-051924 | A | 4/2021 |
| KR | 10-2012-0066874 | A | 6/2012 |
| KR | 10-1731983 | B1 | 5/2017 |
| KR | 20180061439 | A | 6/2018 |
| KR | 10-2018-0111122 | A | 10/2018 |
| KR | 10-2020-0011228 | A | 2/2020 |
| KR | 10-2020-0059026 | A | 5/2020 |
| KR | 10-2020-0075141 | A | 6/2020 |
| KR | 10-2187450 | B1 | 12/2020 |
| KR | 10-2206908 | B1 | 1/2021 |
| KR | 10-2021-0048327 | A | 5/2021 |
| KR | 10-2021-0058170 | A | 5/2021 |
| KR | 10-2254336 | B1 | 5/2021 |
| KR | 10-2021-0126842 | A | 10/2021 |
| KR | 10-2322793 | B1 | 11/2021 |
| KR | 10-2331995 | B1 | 11/2021 |
| KR | 20220039264 | A | 3/2022 |
| KR | 10-2022-0100508 | A | 7/2022 |
| WO | 2021241960 | | 12/2021 |
| WO | 2022145905 | | 7/2022 |

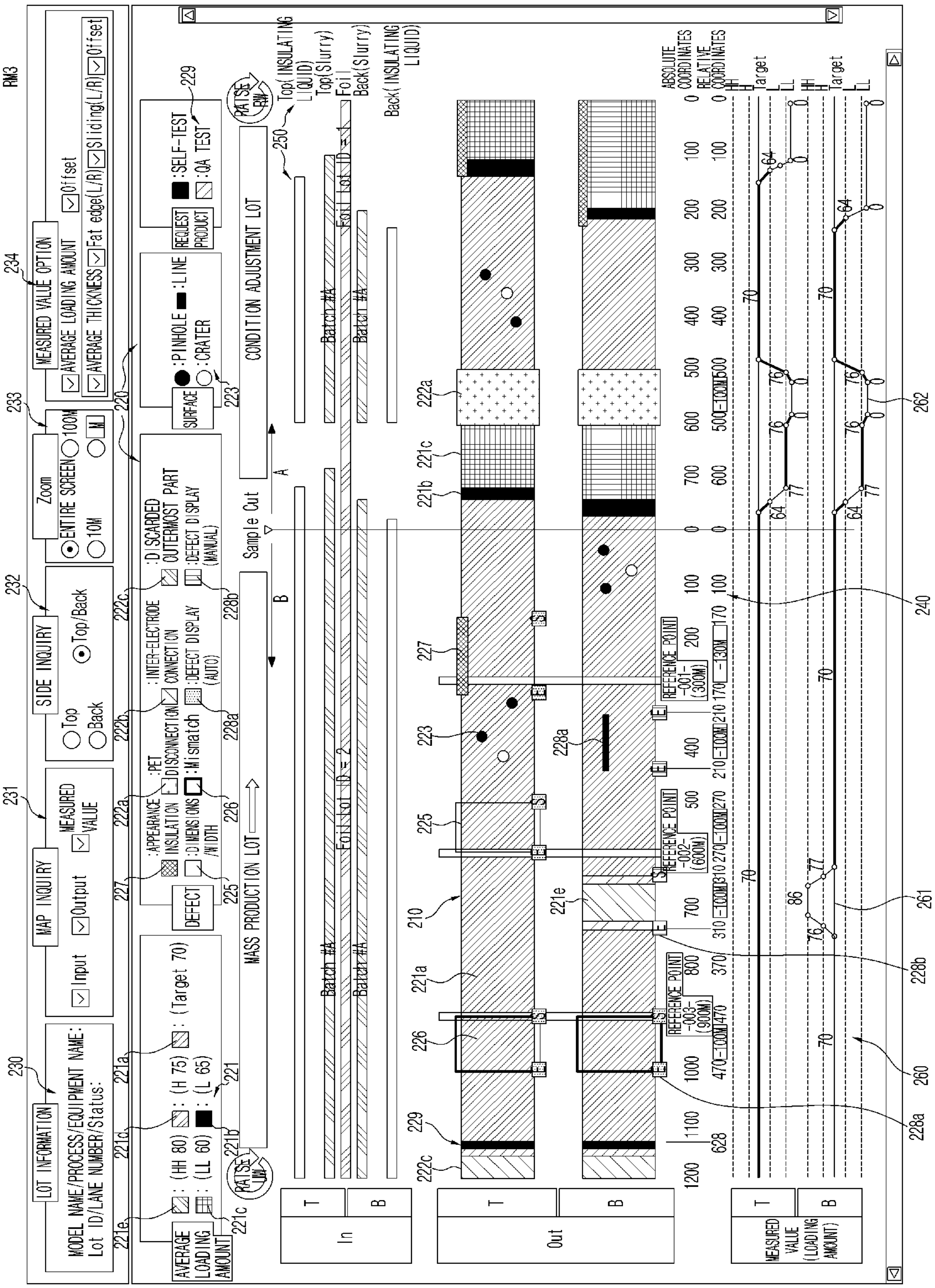
LOT INFORMATION
MODEL NAME/PROCESS/EQUIPMENT NAME:
Lot ID/LANE NUMBER/Status:
MAP INQUIRY
Input
Output
MEASURED VALUE
SIDE INQUIRY
Top
Back
Top/Back
Zoom
ENTIRE SCREEN
100M
10M
M
MEASURED VALUE OPTION
AVERAGE LOADING AMOUNT
Offset
AVERAGE THICKNESS
Fat edge(L/R)
Sliding(L/R)
Offset
MASS PRODUCTION LOT
CONDITION ADJUSTMENT LOT
Sample Cut
SURFACE
PINHOLE
LINE
CRATER
REQUEST PRODUCT
SELF-TEST
QA TEST
DEFECT
Mismatch
In
Out
MEASURED VALUE (LOADING AMOUNT)
FIG. 8

| | | ROLL PRESS ROLL MAP | NOTCHING ROLL MAP |
|---|---|---|---|
| BASED ON PRECEDING PROCESS | Top/Back REVERSAL | Y | Y |
| | Start/End REVERSAL | Y | Y |

| | | PRIMARY ROLL PRESS | SECONDARY ROLL PRESS | NOTCHING ROLL MAP |
|---|---|---|---|---|
| BASED ON PRECEDING PROCESS | Top/Back REVERSAL | Y | N | Y |
| | Start/End REVERSAL | Y | Y | Y |

| TIME | POSITIVE ELECTRODE | INPUT Lot ID | ROLL MAP COORDINATES |
|---|---|---|---|
| ... | | | |
| 21-10-15 16:32 | SBKF010098 | FAAGJ114R1 | 89.79 |
| 21-10-15 16:32 | SBKF010098 | FAAGJ114R1 | 89.79 |
| 21-10-15 16:32 | SBKF010098 | FAAGJ114R1 | 89.79 |
| 21-10-15 16:32 | SBKF010098 | FAAGJ114R1 | 89.79 |
| ... | | | |
| 21-10-15 16:40 | SBKF010098 | FAAGJ114R1 | 89.79 |
| ... | | | |
| 21-10-15 16:32 | SBKF010098 | FAAGJ114R1 | 89.79 |
| 21-10-15 16:32 | SBKF010098 | FAAGJ114R1 | 89.79 |
| 21-10-15 16:32 | SBKF010098 | FAAGJ114R1 | 89.79 |
| 21-10-15 16:32 | SBKF010098 | FAAGJ114R1 | 89.79 |
| 21-10-15 16:32 | SBKF010098 | FAAGJ114R1 | 89.79 |
| 21-10-15 16:32 | SBKF010098 | FAAGJ114R1 | 89.79 |
| ... | | | |

FIG. 60

| | | ROLL PRESS ROLL MAP | NOTCHING ROLL MAP |
|---|---|---|---|
| BASED ON PRECEDING PROCESS | Top/Back REVERSAL | Y | Y |
| | Start/End REVERSAL | Y | Y |

| PROCESS DATA | ELECTRODE MANUFACTURING PROCESS | | | ASSEMBLY PROCESS | MIXING/TANK TRANSFER |
|---|---|---|---|---|---|
| | COATING | ROLL PRESS | SLITTING | NOTCHING | |
| COORDINATE VALUES | C1 | C2 | C3 | C4 | -SLURRY LOT NUMBER<br>-ELECTRODE ROLL LOT NUMBER<br>-TANK TRANSFER PATH<br>...... |
| INSPECTED AND/OR MEASURED DATA | D1 | D2 | D3 | D4 | |
| EQUIPMENT DATA | E1 | E2 | E3 | E4 | |
| TIME-SERIES DATA | F1 | F2 | F3 | F4 | |

| PROCESS DATA | ELECTRODE MANUFACTURING PROCESS | | | ASSEMBLY PROCESS | | ACTIVATION PROCESS | MODULE PROCESS | PACK PROCESS | MIXING/TANK TRANSFER |
|---|---|---|---|---|---|---|---|---|---|
| | COATING | ROLL PRESS | SLITTING | NOTCHING | | | | | |
| | | | | COORDINATE VALUE | ELECTRODE ID | | | | |
| COORDINATE VALUES | C1 | C2 | C3 | C4 | #1 | %1 | @1 | ▲1 | -SLURRY LOT NUMBER<br>-ELECTRODE ROLL LOT NUMBER<br>-TANK TRANSFER PATH<br>...... |
| INSPECTED AND/OR MEASURED DATA | D1 | D2 | D3 | D4 | | D5 | D5 | D6 | |
| EQUIPMENT DATA | E1 | E2 | E3 | E4 | | E5 | E6 | E7 | |
| TIME-SERIES DATA | F1 | F2 | F3 | F4 | | F5 | F6 | F7 | |

FIG. 89

SYSTEMS AND METHODS FOR GENERATING ROLL MAP AND MANUFACTURING BATTERY USING ROLL MAP

CROSS-REFERENCE TO RELATED APPLICATION

This application claims priority to and the benefit of Korean Patent Application Nos. 10-2022-0116302, 10-2023-0013307, 10-2023-0074503, 10-2023-0074504, filed on Sep. 15, 2022, Jan. 31, 2023, Jun. 9, 2023, and Jun. 9, 2023, respectively, the disclosures of which are incorporated herein by reference in their entirety.

TECHNICAL FIELD

Various aspects of the present disclosure relate generally to systems and methods for manufacturing a battery using a roll map. Examples of the present disclosure relate to systems, apparatuses, and related methods for generating a roll map for manufacturing, monitoring, and tracking a battery, among other aspects.

BACKGROUND

Technological developments and increased demands in mobile devices have led to a rapid increase in the demand for secondary batteries. Among various types of secondary batteries, lithium secondary battery is widely used as energy source for various electronic products (e.g., mobile devices) because lithium secondary battery has high energy density and high operating voltage as well as excellent storage and battery life characteristics.

Manufacturing electrodes for secondary batteries generally requires several processes. For example, an electrode manufacturing process(es) for a lithium secondary battery may include a coating process to form positive and negative electrodes by coating the surfaces of metal electrode plates with an active material and an insulating material, a roll press process to roll the coated electrodes, and a slitting process to cut the rolled electrodes based on the desired dimensions.

Additionally, electrode tabs may be formed through a notching process that notches or cuts portions of the electrodes. An electrode assembly is then assembled by interposing a separator between the positive electrode and the negative electrode. A secondary battery cell is then assembled by stacking or folding the electrode assemblies and packaging the electrode assemblies in a housing (e.g., a pouch, a can, etc.) and injecting an electrolyte into the housing. The assembled secondary battery cell typically undergoes an activation process by charging and discharging the assembled secondary battery cell to produce a finished, functioning secondary battery product.

During an electrode and battery manufacturing process, an inspection device may detect defects or anomalies, for example, foreign substances mixed with the active material layer of the electrode or other poor coating conditions. The defects or anomalies may then be marked or tagged by an operator such that the detected defects or anomalies can be identified or removed later during the manufacturing process, (e.g., during a coating process or other subsequent processes).

However, it is difficult to physically mark or tag, for example, a coating part or other areas of the electrode when an operator is manually marking or tagging the electrode. Thus, the operator is generally forced to place marks or tags on non-coating or uncoated parts of the electrode, and displaying or identifying the exact location of defects or anomalies on the electrode becomes difficult. Additionally, after the electrode manufacturing process is completed, it may be difficult to determine the cause or location of other defects that may occur during a subsequent process. That is, once the markings or tags on the electrode are removed for assembly or disappear during manufacturing, it becomes challenging to analyze the quality based on the correlations between the electrode manufacturing process and the subsequent processes. Attempts have been made to place ink markings directly on an outer surface of a secondary battery in an effort to signify that a defect(s) has been identified during the electrode manufacturing process. However, identifying the history information about the defects occurring during an electrode manufacturing process based on the marking on the finished battery product is difficult and unlikely to be reliable or accurate. Additionally, information other than the defects or anomalies, for example, information on the amount of slurry loading, electrodes dimensions, etc. used during the electrode manufacturing process cannot be determined merely based on the known marking methods.

Further, despite there being undetected defects at the time of manufacturing of an electrode or a battery, a fire or other failures may occur during use of finished secondary battery products. Accordingly, identifying and determining the cause of failures by retracing the product history of the battery, as well as the electrode, during manufacturing, is critical and desirable for improving the safety of the battery products.

The present disclosure is directed to overcoming one or more of these above-referenced challenges and deficiencies. The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

Examples of the present disclosure relate to, among other things, systems, apparatuses, and related methods for manufacturing a battery using a roll map, and for generating a roll map for manufacturing, monitoring, and tracking a battery. Each of the aspects disclosed herein may include one or more of the features described in connection with any of the other disclosed aspects.

In one example, an apparatus is provided for generating a roll map. The apparatus for generating the roll map may include an inspection and/or measurement device configured to inspect and/or measure an electrode between an unwinder and a rewinder. In one embodiment, the electrode may be arranged to move between the unwinder and the rewinder. The inspection and/or measurement device may acquire the inspected and/or measured data. The apparatus may include a roll map generation unit configured to generate the roll map. The roll map may include a planar area where simulated electrode may be display. The simulated electrode may be marked with the inspected and/or measured data.

In other aspects, an apparatus for generating a roll map described herein may include one or more of the following features. The apparatus for generating the roll map may further include a position measurement device configured to acquire coordinate values of a position of the electrode based on an amount of rotation of the unwinder and/or the rewinder. The position measurement device may be a rotary encoder configured to measure the position of the electrode based on an amount of rotation of a motor configured to drive the unwinder or the rewinder. The inspected and/or measured data may include: i) data of a dimension of the electrode; ii) data of a mismatch between an electrode coating part and an electrode non-coating part; iii) data of an amount of slurry loading on the electrode; iv) data of a surface of the electrode; v) data of a position of an electrode disconnection section or a connection position between the electrode and another electrode; vi) data on a position of a sample inspection unit; vii) data of a position of an electrode discard section; viii) data of insulation quality or a defect identified during an insulating material coating process performed after an electrode slurry coating; ix) defect data; x) data of reference points marked on the electrode at predetermined intervals; and/or xi) data of a thickness of the electrode after a roll press is performed. The inspection and/or measurement device may include: a reference point measurement device configured to measure reference points marked on the electrode at predetermined intervals; a joint measurement device configured to detect a joint attached to the electrode; a loading amount measurement device configured to measure an amount of slurry loading on the electrode; a dimension measurement device; an electrode exterior inspection device; and/or an electrode thickness measurement device. The inspection and/or measurement device may be connected to the position measurement device to acquire coordinate values of an electrode part, and may transmit the inspected and/or measured data and the coordinate values of the electrode part to the roll map generation unit. The coordinate values may be acquired together with the inspected and/or measured data. The apparatus for generating the roll map may further include a controller configured to control a movement of the electrode between the unwinder and the rewinder. The controller may match the inspected and/or measured data with coordinate values of an electrode part, and may transmit the coordinate values and the inspected and/or measured data matching the coordinate values to the roll map generation unit. The coordinate values may be acquired together with the inspected and/or measured data. The coordinate values of the electrode part may be obtained based on an amount of rotation of the rewinder and an offset distance between the corresponding inspection and/or measurement device and the rewinder. The coordinate values of the electrode may be obtained when corresponding inspected and/or measured data is acquired. The roll map generation unit may mark the coordinate values and the inspected and/or measured data on the roll map. The roll map generation unit may mark or display simulated reference points on the roll map based on the reference points marked on the electrode at predetermined intervals and corresponding to coordinate values of the reference points. The roll map generation unit may be a manufacturing execution system (MES) or a statistical process control (SPC) unit. The roll map generation unit may include a visualization device configured to define a visualization region including the planar area of the roll map and may display the coordinate values and visualize and display the inspected and/or measured data on the visualization region. The roll map generation unit may further include a central processing unit configured to compare the inspected and/or measured data with normal data, and visualize and display data determined to be abnormal on the visualization device. In one embodiment, the normal data may be defined as data that meets or is within one or more predetermined manufacturing tolerance characteristics or ranges of the electrode manufacturing process according to the present disclosure. Conversely, abnormal data may be defined as data that does not meet or is outside of one or more predetermined manufacturing tolerance characteristics or ranges of the electrode manufacturing tolerances. The apparatus for generating the roll map may further include a manual input device configured to receive manually inspection and/or measurement data. The manual input device may transmit the manually inspected and/or measured data of the electrode directly to the roll map generation unit or through a controller that is configured to control a movement of the electrode between the unwinder and the rewinder. The apparatus for generating the roll map may further include a display unit connected to the roll map generation unit to display the roll map. The coordinate values acquired by the position measurement device may be position values of the electrode in a longitudinal direction. The roll map generation unit may mark coordinate values of a position of the electrode in a width direction on the roll map. The coordinate values of the position in the width direction may be acquired by the inspection and/or measurement device. The roll map generation unit may generate at least one of an absolute coordinate roll map displaying coordinate values of an electrode removal part and a remaining electrode part or a relative coordinate roll map displaying the coordinate values of the remaining electrode part. In one embodiment, the relative coordinate roll map may display the coordinate values of the electrode part but not the coordinate values of the electrode removal part. The roll map generation unit may generate at least one a top surface of the electrode on the roll map or a back surface of the electrode on the roll map.

In another example, a method is provided for generating a roll map. The method may include: inspecting and/or measuring an electrode between an unwinder and a rewinder; acquiring inspected and/or measured data and acquiring coordinate values of a position of the electrode; and generating a roll map by providing at least one of the inspected and/or measured data or the coordinate values on a planar area of the roll map on which the electrode is simulated. In one embodiment, the electrode may move between the unwinder and the rewinder.

In other aspects, a method for generating a roll map described herein may include one or more of the following steps or features. A specification of an electrode roll installed on the unwinder may be registered before acquiring the inspected and/or measured data. Information of the specification of the electrode roll may be displayed on the roll map. The inspected and/or measured data may be automatically acquired by an inspection and/or measurement device or may be manually acquired by an operator. The method may further include providing one or more reference points at one or more positions on the roll map corresponding to coordinate values of the reference points marked on the electrode at predetermined intervals. The method may further include comparing the inspected and/or measured data with normal data, and providing abnormal data on the roll map to be visually distinct from the inspected and/or measure data or the normal data. In one embodiment, the normal data may be defined as data that meets or is within one or more predetermined manufacturing tolerance characteristics or ranges of the electrode manufacturing process according to the present disclosure. Conversely, abnormal data may be defined as data that does not meet or is outside of one or more predetermined manufacturing tolerance characteristics or ranges of the electrode manufacturing tolerances. The method may further include providing input status data of an input material input during an electrode manufacturing process on the roll map. The method may further include providing detailed data of the inspected and/or measured data or process data of a sub process when the electrode is manufactured based on specific coordinate values on a specific data display part of the roll map. The detailed data may include inspection data, measurement data. The detailed data and the process data may be linked to the specific coordinate values and data display parts of the roll map. For example, upon receiving an input from a user for selecting a coordinate value on the roll map, relevant information or data relating to the location of the electrode may be displayed on the roll map. Additionally or alternatively, the relevant information of data may be displayed in the data display part of the roll map.

In yet another example, a roll map is provided. The roll map may include a roll map bar having a bar shape simulating an electrode between an unwinder and a rewinder. Inspected and/or measured data may be acquired by inspecting and/or measuring the electrode. The inspected and/or measured data may be displayed at a predetermined position on the roll map bar corresponding to an inspected and/or measured position of the electrode.

In other aspects, the roll map described herein may include one or more of the following features. Coordinate values indicating a position of the electrode in a longitudinal direction may be displayed in a longitudinal direction of the roll map bar. Information of a specification, a manufacturing process, and manufacturing equipment of the electrode may be displayed on the roll map bar. The inspected and/or measured data may include: i) data of a dimension of the electrode; ii) data of a mismatch between an electrode coating part and an electrode non-coating or uncoated part; iii) data of an amount of slurry loading on the electrode; iv) data of a surface of the electrode; v) data of a position of an electrode disconnection section or a connection position between the electrode and another electrode; vi) data of a position of a sample inspection unit; vii) data of a position of an electrode discard section; viii) data of insulation quality or a defect in an insulating material coating process performed after electrode slurry coating; ix) other defect data; x) data of reference points marked on the electrode at predetermined intervals; and xi) data of a thickness of the electrode after a roll press is performed. The roll map may include one or more electrode lanes, and the roll map bar may be provided on the one or more electrode lanes. The roll map bar may simulate a top surface of the electrode or may simulate a back surface of the electrode. In one embodiment, an additional roll map bar may be provided. The additional roll map bar may be provided on the one or more electrode lanes, and the additional roll map bar may simulate a top surface of the electrode or may simulate a back surface of the electrode. The inspected and/or measured data may be displayed on the roll map bar and/or the additional roll map bar. Input status data of an input material input during an electrode manufacturing process may be displayed on the roll map or the roll map bar. The inspected and/or measured data or process data of a detailed process when the electrode is manufactured associated with specific coordinate values may be displayed on a specific data display part of the roll map. In one embodiment, the roll map may include a roll map bar. When a first range of the roll map bar is designated or selected, the inspected and/or measured data and/or the process data for the detailed process when the electrode is manufactured associated with the specific range may be displayed. When an area on the roll map bar is designated or selected, an image associated with the area may be displayed. Simulated reference points associated with reference points marked on the electrode at predetermined intervals may be displayed at corresponding positions on the roll map bar based on the coordinate values of the reference points. When positions of the reference points on the electrode are changed as a coated electrode is roll-pressed and elongated, a simulated reference point corresponding to the changed reference point may be displayed at a coordinate position corresponding to the changed position on the roll map bar. The roll map may be stored in a storage medium.

In yet another example, an apparatus is provided for measuring a loss amount of an electrode. The apparatus may include an electrode arranged to move between an unwinder and a rewinder. The electrode may be marked with a plurality of reference points at predetermined intervals between an electrode start portion and an electrode end portion. The apparatus may further include a reference point measurement device configured to measure the plurality of reference points on the electrode and a position measurement device configured to determine coordinate values of the electrode according to an amount of rotation of the unwinder or the rewinder. The position measurement device may determine coordinate values of a corresponding reference point based on the plurality of reference points measured by the reference point measurement device. The apparatus may further include a calculator configured to calculate a loss amount of the electrode by comparing the coordinate values of the corresponding reference point with set reference point coordinate values when a reference interval between the electrode start portion and the electrode end portion has changed from a set reference point interval due to a loss of a part of the electrode.

In yet another example, a method of measuring a loss amount of an electrode is provided. The method may include: marking a plurality of reference points at predetermined intervals between a start portion of an electrode and an end portion of the electrode moving between an unwinder and a rewinder; measuring, by a reference point measurement device, the plurality of reference points on the electrode and determining coordinate values of the reference points; and calculating a loss amount of the electrode by comparing the reference point coordinate values of the reference points with set reference point coordinate values when a reference interval between the electrode start and end portions has changed from a set reference point interval due to a loss of a part of the electrode.

In yet another example, an apparatus is provided for generating a roll map. The apparatus may include a reference point measurement device configured to inspect an electrode moving between an unwinder and a rewinder and to detect reference points marked on the electrode, a position measurement device configured to determine coordinate values of the electrode according to an amount of rotation of the unwinder or the rewinder and to determine coordinate values of the reference points, and a roll map generation unit configured to generate a roll map bar simulating the moving electrode and to generate a roll map displaying a loss amount of the electrode calculated by comparing the derived reference point coordinate values with set reference point coordinate values on the roll map bar.

In yet another example, a system for correcting a roll map is provided. The system for correcting the roll map may include a roll map generation unit configured to generate a roll map of a first process. The roll map may include a planar area on which a simulated electrode is displayed. An electrode moving between a first unwinder and a first rewinder during the first process may be simulated by the simulated electrode. The roll map may display inspected and/or measured data of the electrode and coordinate values indicating a position of the electrode during the first process. The system may further include a roll map corrector configured to convert the coordinate values of the roll map of the first process in a reverse order so that coordinate values of a start portion of the roll map and an end portion of the roll map of the first process may be reversed. The roll map generation unit may generate a roll map of a second process when the second process is performed on the electrode moving between a second unwinder and a second rewinder.

In other aspects, the system for correcting a roll map described herein may include one or more of the following features. When a part of an end of the electrode is removed before the second process starts and after the first process is completed, the roll map corrector may adjust coordinate values corresponding to the removed part of the end of the electrode from the roll map of the first process, convert the coordinate values of the roll map of the first process in the reverse order so that the coordinate values of the start portion of the roll map of the first process and the coordinate values of the end portion in which the part of the end of the electrode has been removed are reversed, and generate the roll map of the second process.

In yet another example, an apparatus for removing a defect of an electrode between a first unwinder and a first rewinder is provided. The electrode may be arranged or adapted to move between the first unwinder and the first rewinder. A first process may be performed on the electrode between the first unwinder and the first rewinder. During a second process, a defect removal port may be positioned between a second unwinder and a second rewinder and at which a defective section of the electrode identified during the first process may be removed. A second process controller configured to control a movement of the electrode between the second unwinder and the second rewinder may be provided. The second process controller may calculate or determine a time point at which the defective section of the electrode reaches the defect removal port from the second unwinder. The time point may be determined or calculated based on coordinate information of the defective section displayed on a roll map of the first. The second process controller may stop the movement of the electrode during the second process to remove the defective section of the electrode at the defect removal port when the defective section reaches the defect removal port.

In other aspects, the apparatus for removing a defect of an electrode described herein may include one or more of the following features. The apparatus for removing a defect of an electrode may further include a roll map corrector configured to generate a corrected roll map by converting coordinate values of the roll map of the first process in a reverse order so that coordinates of a start portion and an end portion of the roll map of the first process are reversed. The second process controller may stop the movement of the electrode based on coordinate values of a defect section displayed on the corrected roll map. When a part of an end of the electrode is removed before the second process starts but after the first process is completed, the roll map corrector may remove coordinate values corresponding to the removed part of the end of the electrode from the roll map of the first process. The roll map corrector may generate a corrected roll map by converting the coordinate values of the roll map of the first process in the reverse order so that the coordinate values of the start portion of the roll map of the first process and the coordinate values of the end portion in which the part of the end of the electrode has been removed may be reversed. The second process controller may stop the movement of the electrode based on the coordinate values of the defective section displayed on the corrected roll map. The second process controller may control the electrode to move slowly at a first speed during a predetermined time section of the second process. The predetermined time section may be between a predetermined time point and an arrival time point before the defect section reaches the defect removal port. The apparatus for removing a defect of an electrode may further include a warning unit configured to generate or output an alarm based on a condition when the defective section reaches the defect removal port. The condition may include at least one of when the movement of the electrode during the second process stops, or when a predetermined time has elapsed after the movement of the electrode during the second process has stopped. The first process may be an electrode coating process of applying an electrode active material to a current collector to form a coated electrode, and the second process may be a roll press process of rolling the coating electrode with a press roll.

In yet another example, a system for generating a roll map may be provided. The roll map may include a series of roll-to-roll processes. The series of roll-to-roll processes may be performed sequentially and repeatedly. An electrode may be released from a roll on an unwinder to move toward and wound on a rewinder. The system may include an apparatus for generating a roll map. The apparatus for generating the roll map may be configured to generate a roll map of each of the series of roll-to-roll processes. The roll map of each of the series of roll-to-roll processes may include a coordinate planar surface (or area) having two coordinate axes including a longitudinal axis and a width axis of the electrode and may display a position of the electrode in each the series of roll-to-roll processes as coordinate values of the coordinate planar surface. The system may include a roll map matching unit configured to match coordinate values of the roll map of each of the series of roll-to-roll processes with coordinate values of a roll map of a final roll-to-roll process so that an actual electrode represented by the roll map of the final roll-to-roll process and each actual electrode represented by the roll map of each of the series of roll-to-roll processes before the final roll-to-roll process are matched.

In other aspects, the apparatus for generating the roll map described herein may include one or more of the following features. The apparatus may further include a position measurement device configured to acquire coordinate values of a position of the electrode in a longitudinal direction according to an amount of rotation of one of the unwinder or the rewinder during each of the series of roll-to-roll processes and/or the final roll-to-roll process. The apparatus may further include an inspection and/or measurement device configured to inspect the electrode between the unwinder and the rewinder. The electrode may be arranged or adapted to move between the unwinder and the rewinder. The inspection and/or measurement device may acquire inspected and/or measured data. The apparatus may further include a roll map generation unit for generating the roll map by defining a visualization region in which the coordinate planar surface of the roll map may be formed. The roll map generation unit may be configured to mark at least one of the inspected and/or measured data, the coordinate values of the electrode in the longitudinal direction, or combinations thereof, on the visualization region. The inspected and/or measured data may be one or more of the following items: i) data of at least one of a dimension or a width of the electrode; ii) data of mismatch between an electrode coating or coated part and an electrode non-coating or non-coated part; iii) data of an amount of slurry loading on the electrode; iv) data of an exterior or surface of the electrode; v) data of a position of an electrode disconnection section, a connection position between electrodes, or a joint on the electrode; vi) data of a position of a sample inspection unit; vii) data of a position of an electrode discard section; viii) data of insulation quality or a defect during an insulating material coating process performed after electrode slurry coating; ix) other defect data; x) data of reference points marked on the electrode at predetermined intervals; and xi) data of a thickness of the electrode after a roll press is performed. Coordinate values of an electrode part and corresponding inspected and/or measured data may be displayed on the roll map of each of the series of roll-to-roll processes and/or the final roll-to-roll process. Coordinate values of the electrode part in the longitudinal direction may be obtained by adding coordinate values of the electrode in the longitudinal direction with an offset distance. The coordinate values of the electrode in the longitudinal may be determined based on an amount of rotation of the rewinder at a time point at which corresponding inspected and/or measured data in the longitudinal direction has been detected. The offset distance may be a distance between the corresponding inspection and/or measurement device and the rewinder. Coordinate values of the electrode part in a width direction for which inspected and/or measured data in the width direction has been acquired may be acquired by the inspection and/or measurement device. The apparatus for generating the roll map may further include a controller configured to control a movement of the electrode between the unwinder and the rewinder. The controller may match the inspected and/or measured data with the coordinate values of the electrode part, and may transmit a matching result to the roll map generation unit. The roll map generation unit may generate an absolute coordinate roll map displaying coordinate values of a removed electrode part during and in between each of the series of roll-to-roll processes and/or the final roll-to-roll process. The absolute coordinate roll map may display coordinate values of a remaining electrode part excluding the removed electrode part together with the coordinate planar surface. The roll map generation unit may generate a relative coordinate roll map displaying only the coordinate values of the remaining electrode part excluding the removed electrode part on the coordinate planar surface. The roll map matching unit may match the coordinate values of the relative coordinate roll map of each of the series of roll-to-roll processes before the final roll-to-roll process with coordinate values of the relative coordinate roll map of the final roll-to-roll process. The roll map generation unit may generate a roll map for a top surface of the electrode and/or a roll map for a back surface of the electrode. When the final roll-to-roll process is a notching process, the roll map generation unit may generate a roll map having a single planar surface displaying only the coordinate values on the coordinate planar surface of the top surface and/or the back surface of the electrode. The roll map matching unit may be configured to remove all coordinate sections corresponding to actual electrode parts removed in each of the series of roll-to-roll processes from the roll map of each of the series of roll-to-roll processes. The roll map matching unit may match a length of the roll map in each of the series of roll-to-roll processes with a length of the roll map of the final roll-to-roll process by correcting coordinate values of the remaining coordinate sections after removing the actual electrodes to match the coordinate values of the roll map of the final process. When a start direction of coordinates of the roll map of a process before the final process is reversed from a start direction of coordinates of the roll map of the final process, the roll map matching unit may match the start direction of the coordinates of the roll map of the process before the final process with the start direction of the coordinates of the roll map of the final process. The relationship between the start direction of coordinates of the process before the final process and the start direction of the final process may be based on an electrode winding direction in the rewinder of the process before the final process and an electrode unwinding direction in the unwinder in the final process. When a top surface of the electrode in a preceding process is reversed to a back surface of the electrode in a following or subsequent process based on an electrode winding direction in the rewinder in the preceding process and an electrode unwinding direction in the unwinder in the following process, information on a reversal of electrode surfaces may be stored in the roll map matching unit. The roll map matching unit may match a roll map for the top surface of the electrode in the preceding process with a roll map for the back surface of the electrode in the following process according to the information. The roll map matching unit may arrange the roll map of the final roll-to-roll process and the roll map of each of the serial roll-to-roll processes matching the roll map of the final process side by side, and may generate signals to display the arranged roll maps as an overlay roll map. The apparatus for generating the roll map may further include a display unit configured to display an overlay roll map. In one embodiment, a roll map (or a roll map bar) may be generated for each of the serial roll-to-roll processes, and each of the roll maps (or roll map bars) of the serial roll-to-roll processes may be displayed on a single roll map interface side-by-side in an overlay fashion. For example, each roll map may be displayed chronologically from top to bottom. Further, the roll map (or roll map bar) of the final process may be displayed together with the roll maps of the serial roll-to-roll processes in the single roll map interface. Additionally, the roll map of the final process may be displayed adjacent to or below the chronologically last roll map of the serial roll-to-roll processes.

In yet another example, an overlay roll map may be provided. The overlay roll map may comprise roll maps of a series of roll-to-roll processes corresponding to an electrode moving between an unwinder and a rewinder. The series of roll-to-roll processes may be performed sequentially and repeatedly. The roll maps of the series of roll-to-roll processes may be arranged side by side. In the overlay roll map, a roll map matching may be performed on a roll map of a prior process before a final process. The roll map matching may be performed such that coordinate values of the roll maps in each of the series of roll-to-roll processes match coordinate values of the roll map of the final process so that an actual electrode represented by the roll map of the final process matches each actual electrode represented by the roll map of each of the roll-to-roll processes before the final process. A storage medium may be provided to store the overlay roll map.

In yet another example, a system for manufacturing a battery may be provided. The system may include a notching controller configured to acquire electrode coordinate information of an electrode moving in a line during a notching process. The notching controller may be configured to acquire a cell ID of a unit electrode. The system may include a calculator configured to calculate coordinate values of the cell ID. The coordinate values of the cell ID may be a position of the unit electrode during the notching process. The system may include a roll map generation unit. The roll map generation unit may be configured to generate a roll map based on pitch information of the unit electrode and the cell ID. The roll map may display coordinate values of a position of the electrode to identify a change in length of the electrode during one or more electrode manufacturing processes. The one or more electrode manufacturing processes may be performed before the notching process. The system may include a mapping unit. The mapping unit may be configured to derive a position of the unit electrode during the one or more electrode manufacturing processes based on the electrode coordinate information transmitted from the notching controller. The position of the unit electrode may be derived by comparing one or more coordinate values of the roll map with the coordinate values of the cell ID.

In yet another example, a system for manufacturing a battery may be provided. The system may include a plurality of tanks connected with a pipe between a mixer and a coater to move electrode slurry supplied from the mixer to the coater. The electrode slurry may be moved to the coater sequentially. The system may include a controller configured to identify lot information of the electrode slurry and to record the lot information of the electrode slurry. The lot information of the electrode slurry may be recorded based on the lot information of the electrode slurry supplied to each of the plurality of tanks. The controller may be configured to detect lot information of the electrode slurry of a final supply tank. The final supply tank may be adapted or configured to supply the electrode slurry of the final supply tank to the coater. The lot information of the electrode slurry of the final supply tank may be determined in reference to a history of the lot information recorded for each of the plurality of tanks. The lot information of the electrode slurry of the final supply tank may be recorded.

In yet another example, a method of manufacturing a battery may be provided. The method may include recognizing and recording lot information of electrode slurry supplied from a mixer, assigning the lot information of the electrode slurry to each of a plurality of tanks when the electrode slurry is sequentially moved or communicated to each of the plurality of tanks, recording the lot information of the electrode slurry after the lot information of the electrode slurry supplied to each tank has been assigned to each of the plurality of tanks, and detecting lot information of the electrode slurry of a final supply tank. The electrode slurry of the final supply may be supplied to a coater. A supply history of the final tank may be recorded in reference to the lot information recorded for each of the plurality of tanks.

In yet another example, a system for manufacturing a battery may be provided. The system may include a programmable logic controller (PLC) configured to receive specification information of one or more electrodes from a first sensor, receive position coordinates of the one or more electrodes from a second sensor, and generate identification information of each of the one or more electrodes based on the specification information and the position coordinates of the one or more electrodes, an inspection device configured to inspect the one or more electrodes and generate inspection information, and a controller configured to match and manage the identification information and the inspection information of the one or more electrodes.

In other aspects, the apparatus for manufacturing a battery described herein may include one or more of the following features. The PLC may receive quantity count values of the one or more electrodes according to one or more lengths of one or more electrode tabs from the first sensor, and the quantity count value of the electrode may include a binary coded decimal (BCD) code. The PLC may receive coordinates of one or more roll maps of the one or more electrodes from an encoder installed on a rewinder provided in a notching apparatus. The notching apparatus may be configured to notch the one or more electrodes. The PLC may generate an ID of each of the one or more electrodes based on specification information of one or more positive electrode tabs and the coordinates of the one or more roll maps. The inspection device may receive the specification information of the one or more electrodes from the first sensor, and may add the specification information to the inspection information of the one or more electrodes. The controller may match and manage the ID of each of the one or more electrodes and the inspection information of the one or more electrodes. The controller may match the ID of each of the one or more electrodes with the inspection information of the one or more electrodes to generate integrated inspection information of the one or more electrodes, and may transmit the integrated inspection information to one or more servers.

In yet another example, a method of manufacturing a battery may be provided. The method may include receiving specification information of one or more electrodes from a first sensor, receiving position coordinates of the one or more electrodes from a second sensor, generating identification information of each of the one or more electrodes based on the specification information and the position coordinates, inspecting the one or more electrodes and generating inspection information, and matching and managing the identification information and the inspection information of the one or more electrodes.

In other aspects, the method of manufacturing a battery described herein may include one or more of the following steps or features. The receiving of the specification information of the one or more electrodes from the first sensor may include receiving quantity count values of the one or more electrodes according to lengths of one or more electrode tabs from the first sensor, and the quantity count value of the electrode may include a binary coded decimal (BCD) code. The receiving of the position coordinates of the one or more electrodes from the second sensor may include receiving coordinates of roll maps of the one or more electrodes from an encoder installed on a rewinder provided in a notching apparatus configured to notch the one or more electrodes. The generating of the identification information of each of the one or more electrodes based on the specification information and the position coordinates may include generating an ID of each of the one or more electrodes based on specification information of one or more positive electrode tabs and the coordinates of the roll maps. The inspecting of the one or more electrodes to generate the inspection information may include receiving the specification information of the one or more electrodes from the first sensor, and adding the specification information to the inspection information of the one or more electrodes. The matching and managing of the identification information and the inspection information of the one or more electrodes may include matching and managing the IDs of the one or more electrodes and the inspection information of the one or more electrodes. The matching and managing of the identification information and the inspection information of the one or more electrodes may include matching the IDs of the one or more electrodes with the inspection information of the one or more electrodes to generate integrated inspection information of the one or more electrodes, and transmitting the integrated inspection information to a server.

In yet another example, a method of manufacturing a battery may be provided. The method may include generating a virtual ID corresponding to a battery cell, shifting the virtual ID according to progress of a process performed on the battery cell, matching the shifted virtual ID with process data generated for the battery cell to generate and store a first matching result, extracting a cell ID of the battery cell, and matching the process data with the cell ID. The process data may be matched with the cell ID by matching the virtual ID corresponding to the cell ID with the cell ID to generate and store a second matching result. The second result may be transmitted to an upper level control system.

In other aspects, the method of manufacturing a battery described herein may include one or more of the following steps or features. The method may further include matching process operation information indicating one or more processes being performed on the battery cell with the virtual ID after the generating of the virtual ID. The shifting of the virtual ID may include changing the process operation information matched with the virtual ID when the process being performed on the battery cell is changed. The process data may include an operation result and/or a test result of the process performed on the battery cell. The extracting of the cell ID of the battery cell may include reading a cell ID in a form of a barcode attached to the battery cell. The process data matching the cell ID may be process data collected in a time series in the one or more processes performed on the battery cell. The one or more processes for the battery cell may include a notching and dryer (NDD) process and/or a lamination process.

In yet another example, a system for manufacturing a battery may be provided. The system may include a virtual ID generator configured to generate a virtual ID corresponding to a battery cell, a virtual ID manager configured to shift the virtual ID according to progress of one or more processes being performed on the battery cell, a process data collector configured to match the shifted virtual ID with process data generated for the battery cell to generate and store a matching result, and a main controller configured to match the process data with the cell ID. The process data may be matched with the cell ID by matching the virtual ID corresponding to the cell ID extracted from the battery cell with the cell ID to generate process information.

In other aspects, the system for manufacturing a battery described herein may include one or more of the following features. The virtual ID manager may match process operation information indicating the one or more processes being performed on the battery cell with the virtual ID after the virtual ID is generated. The virtual ID manager may change the process operation information matched with the virtual ID when the one or more processes being performed on the battery cell is changed. The process data may include an operation result and/or a test result of the one or more processes performed on the battery cell. The process data matching the cell ID may be process data collected in time series in the one or more processes performed on the battery cell. The one or more processes performed on the battery cell may include an NDD process and/or a lamination process. The system for manufacturing a battery may further include a communicator configured to transmit the process information to an upper level control system.

In yet another example, a system for manufacturing a battery is provided. The system may include a first roll map generation unit configured to generate a first roll map. The first roll map may include process data matching or corresponding to coordinate values or data of one or more positions of an electrode determined during one or more stages of a manufacturing process of the electrode. The coordinate values or data indicating the position of the electrode may be processed or compared with the inspected and/or measured data. The system may include a server unit configured to store the inspected and/or measured data and/or detailed data associated with the inspected and/or measured data. The server unit may be configured to store some or all of the inspected and/or measured data. The system may include a second roll map generation unit configured to generate a second roll map. The second roll map may include the first data and second data including information corresponding to the first data. The second data may include coordinate values or data identical to the above-described coordinate values or data indicating the position of the electrode. The second data may include at least one of data having an amount or volume greater than an amount or volume of the first data, processed data corresponding to the first data, or data having a same or similar type as the first data. The second roll map generation unit may display the inspected and/or measured data and/or the detailed data matching the coordinate values of the first roll map. The second roll map generation unit may display some or all of the inspected and/or measure data. The second roll map generation unit may include a roll map matching unit configured to match coordinate values of a roll map of a preceding process with coordinate values of a roll map of a following or subsequent process. An actual electrode represented by the roll map of the preceding process may correspond with an actual electrode represented by the roll map of the following process. The inspected and/or measured data may include a representative value, an average value of the inspected and/or measured data, and/or a determination value based on the inspected and/or measured data. The inspected and/or measured data may include raw data. The detailed data may include image data on the moving electrode. The inspected and/or measured data and/or the detailed data may match the coordinate values indicating the position of the electrode and be stored in the server unit. Specifications of an input material for manufacturing the electrode, process data for a mixing process of the input material, and path data on a moving path through which the mixed input material is moved to an electrode coater may match at least one of the coordinate values of the first roll map or the coordinate values of the second roll map and the inspected and/or measured data matching the coordinate values of the first roll map and the second roll map.

In yet another example, a method of manufacturing a battery is provided. The method may include generating a first roll map displaying coordinate values indicating a position of an electrode and inspected and/or measured data acquired from the electrode. The method may include matching or mapping the coordinate values with the inspected and/or measured data, storing the inspected and/or measured data and detailed data associated with the inspected and/or measured data, and generating the second roll map displaying the inspected and/or measured data and/or the detailed data matching or mapping with the coordinate values of the first roll map. In one embodiment, the detailed data may be stored in a server system.

In yet another example, a system for manufacturing a battery is provided. The system may include a first roll map generation unit configured to generate a first roll map displaying coordinate values indicating a position of an electrode and inspected and/or measured data acquired from the electrode. The coordinate values may be matched or mapped to the inspected and/or measured data. The system may include a first roll map matching unit configured to match or map coordinate values of the first roll map of a preceding process with coordinate values of a first roll map of a following or subsequent process so that an actual electrode represented by the first roll map of the preceding process corresponds to an actual electrode represented by the first roll map of the following process.

In other aspects, the system for manufacturing a battery described herein may include one or more of the following features. The roll map matching unit may arrange the first roll map of the preceding process and the first roll map of the following process side by side and may display the first roll maps of the preceding and following processes as an overlay roll map. The roll map matching unit may match or map coordinate values of the first roll map of one or more processes performed before the final process to correspond with coordinate values of the first roll map of a final process so that an actual electrode represented by the first roll map of the final process may correspond with an actual electrode represented by the first roll map of the one or more. The one or more processes may be performed in a series of roll-to-roll processes. The roll map matching unit may arrange the first roll map of the final process and the first roll map of each of the one or more processes matching the first roll map of the final process side by side, and may display the first roll map of the final process and the first roll map of each of the one or more processes as an overlay roll map. The system for manufacturing a battery may further include a position measurement device configured to acquire coordinate values of a position of the electrode in a longitudinal direction according to an amount of rotation of at least one of an unwinder or a rewinder, and an inspection and/or measurement device configured to inspect the electrode moving between the unwinder and the rewinder and to acquire or generate inspected and/or measured data. The first roll map generation unit may generate the first roll map by defining a visualization region or area in which the first roll map may be formed or generated. The first roll map may display the inspected and/or measured data and the coordinate values of the electrode in the visualization region. The coordinate values of the position of the electrode in the longitudinal direction may be acquired or obtained by adding coordinate values of the electrode in the longitudinal direction according to an amount of rotation of the rewinder at a time point at which corresponding inspected and/or measured data has been detected with an offset distance. The offset distance may be a distance between the corresponding inspection and/or measurement device and the rewinder. Coordinate values of a position of the electrode in a width direction for which the inspected and/or measured data has been acquired may be acquired by the inspection and/or measurement device. The first roll map generation unit may be configured to generate an first absolute coordinate roll map. The first absolute coordinate first roll map may display coordinate values of a removed electrode part. The removed electrode part may be removed during the one or more processes and/or between the one or more processes. The first absolute coordinate roll map may display the coordinate values of the removed electrode part and coordinate values of a remaining electrode part on a coordinate planar surface or area without displaying the removed electrode part The first roll map generation may be configured to generate a first relative coordinate roll map. The first relative coordinate roll map may display the coordinate values of the remaining electrode part without the removed electrode part on the coordinate planar surface. The roll map matching unit may be configured to match coordinate values of a relative coordinate roll map of the following process with coordinate values of a relative coordinate roll map of the preceding process, or may match coordinate values of a relative coordinate roll maps in each of the one or more processes in a series of roll-to-roll processes before the final process with coordinate values of a relative coordinate first roll map of the final process. The first roll map generation unit may generate a first roll map for a top surface of the electrode and a first roll map for a back surface of the electrode. The roll map matching unit may match a length of the first roll map of the preceding process with a length of the first roll map of the following process by removing a coordinate section corresponding to actual electrode parts removed in the preceding process or after the preceding process from the first roll map of the preceding process. The roll map matching unit may correct or adjust coordinate values of the remaining coordinate sections to match the coordinate values of the first roll map of the following process. In some embodiments, the first roll map may be considered to be a first-type roll map, and not necessarily limited to a single roll map or roll map interface. Accordingly, for example, a first roll map for a back surface of the electrode may be a single roll map having a first type characteristics, and a first roll map for a top surface may be another, different roll map having the same or similar first type roll map characteristics. Similarly, a first roll map of each of a series of roll-to-roll processes may include different roll maps for each of the series of roll-to-roll processes that have the same or similar first type characteristics. The roll map matching unit may be configured to remove the coordinate sections corresponding to actual electrode parts removed in a series of roll-to-roll processes from the first roll map of each of the series of roll-to-roll processes, and match or map the length of the first roll map in each of the series of roll-to-roll processes to correspond with the length of the first roll map of the final process by correcting or adjusting the coordinate values of the remaining coordinate sections left after removing the actual electrode parts in the series of roll-to-roll processes to match or map the coordinate values of the first roll map of the final process to correspond with first roll map of each of the series of roll-to-roll processes. When a start direction of the first roll map of a first process before the final process is reversed in comparison to a start direction of the first roll map of the final process, based on an electrode winding direction in the rewinder, the roll map matching unit may match one or more coordinates of the first roll map of the prior process with one or more coordinates of the first roll map of the final process. When a top surface of the electrode in the preceding process is reversed to a back surface of the electrode in the following process based on an electrode winding direction in the rewinder during the preceding process and an electrode unwinding direction in the unwinder during the following process, the roll map matching unit may match a first roll map for the top surface of the electrode in the preceding process and a first roll map for the back surface of the electrode in the following process. Inspected and/or measured data of the electrode matched with the coordinate values of the first roll map of the preceding process and inspected and/or measured data of the electrode matched with the coordinate values of the first roll map of the following process may be correspond to each other. The inspected and/or measured data of the electrode matched with the coordinate values of the first roll map during the final process in a series of roll-to-roll processes and the inspected and/or measured data on the electrode in each process, which matches the coordinate values of the first roll maps in each of the series of roll-to-roll processes before the final process are correspond to each other. At least one of specifications of an input material for manufacturing the electrode, process data for a mixing process of the input material, or path data of a moving path through which the mixed input material is moved or communicated to an electrode coater may match at least one of the coordinate values of the first roll map or the overlay roll map and the inspected and/or measured data matching the coordinate values of the first roll map or the overlay roll map.

In yet another example, a method of manufacturing a battery is provided. The method may include generating a first roll map displaying coordinate values indicating a position of an electrode and inspected and/or measured data acquired from the electrode. The method may include matching coordinate values of the first roll map during a first process with coordinate values of the first roll map during a second process so that an actual electrode represented by the first roll map during the first process corresponds to an actual electrode represented by the first roll map during the second process.

In other aspects, the method for manufacturing a battery described herein may include one or more of the following features. A storage medium in which at least one of the first roll map and/or a second roll map is stored may be provided. A storage medium in which at least one of the first roll map and/or an overlay roll map is stored may be provided.

In yet another example, a system for manufacturing a battery is provided. The system may include a roll map generation unit configured to generate a roll map displaying coordinate values indicating a position of an electrode and inspected and/or measured data acquired from the electrode. The system may include an identification mark unit configured to provide one or more identification marks on the electrode based on a predetermined pitch. The electrode may be divided into a plurality of unit electrodes. Each of the plurality of unit electrodes may include corresponding one or more identification marks. The system may include a data matching unit configured to match the coordinate values of the roll map corresponding to the identification mark with the inspected and/or measured data of the roll map. In one embodiment, the identification mark may include an electrode ID and/or a cell ID.

In other aspects, the system for manufacturing a battery described herein may include one or more of the following features. The roll map generation unit may generate an additional roll map displaying at least one of the inspected and/or measured data or detailed data associated with the inspected and/or measured data. The detailed data may be matched or mapped to correspond with the coordinate values of the roll map. The roll map generation unit may include a roll map matching unit configured to match coordinate values of the roll map from a first process with coordinate values of the roll map from a second process so that an actual electrode represented by the roll map of the first process corresponds with an actual electrode represented by the roll map of the second process. The second process may be performed after the first process. The roll map matching unit may arrange the roll map of the first process and the roll map of the second process side by side and may display the roll maps of the first and second processes into an overlay roll map. The identification mark may be an identification mark marked on a part of the electrode or may be a virtual identification marks provided at a predetermined pitch of the electrode. The identification mark may be provided on an electrode tab during a notching processing. The data matching unit may match process data generated during the second process on a unit electrode and may match the identification mark with at least one of the coordinate values of the roll map or the inspected and/or measured data corresponding to the coordinate values of the roll map. The system may further include a process data collector configured to match the process data with the identification mark. The process data may include process-related inspected/measured data acquired in one or more processes of manufacturing a semi-finished battery cell product, a battery cell, a battery cell laminate, a battery module, or a battery pack each including the unit electrode and equipment data in each of the one or more processes. The process-related inspected/measured data may be acquired by performing inspection or measurement in the one or more processes performed on the unit electrode, the battery semi-finished cell product, the battery cell, the battery cell laminate, the battery module, or the battery pack, and the equipment data may be parameter data affecting quality of processing target goods processed in the one or more processes. The data matching unit may match or map, at each of the one or more processes, process data generated based on a progress of the one or more processes performed on the unit electrode to correspond with the identification mark. and may match or map the identification mark to correspond with at least one of the coordinate values of the roll map, the inspected and/or measured data matching the coordinate values of the roll map, or detailed data of the inspected and/or measured data matching the coordinate values of the roll map. The data matching unit may match process data generated based on the progress of the second process performed on the unit electrode and may match the identification mark with at least one of the coordinate values of the roll map of the preceding process, the coordinate values of the roll map of the second process matching the first process, or the inspected and/or measured data with the coordinate values of the roll maps in the first and second processes. The data matching unit may match at least one of data on specifications of an input material for manufacturing the electrode, process data for a mixing process of the input material, or path data on a moving path through which the mixed input material is moved to an electrode coater with at least one of the coordinate values of the roll map or the inspected and/or measured data matching the coordinate values.

In yet another example, a method of manufacturing a battery is provided. The method may include generating a roll map displaying coordinate values indicating a position of an electrode and inspected and/or measured data acquired from the electrode. The method may include matching the coordinate values, providing an identification mark on the electrode every predetermined pitch, and matching the coordinate values of the roll map corresponding to the identification mark and/or the inspected and/or measured data matching the coordinate values of the roll map with the identification mark.

In other aspects, the system for manufacturing a battery described herein may include one or more of the following steps or features. An electrode having an identification mark matching at least one of the coordinate values of the roll map indicating the position of the electrode and the inspected and/or measured data matching the coordinate values of the roll map may be provided. The roll map may be an overlay roll map in which coordinate values of the roll map of a preceding process matches coordinate values of the roll map of a following process so that an actual electrode represented by the roll map of the preceding process corresponds to an actual electrode represented by the roll map of the preceding process. The matched roll map coordinate values in each process in the preceding and following processes and the inspected and/or measured data in each process matching each roll map coordinate value may match the identification mark. The identification mark may match process data generated according to a progress of one or more processes performed on the electrode, and at least one of the coordinate values of the roll map and the inspected and/or measured data matching the coordinate values of the roll map may match the process data matching the identification mark. The process data may include process-related inspected/measured data acquired in one or more processes of manufacturing a semi-finished battery cell product, a battery cell, a battery cell laminate, a battery module, or a battery pack each including the electrode and equipment data in the one or more processes. The roll map may be an overlay roll map in which coordinate values of the roll map during a preceding process match coordinate values of the roll map during a following process so that an actual electrode represented by the roll map of the preceding process corresponds to an actual electrode represented by the roll map of the following process, and at least one of the matched roll map coordinate values in each process in the preceding and following processes or inspected and/or measured data in each process matching each roll map coordinate value may match the process data matching the identification mark. At least one of data on specifications of an input material for manufacturing the electrode, process data for a mixing process of the input material, or path data on a moving path through which the mixed input material is moved to an electrode coater may match at least one of the coordinate values of the roll map, the inspected and/or measured data matching the coordinate values, or the identification mark.

According to yet another example, a method is provided for tracking and monitoring manufacturing data of a battery. The method may include: receiving, by a server system, sensing data of the battery from a sensing system; generating, by the server system, mapping data based on the sensing data; generating, by the server system, identification data of the battery based on the sensing data; generating, by the server system, monitoring data of the battery based on the sensing data, the identification data, and the mapping data; and generating, by the server system, display data for displaying graphical information based on the monitoring data of the battery on a display.

In other aspects, any of the methods described herein may include of the followings steps or features. The server system may determine position data of an electrode of the battery between an unwinder and a rewinder of a battery manufacturing system. The method may further include displaying the graphical user interface on a display. The position data may be displayed on the graphical interface. The position data may be determined based on the sensing data generated by the sensing system. The sensing system may detect a movement of the electrode between the unwinder and the rewinder. The position data may include movement data corresponding to the detected movement of the electrode. The server system may determine characteristic data of the battery based on the sensing data. The characteristic data of the battery may be determined based on the sensing data generated by the sensing system. The sensing system may detect an irregular characteristic on the electrode. The method may further include generating graphical information associated with the irregular characteristic on the simulated electrode. The irregular characteristic may include a defect on the current collector substrate. The sensing system may detect an identification indication of the battery. The identification data may include the identification indication. The sensing system may detect an irregular characteristic on the electrode. The identification indication may correspond with a position of the irregular characteristic on the electrode.

According to yet another example, a computer system may be provided for tracking and monitoring manufacturing data of a battery. The system may include a server system, a memory storing instructions, and one or more processors configured to execute the instructions to perform operations. The operations may include: receiving, by the server system, sensing data of the battery from a sensing system; generating, by the server system, mapping data based on the sensing data; generating, by the server system, identification data of the battery based on the sensing data; generating, by the server system, monitoring data of the battery based on the sensing data, the identification data, and the mapping data; and generating, by the server system, display data for displaying a simulated electrode of the battery on a graphical user interface based on the monitoring data of the battery on a display.

In other aspects, any of the systems described herein may include any of the following steps or features. The operations may further include determining, by the server system, position data of an electrode of the battery between an unwinder and a rewinder of a battery manufacturing system. The operations may further include displaying the graphical user interface on a display. The position data may be displayed on the graphical user interface. The position data may be determined based on the sensing data generated by the sensing system. The operations may further include detecting a movement of the current collector substrate between the unwinder and the rewinder. The position data may include movement data corresponding to the detected movement of the current collector substrate. The operations may further include determining characteristic data of the battery based on the sensing data. The characteristic data of the battery may be determined based on the sensing data generated by the sensing system. The operations may include detecting an irregular characteristic on the electrode. The operations may further include generating graphical information associated with the irregular characteristic on the simulated electrode. The irregular characteristic may include a defect on the electrode. The operations may further include: detecting, by the sensing system, an identification of the battery on electrode; and detecting, by the sensing system, an irregular characteristic on the electrode. The identification data may include the identification indication, and the identification indication may correspond with an irregular characteristic on the electrode.

According to yet another example, a non-transitory computer-readable medium storing instructions that, when executed by one or more processors of a computer system, cause the computer system to perform a method of executing tracking and monitoring of manufacturing data of a battery. The method may include: receiving sensing data of the battery from a sensing system; generating mapping data based on the sensing data; generating identification data of the battery based on the sensing data; generating monitoring data of the battery based on the sensing data, the identification data, and the mapping data; and generating display data for displaying a simulated electrode of the battery on a graphical user interface based on the monitoring data of the battery. The present disclosure may provide an electrode assembly, a battery cell semi-finished product, a battery cell, a battery cell laminate, a battery module, a battery pack including the electrode.

It may be understood that both the foregoing general description and the following detailed description are exemplary and explanatory only and are not restrictive of the invention, as claimed.

BRIEF DESCRIPTION OF THE DRAWINGS

The above and other objects, features, and advantages of the present disclosure will become more apparent to those of ordinary skill in the art by describing exemplary embodiments thereof in detail with reference to the accompanying drawings, in which:

FIG. 8 is a schematic diagram illustrating a roll map, according to aspects of the present disclosure;

FIG. 40 is a schematic diagram showing an exemplary overlay roll map associated with a series of roll-to-roll processes, according to aspects of the present disclosure;

FIG. 60 is a table showing exemplary integrated inspected data, according to aspects of the present disclosure;

FIG. 89 is a table showing an exemplary matching data obtained by a system for manufacturing a battery, according to aspects of the present disclosure;

DETAILED DESCRIPTION

Figure 1A:
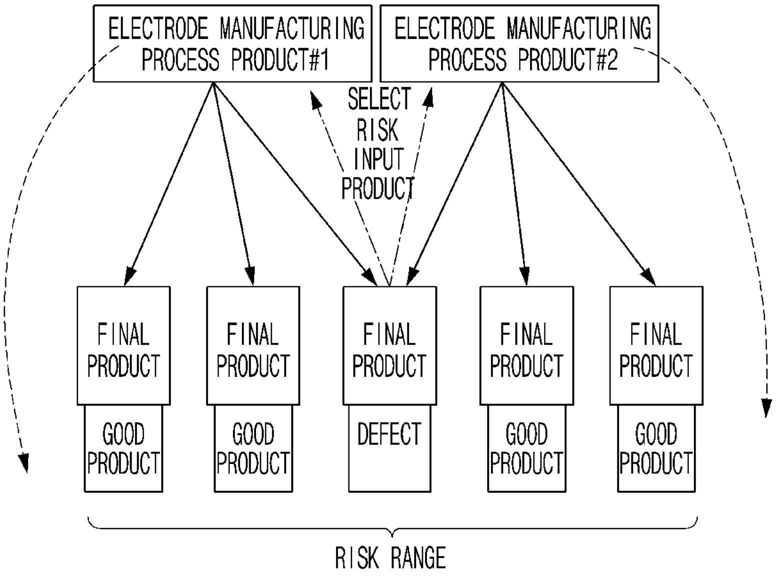
FIG. 1A is schematic diagram showing a change in risk range according to quality correlation analysis between an electrode manufacturing process and a final product, according to aspects of the present disclosure.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±5% of a stated or understood value.

The following embodiments are exemplary and set forth herein to facilitate understanding of the present disclosure. In addition, the accompanying drawings are not drawn to actual scale, and dimensions of some components may be exaggerated to facilitate understanding of the present disclosure.

Since the present disclosure can be variously modified and have a variety of forms, specific embodiments will be shown in drawings and described in detail. However, it should be understood that the embodiments are not intended to limit the present disclosure to a specific form and encompass all changes, equivalents, and substitutions within the spirit and technical scope of the present disclosure.

Figure 1B:
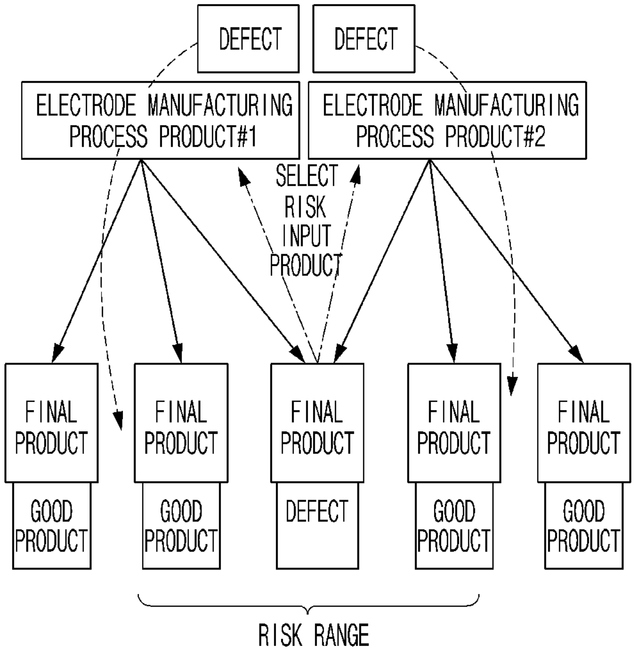
FIG. 1B is another schematic diagram showing a change in risk range according to quality correlation analysis between an electrode manufacturing process and a final product, according to aspects of the present disclosure.

FIGS. 1A and 1B are schematic diagrams showing a change in a risk range according to quality correlation analysis between an electrode manufacturing process and a final product.

As shown in FIG. 1A, a final product (secondary battery) may be manufactured using a product (electrode) manufactured in an electrode manufacturing process. In this case, when a defect occurs in the final product, identifying the manufacturing history may be necessary in some cases to identify the cause of the defect. However, when there is no sufficient information on the manufacturing history of the product produced during the electrode manufacturing process, identifying the process which yielded the corresponding final defective product may be difficult. Therefore, in order to prevent reoccurrences of the same defect, other final products, which may be products without defects, as well as the corresponding defective product, may be included in a risk range where all the products in the risk range may be discarded in some cases when a defect occurs in a product within the risk range.

On the other hand, when there is sufficient information on the manufacturing history of the product during the electrode manufacturing process, the risk range may be reduced based on the information shown in FIG. 1B, thereby reducing the number of products without defects to be discarded. In particular, since an electrode may be manufactured through various processes, such as a coating process, a roll press process, and a slitting process, unless the product history information of each process is clearly recorded or stored, it may be difficult to specify the cause of a defect later in correlation with subsequent processes.

Therefore, it is necessary to develop a technology capable of recording and/or storing information on product quality and/or defects during an electrode manufacturing process and tracking, monitoring, and analyzing the product quality in correlation with subsequent processes or a final product.

In addition, as described above, there is a limit to directly displaying various defects or information on an electrode coated with electrode slurry with all defect information due to physical limitations of space available on an electrode. In addition, in some cases, information on the quality of a non-defective electrode during each manufacturing process may also be helpful for identifying the cause of unexpected faults occurring later during subsequent processes or during usage of a secondary battery that is a finished product.

Therefore, the inventors of the present disclosure have developed a roll map that displays a simulated electrode on a space or region of a roll map displaying various data collected during manufacturing of an electrode. The data may include, for example, a bar imitating or simulating an actual or real electrode without directly marking data or information relating to quality as well as defects on the actual or real electrode during a manufacturing process of the electrode. The roll map of the present disclosure may be a graphical roll map interface displaying a simulated electrode and information relating to an actual or real electrode during and/or after manufacturing. Such a roll map may be used for quality analyses and control during one or more stages of manufacturing an electrode by displaying various pieces of data or information on various sections or areas of the roll map. In addition, in order to track and monitor quality, the roll map may be used for quality correlation analyses between different electrode manufacturing processes to overcome the limitations of related art.

Figure 2:
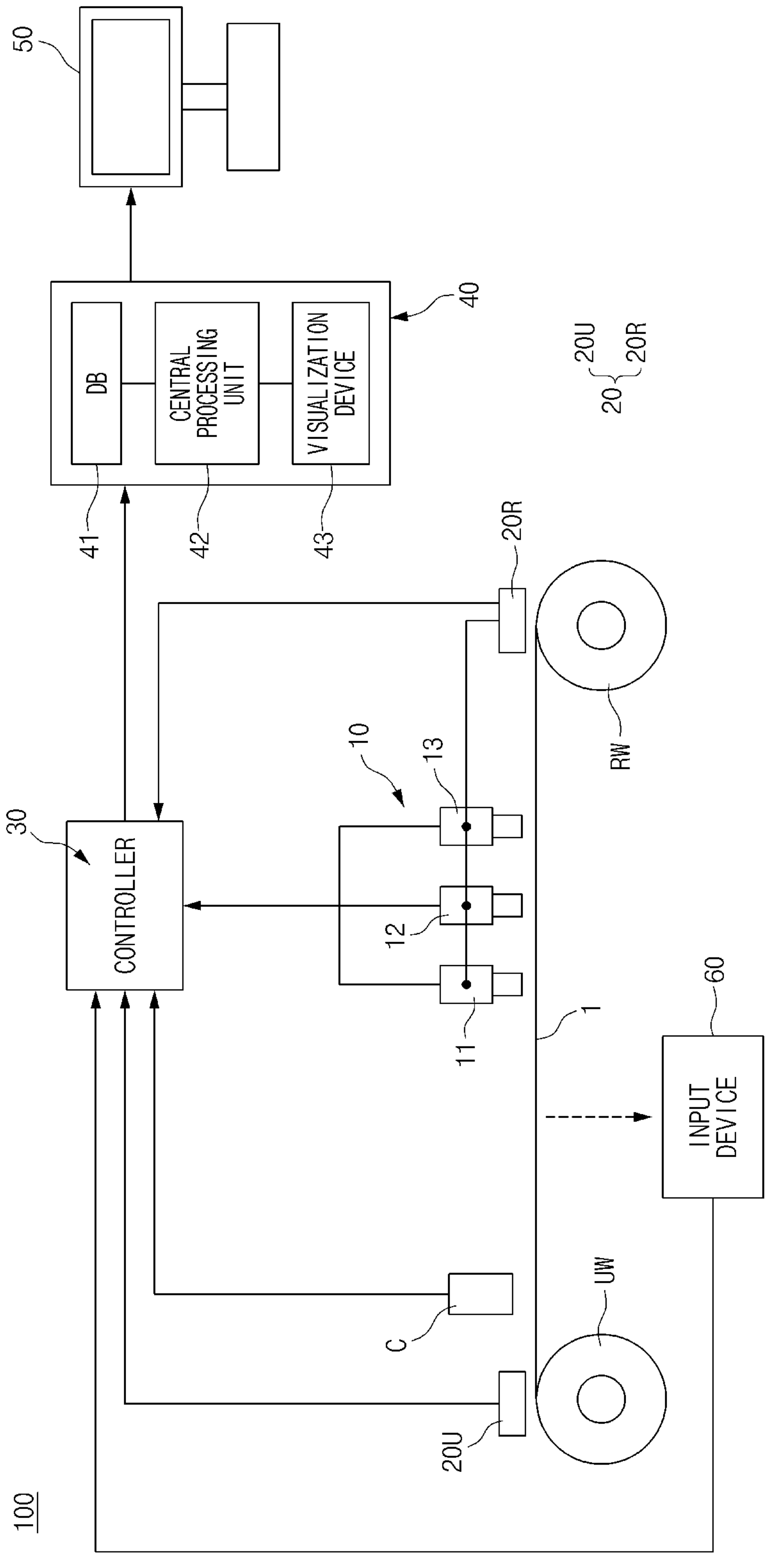
FIG. 2 is a schematic diagram of an exemplary system or apparatus for generating a roll map according to aspects of the present disclosure.
Figure 3:
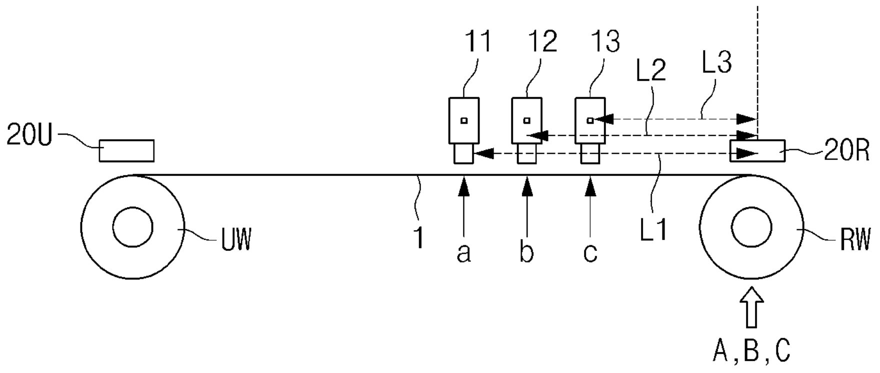
FIG. 3 is a schematic diagram showing an exemplary process for generating a roll map, according to aspects of the present disclosure.

FIG. 2 is a schematic diagram of an apparatus for generating a roll map according to one embodiment of the present disclosure, and FIG. 3 is a schematic diagram showing a process for acquiring inspected and/or measured data and coordinate values of the electrode part where the inspected and/or measured data by an inspection and/or measurement device. FIGS. 2 and 3 are exemplary, and other examples of methods, apparatuses, and systems for generating roll maps can be used in the embodiments corresponding to FIGS. 1-98 in accordance with the present disclosure. Some of these examples, methods, apparatuses, and systems may be relevant to U.S. Patent Application Publication Nos. 2022/012581, 2023/0251752, and 2023/0109490, and Korean Patent Application Nos. 10-2021-0039801 (Filed on Mar. 23, 2021), 10-2022-0103393 (Filed on Aug. 5, 2021), 10-2021-0103393 (Filed on xx), 10-2021-0107647 (Filed on Aug. 13, 2021), 10-2021-0109000 (Filed on Aug. 18, 2021), 10-2021-0117213 (Filed on Sep. 2, 2021), 10-2021-0152305 (Filed on Nov. 8, 2021), 10-2022-0135173 (Filed on Oct. 19, 2022), 10-2022-0108292 (Filed on Aug. 29, 2022), 10-2022-0109335 (Field on Aug. 30, 2022), 10-2022-0127182 (Filed on Oct. 5, 2022), 10-2023-0078340 (Filed on Jun. 19, 2023), 10-2023-0078372 (Jun. 19, 2023), and 10-2022-0139553 (Filed on Oct. 26, 2022), and European Patent Application No. EP22775954 (Filed on Mar. 11, 2022), and a PCT Application No. PCT-KR2022-003446 (Filed on Mar. 11, 2022), all of which are incorporated herein by reference in their entirety, except for any definitions, subject matter disclaimers or disavowals, and except to the extent that the incorporated material is inconsistent with the express disclosure herein, in which case the language in this disclosure controls.

Referring to FIG. 2, an apparatus (or system) 100 for generating a roll map according to the present disclosure may include an inspection and/or measurement device(s) 10, a position measurement device 20, a coater C, a controller 30, and a roll map generation unit 40. In one embodiment, the inspection and/or measurement device 10 may inspect and/or measure an electrode 1 moving between an unwinder UW and a rewinder RW to acquire inspected and/or measured data. The roll map generation unit 40 may generate a roll map including a simulated electrode having a planar (or bar) shape. The simulated electrode may simulate the electrode 1 that may be stationary or moving. In one embodiment, the roll map may display the inspected and/or measured data, alone or in combination with the simulated electrode. In one embodiment, the inspection and/or measurement device 10 may include a loading amount measurement device 11, a reference point measurement device 12, and/or an exterior inspection device 13. In one embodiment, at least one of the devices 11, 12, 13 may be one or more hardware or software components that may be integrated into a single inspection and/or measurement device 10. Alternatively, the devices 11, 12, 13 may be separately provided, but may be coupled together to form the inspection and/or measurement device 10. Of course, the inspection and/or measurement device 10 may include other components in addition to the devices 11, 12, 13 to facilitate inspection and/or measurement of the electrode 1.

In embodiments, the controller 30 may be integrated into the roll map generation unit 40 in the form of software or hardware. The roll map generation unit 40 may be part of a server system. Alternatively, a server system may be integrated as part of the roll map generation unit 40. The server system may include a single server or multiple servers that may be coupled directly or indirectly with each other to carry out the instructions or operations for tracking, monitoring, and manufacturing electrodes and batteries, as well as generating roll maps, in accordance with embodiments of the present disclosure. The server system or a server(s) described throughout the various embodiments of the present disclosure may be incorporated as part of a roll map generation unit or may be provided separately from a roll map generation unit. Additionally, the server system or a roll map generation unit of the present disclosure may include one or more processors and one or more memories storing one or more sets of instructions for carrying out some or all functions or operations of tracking, monitoring, and manufacturing electrodes and batteries, as well as generating roll maps, in accordance with embodiments of the present disclosure. The server system may include suitable logic, circuitry, interfaces, and/or code that is configured to be used in the system(s) 100. Examples of implementation of the server system may include but are not limited, to, a storage server, a cloud-based server, a web server, an application server, or a combination thereof.

In addition to a server system or a roll map unit, it is fully within the scope of this disclosure that any computer system capable of the required storage and processing demands would be suitable for practicing the embodiments of the present disclosure. This may include tablet devices, smart phones, and any other computer devices, whether mobile or even distributed on a network (i.e., cloud based). Further, a server system may refer to a single server system. However, the term "system" shall also be taken to include any collection of systems or sub-systems that individually or jointly execute a set, or multiple sets, of instructions to perform one or more computer functions.

Figure 98:
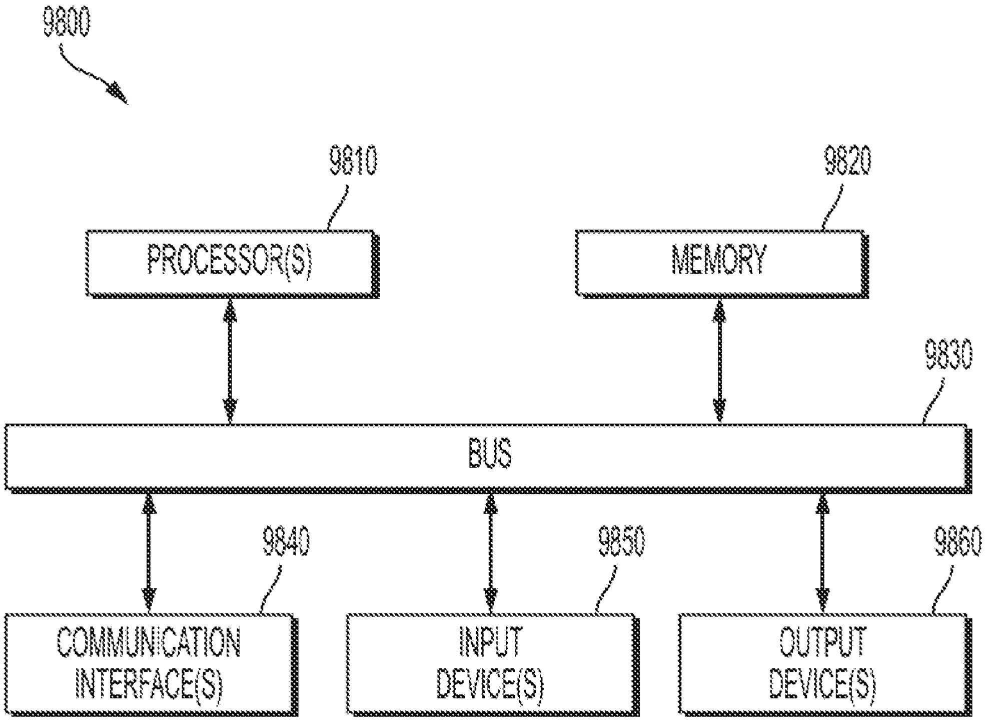
FIG. 98 is a block diagram showing an example of a computing device for manufacturing a battery, according to aspects of the present disclosure.

The server system or server described in the foregoing disclosure may be utilized in any of the embodiments described in relation to FIGS. 1-98 to facilitate functions or operations of tracking, monitoring, and manufacturing electrodes and batteries, as well as generating roll maps, in accordance with embodiments of the present disclosure.

In embodiments, the electrode 1 may refer to an electrode substrate that may be arranged between the unwinder UW and the rewinder RW during various stages of the electrode manufacturing process(s) of the present disclosure. For example, the electrode 1 at one stage of the electrode manufacturing process(s) may be a film or a substrate that does not include any coated materials. In some embodiments, the substrate may be a current collector onto which one or more active materials may be coated in later stages. Alternatively, the electrode 1 at another stage of the electrode manufacturing process(s) may be a fully assembled or manufactured electrode that may be ready for further processing for manufacturing a battery cell. Accordingly, the electrode 1 of the present disclosure may refer to various different forms of an electrode depending on the manufacturing stage that the electrode 1 is being disclosed in reference to various embodiments of the present disclosure.

In order to measure the quality or detect defects of the electrode 1 during an electrode manufacturing process, the inspection and/or measurement device 10 may be arranged adjacent to an upper portion, a lower portion, or any other suitable position near an electrode line moving in a roll-to-roll state. In one embodiment, the electrode line may refer the portion of the electrode 1 between the unwinder UW and the rewinder RW in a lengthwise direction, as shown in FIG. 2.

In one embodiment, the inspection and/or measurement device 10 may be connected to the position measurement device 20. In one embodiment, the position measurement device 20 may include an unwinder rotary encoder 20U and/or a rewinder rotary encoder 20R. The position measurement device 20 may be connected to the inspection and/or measurement device 10 via one or more wires or may be connected wirelessly to acquire coordinate values (coordinate data) of the electrode 1 based on the inspected and/or measured data. The coordinate values of the electrode 1 may be transmitted to the controller 30 (later described more in detail) to match or correspond with the inspected and/or measured data.

In some embodiments, the inspection and/or measurement device 10 may refer to any one or all of an inspection device, a measurement device, and an inspection and measurement device depending on the purpose of measurement. The inspected and/or measured data may refer to any one or all of inspected data, measured data, and inspected and/or measured data. As a result, the inspected and/or measured data may be any data that can be obtained through inspection and/or measurement performed on the electrode 1. In addition, the inspection and/or measurement device 10 may be any suitable device for inspecting and/or measuring the electrode 1 in order to obtain specific inspected and/or measured data.

The inspected and/or measured data of the electrode 1 described in the present disclosure may include data on quality or defects of the electrode 1. For example, measured data relating to a slurry loading amount may be acquired by the loading amount measurement device 11 when electrode slurry is coated onto the electrode 1 during a coating process. When the slurry loading amount is out of a set range, the electrode 1 with such slurry loading amount may be determined to be defective, and the defect may be distinguished from other parts of the electrode 1. Such defects may be visually displayed through a visualization device 43 (later described more in detail). Alternatively, a normal or an acceptable range of the slurry loading amount, rather than the defect, may be divided into sub-ranges according to the slurry loading amount, and each of the sub-ranges may be visually displayed in different colors. Accordingly, the inspected and/or measured data according to the present disclosure is not limited to a defect but may also include data on quality of electrodes and batteries.

In addition, a dimension measurement device for measuring a dimension such as a width of an electrode may be provided (not shown in the figures for clarify of illustration and explanation). The dimension measurement device may determine that a dimension (or width) of an electrode that is out of set ranges as defective data. The dimension measurement device may also divide a normal or acceptable range of the dimension into sub-ranges and each of the sub-ranges may be displayed in different colors. Data on a mismatch between a coating part and a non-coating (or uncoated) part on the electrode 1 or the like may also be acquired by the dimension measurement device.

When the electrode 1 is disconnected, severed, or broken during an electrode manufacturing process and then reconnected using a joint connection member (e.g., connection tape), a joint measurement device may also be provided to detect the joint.

In addition, reference points may be marked on the electrode 1 at predetermined intervals. The reference points may be used for calculating a length of a broken portion of the electrode 1 or the like. The reference point measurement device 12 for detecting the positions of the reference points may also be provided as one of the components of the inspection and/or measurement device 10.

Alternatively, a thickness measurement device (web gauge) (not shown in the figures for clarity of illustration and explanation) may also be provided for measuring the thickness of the electrode 1 after being coated with one or more materials, for example, in a pre-process and/or a post-process (e.g., a roll press process).

In addition, during an electrode manufacturing process, inspected and/or measured data on the quality or defects of the electrode 1 may be obtained through various components of the inspection and/or measurement device 10. The electrode exterior inspection device 13 may be provided to detect exterior defects of the electrode 1, such as a pinhole defect and/or a line defect, but is not limited thereto. The inspection and/or measurement device 10 is not limited to the devices described above, and other inspection and/or measurement devices capable of inspecting other measurement parameters (e.g., temperature, pressure, etc.) may also be applied or incorporated into the apparatus 100 for generating one or more roll maps according to the present disclosure.

In addition, the components of an inspection and/or measurement device(s) according to embodiments of the present disclosure may not need to be provided separately. That is, the inspected data or measured data may be obtained by a single inspection device or a single measurement device. In other words, for example, the inspection and/or measurement device 10 may be a single integrated device including the devices 11, 12, 13. Accordingly, the number of separate components of the inspection and/or measurement device 10 required can be reduced. Alternatively, the components of the inspection and/or measurement device 10 may be referred to different names. For example, since a color sensor may be a joint measurement device that inspects an exterior of the electrode 1, the color sensor may also be regarded as the exterior inspection device 13. In addition, a vision measurement device may be regarded as the dimension measurement device because it may measure a mismatch but may also be regarded as the reference point measurement device 12 because it may also detect the reference points by the vision sensor included in the corresponding measurement device. The inspection and/or measurement device 10, any component of the visualization device (e.g., 11, 12, 13) or any other inspection and/or measurement device or components utilized in connection with the embodiments of FIGS. 1-98 may include suitable logic, circuitry, interfaces, or code that is configured to execute the instructions for carrying out some or all functions or operations of tracking, monitoring, and manufacturing electrodes and batteries, as well as generating roll maps, in accordance with embodiments of the present disclosure. Further, the inspection and/or measurement device 10, any component of the visualization device (e.g., 11, 12, 13) or any other inspection and/or measurement device or components utilized in connection with the embodiments of FIGS. 1-98 may include but is not limited to a processor, a digital signal processor (DSP), a microprocessor, a microcontroller, a complex instruction set computing (CISC) processor, an application-specific integrated (ASIC) processor, a reduced instruction set (RISC) processor, a very long instruction word (VLIW) processor, a state machine, a data processing unit, a graphics processing unit (GPU), and other processors or control circuitry.

In one embodiment, detailed examples of inspected and/or measured data that may be acquired in an electrode manufacturing process of the present disclosure may be include as follows:

i) data corresponding to a dimension of an electrode;
ii) data corresponding to a mismatch between an electrode coating part and an electrode non-coating (or uncoated) part;
iii) data corresponding to slurry loading amount on the electrode;
iv) data corresponding to an exterior of the electrode;
v) data corresponding to a position of an electrode disconnection section or a connection position between the electrodes;
vi) data corresponding to a position of a sample inspection unit;
vii) data corresponding to a position of an electrode discard section;
viii) data corresponding to insulation quality or defects in an insulating material coating process performed after electrode slurry coating;
ix) other defect data;
x) data corresponding to reference points marked on the electrode at predetermined intervals; and
xi) data corresponding to a thickness of the electrode after a roll press.

In one embodiment, in an electrode manufacturing process of the present disclosure, the electrode 1 may be mounted or arranged between the unwinder UW and the rewinder RW. After the electrode 1 is unwound from the unwinder UW and finishes a predetermined process (e.g., a stage of a manufacturing process), the electrode 1 may be wound in the rewinder RW to become an electrode roll. In addition, the electrode roll that has completed a full cycle for one process (e.g., preceding process), the electrode roll may be re-mounted on the unwinder UW and the rewinder RW to be arranged therebetween during a subsequent process and may perform the subsequent process by moving/transferring the electrode 1 on the electrode roll in a roll-to-roll state. That is, during an electrode manufacturing process the electrode 1 may move in the roll-to-roll state repeatedly by being re-mounted to the unwinder UW and the rewinder RW after completing each cycle or process of the electrode manufacturing processes according to the present disclosure. Therefore, when a position of the electrode 1 during movement can be expressed with coordinates, the position of the electrode 1 at each process may be separately or independently specified, collected and/or recorded or stored. In addition, the position of the data that was acquired or the position of the joint detected may be expressed as coordinates when data on quality or defects is acquired, for example, when an event, such as breakage of the electrode 1, occurs and thus the electrode 1 is connected by a joint connection member. The history information on the quality, defects, and various other events of the electrode 1 in the corresponding process may be displayed based on the coordinates relating to the position and the joint of the electrode 1. Since the electrode 1 may be in movement due to the rotation of the unwinder UW and the rewinder RW, a position of a portion or location on the electrode 1 in a longitudinal direction may be specified or determined according to the amount of rotation of the unwinder UW and/or the rewinder RW.

In one embodiment, the apparatus or system for generating the roll map according to the present disclosure may include the position measurement device 20 including the unwinder rotary encoder 20U and/or the rewinder rotary encoder 20R for acquiring the coordinate values of the position of the electrode 1 based on the amount of rotation of the unwinder UW and/or the rewinder RW. The position measurement device 20 according to the present disclosure may acquire the position of the electrode 1 in the longitudinal direction as coordinate values (coordinate data). For example, a starting portion or position of the electrode 1 may be specified when the coordinates acquired or detected by the position measurement device 20 are zero, and an end portion or position of the electrode 1 may be specified when a coordinate value of 1200 meters is acquired or detected by the position measurement device 20 from the electrode 1 having a length of 1200 meters.

The coordinate data of the position of a portion or location of the electrode 1 in the longitudinal direction may be detected by the unwinder rotary encoder 20U and/or the rewinder rotary encoder 20R respectively installed on or near the unwinder UW and the rewinder RW. The rotary encoders 20U and 20R may be installed on one or more motor driving units for driving the unwinder UW and the rewinder RW to detect an electrode movement distance according to the number of rotations (amount of the rotation) of the one or more motors. Accordingly, when the electrode 1 in movement between the unwinder UW and the rewinder RW, the movement distance may be detected by the rotary encoders 20U and 20R. Although FIG. 2 shows the unwinder rotary encoder 20U and the rewinder rotary encoder 20R being respectively disposed outside the unwinder UW and the rewinder RW, the encoders 20R and 20U may alternatively be respectively embedded or incorporated within the unwinder UW and the rewinder RW.

In one embodiment, the inspection and/or measurement devices 10 may be connected to the position measurement device 20 by one or more wires or may be connected wirelessly to acquire coordinate values and the corresponding inspected and/or measured data of a part of the electrode 1. For example, the inspection and/or measurement devices 10 may transmit the inspected and/or measured data and the coordinate values to the roll map generation unit 40 for further processing.

The apparatus or system 100 for generating a roll map according to the present disclosure may include the controller 30 (programmable logic controller (PLC)) for controlling the electrode movement between the unwinder UW and the rewinder RW. In one embodiment, the controller 30 may be connected to the position measurement device 20 and the inspection and/measurement device 10 to receive the coordinate values from the position measurement device 20 and the inspected and/or measured data from the inspection and/or measurement device 10. The controller 30 may match the inspected and/or measured data with the data of the corresponding coordinate values of the part of the electrode 1 and may then transmit the matched data (data of the coordinate values corresponding to and inspected and/or measured data) to the roll map generation unit 40.

Alternatively or additionally, the controller 30 may process the inspected and/or measured data and the data of the corresponding coordinate values in the form facilitate efficient and easy processing by the roll map generation unit 40. Since the controller 30 (e.g., PLC) may be connected to the inspection and/or measurement device 10, the position measurement device 20 (e.g., encoders 20U and/or 20R), or the like to control the roll-to-roll transfer of the electrode 1, the inspection and/or measurement device 10, or the like, may transmit the data to a data processing system such as an electrode manufacturing execution system (MES) more efficiently through the controller 30 than directly transmitting the data to the MES, in terms of data processing and management.

In one embodiment, the inspection and/or measurement devices 10 may be connected directly or indirectly to the position measurement device 20 to acquire the inspected and/or measured data and the data of the corresponding coordinate values together. In addition, some types of inspection and/or measurement devices 10 may acquire only the inspected and/or measured data, and the data of the corresponding coordinate values may be acquired by the position measurement device 20 and matched with the inspected and/or measured data in the controller 30. That is, a subject (or place) for performing the matching with the data of the corresponding coordinate values may vary depending on the type, configuration, a processing capacity, or the like of the inspection and/or measurement device 10.

In one embodiment, the corresponding coordinate values of the part of the electrode 1 for which the inspected and/or measured data has been acquired may be values acquired by adding coordinate values according to the amount of rotation of the rewinder RW at a time point at which the corresponding inspected and/or measured data has been acquired to an offset distance, which is a distance between the corresponding inspection and/or measurement device 10 and the rewinder RW.

In FIGS. 2 and 3, when the inspection and/or measurement device 10 inspects the electrode 1 and acquires the inspected data, the position of an electrode part of the electrode 1 may be detected by the position measurement device 20 (e.g., encoder 20R) of the rewinder RW. However, the position of the electrode part of the electrode 1 may not be at the rewinder RW when the inspected and/or measured data is acquired. In this embodiment, since the coordinates of the roll map are based on the detection by the position measurement device 20 at the rewinder RW, the coordinates in the longitudinal direction detected when the part of the electrode 1 corresponding to the acquired inspected and/or measured data actually arrives at the rewinder RW become the coordinates of the corresponding electrode part in the longitudinal direction. Therefore, the coordinate values of the electrode part in the longitudinal direction corresponding to the acquired inspected and/or measured data may be obtained after the distance (offset distance) from each component of the inspection and/or measurement devices 10 to the rewinder RW is added to the encoder values (coordinate values in the longitudinal direction) of the rewinder RW at the time point at which the data has been acquired. For example, a coordinate value of an electrode part a where a loading amount has been detected by the loading amount measurement device 11 on a longitudinal direction or axis is a value obtained by adding an encoder value (coordinate value) A of the rewinder RW at the detected time point and an offset distance L1 between the loading amount measurement device 11 and the rewinder RW. Similarly, a coordinate value of an electrode part b where reference points have been detected by the reference point measurement device 12 in the longitudinal direction or axis is a value obtained by adding an encoder value B of the rewinder RW at the detected time point and an offset distance L2 between the reference point measurement device 12 and the rewinder RW. In addition, a coordinate value of an electrode part c in the longitudinal direction or axis is a value obtained by adding an encoder value C of the rewinder RW at the detected time point and an offset distance L3 between the exterior inspection device 13 and the rewinder RW.

In one embodiment, a coordinate value of the electrode part for which the inspected and/or measured data has been acquired in a width direction may be acquired by the inspection and/or measurement device 10.

For example, the inspection and/or measurement device 10 such as the exterior inspection device 13 shown in FIG. 3 may be provide with a program capable of scanning and inspecting the exterior of the entire electrode 1 in the width direction. Alternatively, the inspection and/or measurement device(s) 10 itself may be movably installed in the width direction of the electrode 1. Alternatively or additionally, a plurality of inspection and/or measurement devices may be installed in the width direction of the electrode. Therefore, the inspection and/or measurement device(s) 10 may acquire data on quality or defects (e.g., loading amount data or exterior defect data) for each point of the electrode 1 in the width direction, and the position data (coordinate values) in the width direction for which the data has been acquired may also be acquired by the inspection and/or measurement device(s) 10. Therefore, each component of the inspection and/or measurement device(s) 10 may acquire all of the inspected and/or measured data (e.g., the data on quality or defects), the coordinate values of the electrode 1 in the longitudinal and width directions for which the inspected and/or measured data has been acquired and may transmit all data to the roll map generation unit 40 to be described below.

Figure 4:
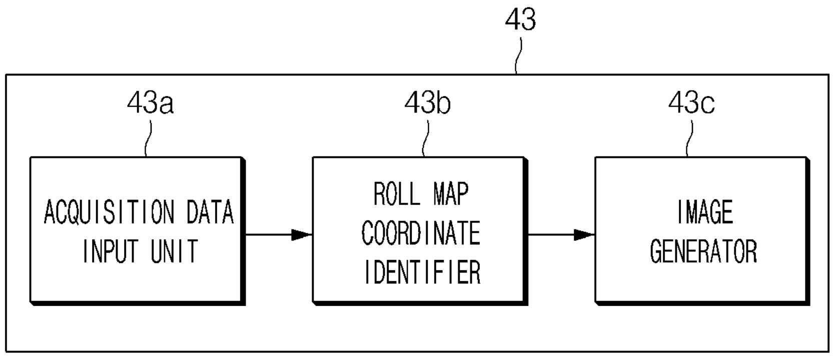
FIG. 4 is a schematic diagram of an exemplary data visualization device provided in a system or apparatus for generating the roll map, according to aspects of the present disclosure.

FIG. 4 is a schematic diagram of a data visualization device 43 provided in the apparatus or system 100 for generating the roll map.

Figure 7:
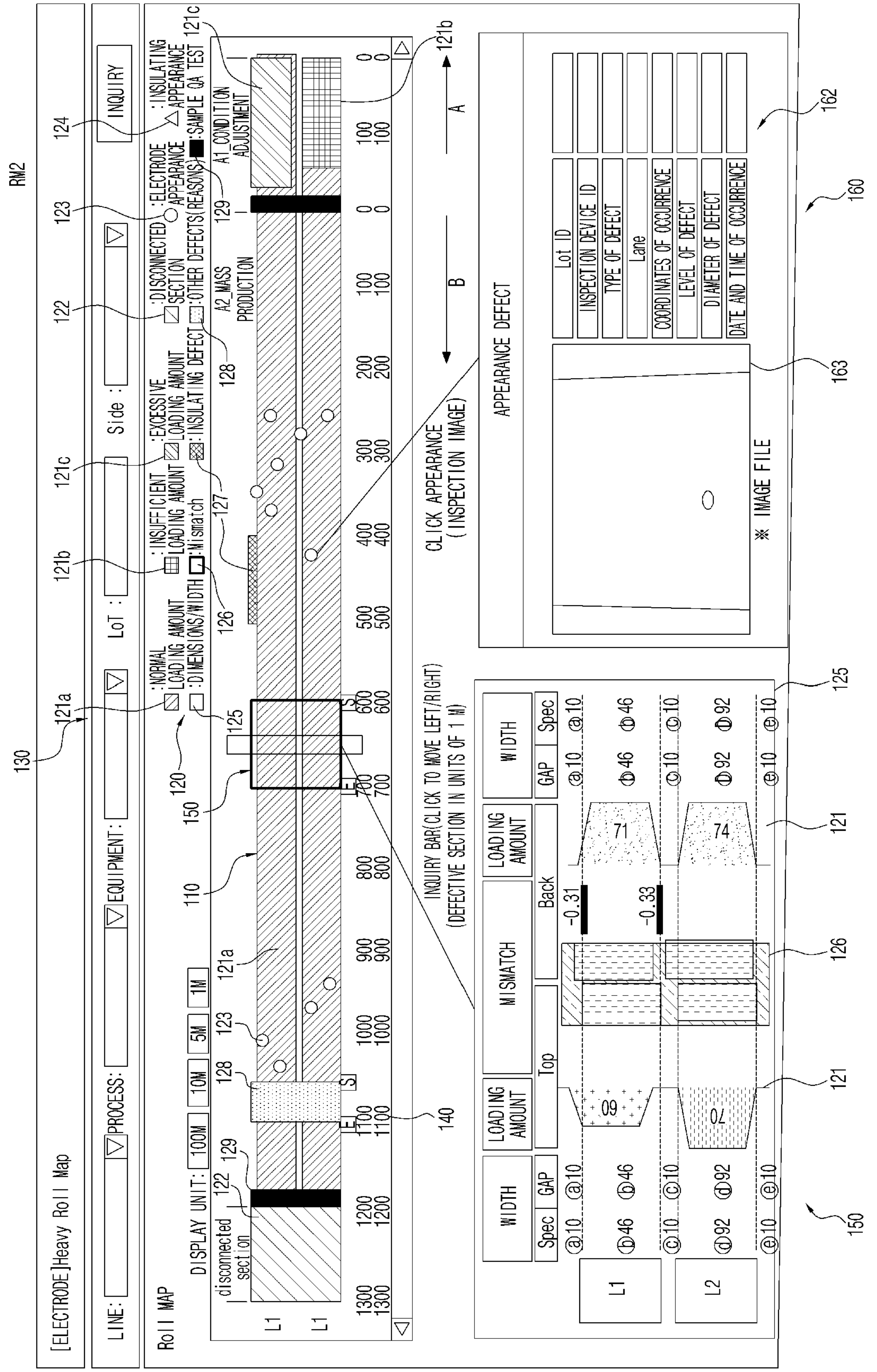
FIG. 7 is a schematic diagram illustrating an exemplary roll map, according to aspects of the present disclosure.

The apparatus or system 100 for generating the roll map according to the present disclosure includes the roll map generation unit 40 for generating the roll map expressed in a planar shape on which a moving electrode 1 is imitated or simulated and displaying at least some of the inspected and/or measured data, for example, as shown in FIG. 7.

The roll map generation unit 40 may be configured to facilitate displaying the coordinate values and the at least some of the inspected and/or measured data on the roll map. In addition, the roll map generation unit 40 may be configured to facilitate displaying reference points marked on the electrode 1 at predetermined intervals at positions on the roll map corresponding to coordinate values of the corresponding reference points on the electrode 1. That is, the reference point data may also be displayed on the roll map, for example, as a graphical image, text, etc.

In one embodiment, the roll map generation unit 40 may be connected to the position measurement device 20 and the inspection and/or measurement device 10 to receive the data of the coordinate values and the inspected and/or measured data. Alternatively or additionally, the roll map generation unit 40 may be connected to the controller 30 to receive the data of the coordinate values and the inspected and/or measured data through the controller 30.

Referring back to FIG. 2, the roll map generation unit 40 may include a database 41 for storing the data acquired from the inspection and/or measurement device 10 and the position measurement device 20 (e.g., encoders 20R, 20U) or storing data on quality, dimensions, and the like of a normal electrode or an electrode without defects. In addition, the roll map generation unit 40 may include a central processing unit 42 for processing the acquired data and instructing the visualization device 43 provided in the roll map generation unit 40 to facilitate visualization of the data into, for example, graphical image to be generated by the visualization device 43. The central processing unit 42 or any central processing unit associated with a roll map generation unit corresponding to embodiments associated with FIGS. 1-98 may include suitable logic, circuitry, interfaces, or code that is configured to execute the instructions stored in the above-described server or the database 41 for carrying out some or all functions or operations of tracking, monitoring, and manufacturing electrodes and batteries, as well as generating roll maps, in accordance with embodiments of the present disclosure. For example, the central processing unit 42 may include but is not limited to a processor, a digital signal processor (DSP), a microprocessor, a microcontroller, a complex instruction set computing (CISC) processor, an application-specific integrated (ASIC) processor, a reduced instruction set (RISC) processor, a very long instruction word (VLIW) processor, a state machine, a data processing unit, a graphics processing unit (GPU), and other processors or control circuitry. Additionally or alternatively, the central processing unit 42 may be located the server system(s) described in the foregoing embodiments for carrying out some or all functions or operations of tracking, monitoring, and manufacturing electrodes and batteries, as well as generating roll maps, in accordance with embodiments of the present disclosure.

The roll map generation unit 40 may include the visualization device 43 for defining a visualization region or area of a graphical roll map interface to form or display the roll map imitating or simulating the electrode 1, and the visualization device 43 may facilitate generation of display coordinate values on another region or area of a graphical roll map interface displayed on the visualization device 43. For example, a simulated electrode may be illustrated or displayed in the visualization region or area of a simulated roll map interface by the visualization device 43 as a simulated or replicated graphical image or video of the electrode 1. The visualization device 43 may match or associate the data of the coordinate values with the inspected and/or measured data and display a matching or corresponding result. The visualization device 43 may be connected to the central processing unit 42 and may visualize and display the inspected and/or measured data and the data of the coordinate values according to instructions received from the central processing unit 42. The roll map, the inspected and/or measured data, and the date of the coordinate values may be displayed on one or more graphical user interfaces. FIG. 7 shows one example of the graphical user interface.

Referring back to FIG. 4, the visualization device 43 may include an acquisition data input unit 43*a*, a roll map coordinate identifier 43*b*, and an image generator 43*c*. The visualization device 43, any component of the visualization device (e.g., 43*a*, 43*b*, 43*c*) or any other visualization device or components utilized in connection with the embodiments of FIGS. 1-98 may include may include suitable logic, circuitry, interfaces, or code that is configured to execute the instructions for carrying out some or all functions or operations of tracking, monitoring, and manufacturing electrodes and batteries, as well as generating roll maps, in accordance with embodiments of the present disclosure. Further, the visualization device 43, any component of the visualization device (e.g., 43*a*, 43*b*, 43*c*) or any other visualization device or components utilized in connection with the embodiments of FIGS. 1-98 may include but is not limited to a processor, a digital signal processor (DSP), a microprocessor, a microcontroller, a complex instruction set computing (CISC) processor, an application-specific integrated (ASIC) processor, a reduced instruction set (RISC) processor, a very long instruction word (VLIW) processor, a state machine, a data processing unit, a graphics processing unit (GPU), and other processors or control circuitry.

First, the acquisition data input unit 43*a* may receive data from the central processing unit 42.

The roll map coordinate identifier 43*b* may define the visualization region or area of a graphical roll map interface to form or display the roll map and define coordinate values of pixels within the visualization region or area for each data element of the acquired source data. In this case, when data on specifications such as a lot number, a length, and a width of the electrode roll is input to the controller 30, the DB, one or more servers (not shown), or the like by registering information relating to the electrode roll, the roll map coordinate identifier 43*b* may calculate and determine the visualization region or area of the roll map according to a predetermined conversion scale or table from the data relating to a size of the electrode 1. Alternatively or additionally, the roll map coordinate identifier 43*b* may also calculate and determine the visualization region or area including the roll map according to the predetermined conversion scale or table from the above-described data of the coordinate values of the electrode 1 in the longitudinal and width directions of the electrode 1.

The roll map coordinate identifier 43*b* may map or associate the acquired inspected and/or measured data with the data of the coordinate values of the electrode 1 (in the width and longitudinal directions) and allocate the mapped or associated data on the visualization region or area (e.g., including a roll map) according to the coordinates of the pixels.

The image generator 43*c* may generate data for expressing or displaying the mapped or associated data elements allocated to the coordinates of each pixel in the visualization region or area as one or more legends. The legends may include various shapes such as a circle, a quadrangle, and a triangle displayed in the visualization region or area, the shapes to which colors or patterns may be provided, but are not limited thereto. Therefore, the roll map according to the present disclosure may be generated by visually displaying the inspected and/or measured data at the coordinates of the pixels (coordinates on the roll map) corresponding to each position data of the actual electrode 1 according to designated shapes, forms, colors, patterns, or like for each data in the visualization region or area including the roll map and implementing and displaying the inspected and/or measured data on the roll map by the image generator 43*c*.

In addition, based on the data stored in a storage such as the database 41 or a separate server, data corresponding to a specific range may be loaded from the storage (e.g., database 41, server, etc.) in conjunction with the specific range of the roll map and displayed (generated as images) on a screen. The range of the roll map may relate to the distance or amount of movement of the electrode 1 between the unwinder UW and the rewinder RW. At this time, the central processing unit 42 may instruct the visualization device 43 to facilitate visualization and displaying inspected data determined to be abnormal compared to normal data stored in the database 41 to be distinct from other data.

The normal data may be defined as data that meets or is within one or more predetermined manufacturing tolerance characteristics or ranges of the electrode manufacturing process according to the present disclosure. Conversely, abnormal data may be defined as data that does not meet or is outside of one or more predetermined manufacturing tolerance characteristics or ranges of the electrode manufacturing tolerances Setting the size of the visualization region or identifying the coordinates of the visualization region to generate images may be performed by various user interfaces or various programs or processing tools related to data allocation-processing-analysis and visualization, in accordance with the present disclosure. Therefore, the roll map generation unit 40 described above is one example and is not limited to the above-described embodiment.

The roll map generation unit 40 may be, for example, a data processing system such as an MES or one component of the system. Alternatively, the roll map generation unit 40 may include software having operating logic of the data processing system, and hardware including the corresponding software, a mechanical device, or the like.

The data processing system may be a system (including hardware and/or software) for performing input, processing, output, communication, and the like in order to perform a series of operations on data. In the manufacturing process of the electrode 1, an electrode MES for managing a series of electrode manufacturing processes such as coating, pressing, and slitting may be provided. Therefore, when the above-described coordinate data, inspected data, and the like are transmitted to the electrode MES, the above-described roll map may be generated by the electrode MES. In this case, the above-described roll map may be generated during each of the coating process, the pressing process, and the slitting process.

After undergoing the electrode manufacturing process of the present disclosure, the electrode 1 may be installed or arranged between an unwinder and a rewinder that are used for a notching process. In the notching process, the electrode 1 installed or arranged between the unwinder and the rewinder used for the notching process may go through a punching process to form one or more electrode tabs on the electrode. Even in the notching process, the above-described inspection and/or measurement unit, roll map generation unit 40, position measurement device 20 (e.g., encoders 20R, 20U), and the like are installed to generate the roll map during the notching process. In this case, the roll map generation unit 40 of the notching process may function as a notching MES.

Alternatively, the roll map generation unit 40 may be for example, a data processing system such as an statistical process control (SPC) or one component of the system. Here, the SPC may refer to a management system, device or method of efficiently operating a process using a statistical method to achieve the quality or productivity target required for the process.

Alternatively or additionally, for example, a data processing system such as the MES may generate a basic roll map in which at least some of the inspected and/or measured data matches the coordinate values, and an upper level system such as the SPC device may generate an intermediate roll map additionally displaying the entire data, detailed data, and the like from the inspected and/or measured data and the coordinate values. In this case, as the amount of data may increase, and an additional server capable of storing the entire data or the detailed data may be provided.

If a large amount of data can be systematically processed, a basic roll map and a more advanced roll map may be processed by a single data processing system.

Additionally, the data processing systems such as the MES and the SPC may be connected to an upper or higher level system (e.g., a data warehouse (DW)). In this case, additionally acquired data from other processes may be used in connection with the data (coordinate values and inspected and/or measured data) acquired from the electrode manufacturing process and/or the notching process. That is, when the coordinate values of an electrode are specified and a semi-finished battery cell product or a fully-finished battery cell is manufactured with the electrode corresponding to the coordinate values in a subsequent process to the electrode manufacturing process/the notching process, the process data of the subsequent process may be matched the inspected and/or measured data. Therefore, manufacturing history of a specific electrode part from the subsequent process may be identified in relation to the preceding process. Therefore, quality control and analysis the electrode manufacturing process may be performed more easily and conveniently. In addition, when a problem occurs in the semi-finished battery cell product, the fully-finished (or fully-assembled) battery cell, or a battery module or battery pack including the same, quality tracking and an analysis of a cause of a problem may be performed easily and conveniently through the matched data.

As described above, various data or information from various data processing systems necessary for manufacturing an electrode, in a broad sense, throughout a battery manufacturing process for manufacturing a finished battery, module, or pack, including the electrode manufacturing may be mapped to or provided on the roll map. Therefore, when the roll map is used quality control/analysis/tracking relating to the battery manufacturing may be performed.

Referring back to FIG. 2, the apparatus or system 100 for generating the roll map according to the present disclosure may include a manual input device 60 to which the inspected and/or measured data of the electrode 1, which may have been manually inspected and/or measured, is input. The manual input device 60 may directly or indirectly transmit the manually inspected and/or measured inspected and/or measured data to the roll map generation unit 40. For example, the manual input device 60 may acquire the coordinate values of a part of the electrode 1 for which the inspected and/or measured data has been acquired in conjunction with the position measurement device 20 (e.g., encoders 20R, 20U). Alternatively or additionally, the manual input device 60 may be connected to the controller 30 to transmit the manually acquired inspected and/or measured data together with the data of the coordinate values to the roll map generation unit 40 through the controller 30.

For example, information on defects, disconnection, or the like of the electrode 1 may be automatically acquired through the inspection and/or measurement device 10, but may also be directly or indirectly input by an operator on an electrode production line. For example, the operator may input a length and a position of the visually checked defect on the electrode 1 and may attach a tag to the defective part. Alternatively, when the electrode 1 is broken, the operator may connect the electrode 1 using a joint connection member and input the information of the connected part, a length of the broken electrode, and the like through the manual input device 60.

The roll map generation unit 40 may display the generated roll map on a display unit 50 so that the data on quality or defects may be inspected visually and easily identified at a glance.

The manual input device 60 and the display unit 50 may be defined as input/output interfaces (I/F). For example, an input device (not shown for clarity of illustration and explanation), such as a keyboard, a mouse, or a touch panel, may be used as the manual input device 60.

In addition, the roll map generation device 40 according to the present disclosure may be provided with an interface for connecting the roll map generation unit 40, the controller 30, the position measurement device 20 (e.g., encoders 20R, 20U), the inspection and/or measurement unit 10, and the like to the display unit 50 to transmit or receive data.

In one embodiment, the roll map generation unit 40 may generate at least one of an absolute coordinate roll map displaying both the coordinate values of an electrode removal part and a remaining electrode part left after the removal of the electrode removal part. Alternatively or additionally, the roll map generation unit 40 may generates a relative coordinate roll map displaying only the coordinate values of the remaining electrode part.

Figure 5:
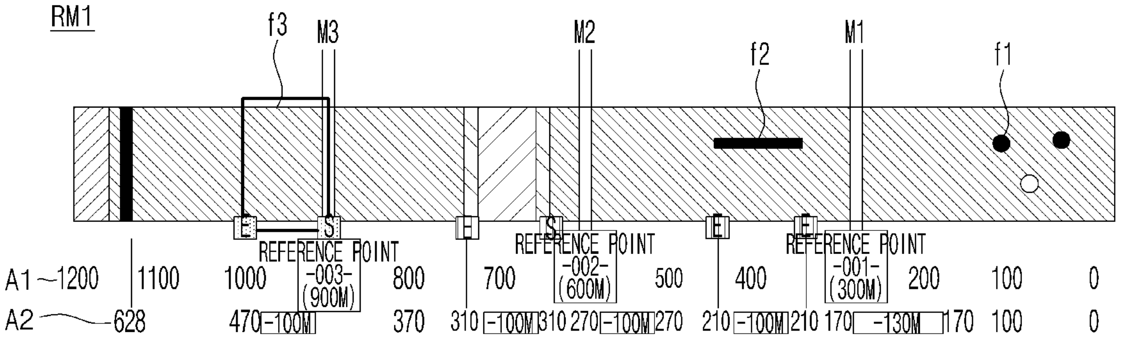
FIG. 5 is a schematic diagram showing an exemplary roll map generated by a system or apparatus for generating a roll map, according to aspects of the disclosure.

FIG. 5 is a schematic diagram showing one example of the roll map generated by the apparatus or system 100 according to the present disclosure.

RM1 shown in FIG. 5 is an exemplary roll map that may be a graphical image and/or video generated by the roll map generation unit 40. On the roll map RM1, the dimensions of the electrode 1 in the longitudinal direction may be expressed as coordinates at predetermined intervals. As described above, since the information on defects, quality, electrode breakage, and the like that may occur during an electrode manufacturing process may be displayed on the roll map RM1 together with the coordinate values, the data corresponding to quality or defects obtained during the electrode manufacturing process may be visually inspected and easily identified at a glance.

Still referring to FIG. 5, exterior defect information such as a pinhole defect f1 and a line defect f2 may be visually displayed at the coordinate values at which the defect has occurred. In addition, a mismatched part f3 of the coating part and the non-coating part may also be displayed. A loading amount defect and the like may also be displayed, and a portion in which the electrode is discarded at the outermost portion may also be displayed.

In addition, reference points M1, M2, and M3 marked on the electrode 1 may be displayed at points of 300, 600, and 900 meters.

In one embodiment, when the electrode 1 is broken and the operator manually connects the electrode 1 using a joint connection member, the length of the electrode 1 may be reduced by the length of the broken electrode that have been removed during the manufacturing process. In addition, as described above, a portion of the electrode 1 at a point where the exterior defect has occurred may also be removed, and the operator may merge and connect the electrode 1 at the point. The coordinate values on the roll map RM1 may be corrected by imitating or simulating the above-described situation on the roll map RM1. Still referring to FIG. 5, absolute coordinates A1 of the roll map RM1 displaying the coordinate values of the electrode removal part and the remaining electrode part left after the removal and relative coordinates A2 of the roll map RM1 displaying only the coordinate values of the remaining electrode part are shown together. As shown in FIG. 5, the relative coordinates A2 and the absolute coordinates A1 may be displayed together on one roll map RM1. However, the absolute coordinates A1 and the relative coordinates A2 may be display separately on different roll maps. A roll map displaying the relative coordinates may display and represent an actual (e.g., current or real-time) state of the electrode 1.

In one embodiment, the electrode 1 may be classified as a single-sided electrode in which the electrode may be coated only on one surface (top or bottom surface) of an electrode medium or substrate (e.g., a current collector). Alternatively, the electrode may be classified as a double-sided electrode in which the electrode may be coated on both to top or bottom surfaces thereof. In this case, the roll map generation unit 40 may generate the roll map including any one surface of the electrode 1 (current collector) or both surfaces of the electrode 1.

Figure 6:
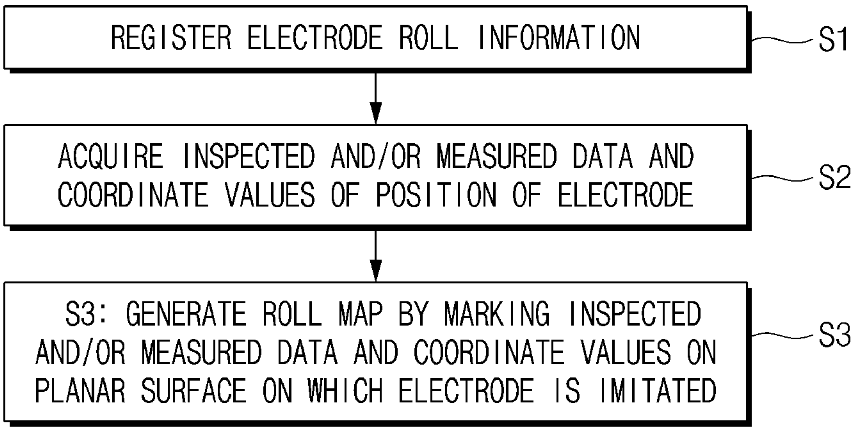
FIG. 6 is a flowchart showing an exemplary method of generating a roll map, according to aspects of the present disclosure.

FIG. 6 is a flowchart showing one embodiment of a method of generating a roll map according to the present disclosure.

As shown in FIG. 6, the method of generating the roll map according to one embodiment of the present disclosure. At step S1, the apparatus or system 100 may register electrode roll information. At step S2, the apparatus or system 100 may acquire inspected and/or measured data by inspecting and/or measuring an electrode moving between an unwinder and a rewinder (e.g., unwinder UW and rewinder RW) and may acquire a position of the moving electrode (e.g., electrode 1) as coordinate values (S2). At step S3 the apparatus or system 100 may generate a roll map (e.g., RM1) by marking at least some of the inspected and/or measured data and the coordinate values on a planar surface (or a display or a graphical interface) on which the moving electrode is imitated or simulated (S3).

In one embodiment, at step S1, an electrode roll information registering operation for registering the specifications of the electrode roll installed on the unwinder (e.g., unwinder UW and rewinder RW) (S1) may be performed before the acquiring of the inspected and/or measured data and acquiring of the position of the electrode as the coordinate values (S2).

The specifications of the electrode roll may include, for example, the type of the electrode determined according to a lot number, a length of an electrode, a width of the electrode, an input material, composition, and the like corresponding to the electrode roll. When the electrode roll is introduced into the unwinder (e.g., unwinder UW) the specification information including the lot number of the electrode roll the electrode roll information may be registered by inputting some or all of the specification information into a server or the like. Such a data input may be manually performed by the operator. Alternatively or additionally, an identification mark or indication capable of identifying the specifications or detailed data of the electrode 1, such as a barcode provided, printed, or attached to one or more locations of the electrode roll, may be scanned by an identification indication recognition device, such as a barcode reader, and automatically input to the server or the like.

After the information of the electrode roll is registered in the server, the specifications or detailed data of the electrode 1 (or electrode roll), such as a lot number, a manufacturing process, and/or equipment, may be requested from the server and may be displayed together with a roll map that may be generated later in a subsequent process. In addition, since the specifications relating to the dimensions (e.g., the length and the width) of the electrode roll may be identified from this data, the shape and size of the roll map (e.g., RM1) may be determined at a predetermined scale proportional to the length and width of the electrode (e.g. electrode 1) when the roll map (e.g., RM1) is generated by the roll map generation unit 40. That is, according to a conversion scale or table stored in the roll map generation unit 40 or the like, the shape and size of a roll map bar corresponding to the length and width of the corresponding electrode may be displayed on an output device such as a display (e.g., display 50). For example, information including at least some of the specifications of the electrode roll may be displayed on the roll map together with the roll map bar.

In order to generate the roll map (e.g., RM1), the inspected and/or measured data may be acquired by inspecting and/or measuring the movement of electrode (e.g., electrode 1) between the unwinder and the rewinder (e.g., unwinder UW and rewinder RW). In addition, at step S2, the position of the corresponding locations of the electrode may be acquired as coordinate values (S2). As described above, the inspected and/or measured data may be acquired automatically by a predetermined inspection and/or measurement device (e.g., inspection and/or measurement device 10) or manually by the operator. For example, the operator may input the inspected and/or measured data and the coordinate values of the corresponding electrode (e.g., electrode 1) to the manual input device (e.g., manual input device 60).

For example, when there are foreign substances or faults on the electrode 1 before the current collector of the electrode 1 is coated, the part including the foreign substances or faults may be cut and discarded via a defect removal port, and one side of the electrode 1 adjacent to a first side of the removed portion of the electrode 1 may be directly connected or merged to another end of the electrode 1 adjacent to a second side of the removed portion of the electrode that is opposite the first side. Alternatively, the electrode 1 may be connected by a connection member such as polyethylene terephthalate (PET). In one embodiment, the electrode 1 may be connected when a fault occurs on the electrode 1 after coating or when the electrode 1 is broken due to excessive tension. In addition, since the outermost portions of the start and end points of the electrode 1 may have non-uniform quality, the outermost portions may be cut and discarded. The length or amount of such electrode connection section or discarded section may be automatically or manually measured. For example, when connecting a disconnection section, an operator may directly input a position of the disconnection section to a server or a data processing system, or may input the position of the disconnection section to a separate input device (e.g., manual input device 60) installed at or proximate to the electrode production line that may communicate with the server or the like. Alternatively or additionally, the operator may directly attach an indication (e.g., a tag) at or near the disconnection section or the connection section on the electrode 1.

The electrode 1 may be inspected by the inspection and/or measurement device 10 installed at the electrode production line. For example, measurement devices, such as an electrode slurry loading amount measurement device 11, a dimension measurement device, the reference point measurement device 12, and the exterior inspection device 13, may be installed in the line. The electrode slurry loading amount measurement device 11 may include a non-contact type thickness measurement sensor, such as an ultrasonic sensor, a displacement sensor, a laser sensor, and a confocal thickness sensor. Since a thickness of an electrode foil, which may be part of the electrode 1, may be known, for example, a confocal thickness sensor may measure the slurry loading amount by analyzing a wavelength of reflected light of light emitted from the sensor and calculating a distance (thickness) between the sensor and the electrode 1.

The dimension measurement device may include a vision measurement device capable of measuring a width of the electrode, widths of the coating part or coated and the non-coating or uncoated part, and the like by capturing or scanning the exterior of the electrode. When the widths of the coating or coated part and the non-coating or uncoated part are identified, it is also possible to determine whether the coating or coated part and the non-coating or uncoated part are mismatched.

In one embodiment, the exterior inspection device 13 may capture and acquire an exterior image of the electrode 1. Accordingly, the data on exterior defects such as a pinhole, a line, and a crater shape may be obtained, as well as the data on insulating exterior or insulating defect. The exterior inspection device 13 may include an inspection device having a sensor, for example, a color sensor configured to determine a color of the electrode 1. For example, the color sensor may detect, for example, a PET connection member, which may be coupled to the electrode 1 and have different color from the electrode 1.

The inspection and/or measurement device 10 is illustrative for description, and the type of inspection and/or measurement device 10 is not limited as long as the data on quality or defects in the electrode manufacturing process or the notching process may be acquired.

In one embodiment, the electrode slurry coater (e.g., coater C) or the like may start coating the electrode 1 at the front-most end of the electrode 1, and the coating conditions such as the loading amount of the slurry may be adjusted. Accordingly, the data on such a condition adjustment section may also be acquired by the inspection and/or measurement device 10, and this data may be displayed on the roll map bar.

In addition, the position of various locations of the electrode 1 moving in the roll-to-roll state may be acquired as coordinate values together with the inspected and/or measured data. That is, the position data of the electrode 1 for which the data has been acquired may be specified. For example, if the roll map bar and/or the roll map has a coordinate system composed of two coordinate axes in the horizontal (or length) and vertical (or width) directions, the position data of the electrode 1 that is the basis for extracting the position (coordinates) may be identified to display specific data at a specific position (coordinates) of the coordinate system.

In one embodiment, the position data (coordinate values) of the electrode 1 in the horizontal (or length) direction may be detected by the encoder (e.g., encoders 20U, 20R) installed at or near the unwinder UW or the rewinder RW. The coordinate values may match or may be mapped to the inspected and/or measured data. The matching of the coordinate values and the data may be performed by the corresponding inspection and/or measurement device (e.g., device 10) or the PLC (e.g., controller 30).

In one embodiment, coordinate values of the electrode 1 in the vertical (or width) direction may be acquired by the inspection and/or measurement device 10. The coordinate values in the width direction may also match or may be mapped to the inspected and/or measured data and displayed on the roll map.

Referring back to FIG. 5, the reference points marked on various locations of the electrode 1 at predetermined intervals may be displayed at the positions (e.g., M1, M2, M3) on the roll map RM1 corresponding to the coordinate values of the corresponding reference points, as shown in FIG. 5.

The roll map according to the present disclosure may include the acquired inspected and/or measured data, coordinate values, and the like on a planar surface or area on which an electrode is imitated or simulated. In one embodiment, the roll map may be displayed on a display device including a two-dimensional graphical interface or a three-dimensional graphical interface. For example, the roll map may be displayed on one or more mobile or stationary display devices (e.g., computer monitor, laptop screen, touchscreen, tablet, mobile phone, etc.). Additionally or alternatively, the display device may include a wearable display device (e.g., head-mounted display) for displaying the roll map as a virtual reality or an augmented reality content on a graphical interface. The roll map generation unit 40 may be a data processing system configured to process data, for example, an electrode MES, an assembly MES, or an SPC or a DW which may be an upper level system. Alternatively, the roll map generation unit 40 may be one component constituting the system 100.

In one embodiment, the roll map generation unit 40 may generate a roll map by marking or displaying at least some of the inspected and/or measured data at the coordinate values on a roll map bar indicating the positions on an electrode for which the corresponding data has been acquired. Additionally or alternatively, all of the inspected and/or measured data or detailed data may be displayed on the roll map. The detailed data may be data associated with the inspected and/or measured data, for example, an exterior image at a specific position of an electrode.

In one embodiment, process data for each detailed process (e.g., coating, roll press, slitting, and notching processes) while an electrode is manufactured may be displayed in connection with specific coordinate values of the roll maps or a specific data display unit. For example, discharge conditions, such as electrode drying temperature during a coating process and a slurry discharge pressure of the coater C, may become the process data of the coating process. Alternatively, a press pressure or the like in the roll press process may also become the process data of the roll press process.

In one embodiment, at least one server or server system(s) may be provided to store the entire data, the detailed data, and/or the process data. The roll map generation unit 40 may receive any necessary data from the server or server system (s) and display the data on the roll map.

In addition, inspected and/or measured data may be compared with normal data, and data determined to be abnormal may be displayed on the roll map to be visually distinct from other data. In one embodiment, the normal data may be defined as data that meets or is within one or more predetermined manufacturing tolerance characteristics or ranges of the electrode manufacturing process according to the present disclosure. Conversely, abnormal data may be defined as data that does not meet or is outside of one or more predetermined manufacturing tolerance characteristics or ranges of the electrode manufacturing tolerances. The manufacturing tolerance characteristics or ranges may be predetermined before starting manufacturing of an electrode according to the present disclosure. Additionally or alternatively, the manufacturing tolerance characteristics or ranges may be adjusted before, during, or after manufacturing of an electrode, in accordance with one or more embodiments of the present disclosure. To this end, the roll map generation unit 40 may be provided with one or more visualization or display device, as described in the foregoing disclosure.

In one embodiment, data on an input status of an input material input during an electrode manufacturing process may be displayed on the roll map. Therefore, the quality control of manufacturing of an electrode is easily performed by comparing the material input status and the data on the roll map.

FIG. 7 is a schematic diagram of a roll map according to one embodiment of the present disclosure, and FIG. 8 is a schematic diagram of a roll map according to another embodiment of the present disclosure.

FIG. 7 illustrates a roll map RM2 including a roll map bar 110. The roll map bar 110 may be displayed in a bar shape imitating or simulating an electrode (e.g., electrode 1) in a roll-to-roll state. The roll maps RM2, RM3 in FIGS. 7 and 8 show roll maps during an electrode coating process according to one or more embodiments of the present disclosure. For example, the roll maps RM2 and RM3 may be generated by the roll map generation unit 40 of the apparatus or system 100.

In one embodiment, at least some of the inspected and/or measured data acquired by inspecting and/or measuring a moving electrode may be displayed at predetermined positions on the roll map bar 110 of the roll map RM2 corresponding to the position of the electrode (e.g., electrode 1) for which the data has been acquired.

In one embodiment, the roll map bar 110 may imitate or simulate an actual electrode (e.g., electrode 1) installed in a roll-to-roll state and moving between the unwinder UW and the rewinder RW. The roll map bar 110 may be displayed in a rectangular planar shape, as shown in FIG. 7 for example.

The start and end points of the roll map bar 110 and a portion of the roll map bar 110 between the start and end points may be displayed in synchronization with a path of the electrode moving between the unwinder and the rewinder. For clarity of explanation, the roll maps RM2 and RM3 in FIGS. 7 and 8 will be explained hereinafter in conjunction with the apparatus or system 100 and its components as shown in FIGS. 2-4. However, any roll map generation unit, apparatus, or system, in relation to FIGS. 1-98 that are disclosed in accordance with the present disclosure may be utilized to generate the rolls maps RM2 and RM3.

In one embodiment, when the length of the electrode roll to be coated is 3000 meters, the roll map bar 110 imitating or simulating an electrode being made from the electrode roll may be reduced at a predetermined scale (ratio) from 3000 meters to be suitably displayed on a screen of a display (e.g., display unit 50). In addition, since detailed information such as a lot number and a width of the electrode roll may be identified when a specific electrode roll is installed between the unwinder UW and the rewinder RW, the width in addition to the length of the electrode (roll) may be reduced at a predetermined scale to be suitably displayed on a display. Accordingly, the roll map bar 110 having a reduced to length and width at a predetermined ratio(s) may be displayed on the display or screen. The length and width of the roll map bar 110 may correspond with the length and width of the actual electrode 1 moving between the unwinder UW and the rewinder RW at the predetermined ratio(s). In addition, when a specific position or location of the electrode 1 is, for example, expressed as coordinate values expressed in units of dimensions of the length, the corresponding coordinates on the roll map 100 may also be reduced at the predetermined ratio(s) and displayed. FIGS. 7 and 8 show coordinate values 140 indicating various positions or locations on the electrode 1 in the longitudinal or horizontal direction at predetermined intervals of the roll map bar 110 in the longitudinal or horizontal direction.

In one embodiment, since the roll map bar 110 is synchronized with the actual electrode 1 being coated with an electrode material while moving along a path between the unwinder UN and the rewinder RW, a coating status of a corresponding coating portion may be displayed on the roll map bar 110 even when a coating process for adjusting coating conditions is being performed before starting a scheduled coating process for manufacturing or producing the electrode 1. Accordingly, the roll map bar 110 may include divided sections such as a condition adjustment part A for coating condition adjustment and a mass production part B on which the coating is performed for producing the electrode 1 under the adjusted conditions.

In addition, even when a section (e.g., a disconnection section 122) in which the electrode is broken during the coating process and re-connected, the roll map RM2 may display this information on the roll map bar 110.

When the roll map bar 110 displays the simulated path or movement of the electrode 1 in the roll map RM2 in synchronization with the movement of the electrode 1, a portion of the data displayed on the roll map bar 110 may be a portion in which the data corresponding to quality or defects on the electrode 1 during an electrode coating process that is displayed. In the present disclosure, the data corresponding to quality or defects may include not only data in a normal range (e.g., within manufacturing tolerances), such as loading amount data and dimension/width data, but also data corresponding to the position of an electrode acquired for sample inspection in addition to data on actual defects, such as an exterior defect, an insulating defect, and a mismatch between an electrode coating or coated part and an electrode non-coating or uncoated part. That is, an inspection and/or measurement device (e.g., device 40) of the present disclosure capable of measuring or monitoring specific quality during the electrode manufacturing process may display all measured data on one or more roll maps of the present disclosure. Accordingly, the data corresponding to quality or defects in the electrode coating process may include normal data (e.g., data within manufacturing tolerances) as well as data on defects (e.g., data beyond manufacturing tolerances) and may indicate all other data on quality that may be quantified or visualized to be displayed on a roll map, in accordance with the present disclosure.

Further, the visual display data or visualization of data may be defined as visually recognizing and displaying data corresponding to one or more roll maps on which an electrode(s) may be imitated or simulated using at least one of a shape, a color, a size, a pattern, a contrast, a transparency, various symbols, numbers, letters, or other visual indicators. In addition, the portion visually displayed may be defined as a display portion, including not only a portion displayed in a shape, color, or the like at specific positions on a roll map bar, but also a portion visually displayed in a shape, color, or the like in a predetermined range or the entire range of the roll map bar. For example, when data corresponding to an electrode slurry loading amount is displayed in color or the like throughout a roll map bar, the data display portion may correspond to the entire portion of the roll map bar rather than a part of the roll map bar. In the figures of the present disclosure, each data display portion may be displayed individually or separately by using one or more hatching patterns. However, some data display portions may be displayed in color to distinguish from each other.

Since the roll map bar 110 according to the present disclosure may imitate or simulate an actual electrode to be coated with an electrode material(s), the detailed information corresponding to the actual electrode (roll) installed between the unwinder UW and the rewinder RW may be displayed together with the roll map bar 110.

In addition to the lot number of the electrode roll, detailed information 130 corresponding to manufacturing lines, manufacturing processes, and manufacturing equipment of the electrode roll, a side of the electrode, and the like may be displayed on the roll map RM2 as shown in FIG. 7, for example. Accordingly, the history information of the preceding process of the electrode roll provided during the coating process, coating-related additional information on which the manufacturing line or equipment has been used to perform coating during the coating process may be provided, information on whether one side or both sides of the electrode have been coated with the electrode coating material, and/or information on specifications of the electrode roll may be provided and identified in the detailed information 130. For example, by clicking an inquiry button displayed on an upper right end of the interface of the roll map RM2 displayed on a screen or display, and by inputting keywords relating to the lines, processes, manufacturing equipment, a side of the electrode, the roll map RM2 or the roll map bar 110, may load corresponding menus on roll map RM2 and display on a screen. In one embodiment, icons, items, objects, etc. on the roll map RM2 may be clicked or selected via an input device (e.g., 60, a mouse, touchscreen, etc.).

In one embodiment, one or more legends 120 showing data corresponding to quality or defects on an electrode may be displayed on the roll map RM2, as shown in FIG. 7. For examples, as disclosed above, the data corresponding to quality or defects may be displayed using at least one of a shape, a color, a size, a pattern, a contrast, a transparency, various symbols, numbers, letters, or other visual indicators. FIG. 7 illustrate, for example, the legends 120 including various visual indicators relating to the data corresponding to quality or defects of an electrode. The roll map bar 110 may include display visual indicators relating to the data corresponding to quality or defects of an actual electrode, in accordance with the legend(s) 120 shown, for example, in FIG. 7. The data on quality or defect of an electrode may be acquired either manually or automatically, and may be graphically displayed on the roll map bar 110.

FIG. 7 shows the roll map RM2 including the data corresponding to quality or defects of an electrode that may be displayed on the roll map bar 110 and/or identified on the legends 120 on the roll map RM2, according to one or more embodiments of the present disclosure. In one embodiment, the visual indications and information relating to the data corresponding to quality or defects of an electrode on the roll map bar 110 and the roll map RM2 may be provided, for example, as follows:

i) data corresponding to at least one of a dimension of the electrode 125 (e.g., labeled as "dimensions" in the legend 120);

ii) data corresponding to a mismatch between an electrode coating or coated part and an electrode non-coating or uncoated part 126 (e.g., labeled as "mismatch" in the legend 120);

iii) data corresponding to a slurry loading amount on an electrode 121 (e.g., labeled as "normal loading amount" 121*a*, "insufficient loading amount" 121*b*, and "excessive loading amount" 121*c* in the legend 120);

iv) data corresponding to an exterior of an electrode 123 (e.g., labeled as "electrode appearance" in the legend 120);

v) data corresponding to a position of an electrode disconnection section or a connection position between the electrodes 122 (e.g., e.g., labeled as "disconnected section" in the legend 120);

vi) data corresponding to a position of a sample inspection unit 129 (e.g., labeled as "sample QA test" in the legend 120);

vii) data corresponding to a position of an electrode discard section;

viii) data corresponding to insulation quality or defects in an insulating material coating process performed after electrode slurry coating 124 and 127 (e.g., labeled as "insulating appearance" 124 and "insulating defect" 127 in the legend 120);

ix) other defect data 128 (e.g., labeled as "other defects (reasons)" in the legend 120);

x) data corresponding to reference points marked on an electrode at predetermined intervals; and xi) data corresponding to a thickness of an electrode after roll press, which may be displayed on or near the roll map bar 110.

In one embodiment, in order to display the inspected and/or measured data, the name or label corresponding to each category of the inspected and/or measured data may be displayed in a specific color, shape, form, or the like. For example, the legend 120 may display the information relating to the inspected and/or measured data at the upper end of the screen in a simple and concise manner, as shown in FIG. 7. However, the actual information of the inspected and/or measure data may be displayed in color, shape, or form at specific positions or in predetermined ranges on the roll map bar 110, as shown in FIG. 7.

FIG. 7 illustrates an exemplary graphical interface of the roll map RM2 showing visual indications and locations of the inspected and/or measured data. For example, when the dimensions of an electrode is out of the normal range (e.g., beyond a predetermined manufacturing tolerance), the data 125 thereon may be displayed on the roll map RM2, for example, in one or more display areas of the roll map RM2 proximate to the roll map bar 110. For example, the data corresponding to a mismatch in which the widths of the coating or coated part and the non-coating or uncoated part are out of the set range 126 may be displayed on the roll map RM2, for example, in one or more display areas of the roll map RM2 proximate to the roll map bar 110. In one embodiment, the mismatch may be determined based on a pattern of the coating or coated part and the non-coating or uncoated part. For example, if one or more sides of the coated or uncoated part are not in a straight line, then such condition may be determined to be out of a normal range. Additionally, the data corresponding to the electrode slurry loading amount 121, e.g., normal 121*a*, insufficient 121*b*, and excessive 121*c*, may be displayed in a specific range on the roll map bar 110 with, for example, a hatching pattern as shown in FIG. 7. For example, the electrode exterior defect 123 may be displayed as circles at a specific locations of the roll map bar 110. For example, the disconnection section 122 in which the electrode is cut and connected by a connection member such as PET may be displayed at a left end of the roll map bar 110. Additionally or alternatively, the electrode that may be directly connected or merged without utilizing a connection member may be displayed on the roll map. When performing such an electrode connection, the operator may directly input data of the position information corresponding to the connection section to be displayed on the roll map RM2.

For example, the data corresponding to the electrode part provided for sample inspection 129 may be displayed on the roll map RM2.

For example, the data corresponding to a section of the electrode that is discarded may also be displayed on the roll map RM2. For example, an outermost section of the coated electrode may be cut and discarded, and the roll map RM2 according to the present disclosure may also display the information corresponding to the discarded section.

During an electrode coating process according to an embodiment of the present disclosure, an insulating material coating process may be performed on or near a boundary between the coating or coated part and the non-coating or uncoated part in addition to the coating of the electrode slurry. In this embodiment, the information corresponding to the insulation defect 127 or the insulation exterior defect 124 may be displayed on the roll map bar 110. Accordingly, the "electrode coating process" of the present disclosure includes "coating of the insulating material" and/or "coating of the electrode slurry."

For example, the data corresponding to other defects 128 in addition to the exterior defect or the insulation defect may be displayed on the roll map bar 110. In one embodiment, the data corresponding to other defects may be categorized as other defects 128 when displayed during an electrode coating process. However, when the data corresponding to the defects is determined to be specific defects at the time of completing the coating process or later in a following or subsequent process, the data corresponding to the other defects 128 may be changed to specific defects that may be associated to the corresponding process and may be displayed later accordingly on the roll map RM2. Displaying the other defect data may be important information for identifying the cause of defects when the defects occur later in the following or subsequent processes.

As described above, by displaying the data corresponding to quality or defects of an electrode, in connection with the manufacturing processes of the present disclosure, in various shapes, colors, patterns, or the like on the roll map bar 110 synchronized with the electrode movement or path, for example, quality-related history information of the electrode during an electrode coating process or other roll-to-roll processes may be easily identified at a glance.

In one embodiment, as shown in FIG. 7, when a specific range of the roll map bar 110 is designated (e.g., selected by clicking one or more location so the roll map bar 110), inspected and/or measured data corresponding to an electrode range of the specific range may be displayed or the process data for each detailed process during manufacturing of an electrode may be displayed. For example, when the mismatch section 126 of the roll map bar 110 in FIG. 7 is clicked, detailed information 150 on the mismatch section 126, the loading amount in the mismatch section 121, and the information on the width 125 may be identified and displayed together at a lower left end of the roll map bar 110. The range may be designated by moving cursor in a left-right direction on the roll map bar and clicking and selecting, and the detailed data within the range may be checked by designating the defect section in units of a set length (e.g., in units of 1 meters). The loading amount of an electrode coating material on a surface of one side the electrode may be displayed on an upper portion of the roll map bar 110, but in the detailed information 150 of the roll map RM2, the loading amount of the electrode coating material may be shown or displayed on both of surfaces of the top and bottom sides of the.

In one embodiment, when the electrode exterior defect data 123 on the roll map bar 110 is clicked, an exterior image 163 of the electrode 1 captured by the exterior inspection device 13 may be displayed separately from the roll map bar 110. The exterior defect image 163 displayed by clicking the exterior defect data 123 may be displayed to be enlarged or magnified at a lower right end of the roll map bar 110, as shown in FIG. 7. For example, when the exterior image 163 is displayed, the detailed information 162 including the position coordinates of the exterior defect captured by the exterior inspection device 13 may also be displayed on the a display area of the roll map RM2 together with the exterior image 163, as shown in FIG. 7. The detailed information 162 may include information on a lot ID of the electrode 1, an ID of the exterior inspection device 13, the type of exterior defect, the line the electrode 1 is being manufactured, and position coordinates, a grade, a diameter, and/or the date and time of the occurrence of the exterior defect of the detailed information 162 may already be stored on a server. Accordingly, the detailed information 162 may be loaded from the server and displayed separately on a screen by clicking an exterior defect image on the roll map bar 110. In one embodiment, an exterior information 160 including the exterior image 163 and the detailed information 162 on exterior defects may be displayed separately in addition to the roll map bar.

In one embodiment, the roll map RM2 shown in FIG. 7 may be include one or more electrode lanes. That is, the electrode may be coated with electrode slurry according to a predetermined interval or pattern on the surface of a foil of the electrode. For example, the electrode may include lane L1 and L2, to which the electrode slurry may be applied. Accordingly, the roll map RM2 may be generate images or graphics for each lane L1 and L2 to which the electrode slurry is applied, as shown in FIG. 7.

FIG. 8 illustrates a roll map RM3 including a double-sided electrode in which both a top surface T and a bottom surface B of the doubled-sided electrode are coated with the electrode slurry. Since the roll map RM3 displays the top surface T and the bottom surface B of the double-sided electrode respectively on upper and lower portions of the same screen, data on quality or defects 220 relating to the electrode slurry applied to both surfaces of the double-sided electrode or the coating of the insulating material on the double-sided electrode may be compared and clearly identified.

For example, the roll map RM3 according to an embodiment of the present disclosure, may display data of input statuses of the electrode foil, the electrode slurry, and the insulating material input to the electrode coating process 250 and data of the loading amount of the electrode slurry input to the electrode coating process 260 together with the roll map RM3 along the longitudinal or horizontal direction of the roll map RM3.

One or more horizontal bars indicating or representing the electrode foil, the electrode slurry, and the insulating material input to the electrode coating process may be displayed at the upper end of the screen, as shown in FIG. 8. the horizontal bars indicating the electrode foil, the electrode slurry, and the insulating material may extend from left to right on the screen together with the roll map in the longitudinal or horizontal direction of the roll map RM3. For example, a portion in which a horizontal bar does not extend indicates that the corresponding material (the electrode foil, the electrode slurry, or the insulating material) was not input during the electrode coating process. Accordingly, which specific material has been input during which section of the electrode coating process may be easily identified from the data 250.

In one embodiment, data of the loading amount of the electrode slurry input to the electrode coating process 221 may be displayed, for example, as legends, on the roll map RM3, as shown in FIG. 8. However, the information or indication corresponding to the data 221 may also be displayed on a lower portion of the roll map bar 210 in the longitudinal or horizontal. Since the data 260 displays the distribution of the loading amount along the length of the electrode like a graph, the information on excessive or insufficient loading amount may be more easily identified, and a numerical value of the loading amount may also be displayed. Therefore, there is an advantage in that the information on the loading amount may be identified more intuitively.

Detailed data of a model, a process, manufacturing equipment, and a lane number of the electrode roll, the side surface of the electrode 230, and the like in addition to the lot number of the electrode roll may also displayed at the upper end of the screen, as shown in FIG. 8. In one embodiment, a menu (or a check box(s)) related to the input status (Input), an electrode (e.g., the roll map RM3) calculated based on the input material (Output), a menu related to the measured value 231, a menu related to the selection of the side surface of the electrode 232, a menu related to a zoom-in and zoom-out (Zoom) of the screen 233, and a menu related to other measured value options 234 may additionally be displayed at the upper end of the screen. By selecting such a menu, various types of roll maps RM3 based on the corresponding menus may be displayed on the screen.

At the upper end of the roll map screen of the embodiment, the names of the data relating to loading amounts and defects, data names relating to surface defects, and data names relating to sample examination are separately displayed as legends that may be easily distinguishable or recognizable. With such data names, the types of data displayed above the roll map bars 210 may be easily recognized or identified.

On the roll map bars 210 shown in FIG. 8, i) data 225 on at least one of electrode dimension, ii) data 226 on a mismatch between a coated electrode part and a non-coated electrode part, iii) the electrode slurry loading amount data 221, iv) data 223 on an exterior defect of the electrode, v) data 222*a* or 222*b* on the location of a disconnected section or inter-electrode connection, vi) data 229 on the location of a sample inspection part, vii) data 222*c* on an electrode discard section, viii) data 227 on insulating quality or defects in an insulating material coating process performed after electrode slurry coating, and ix) other defect data may be displayed on one or more display areas of the roll map RM3 and/or the roll map bars 210.

When the dimension of the electrode deviates from a normal range (e.g., beyond a predetermined manufacturing tolerance range), the data 225 on is the electrode deviation may be displayed as a rectangle on the roll map bar 210, as shown in FIG. 8, and the data 226 on the mismatch may also be displayed as a rectangle having sides or lines thicker than the rectangle showing the data 225, as shown in FIG. 8.

In one embodiment, the data 221 on an electrode slurry loading amount may be displayed in detail. That is, the data 221 may be displayed as a normal case or condition 221*a* (e.g., within a predetermined manufacturing tolerance), an insufficient case or condition 221*b* or 221*c* (e.g., below a predetermined manufacturing tolerance), or an excessive case 221*d* or 221*e* (e.g., beyond a predetermined manufacturing tolerance) over a specific range on the roll map bar 210.

In one embodiment, an electrode exterior defect may be displayed as a circle, a black circle, or a black bar 223 at a specific spot on the roll map bars 210. For example, the exterior defects 223 may be subdivided into pinholes, lines, and craters and displayed in different shapes on the roll map bar 210 of the roll map RM3.

In one embodiment, a disconnected section 222*a* at which a disconnected electrode may be connected with a coupling member, such as PET, and an inter-electrode connection section 222*b* may be displayed, and a PET connection section may be displayed on the roll map bar 210, as shown in FIG. 8.

Further, an automatic mark section 228*a* which may correspond to a defective section measured and marked by, for example, a measuring instrument, and a manual mark section 228*b* which may be manually input for indication by an operator may be displayed on the roll map RM3, as shown in FIG. 8. Since a start portion S and an end portion E of each section are displayed on the roll map bar 210, the information on the length, the start point, and the end point of a corresponding section may be easily identified.

In addition, the outermost discard section 222*c* may be displayed as a hatched portion on the roll map bars 210.

In one embodiment, the electrode part 229 provided for sample inspection may also be subdivided into a self-test and a quality assurance (QA) test and may be displayed on the roll map bars 210.

As shown in FIG. 8, the data (graph) 260 on the loading amount displayed in parallel with the roll map bars 210 at the lower end of the roll map RM3 shows a part 261 having an excessive loading amount and a part (the PET connection section) 262 not loaded with electrode slurry, which correspond to marks on the roll map bars 210 above the data 260.

As described above, the roll map RM3 according to the present disclosure may display quality-related or defect-related data in a specific shape, color, etc. on the roll map bars 210 synchronized with an electrode path or movement and may simultaneously display the current status of a material input during a coating process, important data of a loading amount, and detailed data of each point on the same roll map bar on the same interface on a screen. Accordingly, the quality-related history information during an electrode coating process may easily be seen at a glance.

The roll map may be stored in a storage medium.

The roll map may be stored in a database of the roll map generation unit shown in FIG. 2 or a separate storage medium. The database may be, for example, a memory. A plurality of memories may also be provided, as necessary. The memory may be a volatile memory or a non-volatile memory. As the memory of the volatile memory, a random access memory (RAM), a dynamic RAM (DRAM), a static RAM (SRAM), or the like may be used. As the memory of the non-volatile memory, a read only memory (ROM), a programmable ROM (PROM), an electrical alterable ROM (EAROM), an erasable programmable ROM (EPROM), an electrically erasable programmable ROM (EEPROM), a flash memory, or the like may be used. Examples of the listed memories 2200 are merely illustrative and are not limited to these examples. Alternatively, the storage medium may be a hard disk, a CD-ROM, a USB memory, a solid state drive (SSD), or the like.

The roll map and related data stored in the storage medium may be freely used for battery manufacturing, quality control, analysis, and problem tracking.

When breakage or defects occur in the electrode in the electrode manufacturing process, there is a case in which the broken or defective portion is removed and the broken electrodes are connected with a connection tape. Alternatively, there is a case in which a start portion or an end portion of the electrode, which has non-uniform quality, is removed to maintain the quality of the electrode. In this case, after removing and connecting the electrode, an operator arbitrarily inputs a length (loss amount of the electrode) of the cut electrode to a controller or the like. However, since the operator manually measures the loss amount of the electrode with the naked eye or a measuring tool such as a ruler and inputs the loss amount of the electrode, in practice, the consumed loss amount of the electrode is not accurate. In addition, the loss amounts of the electrode, which are input by each operator, are different.

In this case, in a following process, the fact that the electrode was broken and connected may be confirmed by detecting the connection tape, but the loss amount of the electrode may not be accurately identified because the loss amount of the electrode depends on the operator's input. When the loss amount of the cut electrode is not accurate, since position coordinates of the electrode in the following process are changed, it may be difficult to accurately perform the following process at a desired position. In addition, since a criterion for comparing and analyzing changes in quality between the detailed processes of the electrode manufacturing process is changed depending on the loss amount of the electrode, quality comparison according to the position of the electrode may not be reliably performed.

In addition, recently, a roll map displaying data on quality or defects on a roll map bar displayed on a screen. By imitating an electrode in a roll-to-roll state has been used. Since such a roll map is made up in each sub electrode manufacturing process of a coating process, a roll press process, and a slitting process, roll map information is downloaded, and information on the quality defect or the electrode breakage in the preceding process is checked in the following process to remove the defects or take necessary follow-up processing. However, when the loss amount of the electrode is not accurately identified as described above, data on the position of the electrode displayed on the roll map is changed, and thus, the data on quality or defect position may not be accurately displayed, and when the roll map is referred in the following process, there is a risk of performing the following process based on incorrect position coordinates.

Therefore, in the electrode manufacturing process, it is necessary to develop a technology capable of accurately measuring the loss amount of the electrode.

One or more aspects of FIGS. 1-8 may be incorporated into or combined with one or more aspects of the embodiments disclosed in reference to FIGS. 9-18 herein. Accordingly, some elements of FIGS. 9-18 may be similar to elements of FIGS. 1-8, and thus similar or identical reference numerals may be used to depict those elements. Further, detailed disclosure of the similar or identical elements already described may be omitted hereinafter for brevity. However, such omissions are not disclaimers or disavowals, and except to the extent that the similar or identical elements that are already described are inconsistent with the express disclosure herein, in which case the language in the present disclosure hereinafter controls.

Figure 9:
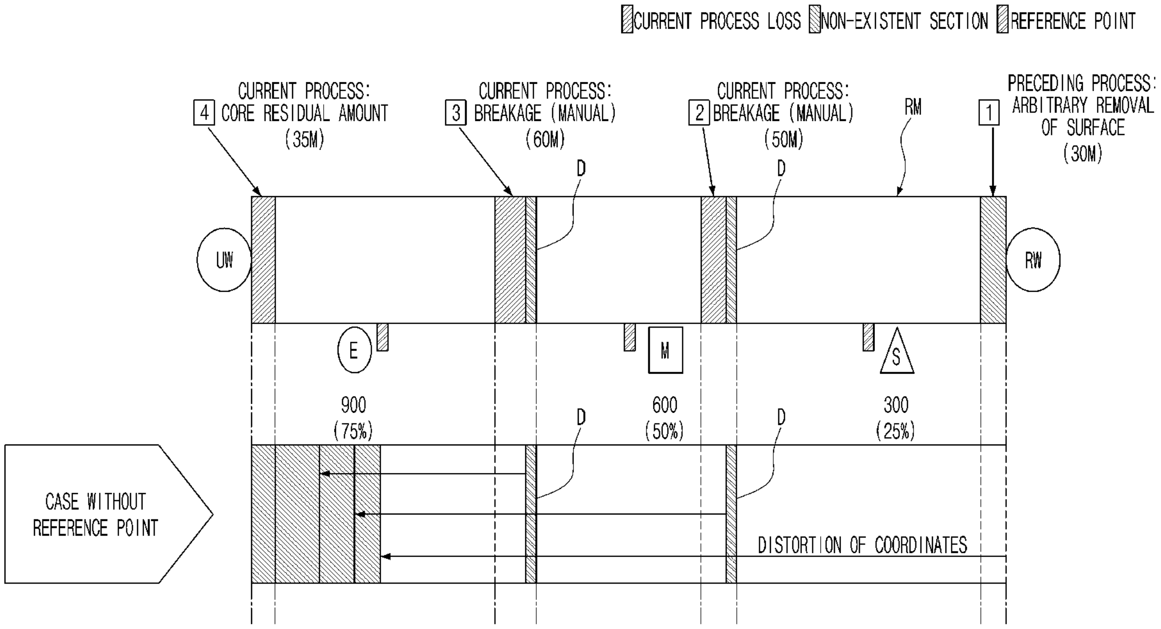
FIG. 9 is a schematic diagram showing an exemplary distortion of position coordinates when a loss of an electrode occurs without reference points, according to aspects of the present disclosure.

FIG. 9 is a schematic diagram showing a case in which distortion occurs in position coordinates when a loss occurs in an electrode in a state of having no reference points.

An upper drawing of FIG. 9 shows a roll map RM imitating the movement of an electrode moving in a roll-to-roll state between an unwinder UW and a rewinder RW. A plurality of pieces of detailed data on quality or defects are visually displayed together on the actual roll map RM, but for convenience of description, FIG. 9 shows only electrode breakage and a connection tape D.

The roll map RM in the upper drawing of FIG. 9 imitates an actual electrode, and several types of breakage occur in the actual electrode. When one process of detailed processes of an electrode manufacturing process is performed, electrode breakage occurs in a process, and breakages of 50 meters and 60 meters are displayed on the roll map RM. In addition, a case in which 30 meters of a start portion of the electrode was removed in a preceding process before entering the process and 35 meters of an end portion of the electrode was removed in the process is displayed.

In this case, when broken parts or electrode removal parts (electrode loss parts) of the start and end portions of the electrode are removed, only the connection tape D for connecting the broken parts is left as shown in a lower drawing of FIG. 9. That is, a form of an actual electrode is shown in the lower drawing of FIG. 9. In the lower drawing of FIG. 9, for example, a position of the connection tape D may be detected by, for example, a joint detection sensor. However, since the broken electrode or the removed electrode is not left in the actual electrode, it is not possible to identify a loss amount of the electrode, which is a length of the electrode removal part (loss part). As described above, since the operator manually inputs information on the electrode removal part, it is difficult to know the exact loss amount of the electrode.

In addition, when the loss amount of the electrode may not be identified, the roll map RM of the electrode manufacturing process also has the form as shown in the lower drawing of FIG. 9, and thus the position coordinates on the roll map are also deviated. In the upper drawing of FIG. 9, the connection tape is shown together for convenience of description because the broken/removed lengths of the electrode are assumed to be known and when an electrode loss actually occurs, the roll map has the form as shown in the lower drawing of FIG. 9.

That is, in the roll map RM, the movement of the electrode is imitated and a longitudinal dimension corresponding to a dimension of the electrode in a longitudinal direction, that is, position coordinates are displayed, and when the loss amount of the electrode is not identified, the loss amount of the electrode may not be reflected in the longitudinal dimension. Therefore, when the electrode is transferred to the following process of the electrode manufacturing process or other detailed processes of the electrode manufacturing process, it is difficult to use the roll map in which the loss amount of the electrode is not reflected. That is, it is necessary to correct the position coordinates by displaying or reflecting the loss amount of the electrode in the roll map RM and also reflecting the loss amount of the electrode in the longitudinal dimension (position coordinates) of the roll map.

Figure 10:
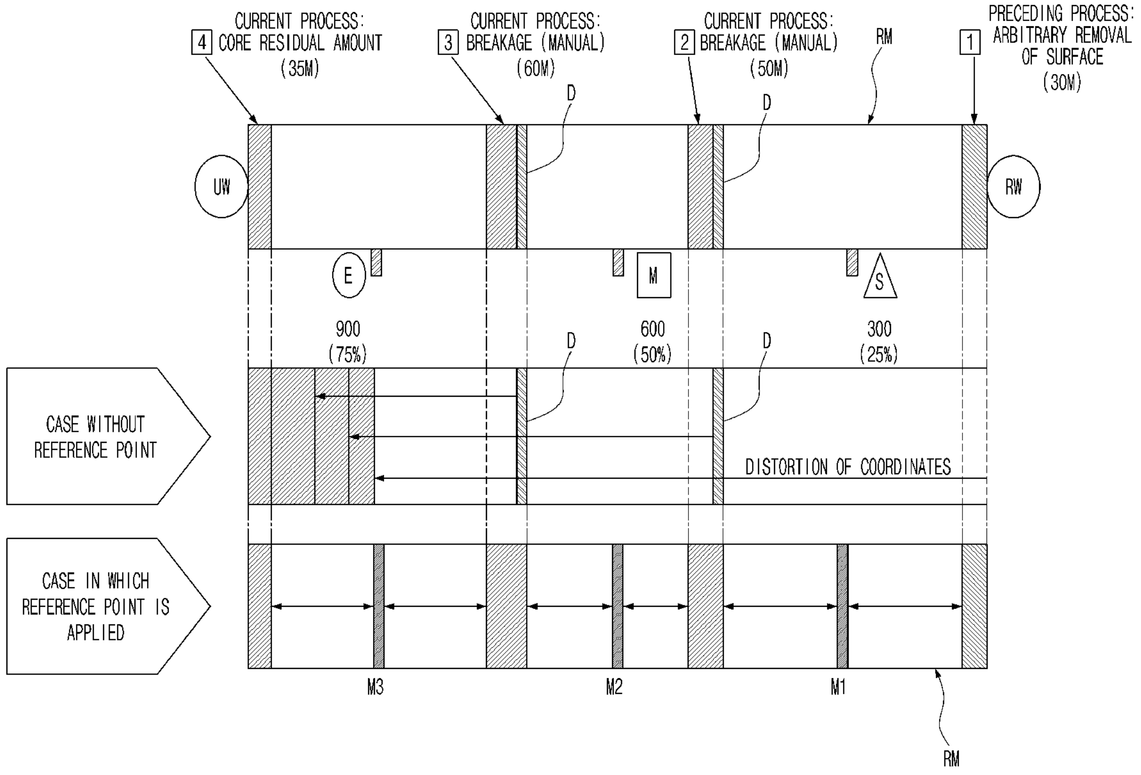
FIG. 10 is a view showing an exemplary concept for preventing a distortion of position coordinates by introducing reference points, according to aspects of the present disclosure.

FIG. 10 is a view showing the concept of the present disclosure of preventing distortion of position coordinates by introducing reference points.

In a roll map RM in a lowermost portion of FIG. 10, reference points M1, M2, and M3 are introduced at predetermined intervals, and an electrode loss part is displayed. The number and intervals of reference points M1, M2, and M3 may be differently applied depending on the length or specifications of an electrode. In FIG. 10, an electrode having a length of 1200 meters is assumed, and the reference points M1, M2, and M3 are respectively displayed at points of 300, 600, and 900 meters. When the reference points M1, M2, and M3 are marked on an actual electrode and actually measured when an electrode loss occurs, an interval between the reference points is changed, and thus, it is possible to easily identify the electrode loss based on the changed value. As described above, when the electrode loss is identified, the reference points M1, M2, and M3 and a length of the electrode loss may be displayed together, as in the roll map RM in the lowermost portion of FIG. 10. As will be described below, a longitudinal dimension (absolute coordinates) of the electrode in which the loss length is reflected and a longitudinal dimension (relative coordinates) of the electrode in which the loss length is not reflected may be displayed together on one roll map.

As described above, when the reference points are introduced to the electrode, from the change in the interval between the reference points, the loss amount of the electrode may be identified by comparing positions of the reference points before the change (positions of set reference points) and positions of the measured reference points and reflected on the roll map. The electrode loss amount measurement using the reference points will be described in detail.

Figure 11:
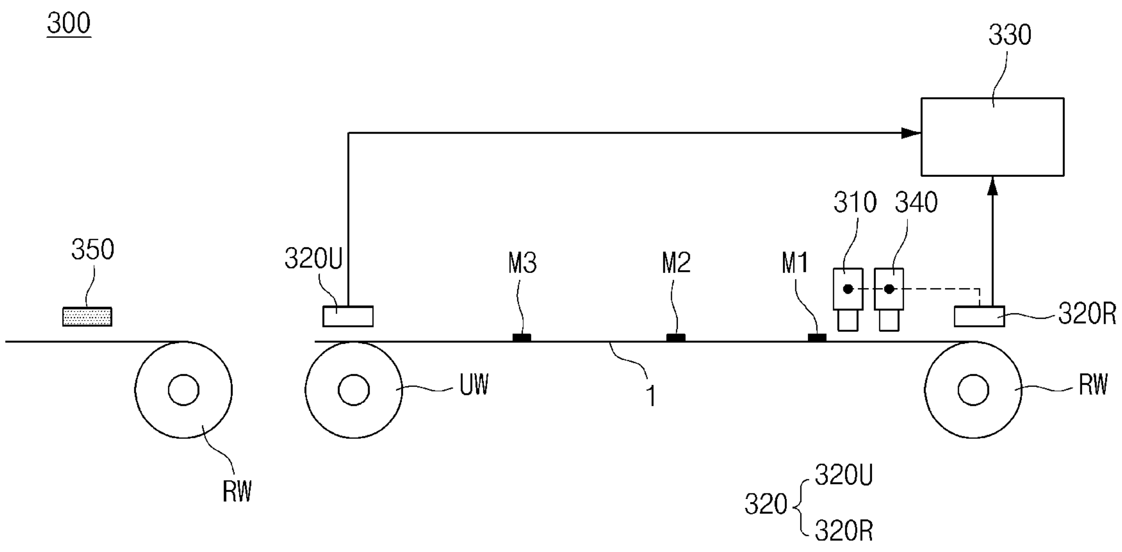
FIG. 11 is a schematic diagram of an exemplary electrode loss amount measurement device, according to aspects of the present disclosure.

FIG. 11 is a schematic diagram of an apparatus for measuring a loss amount of an electrode according to one embodiment of the present disclosure.

An apparatus 300 for measuring the loss amount of the electrode according to the present disclosure includes an electrode 1 which is transferred between an unwinder UW and a rewinder RW in a roll-to-roll state and on which a plurality of reference points M1, M2, and M3 are marked at predetermined intervals between start and end portions of the electrode 1, a reference point measurement device 310 for detecting the reference points marked on the electrode, a position measurement device 320 for deriving coordinate values of the electrode according to an amount of rotation of the unwinder UW or the rewinder RW and deriving a coordinate value of the corresponding reference point in conjunction with the reference point measurement device when the reference point measurement device detects the reference point, and a calculator 330 for calculating a loss amount of the electrode by comparing the derived coordinate value of the reference point with a coordinate value of a set reference point when an interval between the reference points between the start and end portions of the electrode is changed from set reference point coordinate values due to a loss of a part of the electrode.

In the apparatus 300 for measuring the loss amount of the electrode according to the present disclosure, the plurality of reference points M1, M2, and M3 are marked on the electrode 1 at predetermined intervals between the start and end portions of the electrode. As described above, the number and intervals of reference points may be differently applied according to the length or specifications of the electrode. The reference points may be marked by a predetermined reference point marker 350. For example, an inkjet-type ink marking printer may be used as the reference point marker. Since an electrode manufacturing process includes a plurality of processes of a coating process, a roll press process, and a slitting process, the marking needs to be first performed on the electrode before measuring the loss amount of the electrode. To this end, the reference point marker 350 may be installed before the unwinder UW in which the corresponding process is performed, and may mark the plurality of reference points M1, M2, and M3 on the electrode at predetermined intervals. The marking of the reference points may not be performed on a coating part 1*a* to which an active material of the electrode 1 is applied but may be performed on a non-coating part 1*b* to which the active material is not applied for visibility and may be performed on an upper or lower surface or both the upper and lower surfaces of the non-coating part (see FIG. 15).

In addition, according to the present disclosure, the reference point measurement device 310 for detecting the reference points on the electrode is provided. The reference point measurement device 310 may be an optical character recognition (OCR) reader capable of reading printed characters by OCR. Alternatively, a vision camera capable of detecting the reference points by including a vision sensor may be employed as the reference point measurement device. As shown in FIG. 11, the reference point measurement device may be installed above the electrode 1 line transferred in the roll-to-roll state.

The position measurement device 320 may derive the coordinate values of the electrode according to the amount of rotation of the unwinder UW or the rewinder RW. For example, rotary encoders 320R and 320U for extracting the coordinate values of the electrode from amounts of rotation of motors for respectively driving the unwinder UW and the rewinder RW may be used as the position measurement device. Since the electrode unwound from the unwinder UW is wound around the rewinder RW, the coordinate values of the electrodes derived from the rotary encoders 320R and 320U respectively installed in the unwinder UW and the rewinder RW may be the same. No matter which rotary encoder is used, the position of the electrode may be changed into a digital signal according to the amount of rotation of the motor, and the coordinate values may be derived as numerical values. In the present disclosure, since the position measurement device 320 interworks with the reference point measurement device 310, when the reference point measurement device 310 detects the reference point, the position measurement device 320 may derive a position value of the corresponding reference point. FIG. 11 shows that the reference point measurement device 310 is connected to the position measurement device 320 and the position measurement device 320 automatically derives the coordinate values of the reference points when a detected signal of the reference point measurement device is transmitted to the position measurement device. The reference point measurement device may be connected to the position measurement device by a wire or wirelessly.

The present disclosure includes the calculator 330 for calculating the loss amount of the electrode by comparing the derived coordinate values of the reference points with the set reference point coordinate values when the interval between the reference points between the start and end portions of the electrode is changed from a set reference point interval due to a loss of a part of the electrode 1. The calculator 330 may be, for example, a controller (PLC) for controlling transferring of the electrode between the unwinder UW and the rewinder RW. Alternatively, the calculator may also be the roll map generation unit to be described below. The calculator 330 may include a predetermined calculation program and calculate the loss amount of the electrode by comparing the coordinate values of the reference points obtained by the position measurement device 320 and the set reference point coordinate values. To this end, the calculator 330 may include a memory in which the set reference point coordinate values are stored or read data on the set reference point coordinate values from a database.

As shown in FIGS. 9 and 10, when the electrode loss due to breakage or arbitrary removal of the electrode occurs, the positions of the reference points are changed from the positions of the initially marked reference points (set reference point coordinate values). Therefore, the calculator 330 may calculate the loss amount of the electrode from the above fact. A detailed loss amount calculation process will be described in detail when a method of measuring a loss amount of an electrode according to the present disclosure is described.

The apparatus 300 for measuring the loss amount of the electrode according to the present disclosure may further include a joint detection sensor 340 for detecting a connection tape attached on the electrode. The connection tape is a tape for connecting broken electrodes when breakage occurs in the electrode. When only the joint detection sensor 340 is installed without having the reference points, the joint detection sensor may identify that breakage is present in the electrode by detecting the connection tape. However, it is not possible to identify to what extent the length of the electrode is broken. As described above, in the present disclosure, the reference point measurement device 310, the position measurement device 320, and the calculator 330 are provided so that the length of the broken electrode may be identified.

Like the reference point measurement device 310, the position measurement device 320 interworks with the joint detection sensor 340 and thus may derive a length of the connection tape when the connection tape is detected by the joint detection sensor 340. Specifically, the joint detection sensor 340 may detect each of start and end portions of the connection tape, and when the position measurement device 320 receives each detected signal, the position measurement device may detect a coordinate value at a time point of detecting the start portion and a coordinate value at a time point of detecting the end portion. Since a difference between the coordinate value at the time point of detecting the start portion and the coordinate value at the time point of detecting the end portion becomes the length of the connection tape, the length of the connection tape may be identified by the position detection by the position measurement device 320. The joint detection sensor 340 may be, for example, a color sensor. Since a color of the connection tape is typically different from that of an electrode, the connection tape, which is a part having a color different from that of the electrode, may be detected by the color sensor.

The connection tape may also include a polyethylene terephthalate (PET) film in addition to an adhesive tape that connects the electrodes. The PET film extends a relatively longer section than the adhesive tape and connects the electrodes.

When the connection tape is detected in addition to the reference point, the calculator 330 calculates a value obtained by adding the length of the connection tape to the loss amount calculated by comparing the coordinate values of the reference points with the set reference point coordinates as a total loss amount. A detailed description thereof will be provided below.

The method of calculating the loss amount of the electrode according to the present disclosure includes marking a plurality of reference points at predetermined intervals between a start portion and an end portion of an electrode transferred in a roll-to-roll state between an unwinder UW and a rewinder RW, deriving a coordinate value of the reference point by detecting the reference point on the electrode by a reference point measurement device, and calculating a loss amount of the electrode by comparing the derived coordinate values of the reference points with set reference point coordinate values when an interval between the reference points between the start and end portions of the electrode is changed from a set reference point interval due to a loss of a part of the electrode.

As described above, before detecting the reference points, the plurality of reference points are marked at predetermined intervals between the start and end portions of the electrode by the reference point marker 350 (see FIG. 11).

The reference point measurement device 310 such as a vision camera may detect the reference points on the electrode, and the coordinate values of the reference points may be derived by the position measurement device 320 interworking with, for example, the reference point measurement device. When there is no loss in the electrode, the derived coordinate values of the reference points may be the same as the set reference point coordinate values.

However, when a length of the electrode becomes less than a length of the electrode originally wound around the unwinder UW due to breakage or arbitrary removal, the interval between the reference points between the start and end portions of the electrode is changed from the set reference point interval. With such a change, the loss amount of the electrode may be calculated by comparing the derived coordinate values of the reference points with the set reference point coordinate values.

Specifically, when at least one of the interval between the reference points, an interval between the reference point and the start portion of the electrode, and an interval between the reference point and the end portion of the electrode is changed, the loss amount of the electrode may be calculated by comparing the derived coordinate values of the reference points and the set reference point coordinate values.

FIG. 12 shows one example of measuring the loss amount of the electrode according to the present disclosure.

Figure 12A:
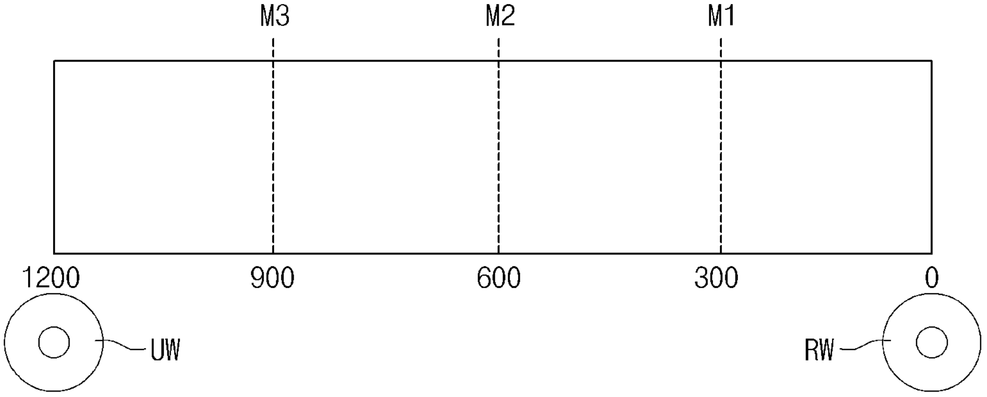
FIG. 12A is a schematic diagram showing an exemplary measurement of electrode loss amount measurement, according to aspects of the present disclosure.

FIG. 12A shows that three reference points M1, M2, and M3 are marked at an interval of 300 meters on an electrode in which no loss occurs. A length of the electrode is 1200 meters, and the rewinder RW and the unwinder UW are installed at a start portion and an end portion of the electrode, respectively, and the electrode is transferred in a roll-to-roll state. For convenience of description, a side in which the electrode is wound around the rewinder RW is considered as the start portion of the electrode, a side in which the electrode is unwound from the unwinder UW is considered as the end portion of the electrode, and the description will be made on the basis that the electrode proceeds from the unwinder UW to the rewinder RW.

Figure 12B:
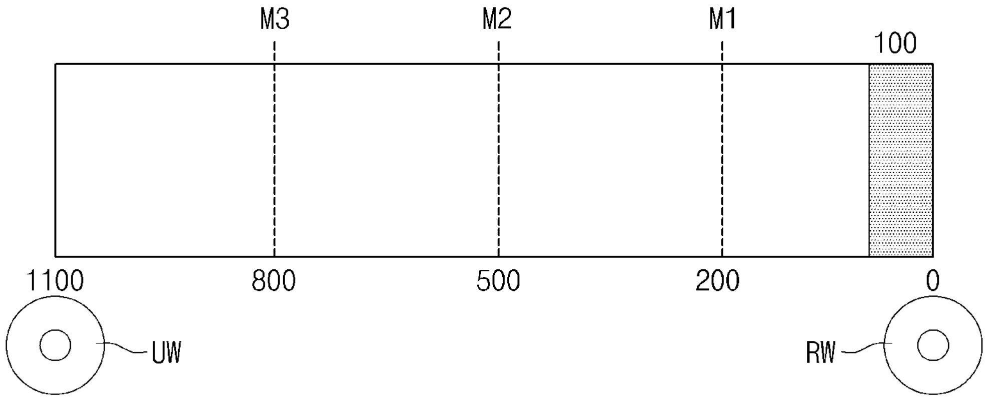
FIG. 12B is a schematic diagram showing an exemplary measurement of electrode loss amount, according to aspects of the present disclosure.

FIG. 12B shows a state in which an operator has arbitrarily removed 100 meters of the electrode in the preceding process. In this case, a first reference point M1 of the electrode wound around the rewinder RW is pulled from 300 meters to 200 meters, which is detected by the reference point measurement device 310, and 200 meters, which is a coordinate value of the first reference point M1, is derived by the rotary encoder installed in the rewinder RW. Since the start portion of the electrode is reduced by 100 meters, positions of the subsequent second and third reference points M2 and M3 are also changed from 600 meters to 500 meters and from 900 meters to 800 meters, respectively. In FIG. 12, the numbers indicated in italics mean the changed coordinate values of the reference points. This is equally applied to the following description. In addition, the position of the end portion of the electrode detected by the unwinder UW is also changed from 1200 meters to 1100 meters.

The position measurement device 320 transmits pieces of data on the coordinate values of the reference points changed as described above to the calculator 330, and the calculator 330 calculates the loss amount of the electrode by comparing the set reference point coordinate values, which are 300, 600, and 900, with the derived coordinate values of the reference points, which are 200, 500, and 800. Specifically, in FIG. 12B, since the interval between the start portion of the electrode and the first reference point M1 is reduced from 300 meters to 200 meters, the loss amount of the electrode may be calculated to be 100 meters. In addition, a loss occurrence position may also be specified between the start portion of the electrode and the first reference point M1. However, since the connection tape is not detected between the start portion of the electrode and the first reference point M1, it may be estimated that the loss is not caused by electrode breakage. Of course, in order to detect the connection tape, the joint detection sensor 340 to be described below is required.

FIG. 13 shows another example of the electrode loss amount measurement according to the present disclosure.

Figure 13A:
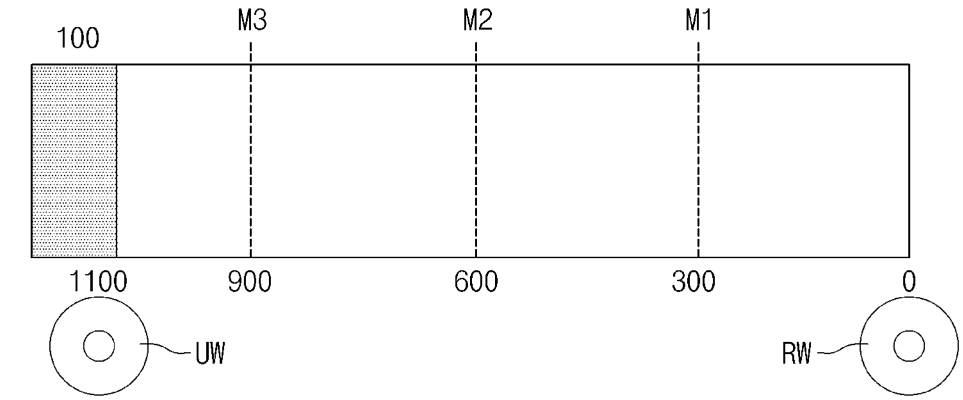
FIG. 13A is a schematic diagram showing an exemplary measurement of electrode loss amount, according to aspects of the present disclosure.

FIG. 13A shows that an electrode loss of 100 meters has occurred at the end portion of the electrode, in contrast to FIG. 12B. In this case, a change in the reference point is not identified in the position measurement device 320R (rotary encoder) installed in the rewinder RW.

However, the fact that the position of the end portion is reduced by 100 meters may be identified by the rotary encoder 320U at the unwinder UW side, and thus, the calculator 330 may derive that an interval between the end portion of the electrode and the third reference point M3 is reduced to 200 meters. Therefore, since the position of the third reference point M3 is changed from the set reference point coordinate values based on the rotary encoder 320U of the unwinder UW, the calculator 330 may calculate that the end portion of the electrode has a 100-meter electrode loss.

Figure 13B:
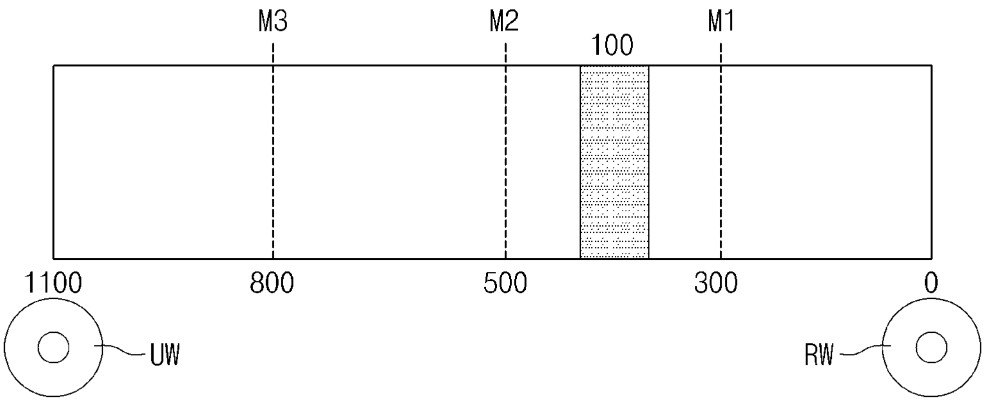
FIG. 13B is a schematic diagram showing an exemplary measurement of electrode loss amount according to aspects of the present disclosure.

FIG. 13B shows that an electrode loss has occurred in a middle portion rather than the start portion or the end portion of the electrode. When a 100-meter electrode loss occurs between the first reference point M1 and the second reference point M2 due to, for example, electrode breakage, the coordinate value of the first reference point M1 is not changed, but the positions of the second and third reference points M2 and M3 and the end portion of the electrode are changed. When the coordinate values of the reference points, which are changed due to such a change in the reference point, are derived by the reference point measurement device 310 and the position measurement device 320 interworking with the reference point measurement device 310, the calculator 330 may calculate that the loss amount of the electrode becomes 100 meters between the first reference point and the second reference point by comparing the changed coordinate values of the reference points and the set reference point coordinate values.

Therefore, according to the method of measuring the loss amount of the electrode according to the present disclosure, when at least one of the interval between the reference points, the interval between the reference point and the start portion of the electrode, and the interval between the reference point and the end portion of the electrode is changed, the loss amount of the electrode may be calculated by comparing the derived coordinate values of the reference points and the set reference point coordinate values.

Figure 14:
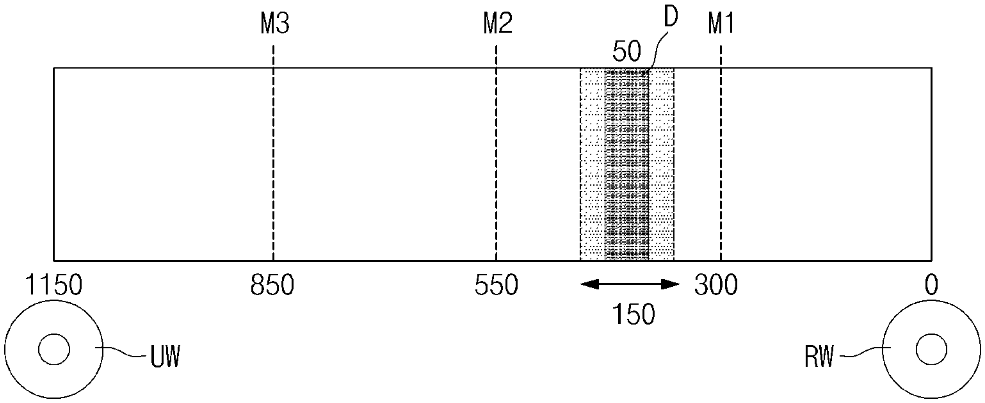
FIG. 14 is a schematic diagram showing an exemplary measurement of electrode loss amount, according to aspects of the present disclosure.

FIG. 14 shows still another example of the electrode loss amount measurement according to the present disclosure.

The present example shows a case in which the connection tape D is present on the electrode due to electrode breakage. In this case, the second and third reference points M2 and M3 respectively changed from 600 meters to 550 meters and from 900 meters to 850 meters are detected by the reference point measurement device 310 and the position measurement device 320. Therefore, it is first assumed that there was a 50-meter electrode loss between the first reference point M1 and the second reference point M2.

In addition, the length of the connection tape D was detected to be 50 meters by the joint detection sensor 340 and the position measurement device 320. This means that the electrode broken due to electrode breakage was cut off and the broken electrodes were connected with the connection tape D having a length of 50 meters. Therefore, an actual breakage amount of the electrode is obtained by adding the 50 meter length of the connection tape D to the above 50 meters. That is, when calculating the coordinate values of the reference points with the set reference point coordinate values, the calculator 330 calculates a value obtained by adding the length of the connection tape D to the loss amount, which is calculated by comparing the coordinate values of the reference points with the set reference point coordinate values, as a total loss amount.

The calculating of the length of the connection tape may be performed before or after the deriving of the coordinate values of the reference points. For example, when the reference point measurement device 310 is installed before the joint detection sensor 340, the length of the connection tape may be calculated after deriving the coordinate values of the reference points, and when the joint detection sensor 340 is installed before the reference point measurement device 310, the calculating of the length of the connection tape may be performed first.

Figure 15:
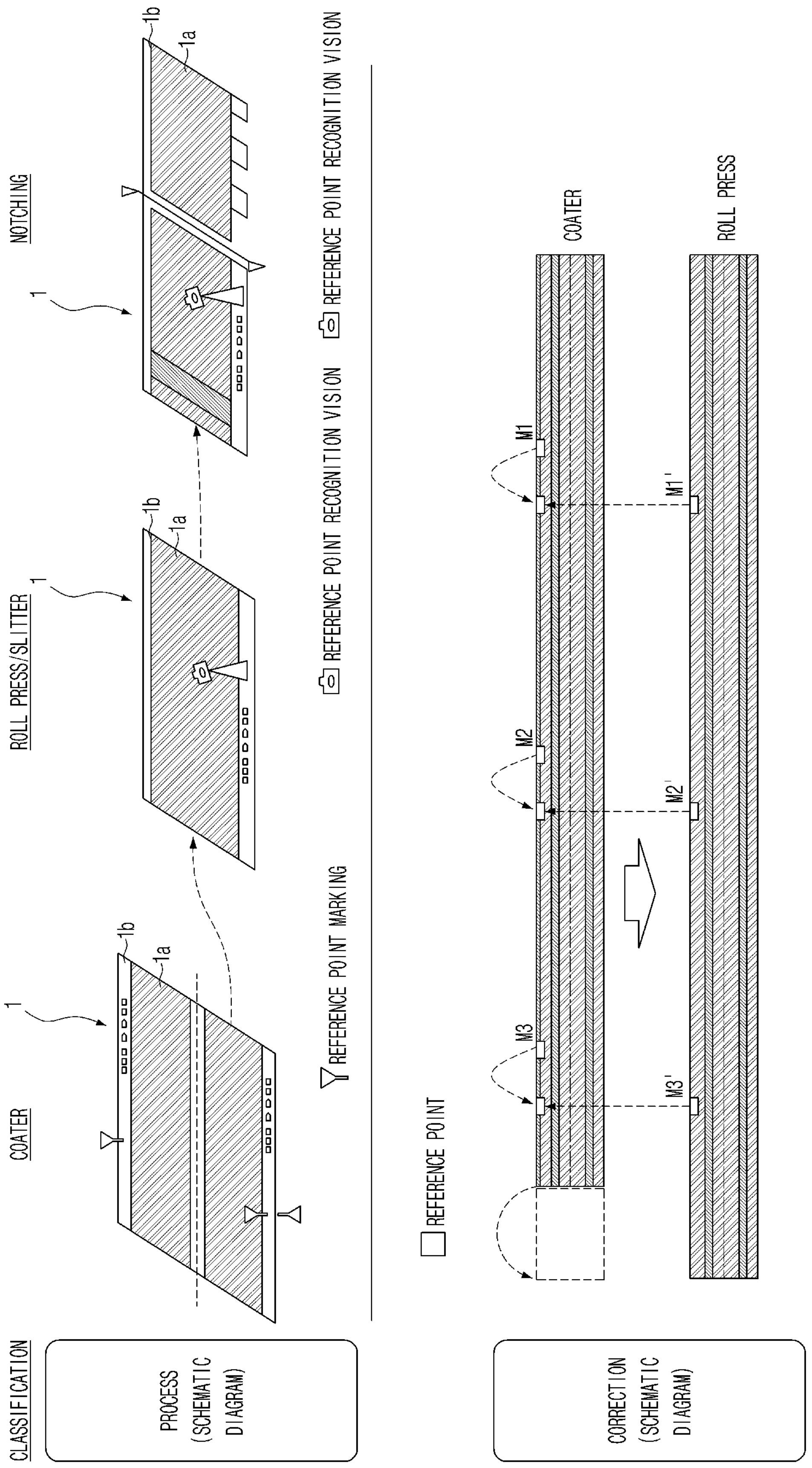
FIG. 15 is a schematic diagram showing an exemplary change in reference points associated with a roll press process, according to aspects of the present disclosure.

FIG. 15 is a schematic view showing a change of a reference point by a roll press process.

As described above, the electrode manufacturing process includes an electrode coating process of coating a current collector with electrode slurry, a roll press process of rolling the coated electrode by a press roll, and a slitting process of cutting the rolled electrode in a longitudinal direction.

For example, when undergoing the roll press process after the reference point is marked in the electrode coating process, the electrode is elongated at a predetermined rate. A lower drawing of FIG. 15 shows the elongation of an electrode 1 When the electrode 1 is elongated, the reference points M1, M2, and M2 are also elongated at the predetermined rate. When positions of the reference points are changed, in the processes after the rolling, a loss amount of the electrode should be calculated based on the changed reference points. That is, in the electrode coating process, the loss amount of the electrode is calculated based on original first to third reference points M1, M2, and M3, but after the rolling, the loss amount of the electrode should be calculated based on changed first to third reference points M1', M2', and M3'. In this case, for the reference points M1', M2', and M3' changed by the rolling, data on set reference point coordinate values related to the changed reference points is also stored in a database, a memory, or the like.

Therefore, when a loss occurs in the electrode after the roll press process, it is possible to determine the loss amount in comparison with the data on the set reference point coordinate values based on the changed reference points. The set reference point coordinate values in which the rolling is reflected is preset according to a pressure of the roll press, a length of the elongated electrode, and the like, and stored in the database or the like.

Figure 16:
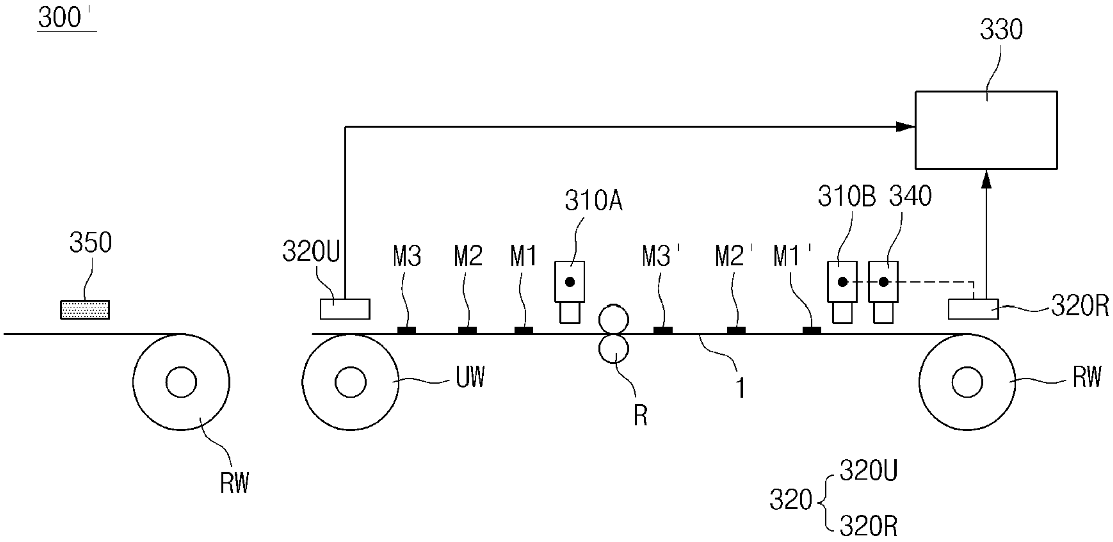
FIG. 16 is a schematic diagram showing an exemplary electrode loss amount measurement device, according to aspects of the present disclosure.

FIG. 16 is a schematic diagram of an apparatus 300' for measuring a loss amount of an electrode according to another embodiment of the present disclosure.

The embodiment describes a roll press operation in which an electrode 1 undergoing an electrode coating process is wound around an unwinder UW of a roll press process and transferred to a rewinder RW. In the embodiment, a press roll R for rolling installed above and below a middle portion of the electrode transferred in a roll-to-roll state is provided. Therefore, the electrode is elongated after being rolled by the press roll R, and thus reference points on the electrode are changed. In this case, since positions of the reference point before and after the press roll R may be different from each other, a first reference point measurement device 310A may be disposed before the press roll, and a second reference point measurement device 310B for detecting the reference point, which is changed by the rolling by the press roll R, may be disposed after the press roll.

Therefore, the calculator 330 may calculate a loss amount of the electrode before the press roll based on the coordinate values of the reference points detected by the first reference point measurement device 310A and calculate a loss amount of the electrode after the rolling by the press roll R based on the coordinate values of the changed reference points detected by the second reference point measurement device 310B. In the embodiment, since a process of comparing the derived coordinate values of the reference points with the set reference point coordinate values is the same as that of the above-described embodiment, except that the coordinate values of the reference points or intervals between the reference points are changed by rolling, a detailed description of the calculation of the loss amount of the electrode will be omitted in the embodiment.

The embodiment of FIG. 16 shows that the reference points are changed in one process, but when the electrode is rolled by the press roll R and thus the positions of the reference points are changed, the method of measuring the loss amount of the electrode that calculates the loss amount of the rolled electrode based on the changed reference points is applied even after the rolling process. For example, even when the electrode roll is separated from the rewinder RW after the rolling process of FIG. 16 and the electrode roll is wound around the unwinder UW of the slitting process, which is a following process and the slitting process is performed as shown in FIG. 15, the loss amount of the electrode in the slitting process is calculated based on the changed reference points. Of course, in the electrode coating process before the process of FIG. 16, the loss amount of the electrode is calculated based on the reference points before the rolling.

As described above, according to the present disclosure, the loss amount of the electrode may be automatically and accurately calculated by the predetermined apparatus for measuring the loss amount of the electrode using the reference points. Therefore, it is possible to increase the reliability of the electrode loss data and effectively use such data information in the following process.

In addition, according to the present disclosure, as will be described below, by displaying the reference points on the roll map on which the electrode is imitated and which also displays the information on the loss amount of the electrode on the roll map, it is possible to visually and easily identify the data on quality or defects at a glance in relation to the reference points.

Figure 17:
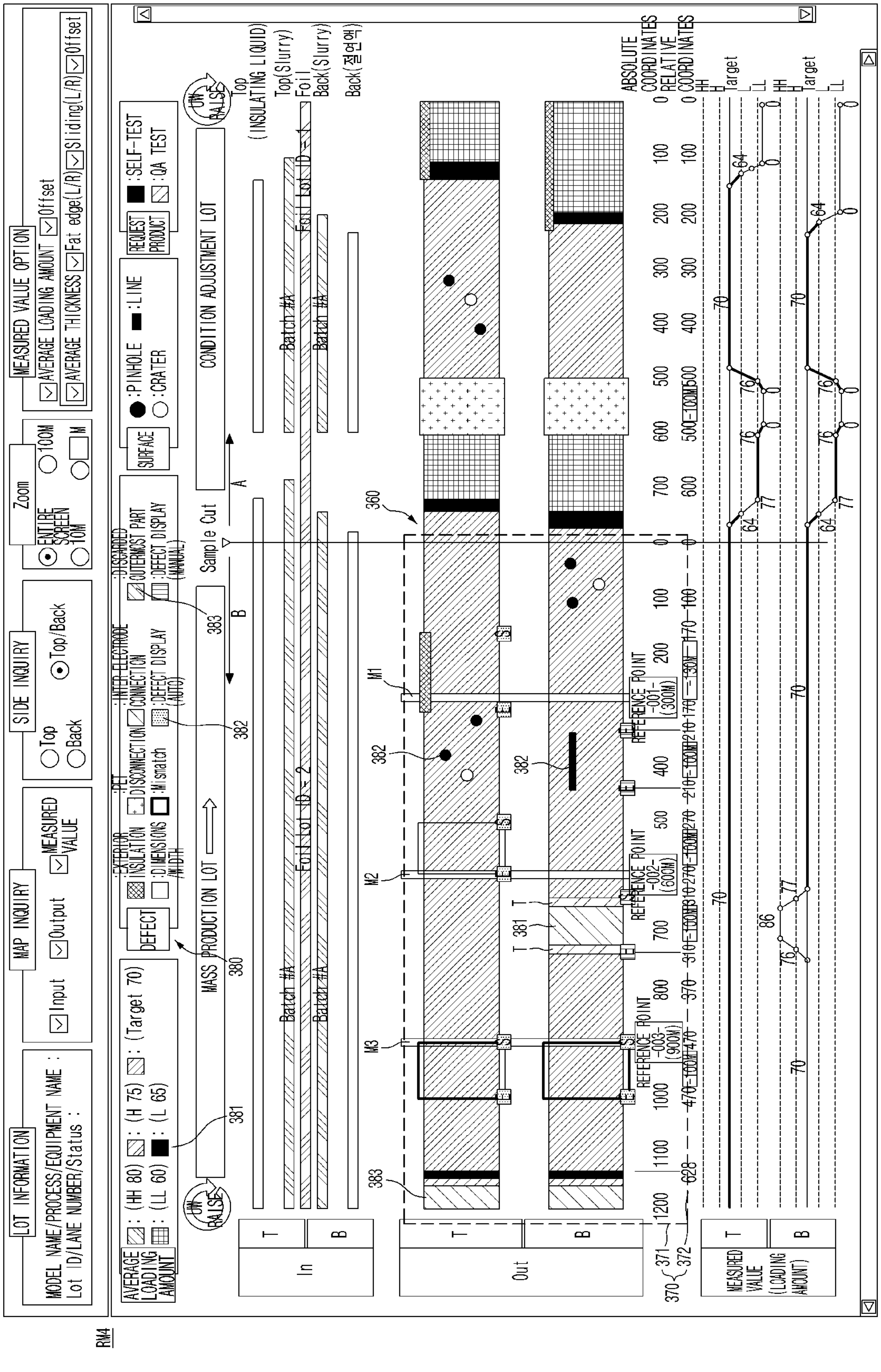
FIG. 17 is a schematic diagram showing an exemplary roll map of an electrode manufacturing process, according to aspects the present disclosure.

FIG. 17 shows one example of the roll map of the electrode manufacturing process according to the present disclosure.

A roll map RM4 according to the present disclosure includes a roll map bar 360 displayed on a screen in synchronization with the movement of an electrode moving in a roll-to-roll state between an unwinder UW and a rewinder RW and displayed in a bar shape imitating the electrode in the roll-to-roll state, and a plurality of reference points M1, M2, and M3 imitating a plurality of reference points marked on the electrode at predetermined intervals and displayed on the roll map bar at predetermined intervals.

The roll map according to the present disclosure includes the plurality of reference points M1, M2, and M3 imitating the plurality of reference points marked at predetermined intervals between the start and end portions of the electrode and displayed on the roll map bar at predetermined intervals. That is, as shown in FIG. 17, the reference points M1, M2, and M3 imitating the reference points, which are actually marked on the electrode, may be displayed on the roll map bar 360 at the predetermined scale ratio.

In this case, the reference points M1, M2, and M3 may also be expressed by the longitudinal dimension of the electrode.

The loss amount measured according to the apparatus and method for measuring the loss amount of the electrode using the reference points may also be displayed on the roll map RM4 according to the present disclosure. That is, position coordinates (position data) in which the loss amount is reflected and position coordinates in which the loss amount is not reflected may be displayed on one roll map. Referring to FIG. 17, position coordinates 370 (longitudinal dimension) in which the loss amount of the electrode is not reflected are displayed as absolute coordinates 371. In addition, the position coordinates 3700 in which the loss amount of the electrode is reflected is displayed as relative coordinates 372. Therefore, referring to the roll map RM4 according to the present disclosure, the electrode loss in the preceding process or the process may be identified at a glance. In addition, since the coordinates in which the loss amount of the electrode is reflected and the coordinates in which the loss amount of the electrode is not reflected are simultaneously displayed, when the following process is performed with reference to the roll map of the preceding process, distortion does not occur in the coordinates, and thus the following process may be accurately performed at a desired position.

In addition, the roll map RM4 further includes a representation part 380 for showing at least one of pieces of data on quality, defects, and an electrode loss measured in the electrode manufacturing process at a predetermined position on the roll map bar 360 corresponding to a position of the electrode on which the at least one of pieces of data has been measured. Referring to FIG. 17, data 381 on quality of the electrode (e.g., data on the loss amount of the electrode), data 382 on defects (e.g., defect data such as a pinhole, a line, or the like), and data 383 on an electrode loss (data on an outermost discard section) are all displayed on the roll map bar 360. Therefore, it is possible to identify information on the quality, defects, and electrode loss of the electrode in the process at a glance. In practice, in addition to the outermost discard section, the electrode in which the defect has occurred and the electrode that did not satisfy a quality standard are deleted and the electrodes left after removal were connected with the connection tape D or the like, and thus, an electrode loss also occurs in these parts. In the roll map RM4, all of these electrode losses are reflected using the relative coordinates 372. Therefore, by comparing the relative coordinates 372 and the absolute coordinates 371 of the roll map RM4, a length of the electrode loss may be identified. In this case, referring to the reference points M1, M2, and M3 displayed on the roll map, the loss amount of the electrode may be more easily calculated.

For reference, on the screen on which the roll map RM4 of FIG. 17 is displayed, items related to the quality, the defect, and the electrode loss are displayed at a glance. Therefore, referring to these items and the roll map, visual data related to the items may be easily identified.

In one embodiment, the roll map RM4 of FIG. 17 is a roll map in the electrode coating process, but the roll map may also be made up for each of the roll press process and the slitting process. In this case, it is possible to easily identify events or the like occurring in each process by comparing the roll maps of each process. In addition, the roll map of the preceding process may be referred and used when generating a roll map of the following process. In this case, in the roll map of the process after the rolling by the press roll, reference points imitating the positions of the reference points changed by the rolling should be displayed on the roll map bar. That is, as shown in FIGS. 15 and 16, when the positions of the reference points are changed by the rolling process, in the roll map of the roll press process and the subsequent slitting process, distortion can be prevented from occurring in the position coordinates of the roll map only when the changed position of the reference point is imitated and displayed on the roll map bar.

Figure 18:
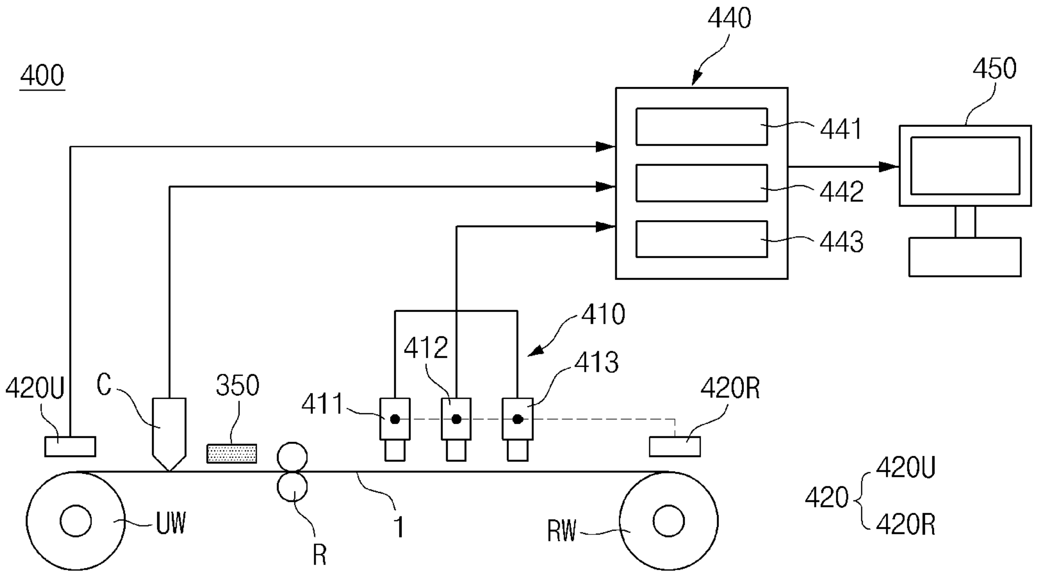
FIG. 18 is a schematic diagram of an exemplary system or apparatus for generating a roll map, according to aspects of the present disclosure.

FIG. 18 is a schematic diagram showing an apparatus for generating a roll map according to the present disclosure.

An apparatus (or system) 400 for generating a roll map according to an embodiment of the present disclosure includes a reference point measurement device 412 for inspecting an electrode 1 moving between an unwinder UW and a rewinder RW and detecting reference points marked on the electrode, a position measurement device 420 for deriving coordinate values of the electrode according to an amount of rotation of the unwinder or the rewinder and deriving coordinate values of the reference points, and a roll map generation unit 440 for generating a roll map bar imitating the moving electrode and displaying a loss amount of the electrode calculated by comparing the derived coordinate values of the reference points and set reference point coordinate values on the roll map bar.

For convenience of description, in FIG. 18, a state in which a current collector is coated with an electrode active material by a coater C in an electrode coating process to manufacture the electrode and a state in which the electrode is rolled by a press roll R are displayed together on one electrode line between the unwinder UW and the rewinder RW.

However, as described above, in practice, the electrode coating is performed on a separate unwinder UW and rewinder RW, and at this time, a separate reference point measurement device and joint detection sensor are installed and the roll map of the electrode coating process is made up in the corresponding process. When the electrode coating process is completed, an electrode roll moves from the rewinder RW of the electrode coating process to the unwinder UW of the roll press process.

However, since FIG. 18 is for comprehensively describing a process of generating the roll map of the electrode manufacturing process, unlike the actual process, the coater C of the electrode coating and the press roll R of the roll press process are shown on one electrode only for convenience of description. That is, when the coater C is removed from FIG. 18, it is a system for generating the roll map of the roll press process, and when the press roll R is removed, it is a system for generating the roll map of the electrode coating process, and thus, it should be understood that the electrode manufacturing process does not actually proceed as in FIG. 18.

When the electrode roll is installed in a roll-to-roll state between the unwinder UW and the rewinder RW before the electrode coating process, it is preferable that an electrode roll information registering operation of inputting data on specifications including a lot number of the electrode roll to a server or a roll map generation unit 440 be performed. For example, when the electrode roll is introduced onto the unwinder UW or installed between the unwinder UW and the rewinder RW, the detailed data including the lot number of the electrode roll may be input to the server or the like. When the information on the electrode roll is registered, detailed data on the electrode (roll), such as the lot number, a process, and equipment may be loaded from the server and displayed on the screen together with the roll map bar. In addition, since specifications on a length and a width of the electrode roll may be identified from the detailed data on the electrode roll, a shape and a size of the roll map bar may be determined at a predetermined scale proportional to the length and width of the electrode when the roll map bar is made up by the data processing system such as, for example, an MES. That is, according to a conversion scale stored in the MES or like, the shape and size of the roll map bar corresponding to the length and width of the electrode roll may be displayed on the screen.

In one embodiment, in order to generate the roll map according to the present disclosure, data on the electrode loss in the electrode manufacturing process and data on the reference points marked on the electrode should be acquired, and data on the position of the electrode from which the data is acquired should be present. In addition, as necessary, data on quality or defects may also be acquired.

Such data may be obtained by inspecting the electrode 1 moving in the electrode manufacturing process.

The electrode 1 is inspected by a predetermined inspection and/or measurement device 410 installed on an electrode transfer line after coating or after rolling. For example, inspection and/or measurement devices such as an electrode slurry loading amount measurement device 411, the reference point measurement device 412, and an exterior inspection device 413 may be installed on the line. As the electrode slurry loading amount measurement device 411, a non-contact type thickness measurement sensor such as an ultrasonic sensor, a displacement sensor, a laser sensor, or a confocal thickness sensor may be employed.

As described above, data on the reference points marked on the electrode may be acquired by the vision measurement device, and the coordinate values of the reference points may be detected by the position measurement device installed in the unwinder UW or the rewinder RW and transmitted to the roll map generation unit 440. The calculator 330 related to measuring the loss amount of the electrode may be the roll map generation unit, specifically, the data processing system or one component of the system. That is, the loss amount of the electrode may also be measured by the apparatus 400 for generating the roll map of FIG. 18. The acquired data on electrode loss and data on reference points may be transmitted from the rotary encoders 420U and 420R, which is a position measurement device, directly to the roll map generation unit 440 or to the roll map generation unit 440 through the inspection and/or measuring instrument 410. Alternatively, a PLC for controlling transferring of the electrode between the unwinder and the rewinder may be connected to the roll map generation unit 440, and the PLC may transmit the data on the loss and the data on the reference points to the roll map generation unit 440.

As described above, when data is acquired by various measurement devices, these data are transmitted to the roll map generation unit 440. In this case, although not shown, a server may be applied for data storage. Alternatively, the roll map generation unit 440 may have a predetermined storage device to store the data.

As shown in FIG. 18, the encoder of the rewinder RW is connected to the loading amount measurement device 411, the reference point measurement device 412 and a dimension measurement device in addition to the exterior inspection device so that data may be exchanged to acquire the position data of the electrode whose position data, dimension, or width of the electrode whose loading amount has been measured in the longitudinal direction has been measured, together with information on the loading amount and the dimension/width. As necessary, an encoder 420U of the unwinder UW may also be connected to various measurement devices 410.

In one embodiment, the data on the electrode loss and the data on the reference points marked on the electrode may be visualized and displayed as the roll map on the display unit 450 by a data visualization device 443 installed in the roll map generation unit 440 together with other data on quality or defects.

As described above, according to the present disclosure, by displaying the reference points on the roll map and displaying the information on the loss amount of the electrode, it is possible to visually and easily identify the data on quality or defects at a glance in relation to the reference points.

In addition, since the roll map displaying the reference points can be referred to perform quality, defect control, and following process in each detailed process of the electrode manufacturing process, it is possible to accurately perform the following process, defect removal, or the like.

When an inspection device catches the fact that foreign substances are mixed into an active material layer or a coating defect part is generated in the electrode manufacturing process, conventionally, the defect part may be removed in the current coating process or the following process by marking the defect part on the electrode or an operator attaching a defect tag.

However, conventionally, since a physical marking process of directly marking information on quality, defects, or the like on the electrode is applied, it is difficult to identify in which section a defect in the electrode manufacturing process has actually occurred even when the defect occurring in the following process is caused by the defect in the electrode manufacturing process after the electrode is assembled and becomes the secondary battery. That is, after the physically marked electrode is assembled or lost, it is very difficult to analyze quality correlation between processes and the current process and the following process in the electrode manufacturing process.

Meanwhile, a technology has been proposed to identify operation history in units of secondary battery by directly marking the presence of the defect on the secondary battery with an ink in a secondary battery assembly line after the electrode manufacturing process is completed.

However, since the related art relates to marking after the secondary battery is assembled, histories of the secondary battery assembly process and the following processes may be identified, but there is a limit in that history information on defects or the like in the electrode manufacturing process, which is the preceding process, may not be identified.

Therefore, there is a need for a technique capable of displaying history information on quality or defects to refer to quality correlation analysis and the progress of the following process in the correlation between detailed processes in the electrode manufacturing process and between the current process and the following process in the electrode manufacturing process.

According to another aspect of the present disclosure, a system 500 for correcting a roll map includes a roll map generation unit 510 for generating a roll map of a first process, which is expressed in a planar shape, on which an electrode, which moves between a first unwinder UW1 and a first rewinder RW1 and on which a first process is performed, is imitated, and displays inspected and/or measured data of the electrode acquired in the first process and coordinate values indicating a position of the electrode, and a roll map corrector 520 for generating a roll map of a second process by converting coordinates of the roll map of the first process in a reverse order so that coordinate values of a start portion and an end portion of the roll map of the first process are reversed when the electrode moves between a second unwinder UW2 and a second rewinder RW2 and performs the second process.

One or more aspects of FIGS. 1-18 may be incorporated into or combined with one or more aspects of the embodiments disclosed in reference to FIGS. 19-24 herein. Accordingly, some elements of FIGS. 19-24 may be similar to elements of FIGS. 1-18, and thus similar or identical reference numerals may be used to depict those elements. Further, detailed disclosure of the similar or identical elements already described may be omitted hereinafter for brevity. However, such omissions are not disclaimers or disavowals, and except to the extent that the similar or identical elements that are already described are inconsistent with the express disclosure herein, in which case the language in the present disclosure hereinafter controls.

Figure 19:
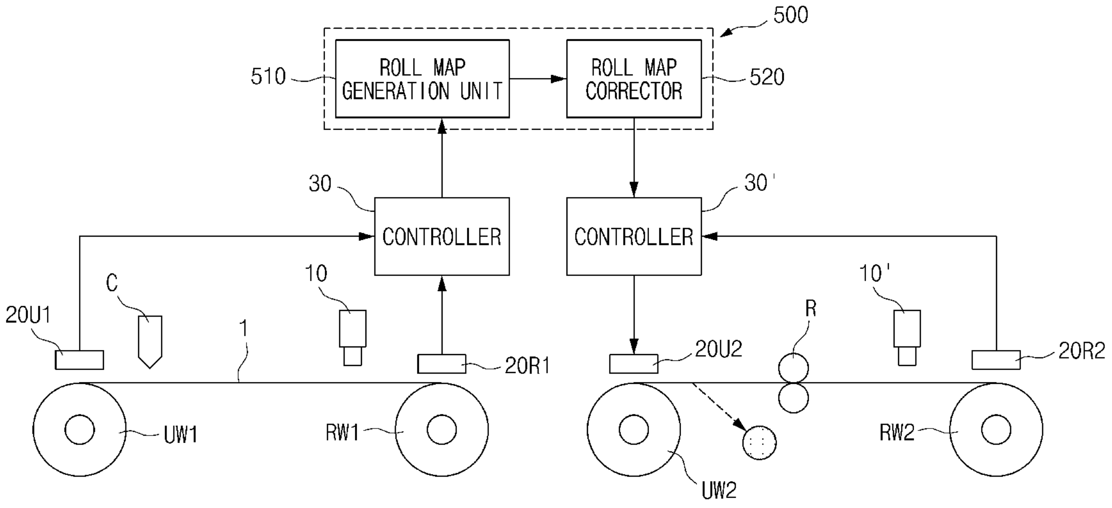
FIG. 19 is a schematic diagram showing a system or apparatus for correcting a roll map, according to aspects of the present disclosure.

FIG. 19 is a schematic diagram showing a system for correcting a roll map according to another embodiment of the present disclosure.

The longitudinal dimension of the electrode 1 may be expressed in coordinates at predetermined intervals on the roll map in a planar shape (roll map bar) on which the electrode 1, which moves between the first unwinder UW1 and the first rewinder RW1 in the roll-to-roll state and on which the first process is performed, is imitated. The position, that is, the longitudinal dimension of the electrode may be acquired from a rotary encoder for extracting the position of the electrode (encoder value) from an amount of rotation of a motor for driving the unwinder UW1 or the rewinder RW1. Therefore, the roll map generation unit 510 of the first process may display the longitudinal dimension of the electrodes 1 as coordinate values at predetermined intervals on the roll map (see FIG. 20). In addition, the roll map generation unit 510 makes up the roll map displaying the inspected and/or measured data of the electrode 1 acquired in the first process at the coordinate value corresponding to the position of the electrode 1 for which the inspected and/or measured data has been acquired. For example, since the position measurement device 20 and the inspection and/or measurement device 10 may be interworked, the inspection and/or measurement device 10 acquires data of the coordinate values of the electrode for which the inspected and/or measured data has been acquired together with the inspected and/or measured data. Alternatively, the inspected and/or measured data may match the data of the coordinate values by the controller. The roll map generation unit 510 makes up the roll map by marking the data on the roll map.

The system 500 for correcting the roll map according to the present disclosure converts and corrects the coordinates of the roll map of the first process to apply the roll map made up in the first process to the second process.

That is, as shown in FIG. 19, the roll map is made up from the electrode moving between the unwinder UW1 and the rewinder RW1 of the first process in a roll-to-roll state. For example, the first process may be an electrode coating process as shown in FIG. 19. The electrode 1 is coated with electrode slurry by a coater C and inspected by the inspection and/or measurement device 10, and the electrode roll is wound around the rewinder RW1 of the first process. In this case, encoder values of the unwinder UW1 and the rewinder RW1 may be specified as coordinate values and transmitted to the roll map generation unit 510 through the controller 30. The inspected data acquired by the inspection and/or measurement device 10 may also be transmitted to the roll map generation unit 510 through the controller 30 together with the data of the coordinate values.

The present disclosure is characterized in that the roll map made up by the roll map generation unit 510 of the first process is corrected to the roll map of the second process that may refer to the second process. The roll map corrector 520 makes up the roll map of the second process by acquiring the roll map of the first process from the roll map generation unit 510 and converting the roll map of the first process in a reverse order so that the coordinates of the start portion and the end portion of the roll map are reversed.

Such conversion and correction are well shown in FIG. 20.

FIG. 20 is a schematic diagram showing one example of a change in coordinates of the roll map by the system for correcting the roll map according to the present disclosure.

Figure 20A:
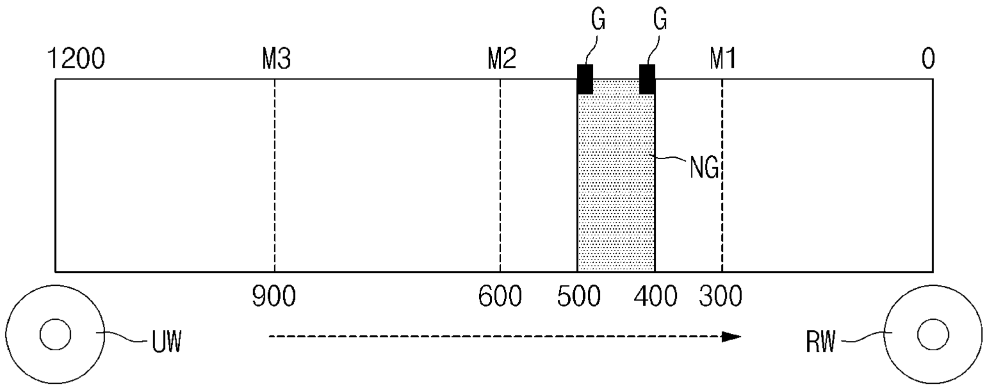
FIG. 20A is a schematic diagram showing an exemplary change in coordinates of a roll map by a system or apparatus for correcting the roll map, according to aspects of the present disclosure.
Figure 20B:
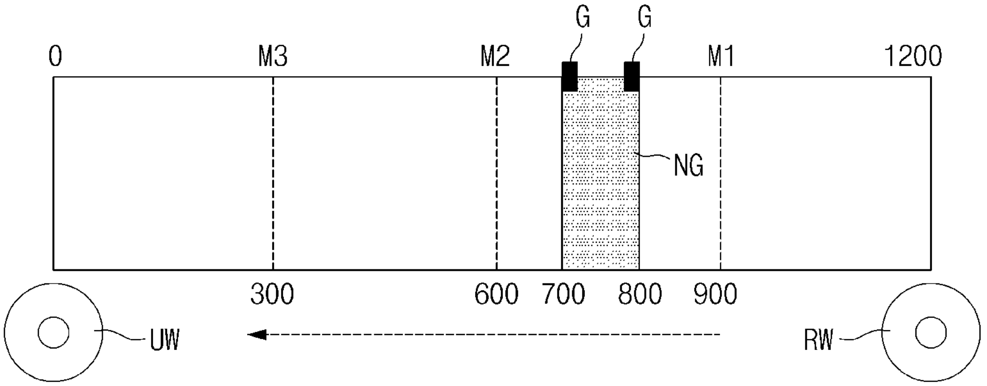
FIG. 20B is a schematic diagram showing an exemplary change in coordinates of a roll map by a system or apparatus for correcting the roll map, according to aspects of the present disclosure.

FIG. 20A is the roll map of the first process (electrode coating process). A length of the electrode 1 is 1200 meters, and reference points M1, M2, and M3 are respectively displayed at points of 300, 600, and 900 meters. In addition, an electrode defect section NG (e.g., exterior defects) is displayed at points of 400 to 500 meters. However, the roll map of the first process having these coordinate values may not be directly used in the second process. This is because a portion in which the coordinate value is displayed as zero on the roll map of the first process is the start portion of the first process, but is first wound around the rewinder RW of the first process and positioned inside the electrode roll, and thus becomes the end portion of the electrode 1 when the electrode 1 is unwound from the unwinder UW of the second process. Conversely, the point at 1200 meters, which is the last portion wound around the rewinder RW of the first process, is the end portion in the first process, but becomes the start portion of the electrode 1 when the electrode 1 is unwound from the unwinder UW of the second process. When the roll map of the first process is applied to the second process as it is, the coordinate values of the reference points and the coordinate values of the defect section NG do not match the dimension of the actual electrode. Therefore, as shown in FIG. 20B, the conversion and correction are performed in a reverse order so that a coordinate value (0) of the start portion of the roll map of the first process becomes a coordinate value (1200) of the end portion thereof, and the coordinate value (1200) of the end portion becomes the coordinate value (0) of the start portion thereof. Therefore, the coordinate values of the reference points of the roll map of the first process are also changed from 900 meters to 300 meters for M3 and from 300 meters to 900 meters for M1. In addition, the coordinate values of the defect sections NG are also converted from 400 to 500 meters to 700 to 800 meters. The roll map of the second process may be made up by the correction in the reverse order as shown in FIG. 20B.

When a part of the end of the electrode is removed after the first process ends and before the second process starts, the coordinates of the roll map need to be corrected by reflecting this. Since the end of the electrode often has non-uniform quality, a part of the end of the electrode is removed after a specific process is completed. This is referred to as "removal after completion" differently from a case in which the electrode is removed in the process.

FIG. 21 is a schematic diagram showing another example of the change in coordinates of the roll map by the system for correcting the roll map according to the present disclosure.

Figure 21A:
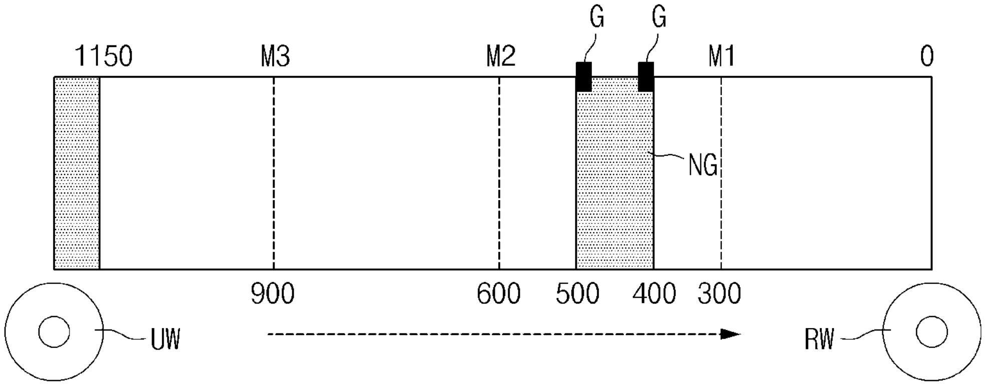
FIG. 21A is a schematic diagram showing an exemplary change in coordinates of a roll map by a system or apparatus for correcting the roll map, according to aspects of the present disclosure.

FIG. 21 is a schematic diagram showing another example of the change in coordinates of the roll map by the system 500 for correcting the roll map according to the present disclosure and shows the removal after completion. That is, the end of the electrode is removed by 50 meters in the first process, which is reflected in the roll map of the first process. The removal of the end of the electrode may be done by, for example, an operator, the operator may input a length and coordinate values of the electrode to a predetermined input device, the input device may transmit the data to the roll map generation unit 510, and the roll map generation unit 510 may generate the roll map of the first process as shown in FIG. 21A.

Figure 21B:
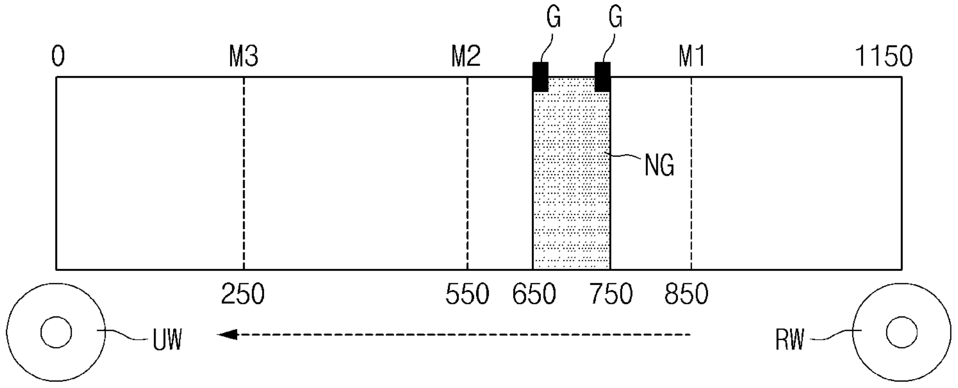
FIG. 21B is a schematic diagram showing an exemplary change in coordinates of a roll map by a system or apparatus for correcting the roll map, according to aspects of the present disclosure.

Alternatively, when the roll map of the first process is in a state shown in FIG. 21A despite the removal of a part of the end of the electrode, the correction of the roll map as shown in FIG. 21B needs to be performed before the second process starts. In this case, the coordinate values of a part of the end of the electrode, which has been removed from the roll map of the first process, are removed (i.e., coordinates of 1150 to 1200 meters are removed), and the coordinates are corrected in a reverse order so that coordinate value of the start portion (0 meters) of the roll map of the first process and the end portion (1150 meters) at which a part of the end of the electrode has been removed are reversed. In addition, when the coordinate values of the reference points and the defect section NG is also corrected in the reverse order in the same manner, the result is as shown in FIG. 21B. That is, in the corrected roll map of the second process, a distance from the start portion to the reference point M3 is 250 meters, M2 has a coordinate value of 550 meters, and M1 has a coordinate value of 850 meters. The defect section NG also becomes 650 to 750 meters.

According to the present disclosure, the roll map of the second process may be made up by the roll map corrector as shown in FIG. 20B or FIG. 21B. Referring to FIG. 19, the roll map corrector 520 may transmit the roll map of the second process to a controller 30' of the second process to be used for performing the second process. For example, as will be described below, when the defect section NG of the first process are removed in the second process, the roll map of the second process may be used. In FIG. 19, the second process is a roll press process in which the electrode is rolled by a press roll R, and the electrode 1 moves between the second unwinder UW2 and the second rewinder RW2 in a roll-to-roll state, and encoders 20U2 and 20R2 of the second unwinder UW2 and the rewinder RW2 are each shown. A predetermined inspection and/or measurement device 10' is also shown above the electrode 1. According to the present disclosure, the roll map of the first process is properly corrected between the first and second processes so that there is no error when the second process is performed.

Figure 22:
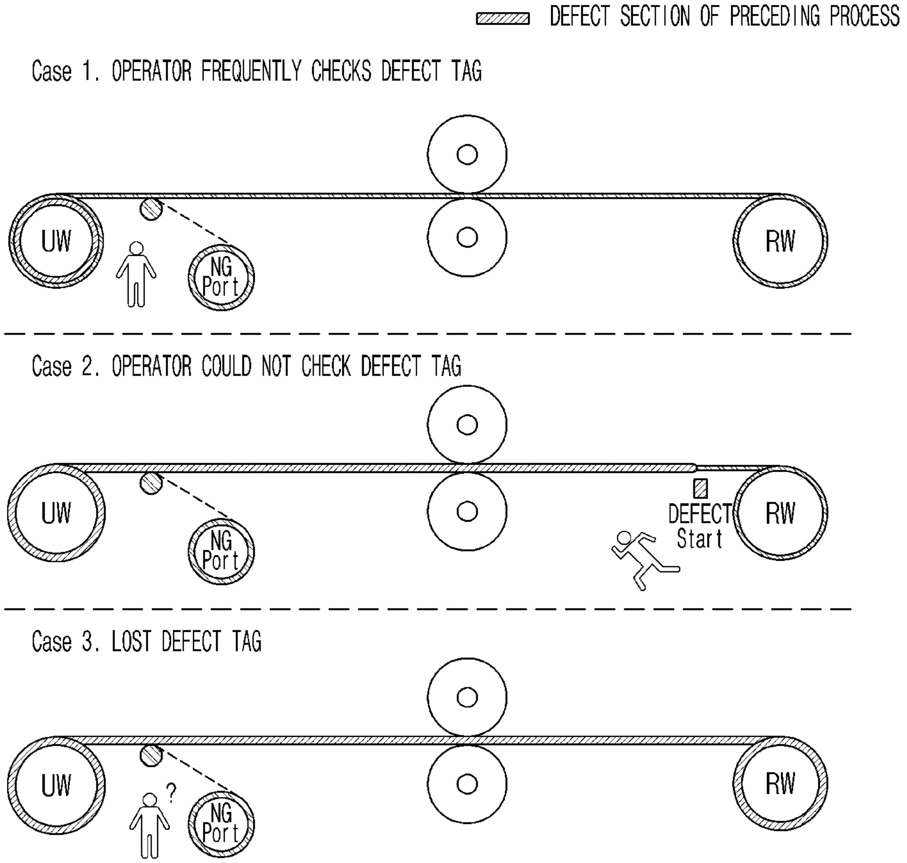
FIG. 22 is a schematic diagram showing an exemplary process of removing a defect occurring during an electrode coating process, according to aspects of the present disclosure.

FIG. 22 is a schematic diagram showing that a defect occurring in an electrode coating process is removed in a roll press process, which is the following process.

In the electrode manufacturing process, there is a case in which the defect occurring in the preceding process is removed in the following process. For example, the electrode mounted between the unwinder and the rewinder of the roll press process proceeds in the roll-to-roll state, is rolled by the press roll, and wound around the rewinder. The operator removes and discards the electrode of the defect section occurring in the coating process of the preceding process at a defect removal port installed before the press roll. At this time, the operator removes the defect section after checking a defect section tag TAG attached on the electrode in the preceding process.

However, the defect removal operation is actually very inconvenient because the operator needs to often check the tag in order to check the defect section and slow down and stop roll press equipment every time (case 1 in FIG. 22).

In addition, when the operator was at a different position when the defect section of the electrode arrived at the defect removal port, there was a problem that the electrode with the defect tag was rolled by the press roll as it was (case 2 in FIG. 22).

In addition, when the defect tag in the preceding process was lost for some reason, the operator could not check and remove the defect section (case 3 in FIG. 22).

Therefore, it is necessary to develop a technology capable of easily checking history and information on the defect section and easily removing the electrode having the defect section in the electrode manufacturing process.

Figure 23:
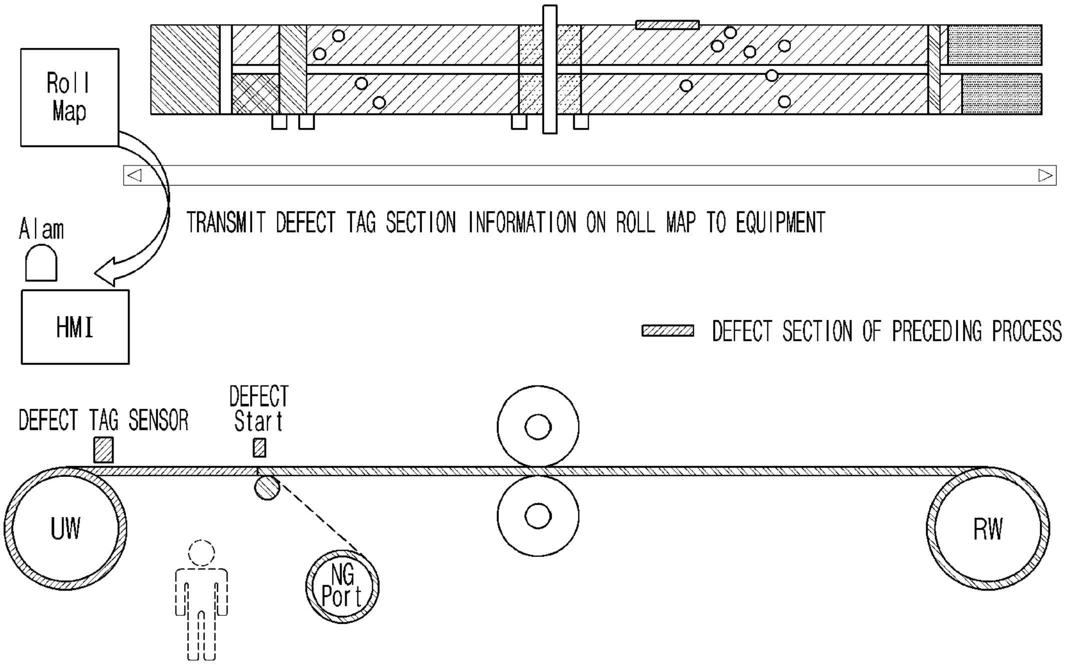
FIG. 23 is a schematic diagram showing an exemplary process of removing a defect of an electrode, according to aspects of the present disclosure.
Figure 24:
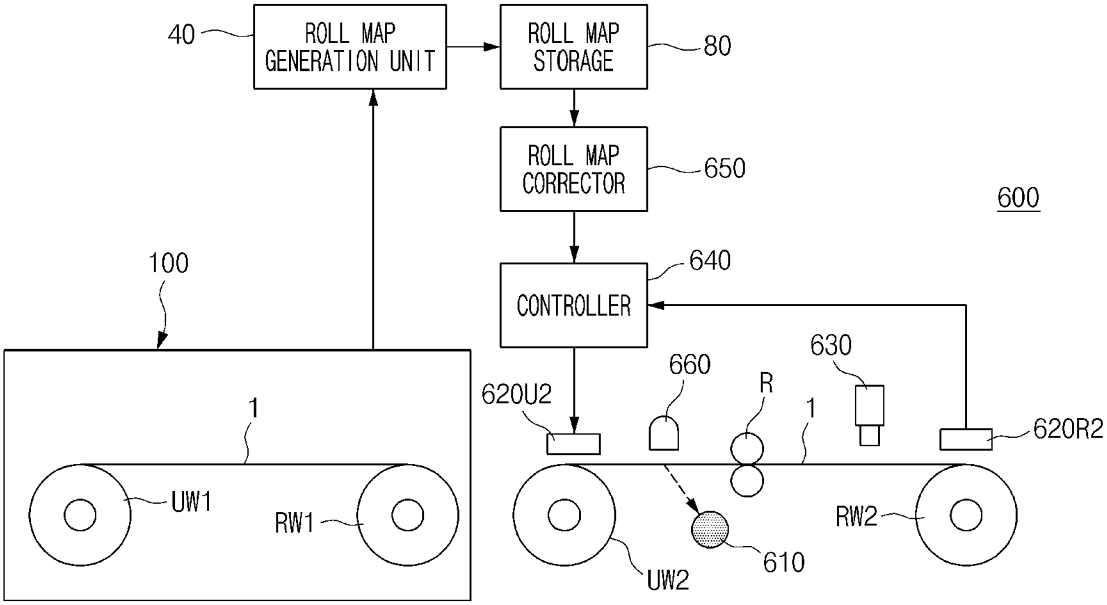
FIG. 24 is a schematic diagram showing a system or apparatus for removing a defect of an electrode, according to aspects of the present disclosure.

FIG. 23 is a schematic diagram showing the concept of an apparatus for removing a defect of an electrode according to still another embodiment of the present disclosure, and FIG. 24 is a schematic diagram showing the apparatus for removing a defect of an electrode according to the present disclosure.

As shown in FIG. 21, for example, assuming a case in which a tag G is attached to the defect section NG occurring in the electrode coating process and the defect section NG of the electrode 1 is removed in the roll press process, as shown in FIG. 22, the operator needs to wait for the tag G of the defect section NG until arriving at the defect removal port. However, such waiting itself is a waste of manpower, and when the tag G is lost, there may occur a case in which the operator may not find the corresponding defect section NG. According to the present disclosure, when the defect section NG arrives at the defect removal port in the second process using information on the roll map (roll map of the electrode coating process) of the preceding process, the electrode 1 stops or slows down before arrival or an alarm is issued so that the operator does not miss the defect section NG. FIG. 23 is a conceptual diagram showing a situation in which such a roll map of the preceding process is used to remove defects.

FIG. 24 is a schematic diagram showing the apparatus for removing a defect of an electrode according to the present disclosure in more detail.

An apparatus (or system) 600 for removing a defect of an electrode according to the embodiment as an apparatus for removing a defect of an electrode, which moves between a first unwinder UW1 and a first rewinder RW1 and on which a first process is performed, includes a defect removal port 610 positioned between a second unwinder UW2 and a second rewinder RW2 and at which a defect section NG of the electrode occurring in the first process is removed, and a second process controller 640 for controlling the electrode movement between the second unwinder UW2 and the second rewinder RW2, wherein the second process controller 640 calculates a time point at which the electrode 1 having the defect section NG arrives at the defect removal port 610 from the second unwinder UW2 based on information on coordinates of the defect section NG displayed on the roll map of the first process and stops the movement of the electrode in the second process so that the defect section NG of the electrode 1 may be removed at the defect removal port when the defect section NG arrives at the defect removal port 610.

As shown in FIG. 24, the defect removal port 610 is positioned at a predetermined position between the unwinder UW2 and the rewinder RW2 of the second process (the second unwinder UW2 and the second rewinder RW2). In the roll press process shown in FIG. 24, the defect removal port 610 is usually provided at a position between the unwinder UW2 and the press roll R. The defect removal port 610 may be a kind of work table on which an operator removes and discards the electrode 1 having the defect section NG, and a waste box to which the removed electrode 1 is discarded, a winder for winding the removed electrode 1, or the like may be installed on the defect removal port 610.

In addition, the apparatus 600 for removing the defect of the electrode includes the second process controller 640 (e.g., a PLC) for controlling the movement of the electrode between the second unwinder UW2 and the second rewinder RW2. The second process controller 640 calculates a time point at which the electrode 1 having the defect section NG arrives at the defect removal port 610 based on the roll map of the first process. Since a longitudinal dimension of the electrode 1 and a position of the defect section NG are expressed as coordinate values on the roll map of the first process, the time point at which the electrode 1 having the defect section NG arrives at the defect removal port 610 from the second unwinder UW2 is calculated based on the information on the coordinates of the defect section NG displayed on the roll map of the first process. That is, the controller 640 may calculate the time point at which the defect section NG arrives at the defect removal port 610 because it knows a distance between a start portion of the electrode and the defect section NG and knows rotating speeds of the unwinder UW2 and the rewinder RW2 (i.e., a transfer speed of the electrode). Here, the meaning of being based on the information on the coordinates of the defect section NG displayed on the roll map of the first process does not necessarily mean that the arrival time point is calculated from the coordinates itself, and as will be described below, means that coordinates undergoing a predetermined correction based on the information on the coordinates of the defect section NG displayed on the roll map of the first process may be applied. That is, as described above with reference to FIGS. 20 and 21, the coordinate values of the roll maps of the preceding process and the following process transferred in the roll-to-roll state have a reverse order relationship. Therefore, even in the present disclosure, in order to calculate the arrival time point of the defect section NG, the coordinate value of the roll map of the first process need to be converted and corrected in a reverse order so that coordinate values of the start portion and the end portion of the roll map of the first process are reversed. To this end, the apparatus 600 for removing the defect of the electrode according to the present disclosure may further include a roll map corrector 650 for performing the correction, and the second process controller 640 may stop the movement of the electrode based on the coordinates of the defect section NG displayed on the corrected roll map. As shown in FIG. 20, the roll map corrector 650 may specify the coordinate value of the defect section NG by correcting the coordinate value of the roll map of the first process in the reverse order based on the information on the coordinates of the defect section NG displayed on the roll map of the first process. Therefore, the second process controller 640 may calculate the time point at which the defect section NG displayed in the first process arrives at the defect removal port based on the coordinate value of the defect section NG and stop the movement of the electrode in the second process when the defect section NG arrives at the defect removal port 610. That is, the operations of the second unwinder UW2 and the second rewinder RW2 may be stopped.

In one embodiment, when a part of the end of the electrode is removed after the first process ends and before the second process starts, as shown in FIG. 21, the roll map corrector 650 may remove a coordinate value corresponding to the removed part of the end of the electrode from the roll map of the first process and convert and correct the coordinate value of the roll map of the first process in the reverse order so that the start portion of the roll map of the first process and the end portion with the part of the end of the electrode removed are reversed, and the second process controller 640 may stop the movement of the electrode based on the coordinate value of the defect section NG displayed on the corrected roll map.

In the first process, the corresponding process is performed while the electrode moves in the roll-to-roll state between the first unwinder UW1 and the second rewinder RW2 before the second process, and the data of the coordinate values is generated as a roll map by the roll map generation unit 40. As described above, the roll map generation unit 40 may be a data processing system, such as an MES or an SPC, or one component of the system. The roll map made up by the roll map generation unit 40 may be stored in a roll map storage 80, such as a server or a database. When stored, identification information, such as a lot number of the corresponding electrode, may be stored together. Therefore, for example, when the identification information on the electrode 1 is scanned and acquired in the unwinder UW2 of the second process, the second process controller 640 may download the roll map of the electrode 1 of the identification information from the roll map storage 80. The roll map of the electrode of the identification information is corrected by the roll map corrector 650 and transmitted to the controller 640, and the controller 640 stops the electrode 1 having the defect section NG at the defect removal port 610. In the second process, the second unwinder UW2 and the second rewinder RW2 may be installed to perform the roll press process, and a predetermined inspection and/or measurement device 630 may also be installed above the electrode. The inspection and/or measurement device 630 may be, for example, an inspection device for measuring a thickness of an electrode or a vision inspection device for recognizing the generation of wrinkles.

In addition, the second process controller 640 may control the electrode of the second process to slowly move for a predetermined time section between a predetermined time point before the defect section NG arrives at the defect removal port 610 and an arrival time point. The second process controller 640 controls the electrode to slowly move to give the operator a margin to remove a defect at the defect removal port 610. Alternatively, when the electrode 1 slowly moves in the second process, the operator may recognize that the defect section NG will soon arrive at the defect removal port 610 and move to the defect removal port. The predetermined time point or the predetermined time section may be appropriately determined in consideration of the distance between the second unwinder UW2 and the defect removal port or the like.

In addition, the apparatus 600 for removing the defect of the electrode according to the present disclosure may further include an alarm unit 660 for issuing an alarm in at least one of a case in which the defect section NG arrives at the defect removal port 610, a case in which the electrode 1 stops in the second process, and a case in which a predetermined time has elapsed since the electrode stopped in the second process. As necessary, an alarm may be issued at a time point at which the electrode 1 starts to slowly move. When the alarm is issued when the defect section NG arrives at the defect removal port or the electrode stops, the operator may remove the defect section NG.

In this case, even when the defect tag G is lost, the operator may remove the defect section NG with reference to the roll map of the first process (accurately, the roll map of the first process whose coordinates have been corrected). Since a length of the defect section NG is expressed as a coordinate value on the roll map, the defect section NG may be removed with reference to the coordinate value. Alternatively, the alarm may be issued when the defect removal operation is not performed even after a predetermined time has elapsed after the movement of the electrode was stopped. In this case, the operator may hear the alarm and move to the defect removal port 610 to remove the defect section. An alarm operation of the alarm unit 660 may be controlled by the second process controller 640.

As described above, according to the present disclosure, by correcting the coordinates of the roll map of the preceding process, it is possible to use the roll map of the preceding process without any error in the following process. In addition, it is possible to reliably and easily remove the defect occurring in the preceding process in the following process by the roll map information and the roll map coordinates correction.

When a tab is formed in a notching process, the form of a secondary battery is made through an assembly process of interposing a separator between a positive electrode and a negative electrode to form an electrode assembly, stacking or folding the electrode assembly to package the same in a pouch, a can, or the like and injecting an electrolyte. Thereafter, the assembled secondary battery undergoes an activation process of imparting battery characteristics by charging and discharging the secondary battery and becomes a final secondary battery as a finished product.

One or more aspects of FIGS. 1-24 may be incorporated into or combined with one or more aspects of the embodiments disclosed in reference to FIGS. 25-43 herein. Accordingly, some elements of FIGS. 25-43 may be similar to elements of FIGS. 1-24, and thus similar or identical reference numerals may be used to depict those elements. Further, detailed disclosure of the similar or identical elements already described may be omitted hereinafter for brevity.

However, such omissions are not disclaimers or disavowals, and except to the extent that the similar or identical elements that are already described are inconsistent with the express disclosure herein, in which case the language in the present disclosure hereinafter controls.

Figure 25:
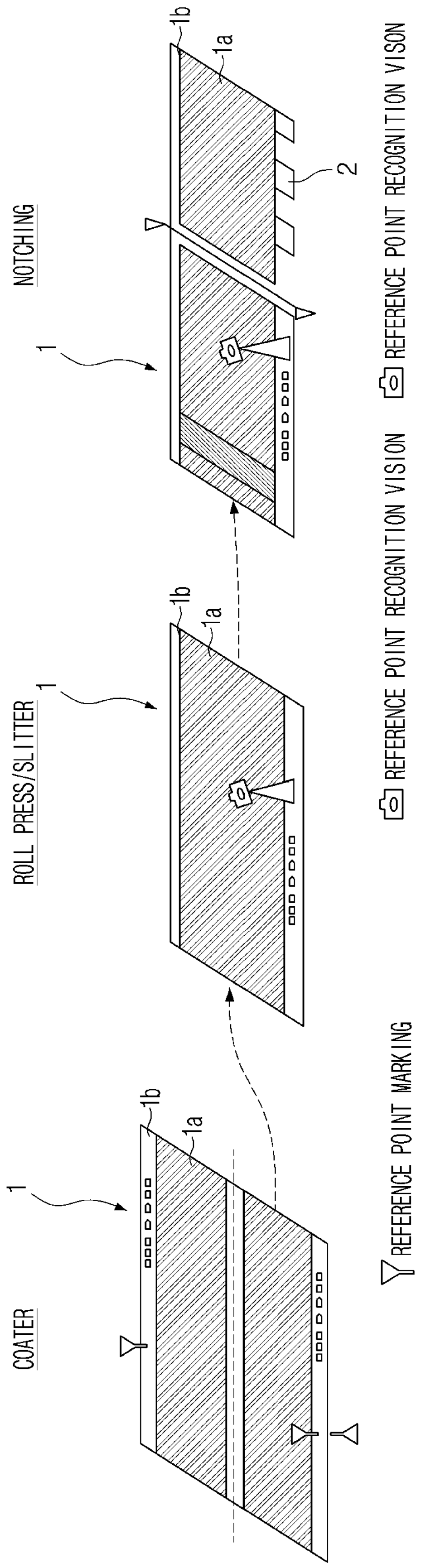
FIG. 25 is a schematic diagram showing an exemplary electrode associated with an electrode manufacturing process, according to aspects of the present disclosure.

FIG. 25 shows a state of the electrode performing such an electrode manufacturing process.

The coating electrode 1 is manufactured by having the current collector coated with the active material in the coater C to form a coating part 1*a*. Reference points may be marked on a non-coating part 1*b* not coated with the active material. Both top and back surfaces of the electrode 1 are typically coated with the active material. The coated electrode 1 is pressed by a press roll in a roll press process and is cut in the longitudinal direction of the electrode 1 by a slitter in a slitting process.

Thereafter, in a notching process, an electrode tab 2 is formed by punching the electrode 1 by a press or the like. In the notching process, the electrode tab 2 is formed for each unit electrode to be cut for each unit electrode manufactured as a battery cell or cut in the following process. A width of the unit electrode corresponds to a pitch P processed by the press.

Such an electrode manufacturing process is performed through a series of roll-to-roll processes in which processes in which the electrode unwound from the unwinder moves and is wound around the rewinder are sequentially and repeatedly performed. That is, the electrode is coated while moving from the unwinder to the rewinder of the coating process, and an electrode roll of the coating process is completed by winding the electrode around the rewinder. Next, the electrode roll is mounted on the unwinder of the roll press process and moved to the rewinder of the roll press process. The electrode roll is wound around the rewinder of the roll press process and completed as the electrode roll of the roll press process. Thereafter, the electrode roll moves again in the roll-to-roll state in the unwinder of the following process (e.g., a secondary roll press process, a slitting process, or a notching process), is wound around the rewinder of the following process, and completed as an electrode roll of the following process. As described above, the electrode manufacturing process is configured as the series of roll-to-roll processes in which the processes in which the electrode unwound from the unwinder moves and is wound around the rewinder (roll-to-roll process) are sequentially and repeatedly performed.

The roll map is expressed in the form of a bar imitating the progress of the electrode, and a longitudinal position and a transverse position of the electrode are expressed in coordinates on the roll map. Since the information on defects, quality, electrode breakage, and the like occurring in the electrode manufacturing process is displayed on the roll map together with the coordinate values, the data on quality or defects in the electrode manufacturing process may be visually and easily identified at a glance.

Referring to FIG. 5, the exterior defect information such as the pinhole defect f1 and the line defect f2 is visually displayed at the coordinates at which the defect has been generated. In addition, the mismatched part f3 of the coating part and the non-coating part is also displayed. Other loading amount defect and the like are also displayed, and the discarded outermost portion of the electrode is also displayed.

In addition, the reference points M1, M2, and M3 marked on the electrode 1 may be displayed at predetermined intervals. When the electrode 1 is broken and the electrodes 1 are connected by the joint connection member, the length of the electrode is reduced by the length of the broken electrode. As described above, a point at which the exterior defect has occurred is also removed, and the operator may connect the electrodes. The coordinate values on the roll map may be corrected by imitating such a situation in the roll map. Referring to FIG. 5, coordinates in which the electrode removal part is not reflected and coordinates in which the electrode removal part is reflected are displayed together on one roll map. The former is referred to as "absolute coordinates A," and the latter is referred to as "relative coordinates B." As shown in FIG. 5, the relative coordinates B and the absolute coordinates A may be displayed together on one roll, but may also be displayed separately. A roll map displayed with the relative coordinates B indicates a state of an actual electrode.

Such a roll map may be made up for each detailed process described above. However, in the roll-to-roll process, since the electrode wound in the preceding process is unwound in the following process, the start portion and the end portion of the electrode are reversed by undergoing a roll-to-roll process such as the end portion of the roll map displaying the electrode roll of the preceding process becoming the start portion of the roll map displaying the electrode roll of the following process. In addition, in the case of a double-sided electrode with both surfaces of the electrode coated with an electrode active material, the surfaces of the electrode may be reversed, such as a top surface of the electrode of the preceding process becoming a back surface of the electrode in the following process. That is, the start/end reversal and the surface reversal of the electrode may occur according to the winding direction of the electrode in the preceding process and the unwinding direction of the electrode in the following process. Since the roll maps of each process are made up based on the reversed electrodes, the coordinates of the roll maps of each process are also reversed. Furthermore, the length of the electrode is changed by cutting the electrode in the longitudinal direction several times due to a removal of the defect section or the broken section and connecting the electrodes through a series of roll-to-roll processes. Since the roll maps of each process reflect such reversal and a change in length, each of the roll maps has different coordinate values.

In the final process (e.g., the notching process) of the electrode manufacturing process, only the remaining electrodes (survival electrodes) excluding the electrode parts removed in the preceding process are left. Since a battery is manufactured with the survival electrodes, when a problem occurs in a finished or semi-finished battery, it is possible to track the cause of the problem with reference to the roll map of the final electrode. In addition, it is possible to reversely track the electrode part, which has caused the problem, with reference to the above-described roll maps of each process. As described above, the roll map is a useful tool for tracking quality as well as identifying quality and defects.

However, as described above, since the start and end portions and/or the surfaces of the electrode are reversed and the length of the electrode is changed through the series of roll-to-roll processes, the coordinates of the roll maps of each process do not match each other. Therefore, even when the roll maps are made up for each process, it is difficult to track the cause of the occurrence of the problem through a comparison with the roll map of the final survival electrode.

In order to solve the above problems, there is provided the system for generating the roll map capable of easily identifying the data on quality or defects of the survival electrodes left in the final process by matching the coordinate values of the roll maps of each process with the coordinate value of the final process in the series of roll-to-roll processes.

Figure 26:
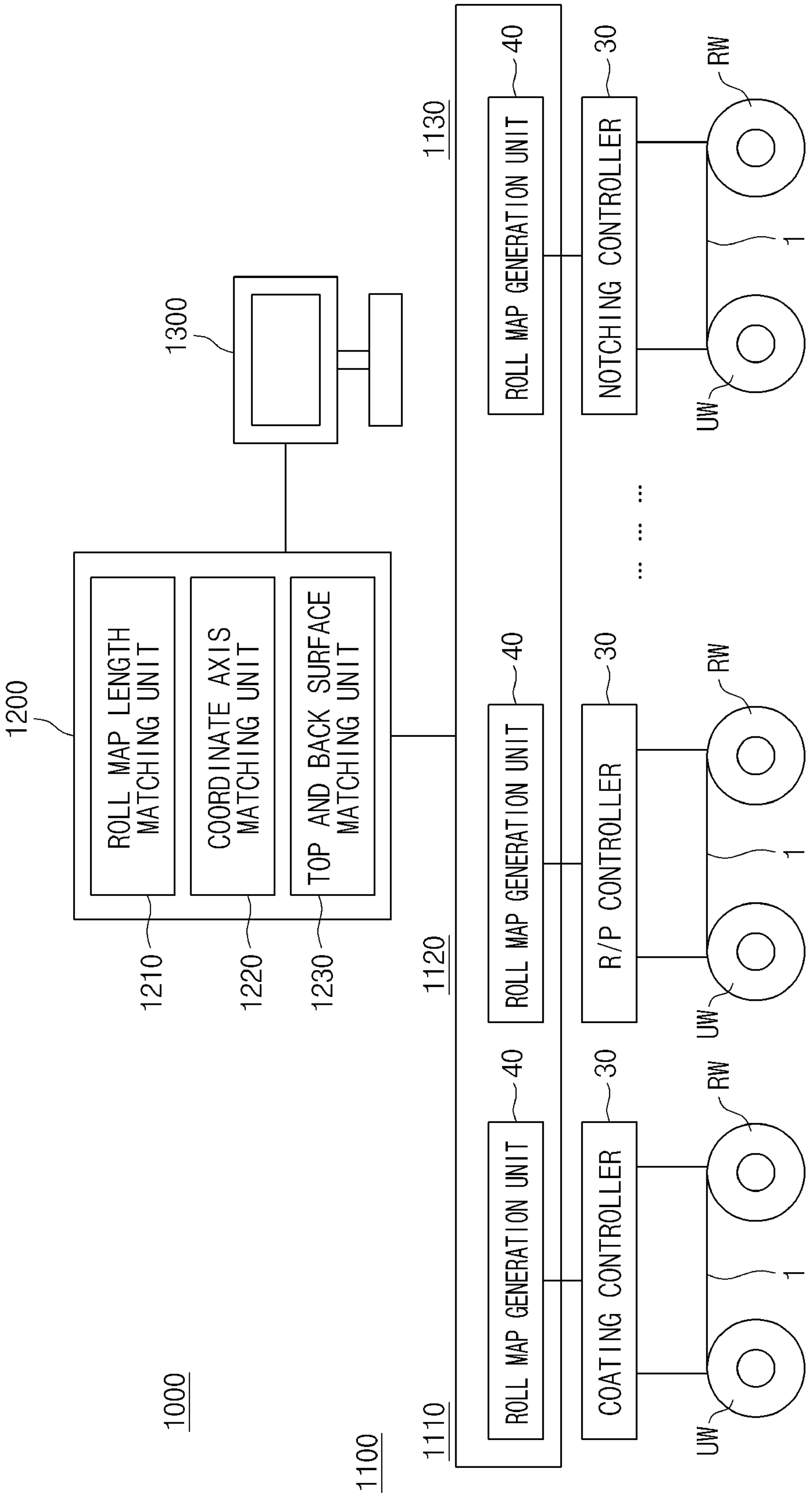
FIG. 26 is a schematic diagram of a system or apparatus for generating a roll map, according to aspects of the present disclosure.
Figure 27:
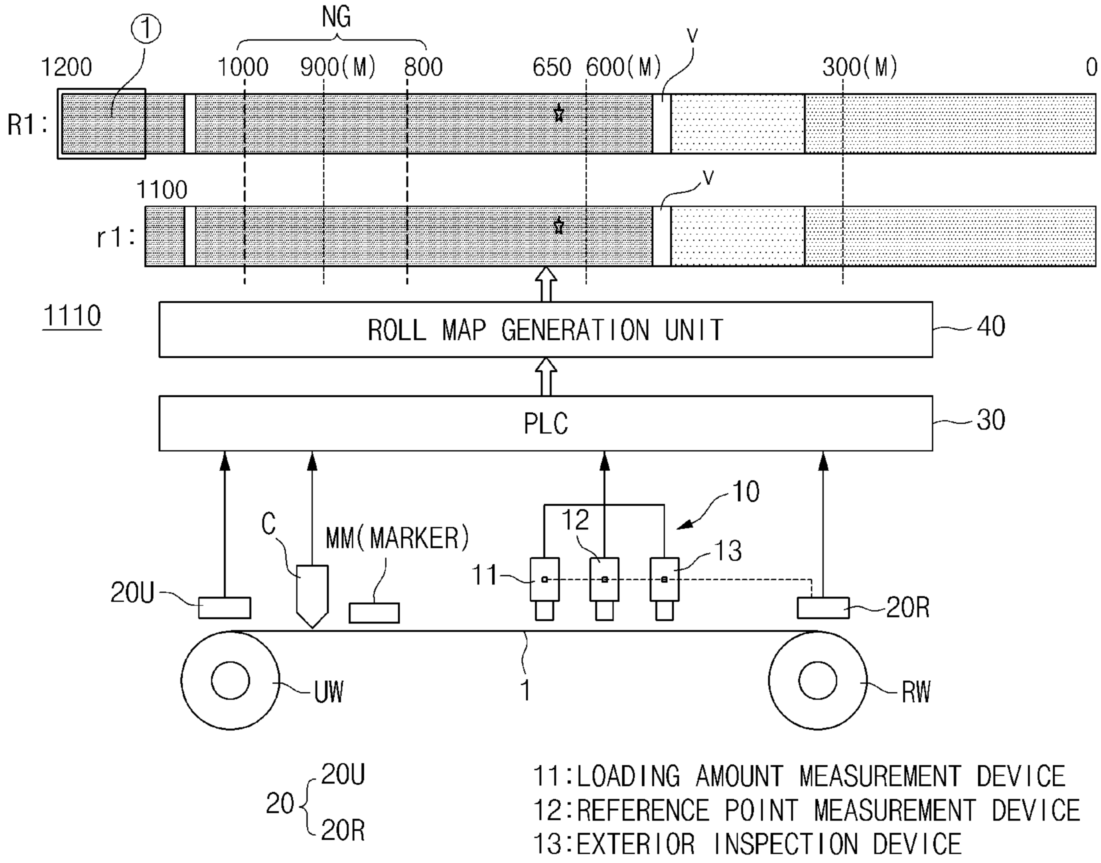
FIG. 27 is a schematic diagram showing an exemplary system or apparatus for generating the roll map and an exemplary roll map associated with an electrode coating process and an electrode coating process, according to aspects of the present disclosure.
Figure 28:
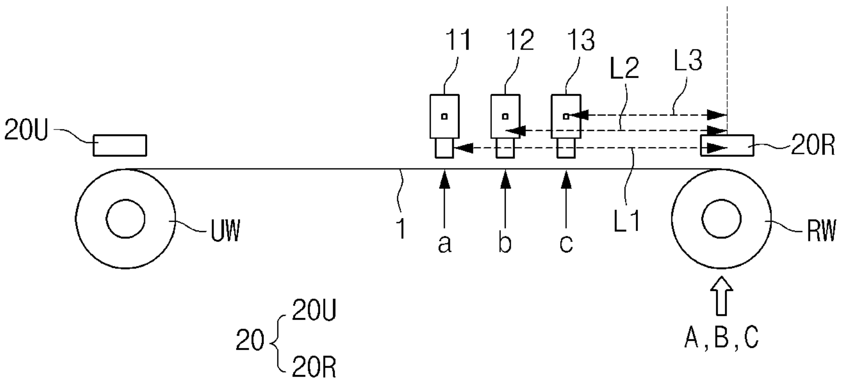
FIG. 28 is a schematic diagram showing an exemplary process generating inspected data and coordinate values by an inspection device, according to aspects of the present disclosure.
Figure 29:
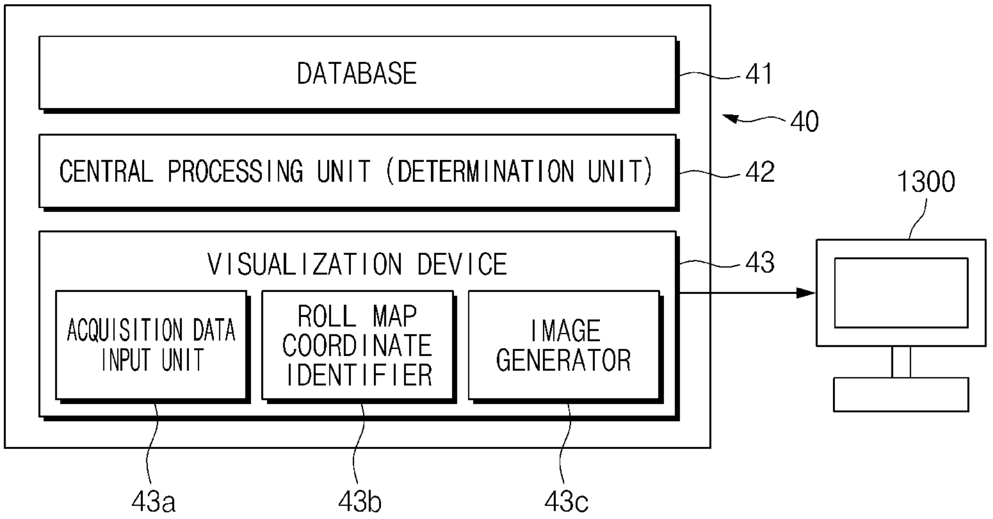
FIG. 29 is a schematic diagram showing an exemplary roll map generation unit, according to aspects of the present disclosure.

FIG. 26 is a schematic diagram of one embodiment of the system for generating the roll map according to the present disclosure, FIG. 27 is a schematic diagram showing one example of the apparatus for generating the roll map and the roll map in the electrode coating process, FIG. 28 is a schematic diagram showing a principle in which inspected data and coordinate values of the corresponding inspected data are acquired by the inspection device, and FIG. 29 is a schematic diagram showing one example of the roll map generation unit.

As described above, a system 1000 for generating a roll map according to the present disclosure is a system for generating a roll map in the series of roll-to-roll processes in which the electrode 1 unwound from the unwinder UW moves and is wound around the rewinder RW are sequentially and repeatedly performed. FIG. 26 shows an example of the coating process, the roll press (R/P) process, and the notching process as the series of roll-to-roll processes. The roll press process may be performed once or several times, as necessary. In addition, a slitting process of cutting the electrode 1 in the longitudinal direction may be intervened after the roll press process. Therefore, the series of roll-to-roll processes according to the present disclosure are not limited to the example of FIG. 26 and may include more or fewer roll-to-roll processes or other roll-to-roll processes depending on the type or manufacturing equipment of the electrode 1.

The system 1000 for generating the roll map according to the present disclosure includes a roll map generation unit 1100 for making roll maps capable of being defined as a coordinate planar surface having two coordinate axes including longitudinal and transverse axes of the electrode 1 and displaying positions of the electrodes 1 in each process as coordinate values of the coordinate planar surface for each process, and a roll map matching unit 1200 for matching the coordinate values of the roll maps of each process with a coordinate value of the roll map of a final process so that an actual electrode represented by the roll map of the final process in a series of roll-to-roll processes matches each actual electrode represented by the roll maps of each process before the final process.

The roll map is visually displayed in a bar shape imitating the electrode 1 moving between the unwinder UW and the rewinder RW in the roll-to-roll state. Therefore, a length and a width of the roll map correspond to a length and a width of the actual electrode. That is, the roll map is defined as the coordinate planar surface having the two coordinate axes including the longitudinal and transverse axes of the electrode 1. In addition, the position of the electrode 1 may be expressed as a coordinate value of the coordinate planar surface. Therefore, for example, when a defect occurs at a specific position of the electrode 1, a position of the defect may be expressed as a specific coordinate value on the roll map as shown in FIG. 5. In FIG. 5, longitudinal coordinates are displayed on the lower portion of the roll map. In FIG. 5, for simplicity of illustration, transverse coordinates are not expressed as numerical values on the roll map. However, exterior defects such as the pinhole defect f1 and the line defect f2 are visually displayed at the longitudinal and transverse coordinates in which the defect has occurred. As described above, the roll map may clearly display defects and the like at predetermined positions (longitudinal and axial coordinates) on the coordinate planar surface represented by the two coordinate axes.

Such a roll map may be made up for each detailed process in the roll-to-roll processes. FIG. 26 shows an apparatus 1110 for generating a roll map of a coating process, an apparatus 1120 for generating a roll map of a roll press process, and an apparatus (or system) 1130 for generating a roll map of a notching process. The apparatuses (or systems) 1110, 1120, and 1130 for generating the roll maps of each process constitute the apparatus 1100 for generating the roll map according to the present disclosure.

FIG. 27 shows one example of the apparatus 1110 for generating the roll map of the electrode coating process.

The apparatus 1110 for generating the roll map includes the position measurement device 20, the inspection and/or measurement device 10, and the roll map generation unit 40.

In the roll-to-roll processes, the electrode 1 is mounted between the unwinder UW and the rewinder RW. In the roll-to-roll processes, the electrode 1 is unwound from the unwinder UW, and the active material is coated by the coater C. After coating, reference points are marked by a maker MM on the non-coating part 1*b* of the electrode 1 at predetermined intervals. When the length of the electrode is changed by breakage, defect removal, or the like, the changed length of the electrode may be identified by a change in interval between the reference points M. Since the electrode 1 is moved by the rotations of the unwinder UW and the rewinder RW, the longitudinal position of the electrode 1 may be specified according to the amount of rotation of the unwinder UW or the rewinder RW. The position measurement device 20 may acquire the longitudinal position of the electrode 1 as a coordinate value of the longitudinal axis of the electrode. For example, in the electrode 1 with a length of 1200 meters, when a coordinate value acquired by the position measurement device 20 is zero, this indicates the start portion of the electrode 1, and when a coordinate value of 1200 meters is acquired, this means the end portion of the electrode 1. As the position measurement device 20, the rotary encoders 20U and 20R installed in the unwinder UW and the rewinder RW may be used. Generally, the rotary encoders 20U and 20R are installed in a motor driving unit for driving the unwinder UW and the rewinder RW to detect an electrode movement distance according to the number of rotations (amount of the rotation) of a motor. Therefore, when the electrode 1 moves between the unwinder UW and the rewinder RW, the movement distance may be detected by the rotary encoders 20U and 20R. Although FIG. 27 shows that the encoder 20U of the unwinder and the encoder 20R of the rewinder are respectively disposed outside the unwinder UW and the rewinder RW for convenience of description, the encoders are respectively embedded in the unwinder UW and the rewinder RW. However, the roll map may be made up after the electrode 1 is completely wound around the rewinder RW and an electrode winding roll is completed, that is, after all coordinate data along the length of the electrode and all inspected and/or measured data are input. Therefore, it is preferable to use the rotary encoder 20R installed in the rewinder RW as the position measurement device 20 for generating the roll map. In the specification, generating the roll map and matching the roll map to be described below will be described according to the coordinate values acquired based on the rewinder.

The apparatus 1110 for generating the roll map also includes a predetermined inspection and/or measurement device 10 for measuring the quality or defects of the electrode 1 adjacent to an electrode movement line.

The inspection and/or measurement device 10 may acquire the inspected and/or measured data by inspecting the electrode 1 and may be connected to the position measurement device 20 by wire or wirelessly to acquire a coordinate value of the longitudinal axis of an electrode part for which inspected and/or measured data has been acquired together with the inspected and/or measured data. The inspected and/or measured data may include data on quality or defects of the electrode 1 and data on the positions of the above-described reference points.

The inspected and/or measured data may be one or more of the following items:

i) data on at least one of a dimension of the electrode;
ii) data on mismatch between an electrode coating part and an electrode non-coating part;
iii) data on a slurry loading amount on the electrode;
iv) data on an exterior of the electrode;
v) data on a position of an electrode disconnection section, a connection position between the electrodes, or a joint on the electrode;
vi) data on a position of a sample inspection unit;
vii) data on a position of an electrode discard section;
viii) data on insulation quality or defects in an insulating material coating process performed after electrode slurry coating;
ix) other defect data;
x) data on reference points marked on the electrode at predetermined intervals; and
xi) data on a thickness of the electrode after a roll press.

The inspection and/or measurement devices 10 installed in each process may be different. Therefore, the inspected and/or measured data inspected in each process may be different depending on the processing performed in each process.

FIG. 27 shows the loading amount measurement device 11, the reference point measurement device 12, and the exterior inspection device 13 as the inspection and/or measurement device 10.

In the coating process, the coating amount at the time of slurry coating, that is, the loading amount is important. Therefore, in the coating process, the slurry loading amount is measured by the loading amount measurement device 11. When the loading amount is out of a set range, it is determined to be defect, and the defect may be distinct from other parts and visually displayed by a visualization device to be described below. Alternatively, even when the loading amount is in a normal range rather than the defect, the range may be divided according to the amount and visually displayed in different colors. In this sense, the inspected and/or measured data according to the present disclosure is not limited to the defect but collectively includes data on quality. In FIG. 27, the loading amount is displayed on the roll map by varying a contrast from a dark color to a bright color. That is, the darkest color indicates an overloading amount, the next darker color indicates a normal loading amount, and the brightest color indicates an under-loading amount. However, this is only one example of the visual expression of the loading amount, and the loading amount may be displayed by various methods, such as color, saturation, and contrast.

In addition, there is a case in which reference points are marked on the electrode 1 at predetermined intervals and used for calculating a length of a broken electrode or the like. The reference point measurement device 12 for detecting the positions of the reference points M may also be provided as the inspection and/or measurement device 10.

In one embodiment, when the electrode is broken during the process and connected by the joint connection member (connection tape), the joint measurement device for detecting the joint may also be provided as one of the inspection and/or measurement devices 10.

In addition, the dimension measurement device for measuring the dimensions and widths of the coating part and the non-coating part may also be provided as the inspection and/or measurement device 10. The dimension measurement device may also determine that the dimension out of set ranges are defect data or divide the data in a normal range according to the ranges of the dimension to display each of the divided data as a different visual image. Data on the mismatch between the coating part and the non-coating part on the electrode 1 or the like may also be acquired by the dimension measurement device.

In addition, the electrode exterior inspection device 13 may also be provided to obtain data on the exterior of the electrode including exterior defects of the electrode, such as a pinhole defect and a line defect.

The above-described inspection devices are illustrative of those mainly used in the electrode coating process, and when the process is different, for example, in the roll press process, an inspection device for obtaining data on the thickness of the electrode after rolled by the press roll may be employed instead of the above-described loading amount inspection device.

The inspection and/or measurement device 10 is not limited to the devices described above, and when there are other measurement parameters capable of being obtained from the electrode 1, predetermined other inspection and/or measurement devices 10 capable of inspecting the other measurement parameters may also be applied to the apparatus 1100 for generating the roll map according to the present disclosure. In addition, the inspection and/or measurement devices 10 are not necessarily provided separately, and a plurality of inspected and/or measured data may be acquired by one inspection and/or measurement device 10, and in this case, it is possible to reduce the number of necessary inspection and/or measurement devices 10. Alternatively, a plurality of inspection and/or measurement devices 10 having the same name may also be provided depending on the purpose. That is, since a color sensor as the joint measurement device inspects an exterior, the color sensor may also be regarded as an exterior inspection device 13. In addition, the vision measurement device may be regarded as the dimension measurement device because it may measure mismatch, but may also be regarded as the reference point measurement device because it may also detect the reference points using the vision sensor included in the corresponding measurement device.

The electrode inspection and/or measurement devices 10 may transmit the coordinate value (position data) of the electrode part for which the corresponding inspected and/or measured data has been acquired together with the inspected and/or measured data to the roll map generation unit 40 to be described below through the controller 30 for controlling the current roll-to-roll transfer process or directly in conjunction with the position measurement device 20. The roll map generation unit 40 may visually display the inspected and/or measured data and the coordinate values on the roll map of the coating process.

FIG. 28 is a schematic diagram showing a principle in which inspected data by an inspection device and coordinate values of the corresponding inspected data.

In FIGS. 27 and 28, when the inspection and/or measurement device inspects the electrode 1 and acquires the inspected data, the position of the electrode part thereof is detected by the position measurement device 20 of the rewinder RW. However, the electrode part at the time point at which the inspected data has been acquired is not in a state of having arrived at the rewinder RW. In the embodiment, since the coordinates of the roll map are based on the rewinder RW, longitudinal coordinates detected when the electrode part actually arrives at the rewinder RW become longitudinal coordinates of the corresponding electrode part. Therefore, the longitudinal coordinate value of the electrode part for which the inspected data has been acquired is obtained by adding the encoder value (longitudinal coordinate value) of the rewinder RW at the time point at which the data has been acquired and a distance (offset distance) from each inspection device to the rewinder RW. For example, a longitudinal coordinate value of an electrode part a whose loading amount has been detected by the loading amount measurement device 11 is a value obtained by adding the encoder value (coordinate value) A of the rewinder RW at the detected time point and an offset distance L1 between the loading amount measurement device 11 and the rewinder RW. In the same principle, a longitudinal coordinate value of an electrode part b whose reference points have been detected by the reference point measurement device 12 is a value obtained by adding an encoder value B of the rewinder RW at the detected time point and an offset distance L2 between the reference point measurement device 12 and the rewinder RW. In addition, a longitudinal coordinate value of an electrode part c is a value obtained by adding an encoder value C of the rewinder RW at the detected time point and an offset distance L3 between the exterior inspection device 13 and the rewinder RW.

In one embodiment, a transverse coordinate value of the electrode part for which the inspected and/or measured data has been acquired may be acquired by the inspection and/or measurement device.

For example, the inspection and/or measurement device 10 such as the exterior inspection device shown in FIG. 27 may include a program capable of scanning and inspecting the exterior of the electrode 1 in the width direction of the entire electrode 1. Alternatively, the inspection device itself may be movably installed in the width direction of the electrode. Alternatively, a plurality of inspection devices may be installed in the width direction of the electrode. Therefore, the inspection and/or measurement device 10 may acquire data on quality or defects (e.g., loading amount data or exterior defect data) for each point of the electrode in the width direction, and the transverse position data (coordinate values) for which the data has been acquired may also be acquired by the inspection and/or measurement device 10. Therefore, each inspection and/or measurement device 10 may acquire all of the inspected and/or measured data (e.g., the data on quality or defects), the longitudinal and transverse coordinate values of the electrode 1 for which the inspected and/or measured data has been acquired and transmit all data to the roll map generation unit 40 to be described below.

FIG. 29 is a schematic diagram showing one example of the roll map generation unit 40.

The apparatus 1110 for generating the roll map includes the roll map generation unit 40 for generating the roll map in conjunction with the position measurement device 20 and the inspection and/or measurement device 10. The roll map generation unit 40 may include a database 41 for storing the data acquired from the inspection and/or measurement device 20 and the position measurement device 10 or storing data on the quality, dimensions, and the like of the normal electrode. In addition, the roll map generation unit 40 may include a central processing unit 42 for processing the acquired data and instructing the visualization device 43 provided in the roll map generation unit 40 to visualize the data.

The roll map generation unit 40 includes the visualization device 43 capable of defining a visualization region to form the coordinate planar surface of the roll map on which the electrode 1 is imitated and which visually displays coordinate values of the longitudinal and the transverse axes of the electrode and the inspected data on the defined region. The visualization device 43 may visualize and display the corresponding inspected and/or measured data on the coordinate values of the inspected and/or measured data. The visualization device 43 may be connected to the central processing unit 42 to visualize and display the inspected and/or measured data and the data of the coordinate values according to instructions from the central processing unit.

Referring to FIG. 29, the visualization device 43 includes the acquisition data input unit 43*a*, the roll map coordinate identifier 43*b*, and an image generator 43*c*.

The acquisition data input unit 43*a* receives data from the database 41 or the central processing unit connected to the database 41.

The roll map coordinate identifier 43*b* may define the visualization region to form the roll map and define coordinate values of pixels within the visualization region for each data element of the acquired source data. In this case, when data on specifications, such as a lot number, a length, and a width of the electrode roll, is input to the controller 30, a server (not shown), or the like by registering information on the electrode roll, the roll map coordinate identifier 43*b* may calculate and determine the visualization region of the roll map according to a predetermined conversion scale from data on a size of the electrode 1. Alternatively, the roll map coordinate identifier 43*b* may also calculate and determine the visualization region of the roll map according to the predetermined conversion scale from the above-described longitudinal and transverse data of the coordinate values of the electrode 1.

The roll map coordinate identifier 43*b* may map the acquired data on quality or defects with the (longitudinal and transverse) position data of the electrode 1 and allocate the mapped data on the visualization region (roll map) according to the coordinates of the pixels.

The image generator 43*c* may express the mapped data elements allocated to the coordinates of each pixel in the visualization region as at least one legend. The legend refers to various shapes, such as a circle, a quadrangle, and a triangle, displayed in the visualization region, the shapes to which colors are provided, or the like. Therefore, the roll map according to the present disclosure may be made up by visually displaying various data on quality or defects at the coordinates of the pixels (coordinates on the roll map) corresponding to each position data of the actual electrode 1 in designated shapes, forms, or colors for each data and implementing the data on the roll map in the visualization region called the roll map by the image generator 43*c*.

In addition, based on the data stored in a storage such as the database 41, data corresponding to a specific range may be loaded from the storage in conjunction with the specific range of the roll map and displayed (generated as images) on a screen. At this time, the central processing unit 42 may instruct the visualization device 43 to visualize and display inspected data determined to be abnormal compared to normal data stored in the database 41 to be distinct from other data.

Setting the size of the visualization region or identifying the coordinates of the visualization region to generate images may be performed by various conventional user interfaces or various programs or processing tools related to data allocation-processing-analysis and visualization. Therefore, the roll map generation unit 40 is only one example and is not limited to the above-described embodiment.

The roll map generation unit 40 may be, for example, a data processing system, such as an MES, or one component of the corresponding data processing system. The data processing system is a system (including hardware or software) for performing input, processing, output, communication, and the like in order to perform a series of operations on data. In the electrode 1 manufacturing process, an electrode MES, an assembly MES, and the like for managing a series of electrode manufacturing processes such as coating, pressing, and slitting is provided. Therefore, when the above-described data of the coordinate values, inspected data, and the like are transmitted to the MES, the above-described roll map may be made up by the MES.

The apparatus 1110 for generating the roll map may further include the controller (PLC) 30 for controlling the electrode movement between the unwinder UW and the rewinder RW.

The controller 30 may transmit the inspected and/or measured data and the coordinate values of the electrode part for which the inspected and/or measured data has been acquired to the roll map generation unit 40 in conjunction with the position measurement device 20 and the inspection and/or measurement device 10. In this case, the controller 30 may match the coordinate values with the inspected and/or measured data or process the inspected data and the coordinate data to a form that may be easily processed by the roll map generation unit 40. Since the PLC 30 is connected to the inspection and/or measurement device 10, the encoder, or the like to control the roll-to-roll transfer of the electrode, the inspection and/or measurement device 10, the encoder, or the like may more efficiently transmit the data through the controller 30 than directly transmitting the data to the data processing system such as the MES in terms of data processing and management.

In addition, the controller 30 of each roll-to-roll process stores information on the winding direction of the electrode in the rewinder RW and the unwinding direction of the electrode in the unwinder UW. That is, information on whether the winding direction of the electrode is a forward direction (clockwise) or a reverse direction (counterclockwise) and whether the unwinding direction of the electrode is a forward direction or a reverse direction is automatically stored In the controller 30 for controlling the corresponding roll-to-roll process. As will be described below, in the preceding and following processes, the start and end portions of the electrode are reversed, or the top and back surfaces of the electrode 1 are reversed according to the winding direction and the unwinding direction of the electrode. Therefore, by transmitting such information to the roll map matching unit 1200 to be described below, the roll map matching unit 1200 may match the roll maps of each process by reflecting the coordinate values of the roll maps when matching the coordinate values of the roll maps.

The roll map generation unit 40 makes up the roll map with the above-described data. FIG. 27 shows an example of such a roll map.

An absolute coordinate roll map R1 of the coating process is shown at an uppermost end of FIG. 27, and a relative coordinate roll map r1 is shown thereunder. The absolute coordinate roll map R1 is a roll map that displays coordinate values of electrode parts removed in each process and between the processes and coordinate values of survival electrodes excluding the removed electrode parts together in a coordinate space. The relative coordinate roll map r1 is a roll map that displays only the coordinate values of the survival electrodes excluding the removed electrode parts in the coordinate space.

Since the relative coordinate roll map r1 represents the survival electrodes that have survived after finishing the corresponding process, the relative coordinate roll map r1 becomes a roll map representing an actual electrode.

FIG. 27 shows a roll map of an electrode with a total length of 1200 meters. Reference points M are marked at points of 300, 600, and 900 meters, which are 25%, 50%, and 75% points of the electrode, and each of the reference points M is displayed on the roll map of the corresponding coordinate value based on the data detected by the reference point measurement device 12. In addition, the loading amount is also displayed by varying a contrast throughout the corresponding coordinate section. However, a section v displayed in white without contrast is a section not inspected by the loading amount measurement device 21. When the electrode moves in the roll-to-roll state, the section in which the inspection device may not acquire data may occur due to various causes, such as fluctuation of the electrode, sensitivity of the inspection device, and problems in data communication.

In one embodiment, coordinates of right ends of the roll maps R1 and r1 have coordinate values of zero as start portions and coordinates of left ends thereof have coordinate values of 1200 meters as end portions. The winding of the rewinder RW starts at the start portion, and an encoder value (coordinate value) of the rewinder RW at this time is zero. When the winding is ended, the encoder value of the rewinder becomes 1200. However, when the electrode 1 was wound by 1100 meters, the end of the electrode was actually cut off by 100 meters. As described above, cutting off the electrode after the electrode roll is completed is referred to as "removal after completion." Since the start and end portions of the electrode often have non-uniform quality, the electrode 1 is often cut off before the winding starts or at the time point at which the winding ends. In this regard, there is a case in which the defect section or the like is also cut off and the electrodes 1 are connected during the corresponding process, which is referred to as "current process removal." The roll map also displays information on a change in length of the electrode. Such a change in length of the electrode may be identified by detecting (inspecting) a change in interval between the reference points M. The absolute coordinate roll map R1 also displays the electrode with the length of 100 meters removed after completion, but the relative coordinate roll map r1 displays only the remaining electrodes (survival electrodes) excluding the removed electrode. In the relative coordinate roll map, the end portion of the electrode is indicated by 1100 meters.

In addition, the defect section NG is also displayed on the roll map in FIG. 27. In the electrode coating process, a section between 800 meters and 1000 meters is determined to be the defect section NG by the visual inspection device 13 or by a visual inspection by an operator, and a defect tag or the like may be attached to the defect section NG. Coordinates of the corresponding defect section NG may be displayed on the roll map by the inspection device detecting such a defect tag or the like.

In order to provide a standard for contrast when the roll maps are matched and an overlay roll map is made up, a point of 650 meters, which is a specific position on the roll map, is indicated by an star. The star may also be an exterior defect point and may be a reference point indicating a specific characteristic related to quality. The coordinate value of the longitudinal axis of the point indicated by the star is 650 meters. When the width of the electrode is 60 cm, the coordinate value of the transverse axis of the star point is 40 cm (0.4 m) from a lower end of the electrode. As described above, the coordinate value of the star point may be acquired by a specific inspection device capable of detecting the corresponding star point.

As shown in FIG. 29, the apparatus 1100 for generating the roll map displays the made-up roll map on the display unit 1300 so that data on quality or defects may be visually and easily identified at a glance.

In FIG. 27, the inspection and/or measurement device 10 may be positioned on the top surface of the electrode, and a roll map of the top surface of the electrode may be made up using the inspection and/or measurement device 10. However, a roll map of the back surface of the electrode may also be made up by installing the inspection and/or measurement devices on the back surface of the electrode. Alternatively, depending on the layout of the plant equipment, each of the roll maps of the top and back surfaces of the electrode may be made up by going through the electrode under the inspection and/or measurement device in a state in which the top surface faces upward, then reversing the electrode by a guide roll or the like, and going through the electrode under the same inspection and/or measurement device in a state in which the back surface faces upward.

Figure 30:
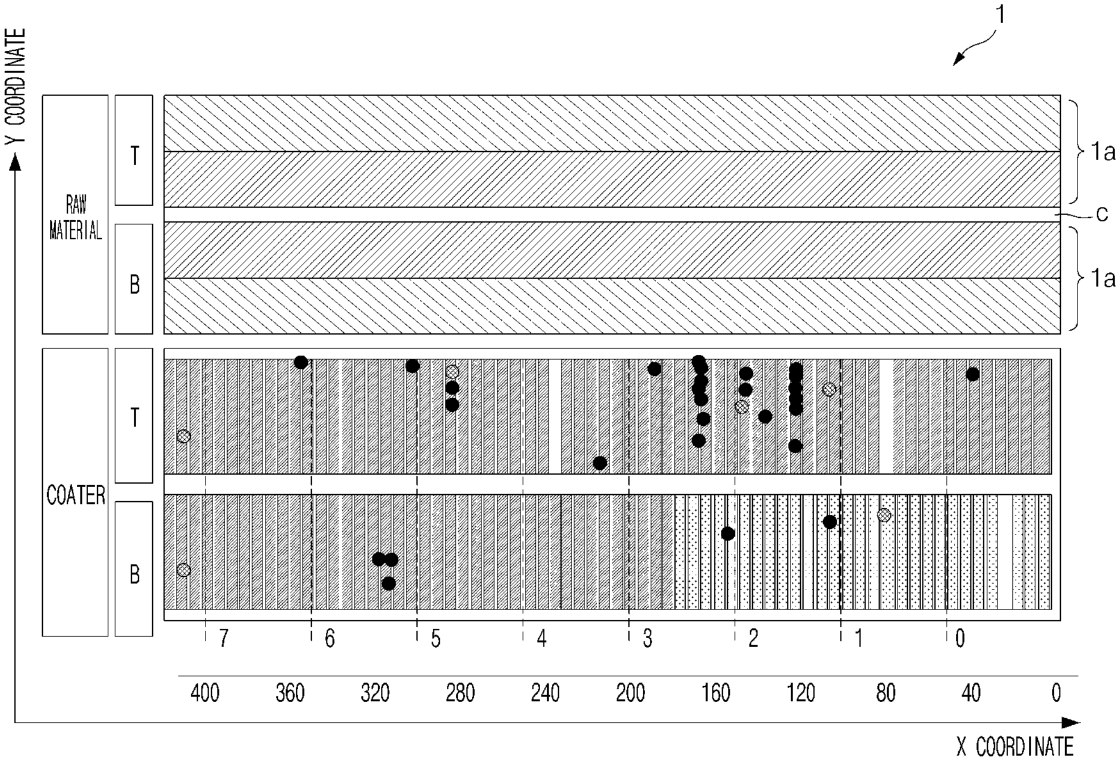
FIG. 30 is a schematic diagram showing an exemplary roll map of top and back surfaces of an electrode, according to aspects of the present disclosure.

FIG. 30 is a schematic diagram showing one example of a roll map of the top and back surfaces of the electrode.

An upper drawing of FIG. 30 shows an input status of a raw material to be displayed in comparison with the roll map rather than the roll map. That is, in the upper drawing, c indicates a current collector, and portion 1*a* indicates a coating part coated on top and back surfaces of the current collector. A lower drawing of FIG. 30 shows a roll map of a top surface T and a back surface B of the electrode. As shown, even for the same electrode, the top and back surfaces of the electrode have different loading amounts and exterior defects. Therefore, in the electrode coating process, the roll map needs to be made up for both side surfaces of the top and back surfaces.

Figure 31:
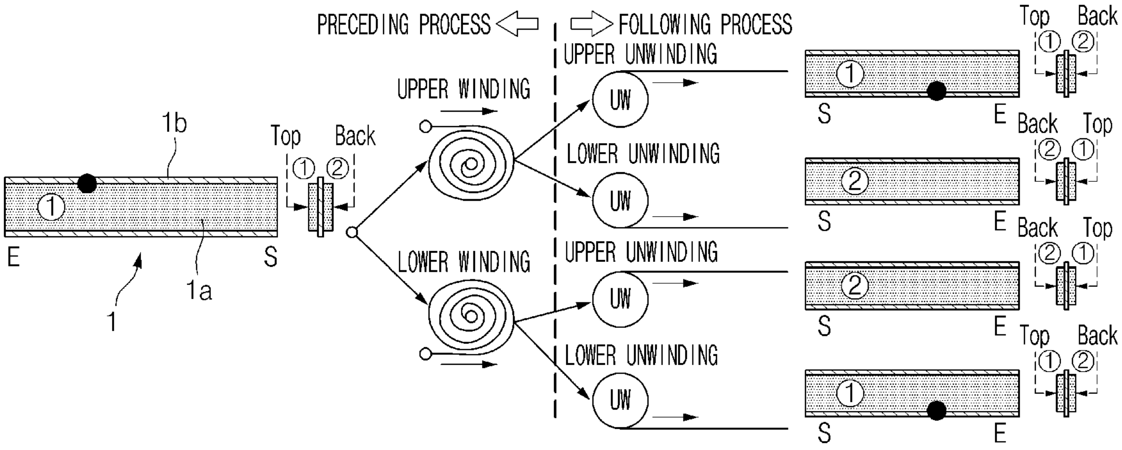
FIG. 31 is a schematic diagram showing an exemplary electrode reversal process, according to aspects of the present disclosure.

FIG. 31 is a schematic diagram showing an electrode reversal aspect according to a winding direction in the preceding process and an unwinding direction in the following process.

As shown in FIG. 31, the winding direction of the electrode in the rewinder RW of the preceding process is divided into an upper winding direction (forward direction: clockwise) and a lower winding direction (reverse direction: counterclockwise). As described above, the electrode winding rolls wound in two different directions may be respectively unwound in an upper unwinding direction (forward direction: clockwise) and a lower unwinding direction (reverse direction: counterclockwise).

According to the winding direction of the electrode in the rewinder RW of the preceding process and the unwinding direction of the electrode in the rewinder RW of the following process, an electrode path is divided into a total of four types.

First, when the winding direction of the rewinder in the preceding process is the upper winding direction and the unwinding direction of the unwinder in the following process is the upper unwinding direction, a start portion S and an end portion E of the electrode in the preceding process are reversed. When the start and end portions of the electrode are reversed, it means that the coordinate axes constituting the coordinate planar surface of the roll map move symmetrically.

Figure 32:
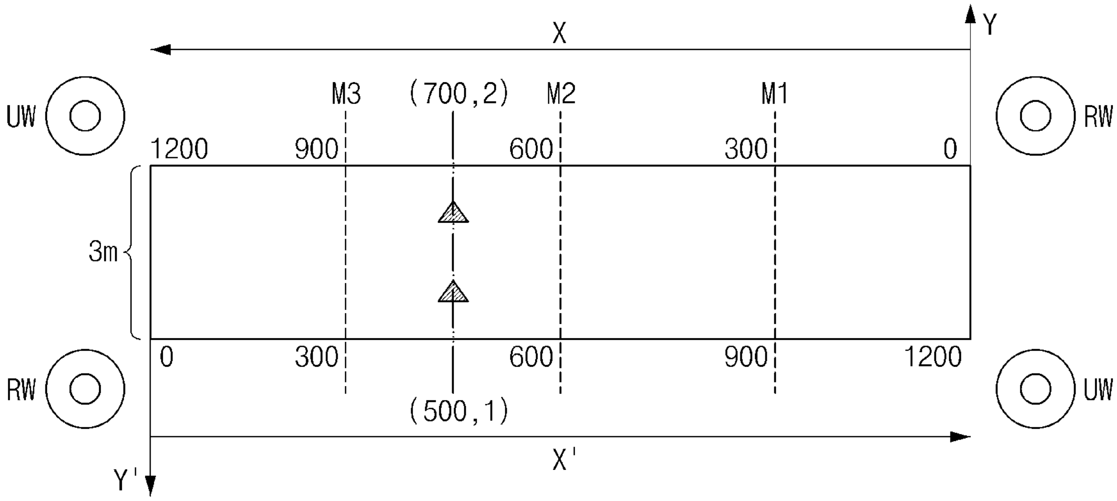
FIG. 32 is a schematic diagram showing exemplary coordinate axes based on a roll map reversal, according to aspects of the present disclosure.

FIG. 32 shows the reversal of the coordinate axes of the roll map of the preceding and following processes in one drawing. An upper part of the roll map in FIG. 32 displays the coordinate axes (X axis and Y axis) and coordinate values in the preceding process. In the preceding process, the electrode moves from the unwinder UW to the rewinder and is wound around the rewinder RW. In this case, coordinate values of triangular points were measured as having coordinates of the longitudinal axis (X axis) being 700 meters and coordinates of the transverse axis being 2 meters from the lower end of the electrode (assuming that the width of the electrode was 3 meters). When the electrode roll is completely wound around the unwinder UW of the preceding process and the electrode roll is mounted on the rewinder RW of the following process, a point of 1200 meters, which is an end portion of the electrode roll in the preceding process, is 0 meters, which is a start portion of the electrode roll in the following process. That is, due to the characteristics of the electrode roll, the start and end portions of the electrode roll in the preceding process and the following process are reversed. Describing the reversal based on the coordinate planar surfaces of the preceding process and the following process, it can be seen that the longitudinal axis (X axis) of the preceding process moves symmetrically with respect to the transverse axis (Y axis) to become a longitudinal axis (X' axis) of the following process, and the transverse axis (Y axis) of the preceding process moves symmetrically with respect to the longitudinal axis (X axis) to become a transverse axis (Y' axis) of the following process. Therefore, the coordinate values (700 meters and 2 meters) of the triangular points in the preceding process are also reversed to (500 meters and 1 meter) in the following process.

The start/end reversal occurs in all of the four types of the electrode paths.

In the first case of FIG. 31, in the case of the electrode path that is the upper winding direction in the preceding process and the upper unwinding direction in the following process, a black point moves between the preceding and following processes, which means that the electrode in the preceding process has been reversed in the longitudinal and width directions in the following process. That is, the start/end reversal of the electrode occurred. In this case, the top and back surfaces of the electrode 1 are not reversed.

Second, when the winding direction of the rewinder in the preceding process is the upper winding direction (winding clockwise) and the unwinding direction of the unwinder UW in the following process is the lower unwinding direction (unwinding counterclockwise), the start/end reversal of the electrode 1 and the top/back reversal of the electrode 1 occur at the same time. For example, the electrode 1 moving in the state in which the top surface faces upward in the coating process is turned over and moves in a state in which the back surface faces upward in the roll press process. Therefore, these points should be considered when matching the roll map to be described below.

Third, when the winding direction of the rewinder in the preceding process is the lower winding direction (winding counterclockwise) and the unwinding direction of the unwinder in the following process is the upper unwinding direction (unwinding clockwise), the start/end reversal of the electrode 1 and the top/back reversal of the electrode 1 occur at the same time as in the second case.

Fourth, when the winding direction of the rewinder in the preceding process is the lower winding direction and the unwinding direction of the unwinder in the following process is the lower unwinding direction, only the start/end reversal of the electrode 1 occurs.

Figure 33:
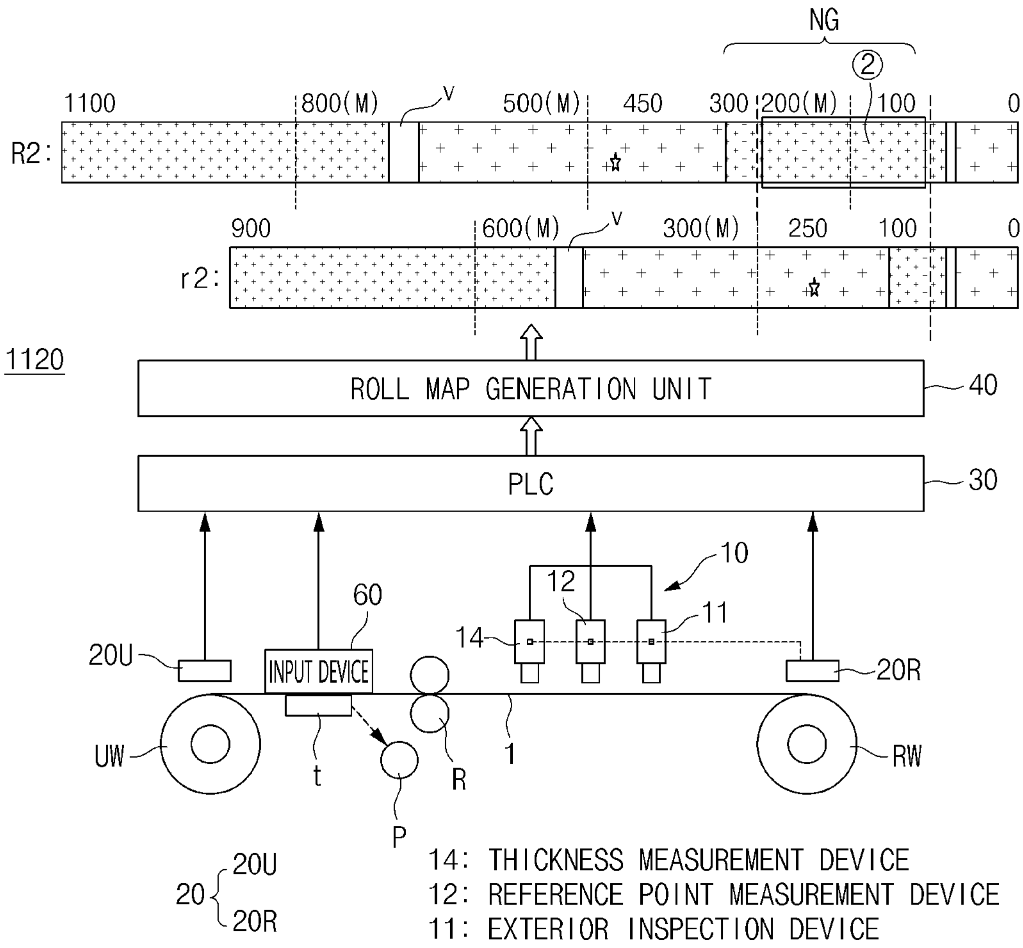
FIG. 33 is a schematic diagram showing an exemplary system or apparatus for generating a roll map associated with a roll press process and a roll map associated with a roll press process, according to aspects of the present disclosure.

FIG. 33 is a schematic diagram showing one example of the apparatus 1120 for generating the roll map of the roll press process and the roll map thereof.

As in the above-described coating process, the position measurement device 20, the inspection and/or measurement device 10, and the roll map generation unit 40 are also provided in the roll press process.

Since the roll press process is a process of rolling the coated electrode 1 by the press roll R in the coating process, a thickness of the electrode after rolling is important. Therefore, in the roll press process, the thickness measurement device 14 is provided instead of the loading amount measurement device. In addition, the roll press process is the same as the coating process in that the reference point measurement device 12 and the exterior inspection device 13 are provided. As the thickness measurement device 14, a predetermined displacement sensor, a confocal thickness sensor, or the like may be employed.

The roll map generation unit 40 of the roll press process also forms the coordinate planar surface of the roll map in conjunction with the position measurement device 20 and the inspection and/or measurement device 10. An upper drawing of FIG. 33 shows roll maps R2 and r2 of the roll press process. The roll maps are visually displayed by varying hatching according to the thickness of the electrode. Even in the roll maps, there may be portions v in which the inspected and/or measured data is not reflected.

The roll map at an uppermost end of FIG. 33 is the absolute coordinate roll map R2, and the roll map thereunder is the relative coordinate roll map r2.

Since the end portion of the electrode was removed by 100 meters at the end of the coating process or after the coating process was completed, the coordinate value of the end portion of the absolute coordinate roll map R2 of the roll press process was also 1100 meters. In addition, since the start and end portions of the electrode roll of the coating process and the roll press process were reversed, the coordinates of the roll map of the roll press process were also reversed. Therefore, the coordinate value of the reference point M of the coating process and the coordinate value of the reference point M of the roll press process were also changed. In addition, the coordinates of the star point were also changed from (650, 0.4) to (450, 0.2) according to the start/end reversal. In the roll press process, a section between 800 to 1000 meters marked as the defect section NG in the coating process, which is the preceding process, was reversed to become a section between 100 to 300 meters. The defect section is removed from a table t of a defect section processing port and discarded to the defect removal port P (scrap port).

The matters on the removal of the defect section NG may be reported to the controller 30 and the roll map generation unit 40 by the input device 60. Since the defects in the section between 100 to 300 meters were removed, the point of 200 meters M, which was the reference point in the defect section, was also removed.

In the relative coordinate roll map r2 in FIG. 33, only coordinates of the survival electrodes left after the defect section has been removed are displayed.

Even in the roll press process, a roll map may be made up for each of the top and back surfaces of the electrode 1.

In this case, as described above, when the winding direction of the rewinder of the coating process is the upper winding direction and the unwinding direction of the unwinder of the roll press process is the lower unwinding direction, the top surface of the electrode in the coating process is reversed to the back surface of the electrode in the roll press process. In addition, when the winding direction of the rewinder of the coating process is the lower winding direction and the unwinding direction of the unwinder of the roll press process is the upper unwinding direction, the top surface of the electrode in the coating process is reversed to the back surface of the electrode in the roll press process. The matters on the reversal are stored in the controller 30 of the coating process and the controller 30 of the roll press process, and the roll map generation unit 40 and the roll map matching unit 1200 may generate the roll maps of each process with reference to such information and match the roll maps of each process as will be described below.

Figure 34:
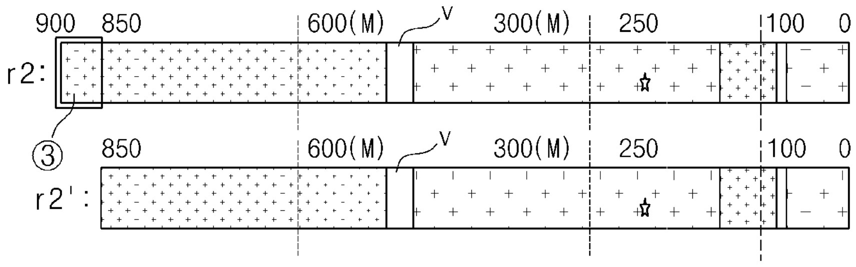
FIG. 34 is a schematic diagram showing an exemplary roll map displaying an electrode associated with a removal process, according to aspects of the present disclosure.

FIG. 34 is a schematic diagram showing a roll map when the electrode 1 is removed after the roll press process is completed. This is a case in which the end portion of the electrode was removed by 50 meters after the roll press process. Such a removal of the electrode is well displayed on the absolute coordinate roll map r2 and a relative coordinate roll map r2'.

Figure 35:
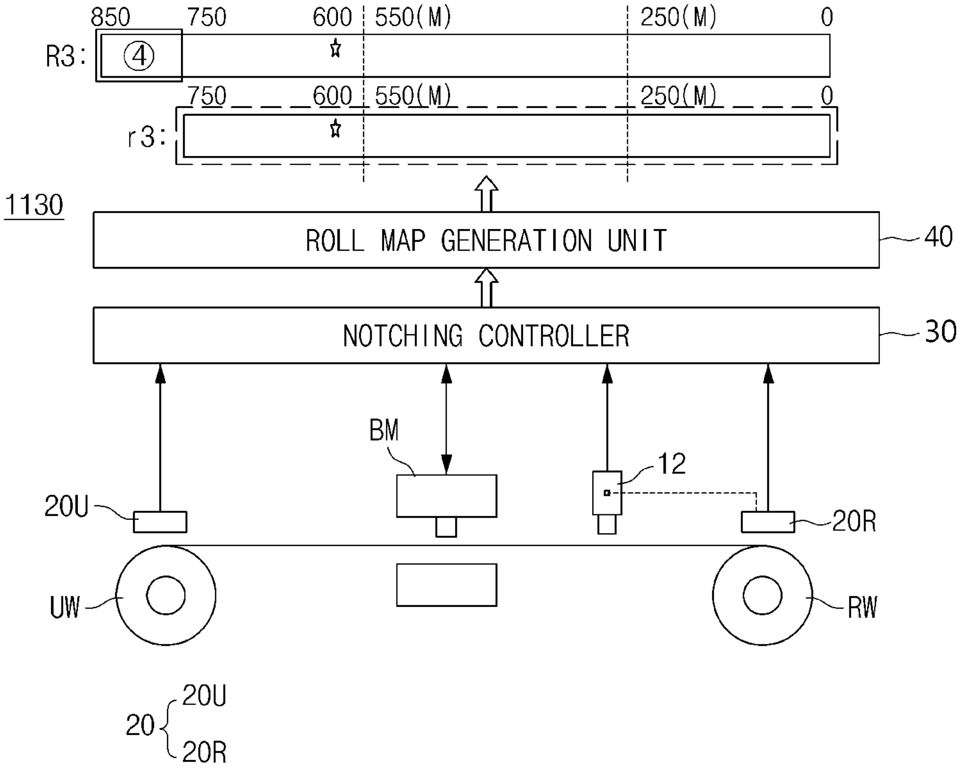
FIG. 35 is a schematic diagram showing an exemplary system or apparatus for generating a roll map associated with a notching process, according to aspects of the present disclosure.

FIG. 35 is a schematic diagram showing one example of the apparatus 1130 for generating the roll map of the notching process and the roll map thereof.

In the notching process, an electrode tab is formed by punching the electrode moving in the roll-to-roll state using a punching tool BM. In addition, the reference point measurement device 12 may be provided to check a change in length of the electrode before and after the notching process or during the notching process.

An upper drawing of FIG. 35 shows one example of the roll map of the notching process. In the notching process after the roll press process, the start/end reversal of the electrode 1 occurred. Therefore, the coordinates of the star were re-changed from (450, 0.2) to (600, 0.4). In addition, the end portion of the electrode was removed by 100 meters after notching. The coordinates of the removed electrode part are displayed on an absolute coordinate roll map R3 of the notching process together, but only the coordinates of the roll map of the remaining survival electrodes are displayed on a relative coordinate roll map r3. Through the coating process, the roll press process, and the notching process, a part of the electrode was removed a total of four times. Therefore, it can be seen that the electrode with a length of 1200 meters finally became a length of 750 meters.

In one embodiment, in the notching process, unlike the coating process or the roll press process, it is not necessary to separately generate the roll map of the top and back surfaces of the electrode. In the notching process, only punching is performed without performing any special treatment on the top and back surfaces of the electrode. Therefore, as in the preceding process, only the reference point measurement device related to the change in length is installed without installing a complicated inspection and/or measurement device displaying the state of the electrode. That is, the properties of the top and back surfaces of the electrode may be sufficiently identified by the roll maps of the coating process and the roll press process, and in the notching process, the properties of the top and back surfaces are not particularly changed by notching. Therefore, in the notching process, it is sufficient to generate a roll map of a single planar surface displaying only the coordinate values on the coordinate planar surface regardless of the top and back surfaces of the electrode.

As described above, the system 1000 for making the roll map according to the present disclosure includes the apparatus 1100 for generating the roll maps for each process. Referring back to FIG. 26, the coating process, the roll press process, and the notching process include the apparatuses 1110, 1120, and 1130 for generating the roll map, respectively. The apparatuses 1110, 1120, and 1130 for generating the roll maps of each process are combined to constitute the apparatus 1100 for generating the roll map according to the present disclosure. For convenience of description, FIG. 26 shows that the roll map generation units 40 of each process are provided separately. However, as described above, the roll map generation unit 40 may be the MES or one component of the MES, and one integrated system may generate all roll maps for each process. In FIG. 26, the single roll map generation unit 40 that may be overall integrated by combining the respective roll map generation units is shown in a large quadrangle box.

As described above, another roll-to-roll process, such as a second roll press process or a slitting process, may be included between the roll press process and the notching process. Therefore, in the series of roll-to-roll processes, the start/end reversal and surface reversal of the electrode roll may occur more frequently. The roll map generation unit 40 may generate the roll maps for each process by reflecting all pieces of reversal information.

The system 1000 for generating the roll map according to the present disclosure includes the roll map matching unit 1200 for matching the coordinate values of the roll maps of each process with the coordinate value of the roll map of the final process so that the actual electrode represented by the roll map of the final process in the series of roll-to-roll processes matches each actual electrode represented by the roll maps of each process before the final process.

As described above with reference to FIGS. 26 to 35, when the roll-to-roll process continues to be performed, the start/end reversal of the electrode roll of the preceding process and the electrode roll of the following process necessarily occur, and the surface reversal of the electrode roll may also occur according to the winding direction in the preceding process and the unwinding direction in the following process. In addition, since the electrode is removed in each process, the lengths of the roll maps and the coordinate values of each process are also changed. Therefore, since the coordinate values of the roll maps of each process are changed, it is difficult to compare these roll maps based on the same criterion. The important thing is the electrode part that survives in the final process and is manufactured as an actual battery. When a problem occurs in the battery manufactured with the survival electrodes, it is necessary to subsequently investigate which electrode part during each detailed process of the electrode manufacturing process is manufactured as the battery. However, as described above, the roll maps of each process have different coordinate values, making it difficult to track the quality of a specific position of the electrode.

According to the present disclosure, the roll map matching unit 1200 is provided to compare the roll maps of each process based on the same criterion or with the same coordinate values. The roll map matching unit 1200 matches the roll maps of each process so that the actual electrode represented by the roll map of the final process among the series of roll-to-roll processes matches each actual electrode represented by the roll maps of each process before the final process. That is, the roll maps are matched so that the actual electrode (survival electrode) of the final process corresponds to the actual electrode of each process before the final process. From this point of view, the roll map matching unit 1200 matches the actual electrodes of each process and the final process with the roll maps corresponding thereto. The matching of the roll maps are performed by matching the coordinate values of the roll maps of each process with the coordinate value of the roll map of the final process.

Figure 36:
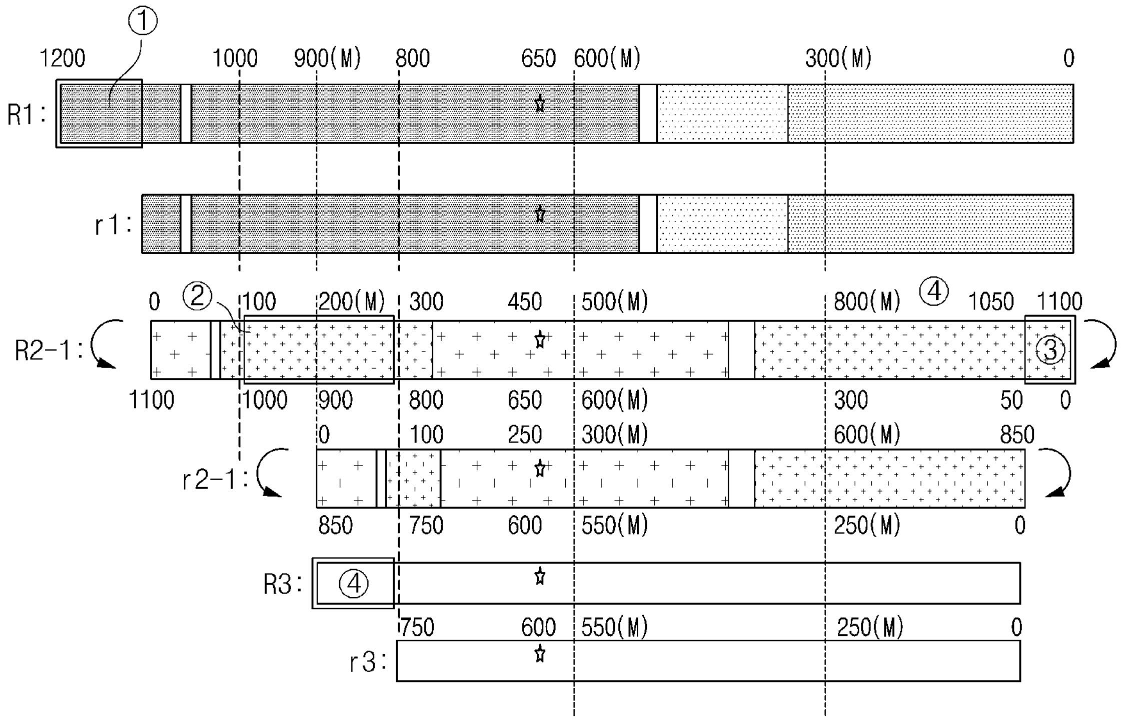
FIG. 36 is a schematic diagram showing an exemplary roll map matching process, according to aspects of the present disclosure.
Figure 37:
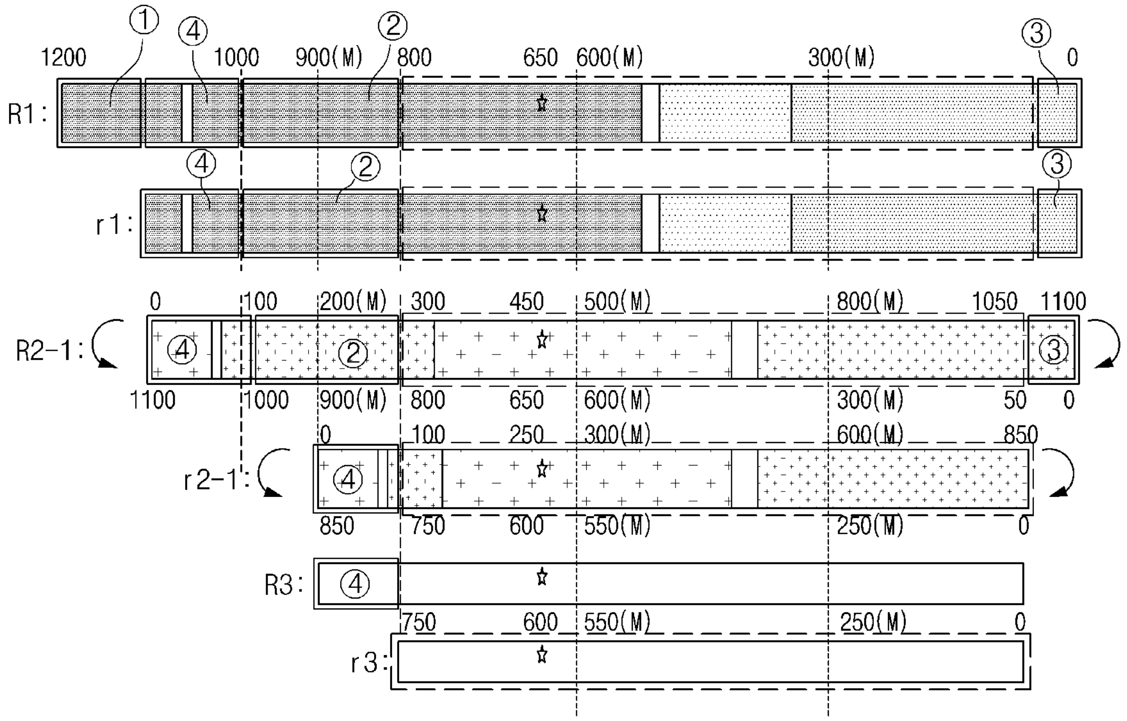
FIG. 37 is schematic diagrams showing an exemplary roll map matching process, according to aspects of the present disclosure.
Figure 38:
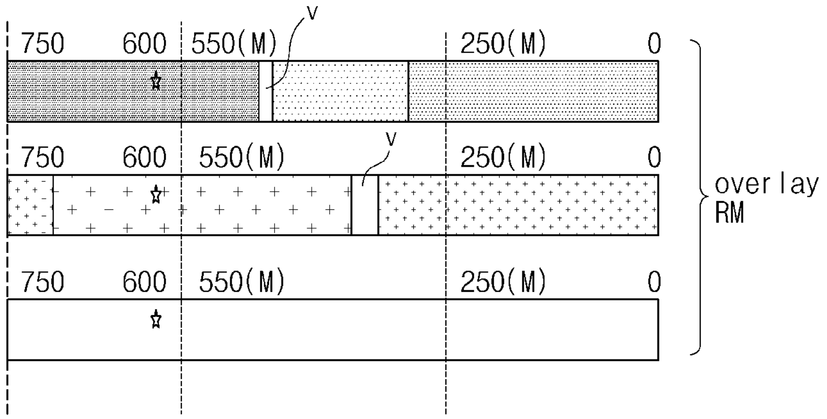
FIG. 38 is schematic diagrams showing an exemplary roll map matching process, according to aspects of the present disclosure.

FIGS. 36 to 38 are schematic diagrams showing a roll map matching process according to the present disclosure.

FIG. 36 shows the absolute coordinate roll map R1 and the relative coordinate roll map r1 of the coating process, the absolute coordinate roll map R2 and the relative coordinate roll map r2 of the roll press process, and the absolute coordinate roll map R3 and the relative coordinate roll map r3 of the notching process sequentially from the top. The roll maps are made up by each of the roll map generation units 1100 in FIGS. 27, 33, and 35.

As described above, the relative coordinate roll map represents the actual electrodes in each process excluding the electrode parts removed during each process or between the processes. Therefore, the roll map matching operation of the roll map matching unit 1200 is to match the coordinate values of the relative coordinate roll maps of each process before the final process with the coordinate value of the relative coordinate roll map of the final process.

Referring to FIG. 26, the roll map matching unit 1200 may include a roll map length matching unit 1210, a coordinate axis matching unit 1220, and a top and back surface matching unit 1230.

In the series of roll-to-roll processes, actual electrodes are removed before or after each process or in the corresponding process for reasons, such as defects or non-uniform quality. Therefore, the coordinate value of the roll map of the final process and the coordinate values of the roll maps of each process are changed. The important thing is that the coordinate values of the roll maps of each process should match the coordinate value of the roll map of the final process so that the actual electrode (survival electrode) represented by the roll map of the final process matches each actual electrode represented by the roll maps of each process. When the length of the electrode is not changed between the start and final processes of the roll-to-roll processes, the roll map length matching is not required. However, due to the characteristics of the mass production process, the start and end portions of the electrode often have non-uniform quality, and there is a case in which a test production part or the like before mass production is often removed. Therefore, in practice, the length of the electrode is inevitably changed between the start and final processes for any reason. In consideration of this, the roll map matching unit 1200 includes the roll map length matching unit 1210 according to the change in length of the electrode.

For the roll map length matching, it is necessary to remove all coordinate sections corresponding to actual electrode parts cumulatively removed in the series of roll-to-roll processes from the roll maps of each process. In addition, by correcting the coordinate values of the remaining coordinate sections left from the removal of the roll maps of each process to correspond to the coordinate value of the roll map of the final process, the lengths of the roll maps of each process may match the length of the roll map of the final process.

In addition, when a start direction of a coordinate axis of a roll map of a specific process before the final process is reversed from a start direction of the coordinate axis of the roll map of the final process according to the winding direction of the electrode in the rewinder RW of the preceding process and the unwinding direction of the electrode in the unwinder UW of the following process, the roll map matching unit 1200 matches the start direction of the coordinate axis of the roll map of the specific process with the start direction of the coordinate axis of the roll map of the final process. To this end, the roll map matching unit 200 may include the coordinate axis matching unit 1220 for matching coordinate axes.

As described above, due to the characteristics of the roll-to-roll processes, the start/end reversal in which the start and end portions are reversed inevitably occurs in the roll map of the preceding process and the roll map of the following process. Since the coordinate axis matching is to match the (start) direction of the coordinate axis of the roll map of the final process, it is sufficient to match only the start direction of the coordinate axis of the roll map of the specific process, which is opposite to the start direction of the coordinate axis of the roll map of the final process, among the preceding processes before the final process. For example, the roll map of the process, which coincides with the direction of the coordinate axis of the roll map of the final process, among the preceding processes does not need to perform such a coordinate axis matching operation.

Referring to FIG. 36, there were a total of four electrode removal operations in the entire roll-to-roll process as follows:

① Removal of the end portion by 100 meters when the coating process is ended;

③ Removal of the defect section by 200 meters during the roll press process;

③ Removal of the end portion by 50 meters after the roll press process; and

④ Removal of the end portion by 100 meters after the notching process is ended.

The relative coordinate roll map r3 of the notching process, which is the final process, became a total of a length of 750 meters due to the four-time removal of the electrode. In addition, the longitudinal coordinate value of the star point, which is the electrode part, for comparison, was 600 meters, and the transverse coordinate value was 40 cm (0.4 m).

In order to match the length of the roll map of the final process, all coordinate sections of the electrode parts removed four times in the entire roll-to-roll process were removed from the relative coordinate roll maps of each process in FIG. 37. In this case, portions indicated by dotted boxes in FIG. 37 become portions of the roll map represented by the finally surviving actual electrodes.

In this case, since the start direction of the coordinate axis of the roll map of the coating process is the same as the start direction of the coordinate axis of the roll map of the notching process, the coordinate axis matching is not required. However, since the start direction of the coordinate axis of the roll map of the roll press process is reversed and different from the start directions of the coordinate axes of the roll maps of the coating process and the notching process, the coordinate axis matching operation is required.

In FIGS. 36 and 37, upper ends of the absolute coordinate roll map R2 and the relative coordinate roll map r2 of the roll press process displays coordinate values before the coordinate axis matching. These coordinate values coincide with the coordinate values of the roll maps shown in FIG. 33. When these coordinate values are reversed (corrected) like the lower end of the corresponding roll map, the coordinate values become the same as the start direction of the coordinate axis of the roll map of the notching process. According to the matching of the coordinate axes of the roll maps, the coordinate values of the reference points, the coordinate value of the defect section, and the coordinate values of the star points of the absolute coordinate roll map and the relative coordinate roll map of the roll press process are all changed. Specifically, both the longitudinal axis and the transverse axis, which are the coordinate axes of the roll map of the roll press process, match the directions of the coordinate axes of the notching process. In FIGS. 36 and 37, symbols indicated by R2-1 and r2-1 indicate that the coordinate axes of the absolute coordinate roll map R2 and the relative coordinate roll map r2 of the roll press process are reversed. That is, R2-1 indicates the absolute coordinate roll map of the roll press process in which the coordinate axes are reversed, and r2-1 indicates the relative coordinate roll map of the roll press process in which the coordinate axes are reversed.

In FIG. 37, the roll-to-roll processes are formed of the odd number of times (three times), and the directions of the coordinate axes of the roll maps of the first process (coating process) and the final process (notching process) are matched. Therefore, the coordinate axes of the roll map of the second process (roll press process) formed of the even number of times in which the directions of the coordinate axes have been reversed match the coordinate axes of the roll map of the final process. However, when the entire roll-to-roll process is formed of the even number of times by adding the process, unlike FIG. 37, coordinate axes of a roll map of an odd-numbered process, such as a first process, need to match coordinate axes of a roll map of a final process, which is an even-numbered process.

As described above, the coordinate axis matching is performed relatively based on the final process.

FIG. 38 shows a roll map finally matched by the roll map matching operation. The coordinate section corresponding to the removed electrode section was removed from the roll maps of the coating process and the roll press process, and the directions of the coordinate axes of the roll map were also matched with the directions of the coordinate axes of the roll map of the notching process. Therefore, the coordinate value of the roll map of the notching process, which is the final process, is accurately matched with the coordinate values of the roll maps of the coating process and the roll press process, which are the preceding processes. All of the coordinate values of the longitudinal and transverse axes of the star points are also matched in the three roll maps matched with 600 meters and 0.4 meters.

As described above, the roll map in which the coordinate values of the roll maps of each process and the coordinate values of the roll map of the survival electrodes of the final process are matched and arranged side by side to be viewed at once is referred to as "overlay roll map." The roll map matching unit 1200 according to the present disclosure is for eventually generating the overlay roll map. When the overlay roll map is displayed on the display unit 1300, the quality history or manufacturing history of the final survival electrode may be identified at a glance.

Referring to FIG. 38, it can be seen from the (overlay) roll map of the roll press process that the battery manufactured with the electrodes at the star points was derived from the electrode having the rolled thickness (e.g., the rolled thickness in a normal range) indicated by a specific hatching in the roll press process. In addition, it can be seen from the roll map of the coating process that the battery manufactured with the electrodes at the star points was derived from the electrode having an excessive loading amount coated more than the normal range in the coating process. For example, when ignition occurs in the battery manufactured with the electrodes at the star points, it can be determined that there is a problem with the corresponding electrode from the manufacturing history of the coating process. Alternatively, the star points may be exterior or other defect portions. That is, when a problem occurs in the removed electrode at the star point and this is caused by an exterior defect, it is possible to simply identify from the overlay roll map from which electrode part the portion corresponding to the exterior defect was derived in the electrode manufacturing process.

As described above, according to the present disclosure, by generating the roll maps of each process and matching the roll maps of each process by the roll map matching unit 1200, it is possible to easily identify data on quality or defects of the survival electrodes surviving in the final process.

In addition, it is possible to easily identify the inspection history in the electrode manufacturing process using the matched roll map (overlay roll map).

In addition, according to the present disclosure, even when the start and end portions of the electrode roll are reversed or the length of the electrode is changed through the series of roll-to-roll processes, by generating the overlay roll map through the above-described roll map length matching and coordinate axis matching, it is possible to intuitively and quickly track a problem with the quality of the electrode when the problem occurs.

In one embodiment, when the top surface of the electrode in the preceding process is reversed to the back surface of the electrode in the following process according to the winding direction of the electrode in the rewinder RW of the preceding process and the unwinding direction of the electrode in the unwinder UW of the following process, the matching unit 1200 may match the roll maps by reflecting such a surface reversal.

As shown in FIG. 31, there is a case in which the top and back surfaces of the electrode may be reversed in the preceding and following processes according to the winding and unwinding directions of the electrode in the preceding and following processes.

In this case, information on the electrode surface reversal is stored in the roll map matching unit 1200. For example, the controller 30 of each process retains information on the winding and unwinding directions of the electrode because it controls the electrode movement and the winding and unwinding of the electrode. The roll map matching unit 1200 may receive the information on the surface reversal from the controller and store the information in the top and back surface matching unit 1230.

The top and back surface matching unit 1230 of the roll map matching unit 1200 matches the roll map of the top surface of the electrode in the preceding process with the roll map of the back surface of the electrode in the following process according to the information.

Figure 39:
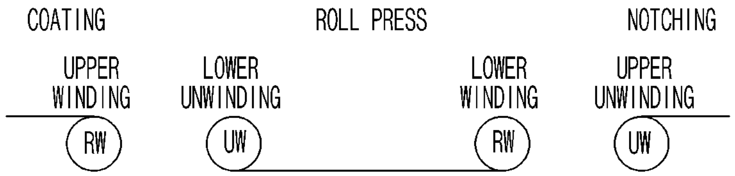
Figure 40:
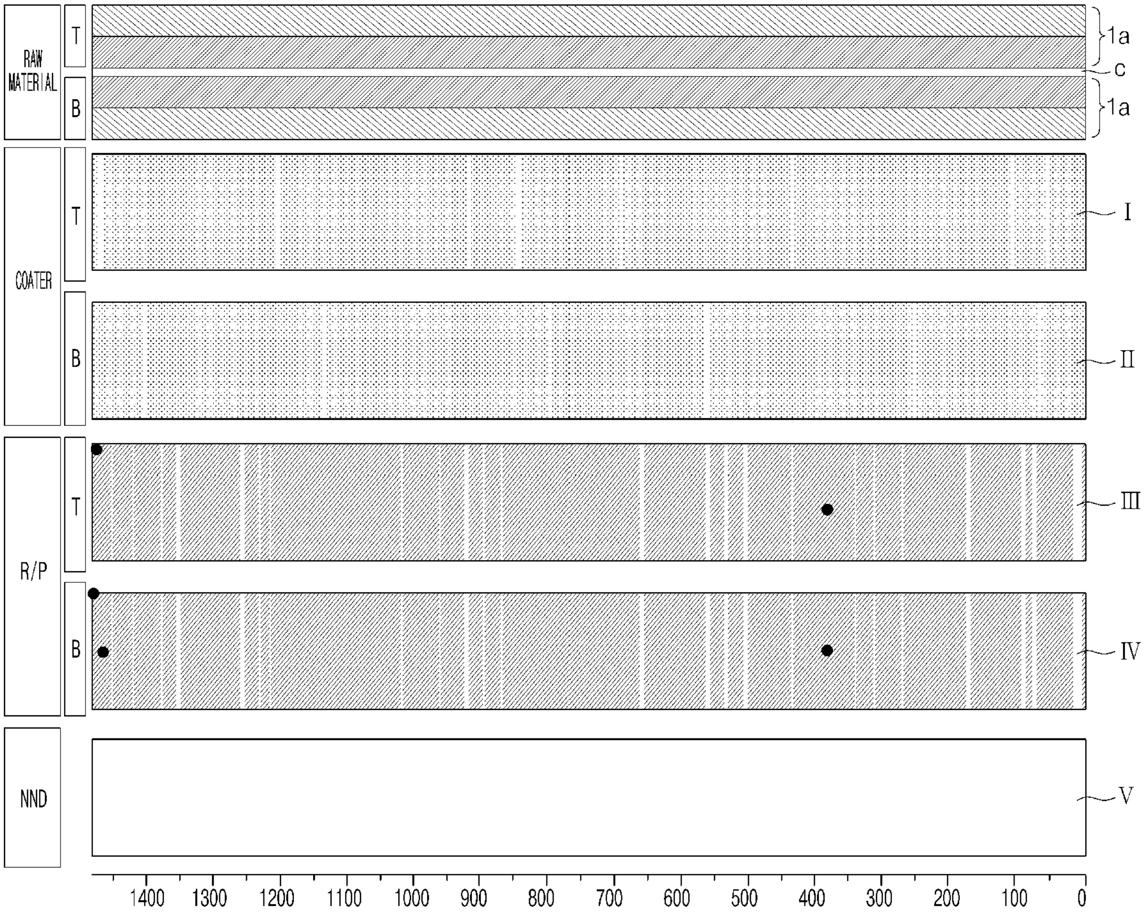
FIG. 40 is a schematic diagram showing an exemplary series of roll-to-roll processes, according to aspects of the present disclosure.
Figure 41:
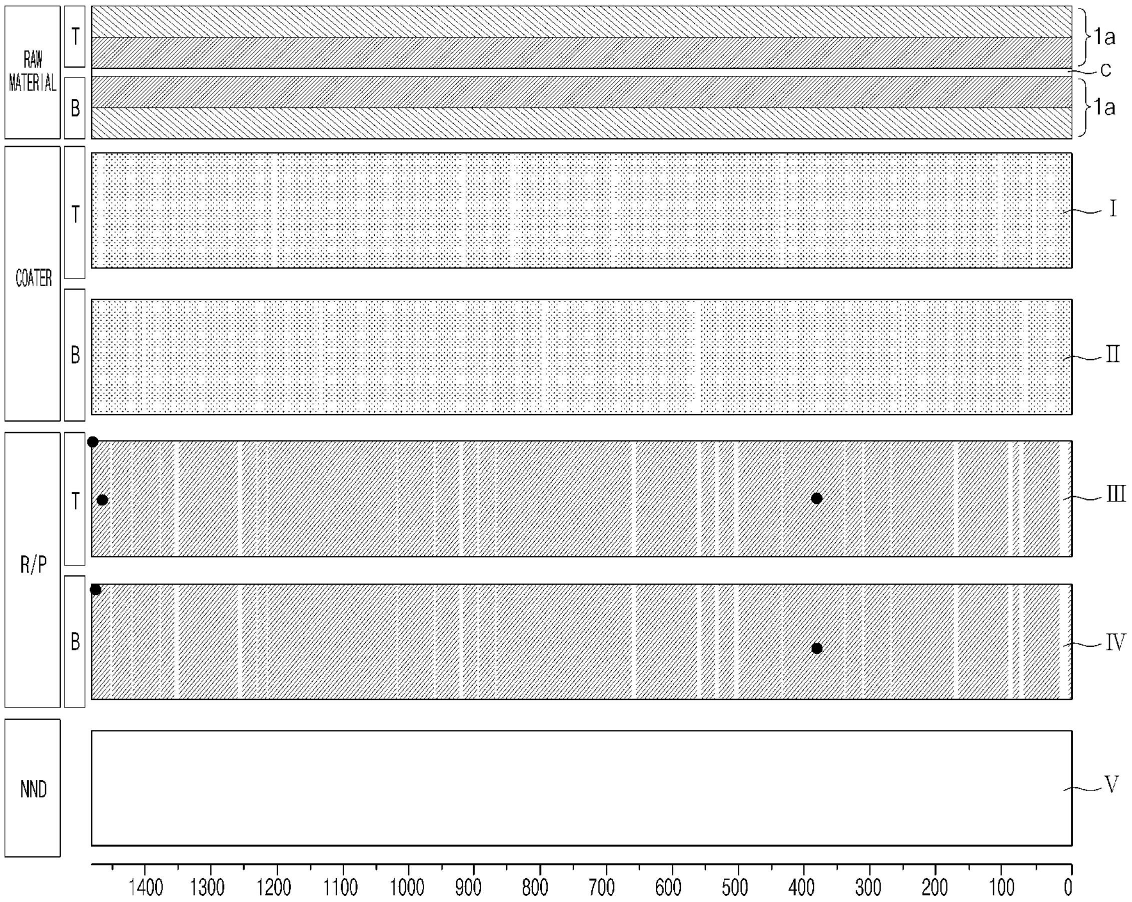
FIG. 41 is a schematic diagram showing an exemplary overlay roll map associated with a series of roll-to-roll processes, according to aspects of the present disclosure.

FIGS. 39 to 41 show an example of generating an overlay roll map by the surface matching.

Referring to FIG. 39, the electrode is wound around the rewinder RW of the coating process in the upper winding direction and unwound in the lower unwinding direction in the roll press process. That is, the top surface of the electrode in the coating process is reversed to the back surface of the electrode in the roll press process. The top and back surface matching unit 1230 receives and records the information on the surface reversal from the controller 30. For example, a control logic value when the surface reversal (top/back reversal) does not occur between the preceding and following processes may be set to zero, and a control logic value when the surface reversal occurs may be set to 1.

In addition, the electrode is wound around the rewinder RW of the roll press process in the lower winding direction, and unwound from the unwinder W of the notching process in the upper unwinding direction. In this case, the surface reversal of the electrode occurs again, and in this case, the control logic value is set again to 1 by the top and back surface matching unit 1230. However, since the roll map of the notching process is made up as only a roll map of a single planar surface regardless of the surface of the electrode, there is not a big problem even when the reversal information is not reflected at the time of generating the overlay roll map when there occurs the surface reversal between the roll press process and the notching process. Referring to FIG. 39, it can be seen that the start/end reversal has also occurred between the coating process and the roll press process and between the roll press process and the notching process.

FIGS. 40 and 41 show one example of the above-described overlay roll map in which the roll map length matching and the coordinate axis matching are performed by reflecting the change in length of the electrode and the change in coordinate axes.

FIG. 40 shows an overlay roll map when the surface reversal does not occur between the coating process and the roll press process, and FIG. 41 shows an overlay roll map when the surface reversal occurs.

Referring to FIG. 40, since no surface reversal has occurred, a roll map I of the top surface T of the electrode in the coating process corresponds to a roll map III of the top surface T of the electrode in the roll press process.

In this case, a control logic value is set to 0 in the top and back surface matching unit 1230. That is, the roll map I of the top surface of the electrode, which is indicated by T, in the coating process corresponds to the roll map III of the top surface of the electrode, which is indicated by T, in the roll press process. In this case, since the overlay roll maps of the top surfaces of the electrodes between the coating process and the notching process are formed of I, III, and V, it is possible to identify quality and product histories between the processes. Likewise, the overlay roll maps of the back surfaces B of the electrodes are formed of II, IV, and V.

Referring to FIG. 41, since no surface reversal has occurred, the roll map I of the top surface T of the electrode in the coating process corresponds to the roll map IV of the back surface B of the electrode in the roll press process. In this case, a control logic value is set to 1 in the top and back surface matching unit 1230. That is, the roll map I of the top surface of the electrode, which is indicated by T, in the coating process corresponds to the roll map IV of the back surface of the electrode, which is indicated by B, in the roll press process. In this case, since the overlay roll maps of the top surfaces of the electrodes between the coating process and the notching process are formed of I, IV, and V, it is possible to identify quality and product histories between the processes. Likewise, by also reflecting the surface reversal information to the back surface of the electrode, the roll map II of the back surface of the electrode in the coating process corresponds to the roll map III of the top surface T of the electrode in the roll press process. Therefore, the overlay roll map of the back surface of the electrode is formed of II, III, and V.

As described above, when the top and back surface matching unit 1230 provides the information on the surface reversal and does not match the surface reversal between the roll maps, there occurs a problem that roll maps representing surfaces of completely different actual electrodes are compared in the coating process and the roll press process. In this case, since the consistency of quality tracking using the overlay roll map is damaged, the quality tracking may not be performed accurately.

The roll map matching unit 1200 according to the present disclosure may perform top and back surface matching in addition to the above-described roll map length matching and coordinate axis matching. Therefore, by generating the overlay roll map by the roll map matching of a predetermined logic even when the top and back surfaces of the electrode are reversed in the series of roll-to-roll processes, it is possible to quickly and intuitively track a problem with the quality of the electrode when the problem occurs.

Figure 42:
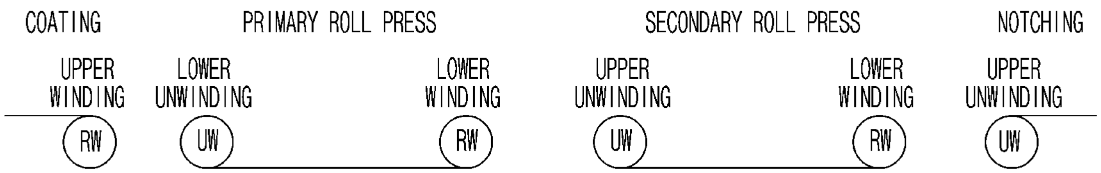
FIG. 42 is a schematic diagram showing an exemplary series of roll-to-roll processes, according to aspects of the present disclosure.
Figure 43:
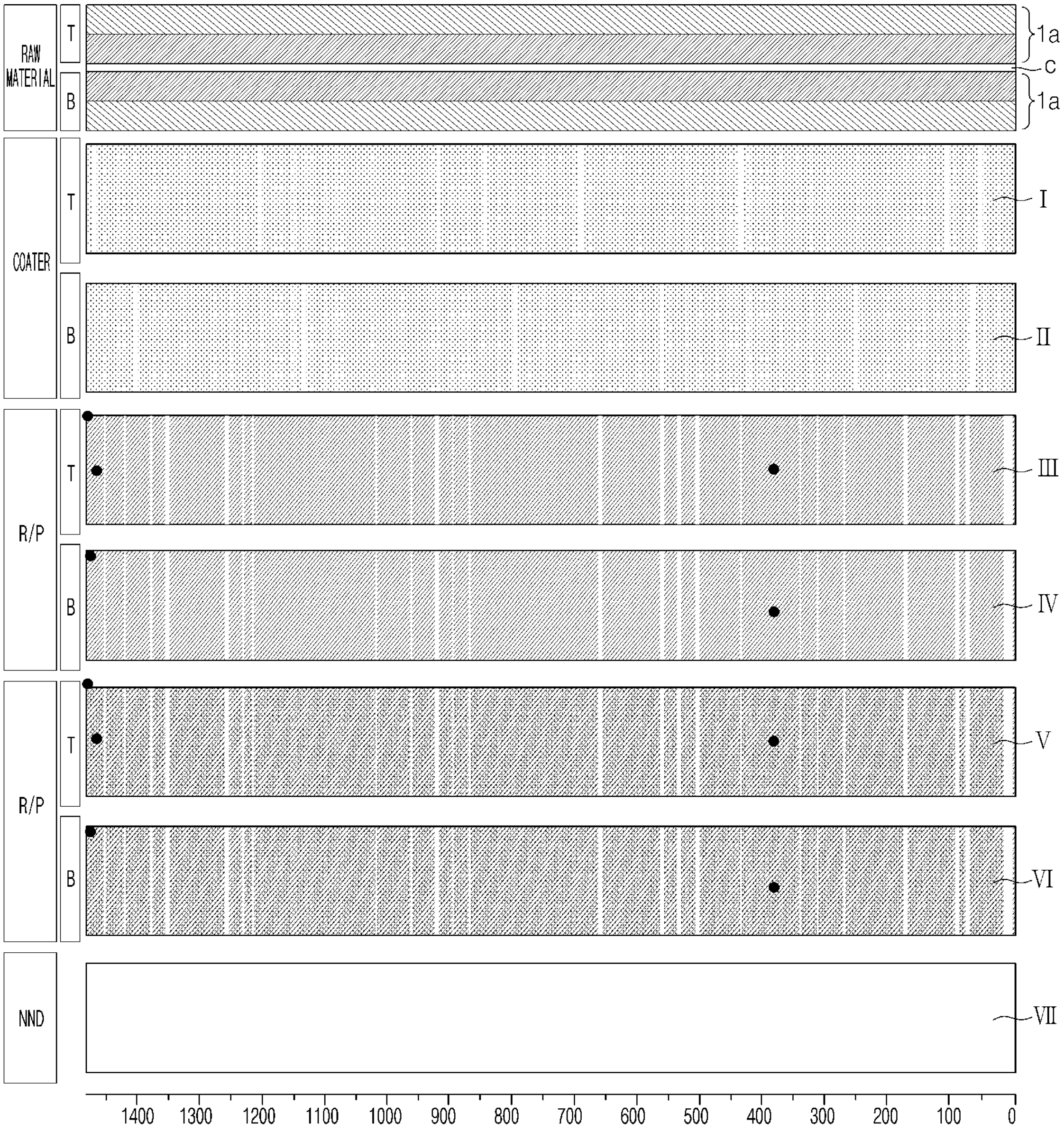
FIG. 43 is a schematic diagram showing an exemplary overlay roll map associated with a series of roll-to-roll processes, according to aspects of the present disclosure.

FIGS. 42 and 43 are schematic diagrams showing a series of roll-to-roll processes according to another embodiment and overlay roll maps in the corresponding processes. The embodiment shows a case in which the roll press process is performed twice.

Referring to FIG. 42, the electrode surface reversal occurred between the coating process and a primary roll press process. However, since the electrode is wound around the rewinder RW of the primary roll press process in the lower winding direction and the electrode is unwound from the unwinder UW of a secondary roll press process in the lower unwinding direction, the electrode surface reversal did not occur between the primary and secondary roll press processes. Therefore, the top and back surface matching unit 1230 sets a control logic value to 1 between the coating process and the primary roll press process and sets a control logic value to 0 between the primary roll press process and the secondary roll press process.

Referring to FIG. 41, since surface reversal has occurred, the roll map I of the top surface T of the electrode in the coating process corresponds to the roll map IV of the back surface B of the electrode in the roll press process. In this case, a control logic value is set to 1 in the top and back surface matching unit 1230. That is, the roll map I of the top surface of the electrode, which is indicated by T, in the coating process corresponds to the roll map IV of the back surface of the electrode, which is indicated by B, in the roll press process. In this case, since the overlay roll maps of the top surfaces of the electrodes between the coating process and the notching process are formed of I, IV, and V, it is possible to identify quality and product histories between the processes. Likewise, by also reflecting the surface reversal information to the back surface of the electrode, the roll map II of the back surface of the electrode in the coating process corresponds to the roll map III of the top surface T of the electrode in the roll press process. Therefore, the overlay roll map of the back surface of the electrode is formed of II, III, and V.

As described above, when the top and back surface matching unit 1230 provides the information on the surface reversal and does not match the surface reversal between the roll maps, there occurs a problem that roll maps representing surfaces of completely different actual electrodes are compared in the coating process and the roll press process. In this case, since the consistency of quality tracking using the overlay roll map is damaged, the quality tracking may not be performed accurately.

The roll map matching unit 1200 according to the present disclosure may perform top and back surface matching in addition to the above-described roll map length matching and coordinate axis matching. Therefore, it is possible to quickly and intuitively track a problem with the quality of the electrode by generating the overlay roll map by the roll map matching of a predetermined logic, even when the top and back surfaces of the electrode are reversed in the series of roll-to-roll processes.

FIGS. 42 and 43 are schematic diagrams showing a series of roll-to-roll processes according to another embodiment and overlay roll maps in the corresponding processes. The roll press process is performed twice in this embodiment.

Referring to FIG. 42, the electrode surface reversal occurred between the coating process and a primary roll press process. However, since the electrode is wound around the rewinder RW of the primary roll press process in the lower winding direction and the electrode is unwound from the unwinder UW of a secondary roll press process in the lower unwinding direction, the electrode surface reversal did not occur between the primary and secondary roll press processes. Therefore, the top and back surface matching unit 1230 sets a control logic value to 1 between the coating process and the primary roll press process and sets a control logic value to 0 between the primary roll press process and the secondary roll press process.

FIG. 43 shows overlay roll maps of the series of roll-to-roll processes of FIG. 42. In the overlay roll maps in FIG. 43, the roll map length matching and the coordinate axis matching were performed by reflecting the change in length of the electrode and the change in coordinate axis occurring between the coating process and the notching process.

In this case, the roll map I of the top surface of the electrode, which is indicated by T, in the coating process corresponds to the roll map IV of the back surface of the electrode, which is indicated by B, in the roll press process due to the surface reversal in the primary roll press process. On the other hand, the roll map IV of the back surface of the electrode, which is indicated by B, in the primary roll press process corresponds to the roll map VI of the back surface of the electrode, which is indicated by B, without surface reversal in the secondary roll press process. Therefore, the overlay roll map of the top surface T of the electrode from the coating process to the notching process is formed of I, IV, VI, and VII, and it is possible to identify quality and product histories between the respective processes therefrom.

In addition, the overlay roll map of the back surface B of the electrode is formed of II, III, V, and VII by reflecting the surface reversal information as well, and it is possible to identify the quality and product histories between the respective processes therefrom.

The roll map matching unit 1200 may be the MES or one component of the MES. In this case, the roll map generation unit 40 may constitute the MES together with the roll map matching unit 1200. Alternatively, the roll map matching unit 1200 may be an SPC or a DW, which is a system that is separate from or an upper level of the MES, or one component included in the SPC or the DW. For example, the roll map matching unit 1200 may be a SPC device/system. Here, the SPC is a management device/system for efficiently operating a process in a statistical method to achieve the quality or productivity target required in the process. Alternatively, the roll map matching unit 1200 may be a data warehouse DW for converting data accumulated in a database into a common format and managing the data. The data warehouse enables data-based decision-making and analysis by integrating data from multiple sources.

Therefore, the coordinate values of the roll maps of each process generated by the roll map generation unit 40 may be matched with the coordinate values of the roll map of the final process through matching operation of comparing and matching the coordinate values of the roll maps of each process such that the remaining electrode in the notching process matches the survival electrodes in each process.

The roll map length matching unit 1210, the coordinate axis matching unit 1220, and the top and back surface matching unit 1230 may be software capable of performing predetermined calculation and matching operations or a computing system in which the software is embedded. For example, each matching unit may be a real-time system, such as an embedded computer system (ECS), and a micro-computer may be employed as the each matching unit. The roll map length matching unit 1210, the coordinate axis matching unit 1220, and the top and back surface matching unit 1230 may mutually perform wired and wireless communication. In FIG. 26, the matching units are separately shown for functional classification. However, for efficient computing processing, one or more of the matching units may be integrated. For example, since both the roll map length matching and the coordinate axis matching are related to the conversion of the coordinate value, the roll map length matching and the coordinate axis matching may be integrally operated as one matching unit. Therefore, a detailed configuration of the roll map matching unit is not limited to the example of FIG. 26.

The roll map and the overlay roll map may be, for example, stored in a storage medium, such as a memory. A plurality of memories may also be provided when necessary. The memory may be a volatile memory or a non-volatile memory. Alternatively, the storage medium may be a hard disk, a CD-ROM, a USB memory, a solid state drive (SSD), or the like. The listed storage media are merely illustrative and are not limited to these examples.

The roll map, the overlay roll map, and related data stored in the storage medium may be freely used in battery manufacturing, quality control, analysis, and problem tracking.

One or more aspects of FIGS. 1-43 may be incorporated into or combined with one or more aspects of the embodiments disclosed in reference to FIGS. 44-50 herein. Accordingly, some elements of FIGS. 44-50 may be similar to elements of FIGS. 1-43, and thus similar or identical reference numerals may be used to depict those elements. Further, detailed disclosure of the similar or identical elements already described may be omitted hereinafter for brevity. However, such omissions are not disclaimers or disavowals, and except to the extent that the similar or identical elements that are already described are inconsistent with the express disclosure herein, in which case the Language in the present disclosure hereinafter controls.

Figure 44:
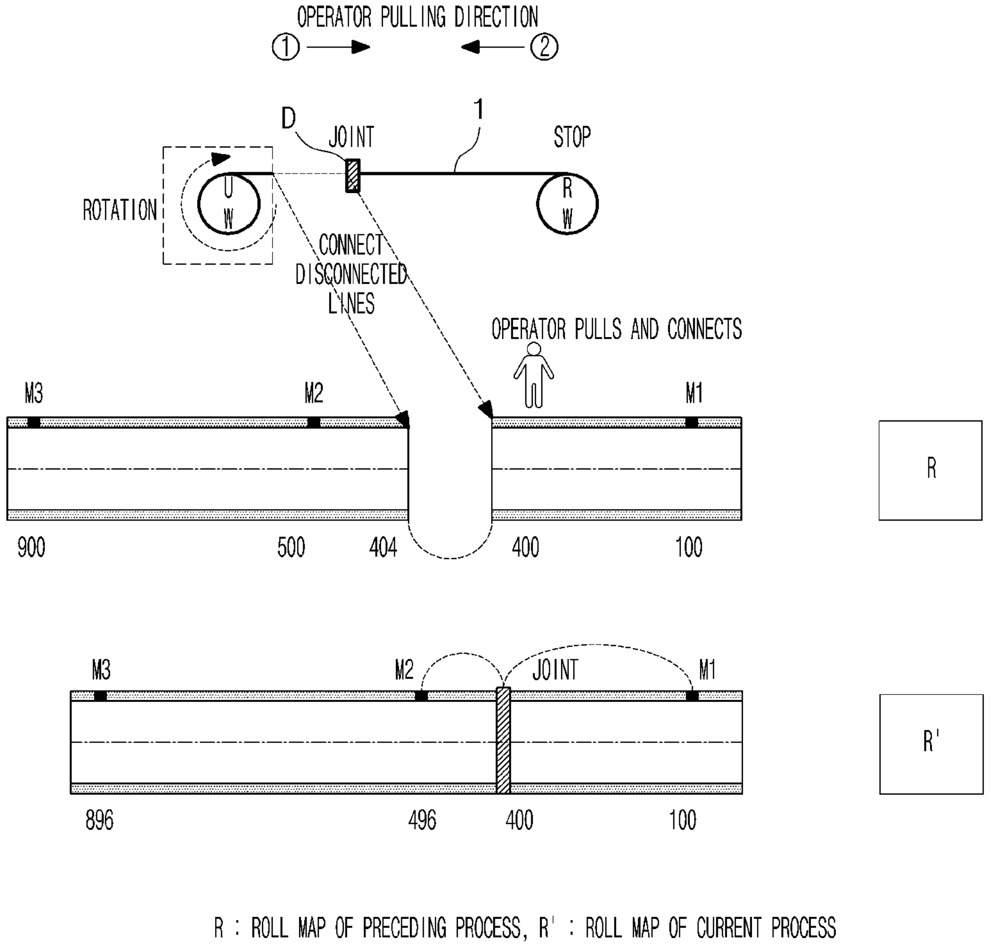
FIG. 44 is a schematic diagram showing an exemplary roll map during an electrode manufacturing process, according to aspects of the present disclosure.

FIG. 44 shows one example of the roll map in the electrode manufacturing process.

In the coating process, the roll press process, and the slitting process, the electrode moves in a roll-to-roll state. The roll map is displayed in a bar shape imitating the movement of the electrode, and a longitudinal dimension of the electrode is displayed in coordinates on the roll map. Since the information on defects, quality, electrode breakage, and the like occurring in the electrode manufacturing process is displayed on the roll map together with the coordinate values, the data on quality or defects in the electrode manufacturing process may be visually and easily identified at a glance. For example, as shown in FIG. 44, when breakage occurs in the electrode 1 in the first process and thus an operator connects the broken electrodes with the joint connection member D, a length of the electrode is reduced by the length of the breakage. Since the roll map imitates such a situation, the coordinates on the roll map may be corrected. Referring to FIG. 44, the roll map R of the first process is corrected and an entire length of the bar and positions of reference points M1, M2, and M3 marked on the electrode are corrected so as to match with the actual electrode in the roll map R' of the second process. As described above, the roll map includes information on electrode loss such as electrode breakage. In addition, the coordinates of the roll map may be displayed as relative coordinates in which a change in length of the electrode is reflected for each process (see R' of FIG. 44) and absolute coordinates in which the change in length of the electrode is not reflected. The relative coordinates and the absolute coordinates may be displayed together on a single roll map. In addition, the roll map displayed in the absolute coordinates may visually display the length of electrode lost due to electrode breakage or the like on the roll map bar.

In a conventional battery manufacturing process including an electrode manufacturing process and a notching process, when defects occur in a battery which is a semi-finished product or a finished product, it is possible to analyze a cause of the defects from and after the notching process. For example, by printing a cell ID on an electrode tab, and by checking the cell ID when there is a problem in a semi-finished battery or a finished battery, it is possible to analyze at which operation the problem has occurred prior to the manufacturing of the semi-finished battery or the finished battery. Therefore, in the battery manufacturing process after the notching process, as it is possible to track the cell ID to determine at which operation and at which position the semi-finished product or the finished product including the cell ID has been manufactured, quality tracking is possible in units of battery cells.

However, the above said quality tracking in units of battery cells is possible only from and after the notching process and cannot be performed in the electrode manufacturing process prior to the notching process. Prior to the notching process, only a lot number of an electrode roll from which a corresponding battery cell is manufactured can be identified. For this reason, when a defective battery cell is detected, the entire electrode roll in the electrode manufacturing process line from which the corresponding battery cell has been produced should be discarded.

Therefore, a development of technology which enables tracking quality in units of battery cells even in the electrode manufacturing process prior to the notching process is required.

Figure 45:
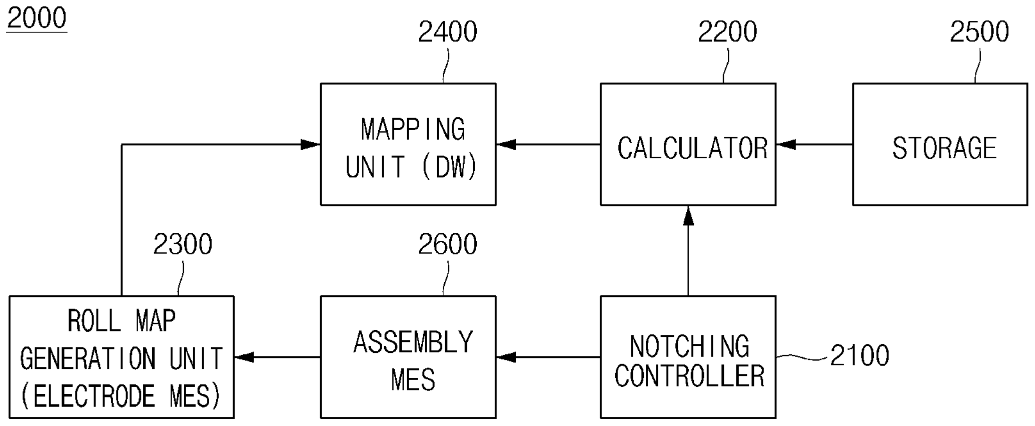
FIG. 45 is a block diagram showing a system for manufacturing a battery, according to aspects of the present disclosure.

FIG. 45 is a block diagram showing a battery manufacturing system 2000 according to the present disclosure.

The battery manufacturing system 2000 according to the present disclosure includes a notching controller 2100 for acquiring electrode coordinate information of an electrode line being transferred in a notching process and a cell ID of a unit electrode, a calculator 2200 for calculating a coordinate value for the cell ID, which is a position of a specific unit electrode being moved in the notching process, from pitch information, which is information on a width of the notched unit electrode, and the cell ID, a roll map generation unit for generating a roll map, which displays a position of the electrode as a coordinate value and is capable of identifying a change in length of the electrode in an electrode manufacturing process before a notching process, from electrode coordinate information transmitted from the notching controller 2100, and a mapping unit 2400 for comparing coordinate values of the roll map with coordinate values of the cell ID and deriving the position of the electrode in the electrode manufacturing process from which the specific unit electrode is derived.

The present disclosure is for tracking the electrode manufacturing process before the notching process on cell by cell basis. Therefore, in order to track the position of the electrode, a position of a tracking target electrode in the notching process should be first specified. In the notching process, since a continuous electrode sheet is processed at intervals of the unit electrode, a specific unit electrode among the unit electrodes will be described as the tracking target electrode.

The battery manufacturing system 2000 according to the present disclosure includes the notching controller 2100, a calculator 2200, a roll map generation unit 2300, and the mapping unit 2400.

The notching controller 2100 controls the transfer of the electrode line being transferred in a roll-to-roll state in the notching process. For example, the controller 2100 is a PLC. The controller 2100 stores the pitch information, which is the information on the width of the unit electrode, for notching the electrode line at an interval of a unit electrode. In addition, the controller 2100 may acquire electrode coordinate information on the electrode line being transferred in the roll-to-roll state between an unwinder and a rewinder. When the electrode is transferred in the roll-to-roll state between the unwinder and the rewinder in the notching process, the electrode coordinate information may be acquired from encoder value information indicating the position of the electrode according to amounts of rotation of the unwinder and the rewinder. In order to describe a function of the notching controller 2100, a typical notching process will be described.

Figure 46:
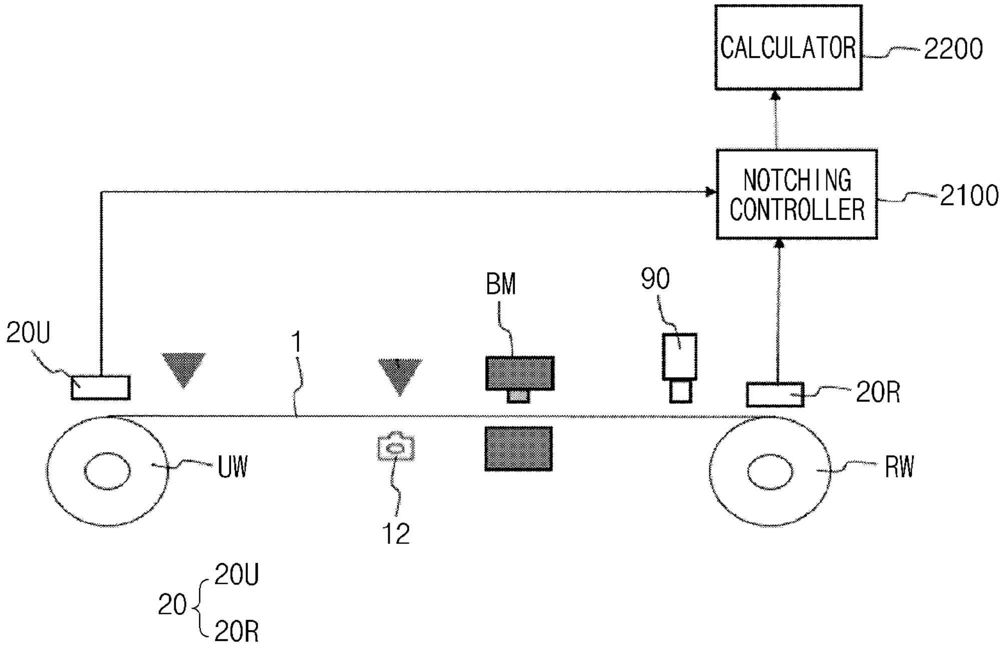
FIG. 46 is a schematic diagram showing a system or apparatus for manufacturing a battery with a notching controller, according to aspects of the present disclosure.

FIG. 46 is a schematic diagram for describing the notching process controlled by the notching controller 2100 according to the battery manufacturing system 2000 according to the present disclosure.

The electrode, which has undergone the roll press process or the slitting process, is loaded onto an unwinder UW as shown in FIG. 46, and is notched while being released from the unwinder UW and moving forward toward a rewinder RW. Since the electrode 1 is unwound from the unwinder UW and wound around the rewinder RW, a movement amount of the electrode or a position of each electrode 1 can be calculated from amounts of rotation of the unwinder UW and the rewinder RW. A rotary encoder 20 is installed at each of the unwinder UW and the rewinder RW. The encoder may extract an encoder value, which is a displacement or a coordinate value of the electrode, from an amount of rotation of a motor. That is, the encoder 20 is connected to a motor driving unit installed in the unwinder UW and the rewinder RW to express an encoder value indicating the position of the electrode according to the amounts of rotation of the unwinder UW and the rewinder RW. Electrode coordinate information (that is, electrode position information) of the electrode line in the notching process may be acquired from information on the encoder value. As shown in FIG. 46, an unwinder encoder 20U and a rewinder encoder 20R are connected to the notching controller 2100 and transmit encoder values according to the movement of the electrode to the notching controller 2100. Therefore, the notching controller 2100 may acquire the electrode coordinate information of the electrode line transferred in the roll-to-roll state from the encoder values.

In one embodiment, the notching controller 2100 may also acquire a cell ID of each unit electrode which is being notched. Referring to FIG. 46, in the notching process, the electrode is punched using a punching device BM to form an electrode tab for each unit electrode. After the punching, a predetermined identification mark is provided on the electrode tab of the unit electrode. For example, a barcode is printed on the electrode tab or the electrode tab is laser marked. The unit electrode, or a semi-finished battery cell or a finished battery cell which is manufactured with the unit electrode can be distinguished from other semi-finished products and finished products by the identification mark such as the barcode or the laser marking. In this sense, the identification mark is referred to as a cell ID indicating an identity of the battery cell. A device for printing the cell ID is not shown in FIG. 46. However, the cell ID of the unit electrode, which has been punch-processed in the punching device BM and has the identification mark printed thereon, is scanned with an identification mark scanner 90 and transmitted to the notching controller 2100. The notching controller 2100 transmits the cell ID and the pitch information to the calculator 2200, and the calculator 2200 may calculate cell ID coordinates, which are a position of a specific unit electrode moving in the notching process, from the pitch information and the cell ID.

Specifically, the calculator 2200 may obtain a sequence number of a specific unit electrode from the identification mark (cell ID) and multiply the sequence number by the pitch to obtain cell ID coordinates. For example, when barcodes as identification marks are sequentially printed on the electrode line in the notching process, the barcodes indicate sequence numbers of the unit electrodes. Generally, a relationship between the barcode (identification mark) and the sequence number of the unit electrode is stored in a storage 2500 such as a server, so that the sequence of the unit electrode can be identified by recognizing the barcode. When a unit electrode of a specific barcode is omitted, this may mean that the unit electrode is missing from the notching line. Therefore, the calculator 2200 can obtain a sequence number of a specific unit electrode by comparing the sequence number stored in the storage 2500 with the identification mark acquired by the identification mark scanner.

For example, when a pitch of the notching process is 0.1 meters and a sequence number of a corresponding specific unit electrode is 5000, cell ID coordinates of the specific unit electrode are 500 meters by multiplying the sequence number by the pitch. In this case, when an electrode length of a notching line is determined to be 760 meters from the electrode coordinate information acquired from the encoder values of the unwinder UW and the rewinder RW, the specific unit electrode may be specified as a unit electrode positioned at a the position of 500 meters within the length of 760 meters.

The calculator 2200 may be, for example, a real-time system such as an ECS, and a microcomputer may be employed as the calculator 2200. As described below, the calculator 2200 calculates the cell ID coordinates and transmits the cell ID coordinates to the mapping unit 2400.

In addition, according to the present disclosure, the roll map generation unit 2300 for generating a roll map from the electrode coordinate information transmitted from the notching controller 2100 is included. Since the present disclosure is for tracking the position of the electrode in the electrode manufacturing process prior to the notching process, the roll map is generated for each detailed process of the electrode manufacturing process. Specifically, the electrode manufacturing process prior to the notching process may include at least a coating process of coating an electrode active material on a current collector to form a coating electrode, and a roll press process of rolling the coating electrode using a press roll. In addition, the electrode manufacturing process prior to the notching process may further include a slitting process of cutting the rolled electrode after the roll press process in the longitudinal direction.

As described above, the roll map imitates an electrode moving in a roll-to-roll state, and a longitudinal dimension of the electrode is represented in coordinates so that a change in the length of the electrode can be determined therefrom.

Since the electrode for the notching process has been manufactured from the electrode transferred in the roll-to-roll state from the processes prior to the notching process such as the slitting process, the roll press process, and the electrode coating process, a roll map including information on the change of the electrode length in the above processes is needed to track the electrode position. The roll map may be generated in each of the electrode coating process, the roll press process, and the slitting process. Information on an electrode removal part, which is removed by an operator when a breakage of an electrode or defects during a corresponding process occur, is displayed on the roll map. Since the longitudinal dimension of the electrode is displayed in coordinates on the roll map, when an actual change in length during a corresponding process occurs due to breakage or connection of the electrode, the change may be displayed on the roll map. In addition, since a plurality of reference points are marked at predetermined intervals on the roll map, a broken length of the electrode may be calculated from the reference points. The reference point on the roll map is marked by imitating a reference point printed on the electrode.

Meanwhile, between each detailed process of the electrode manufacturing process, there is a case in which a predetermined portion of the electrode may be cut off after completion of one of the each detailed process. Usually, since the quality of the electrode at an initial stage and at a final stage of the roll-to-roll process is not uniform in many cases, an electrode at a beginning stage or a termination stage of a corresponding process is cut off in many cases. The above electrode removal part is referred to as "electrode removal part after completion." As described above with reference to FIG. 44, the coordinates displayed on the roll map include relative coordinates in which the change in the length of the electrode is reflected and absolute coordinates in which the change in the length of the electrode is not reflected. Therefore, since the removed electrode part can be displayed together with the coordinate data on the roll map displayed in the absolute coordinates, information on defects or breakage can be visually displayed on the roll map. However, in the present disclosure, for convenience of description, visual information other than the length and coordinates of the electrode will be omitted from the roll map. In the case of the electrode manufacturing process including a plurality of detailed processes, a roll map of a preceding process may be referred to when generating a roll map of a following process. For example, when the electrode is manufactured by the electrode coating process, the roll press process, and the slitting process, the roll map of the electrode coating process is referred to in the following roll press process. When the electrode is removed during the electrode coating process or removed after the coating process is completed, the roll map of the roll press process should reflect (be corrected according to) the above-said electrode removal. That is, the roll map of the roll press process displays a reference point and coordinates with reference to the roll map displaying the absolute coordinates of the electrode coating process, and the coordinates should be corrected by reflecting details related to the change in length of the electrode. In this sense, the roll map including the absolute coordinates of the roll press process may be a roll map including the relative coordinates in the electrode coating process of the preceding process. Likewise, when a change in length of the electrode occurs during or after the roll press process, the change should be reflected in the roll map of the following slitting process. The roll map of the slitting process reflecting the change may be a roll map of absolute coordinates in the slitting process and may be referred to as a roll map of the relative coordinates based on the roll press process.

As described above, the roll map displayed in the absolute coordinates or the relative coordinates is relative with respect to a relationship between the processes. In the present disclosure, types of such coordinates may be appropriately utilized to track the position of the electrode.

The roll map generation unit 2300 may reflect data on the change in length of the electrode in the electrode manufacturing process, which is stored in the roll map generation unit 2300, in the electrode coordinate information transmitted from the notching controller 2100 and generate roll maps of each detailed process of the electrode manufacturing process, for example, the coating process, the roll press process, and the slitting process. For example, the roll map generation unit 2300 may be an MES for managing the electrode manufacturing process or one component of the MES. Similarly to FIG. 46, also in the coating process, the roll press process, and the slitting process, as the electrode is transferred in a roll-to-roll state between the unwinder and the rewinder RW, the electrode coordinate information of the electrode line may be obtained from the encoder value or the like. In addition, when the electrode is removed during a current process (removal during the process) or removed after the process is ended (removal after completion), a removal length may also be determined with a change in interval between the reference points marked on the electrode. As shown in FIG. 46, since the reference point measurement device 12 is disposed adjacent to the electrode line in the electrode manufacturing process, the electrode removal length may be measured using the reference point measurement device. All the pieces of information are stored in an electrode MES. Therefore, when only the electrode coordinate information transmitted from the notching controller 2100 is specified, the data on the change in length of the electrode stored in the MES is added to or subtracted from the electrode coordinate information during the electrode manufacturing process, and thus, the roll maps of the slitting process, the roll press process, and the electrode coating process from which the current notched electrode is derived may be generated through reverse calculation. The MES is provided as a data processing system and provided with a central processing unit, the calculator, a determination unit, and the like, thereby being able to easily generate a roll map from the information. In addition, the MES may also be provided with a predetermined data visualization device to visualize and display the roll map on a screen. Since a process of visualizing data, which is a source, into a diagram or graph is known in the art, a detailed description thereof will be omitted herein.

Referring back to FIG. 45, the notching controller 2100 may transmit coordinate information on the electrode line of the notching process to the MES 2600 of the assembly process, and the MES 2600 of the assembly process may transmit the coordinate information to the roll map generation unit 2300. Since a process after the notching process belongs to an assembly process not the electrode manufacturing process (referred to as the electrode manufacturing process), the notching controller 2100 may be connected to the MES 2600 of the assembly process. In addition, in the notching process, even without generating a roll map, it is possible to track the position of the electrode in the electrode manufacturing process from the coordinate information and the cell ID. However, in order to check the continuity and correlation between the notching process and the preceding processes (e.g., the slitting process or the roll press process), a roll map of the notching process may be generated in the MES 2600 of the assembly process. In this case, the encoder value, the cell ID, and the pitch information, which are acquired by the notching controller 2100 in the above-described notching process, may be used. Since the notching controller 2100 actually acquires the electrode coordinate information of the notched electrode line, when the electrode coordinate information is expressed in coordinates, the expressed coordinates become a roll map of the notching process by itself (see FIG. 48 which will be described below).

The mapping unit 2400 compares the coordinates of the roll map as generated above with the cell ID coordinates to derive the position of the electrode in the electrode manufacturing process from which a specific unit electrode is derived. The mapping unit 2400 may be a data warehouse (DW) for converting and managing data accumulated in a database into data in a common format. Since the DW is able to make a data-based decision and integrate and analyze data from multiple sources, through a mapping operation of comparing and matching the cell ID coordinates from the calculator 2200 and the roll map coordinates from the roll map generation unit 2300, the DW may derive the position of the electrode in the electrode manufacturing process from which the specific unit electrode of the notching process is derived.

A process of estimating the position of the electrode by the mapping unit 2400 will be described in detail with reference to examples and drawings as follows.

Figure 48:
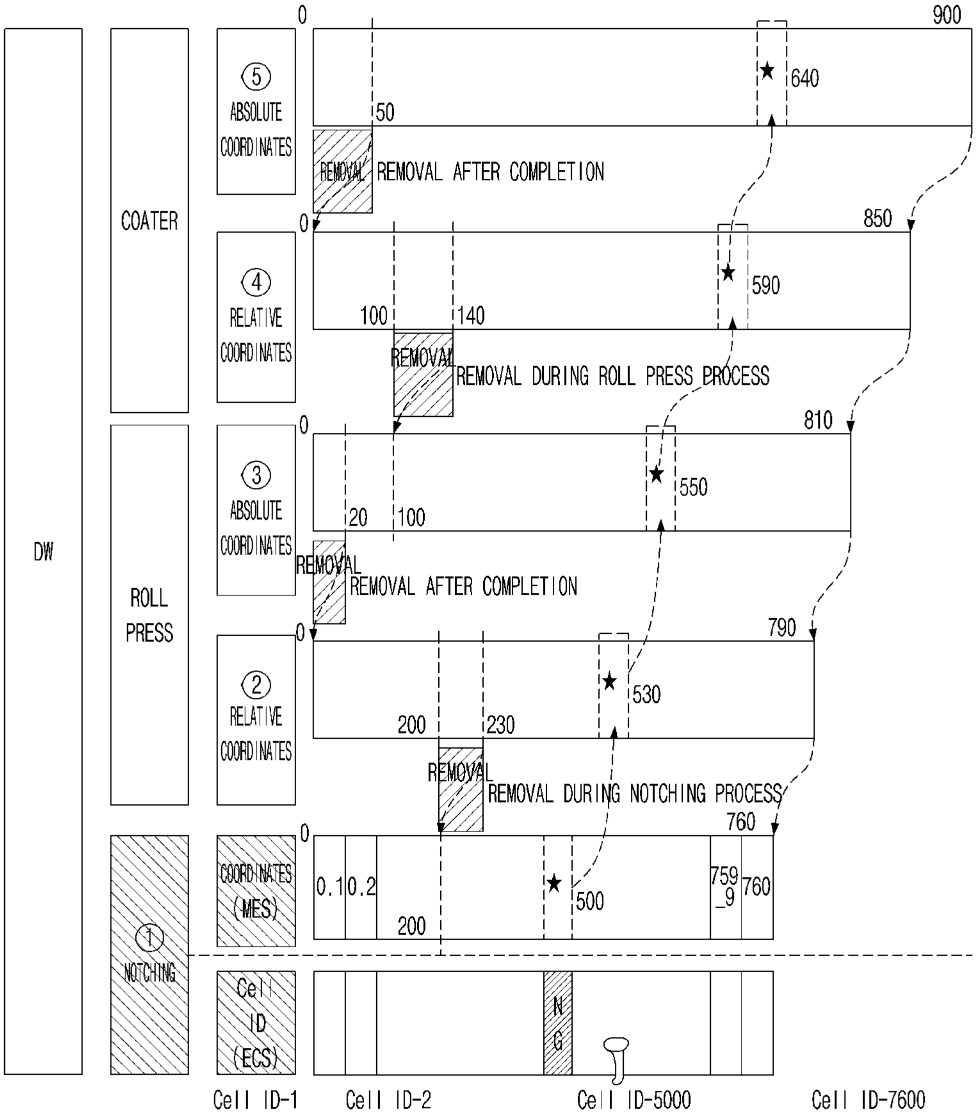
FIG. 48 is a schematic diagram showing an exemplary process of tracking a position of an electrode using a system or apparatus for manufacturing a battery, according to aspects of the present disclosure.

FIG. 48 is a schematic diagram showing an electrode position tracking process of the battery manufacturing system 2000 according to one embodiment of the present disclosure.

In an example shown in FIG. 48, it was confirmed that the stored pitch information was 0.1 meters from the notching controller 2100, and a length (coordinates) of the notched electrode line was 760 meters from the electrode coordinate information of the electrode line transferred in a roll-to-roll state in the notching process.

In addition, the ECS calculator 2200 compared the barcodes with the sequence information input to the storage 2500, checked that a sequence number of the specific unit electrode was 5000 from the barcode (cell ID) printed on the specific unit electrode of the notching process, and multiplied the pitch information (0.1 meters) by the sequence number to calculate the cell ID coordinates as 500 meters.

In addition, the encoder values stored in the notching controller 2100 were transmitted to the electrode MES, which was the roll map generation unit 2300, and the electrode MES generated the roll map of the roll press process and the roll map of the electrode coating process in absolute coordinates and relative coordinates. The cell ID coordinates calculated by the calculator 2200 and the roll map information generated by the electrode MES were transmitted to the mapping unit, and through the following comparison process, the mapping unit 2400 traced whether the specific unit electrode having the cell number 5000 in the notching process was derived from a position of the electrode in the roll press process or from a position of the electrode in the electrode coating process.

Specifically, the mapping unit 2400 added a reduction value of the electrode length, which was confirmed by the roll map (the roll map of the roll press process and the roll map of the coating process) in each detailed process of the electrode manufacturing process to the cell ID coordinates (500 meters) of the specific unit electrode. Usually, the reduction in length of the electrode in the electrode manufacturing process is resulting from at least one of the electrode removal during each detailed process (removal during the process) or the electrode removal after the detailed process (removal after completion of the process).

As described above, the cell ID coordinates of the specific unit electrode of the notched electrode line are 500 meters. Therefore, when a problem, such as defects or the like, occurs in the semi-finished or finished battery cell based on the unit electrode produced at the point of 500 meters, the electrode position in the electrode manufacturing process can be tracked by disassembling a corresponding battery cell and checking the cell ID, and thus, it is possible to analyze a cause of the defect in units of cells, such as which electrode position the defect is derived from.

As described above, when the cell ID coordinates of the specific unit electrode of the notching line are specified, the electrode coordinates in the electrode manufacturing process from which the specific unit electrode is derived are calculated by adding the reduction value of the electrode length confirmed by the roll map of each detailed process of the electrode manufacturing process.

In the one embodiment of the present disclosure, it was assumed that the electrode coating process and the roll press process were performed as the detailed processes, and the roll map of the coating process and the roll map of the roll press process were used. In this embodiment, although the slitting process is performed after the roll press process and a roll map may be generated in the slitting process, the process of tracking an electrode position will be described excluding a change in length of the electrode in the slitting process since the principle of the process of tracking an electrode position is the same. In addition, slitting is simply cutting the roll-pressed electrode in the longitudinal direction, and a severe change in length of the electrode as in the electrode coating process or the roll press process rarely occurs. Therefore, the process of tracking an electrode position will be described herein excluding the roll map of the slitting process. However, when a roll map of the slitting process is generated, it is possible to track the electrode position by comparing coordinates of the roll map using the same principle as in this embodiment.

FIG. 48 shows that, for comparison with the roll press process, a roll map of the notching line is generated in the assembly MES using the electrode coordinate information and the cell ID coordinate of the notched electrode line. However, as described above, the roll map of the notching process shown in FIG. 48 is shown for convenience of description and is not necessarily essential in tracking the electrode position. That is, even when only the cell ID coordinates of the notching process are present, the electrode position may be tracked using the roll map of the electrode manufacturing process. However, as described below, in a case in which the electrode is removed in the notching process, when a roll map of the notching process reflecting the electrode removal is prepared similarly to the electrode manufacturing process, there is an advantage of being able to more easily specify the electrode position in connection with the roll map of the preceding roll press process.

In the notching process, when there is no history of changing the cell ID coordinates of the specific unit electrode, the electrode position is tracked based on the cell ID coordinates.

However, in the notching process, for example, when the electrode is removed during a process of removing a predetermined length, the removed length of the electrode should be added to enable tracking of an accurate electrode position. In this embodiment, it is assumed that the electrode has been removed during the notching process. When intervals between the plurality of reference points marked on the electrode are changed due to the electrode removal, the length of the removed electrode during the notching process may be obtained by comparing set intervals of the reference points. This will be described below.

Referring to FIG. 48, when coordinates of a cell ID-5000 of the notching line is 500 meters, and when 30 meters of the electrode are removed along the notching line (removal during the notching process), the coordinates of the unit electrode become 530 meters in the coordinates of the roll press process prior to the notching process. As described above, the roll map shown in relative coordinates in the roll press process may become a roll map in absolute coordinates based on the notching process. In addition, in consideration of the removal of 30 meters of the electrode during the notching process, an electrode length (coordinates) of the roll map in the roll press process represented in relative coordinates becomes 790 meters.

Next, the roll map represented in absolute coordinates of the roll map of the roll press process is referred. Since 20 meters of the electrode were removed (removal after completion) after the roll press process, when the removed length is added, coordinates of the electrode having a cell ID-5000 of the notching line in the roll press process become 550 meters, and the electrode length (coordinates) becomes 810 meters. Therefore, it can be seen that the specific unit electrode (with the cell ID-5000) having the coordinates of 500 meters in the notching line originated from an electrode having coordinates of 550 meters in the roll map of the roll press process. From the above description, at least the electrode position in the roll press process may be tracked in units of cells.

Furthermore, the process of tracking an electrode position in the electrode coating process will be described. After the electrode position of 550 meters is tracked based on the absolute coordinates of the roll map of the roll press process, it can be seen from the roll map displayed in the relative coordinates of the coating process that 40 meters of the electrode were removed during the roll press process. Therefore, the electrode coordinates of the specific unit electrode (with the cell ID-5000) having the coordinates of 500 meters in the notching line are changed from 550 meters to 590 meters, and the electrode length (coordinates) becomes 850 meters. Finally, the roll map displayed in the absolute coordinates is compared with the roll map displayed in the relative coordinates of the electrode coating process, thereby confirming that 50 meters of the electrode are removed after the electrode coating process, and the electrode coordinates are corrected. Therefore, the electrode coordinates of the specific unit electrode (with the cell ID-5000) having the coordinates of 500 meters in the notching line are changed from 590 meters to 640 meters, and the electrode length (coordinates) becomes 900 meters. That is, it can be seen that the electrode of 760 meters in the notching line originally had a length of 900 meters, and it can be understood that the unit electrode with the cell ID-5000 was manufactured from the electrode at a position of 640 meters during the electrode coating process.

As described above, by comparing the coordinates of the specific unit electrode in the notching line with the coordinates of the roll map, the electrode position of the roll press process or the electrode position of the electrode coating process from which the specific unit electrode was derived can be tracked.

Figure 47A:
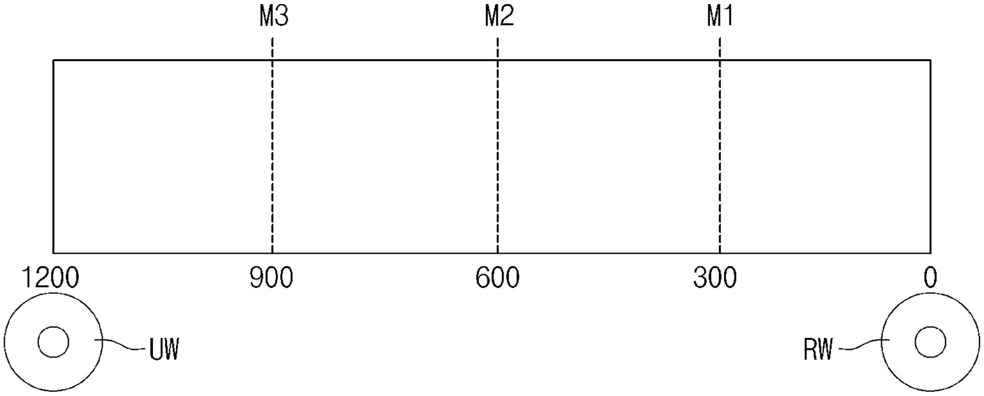
FIG. 47A is a schematic diagram showing an exemplary process of deriving a length or an electrode associated with a removed portion during the notching process, according to aspects of the present disclosure.
Figure 47B:
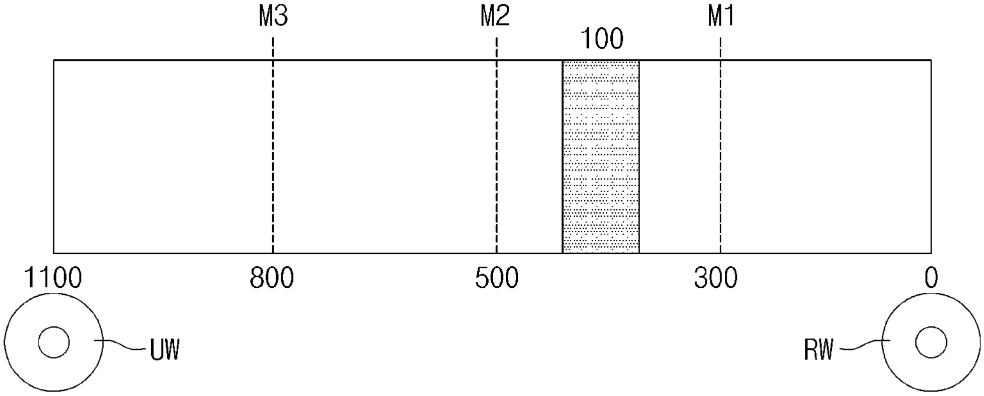
FIG. 47B is a schematic diagram showing an exemplary process of deriving a length or an electrode associated with a removed portion during the notching process, according to aspects of the present disclosure.

FIG. 47 is a schematic diagram for describing a process of deriving a removal length when the electrode is removed during the notching process.

A plurality of reference points are printed on the electrode in the notching process at predetermined intervals. The reference point measurement device 12 for detecting the reference points is shown in FIG. 46. When an electrode loss of 100 meters occurs due to, for example, electrode breakage between a first reference point M1 and a second reference point M2, a coordinate value of the first reference point M1 is not changed, but second and third reference points, M2 and M3, and a position of an end portion of the electrode are changed. When the reference point measurement device 12 and the encoder 20 linked thereto derive the changed reference point coordinate values according to the reference point change, the notching controller 2100 may calculate that a loss amount of the broken electrode becomes 100 meters between the first reference point and the second reference point when compared to a set reference point coordinate value.

Therefore, when an interval between the reference points is changed due to the removal of the electrode resulting from breakage or the like during the notching process, a derived reference point coordinate value is compared with the set reference point coordinate value so that a loss amount of the electrode (the removed length of the electrode) can be calculated.

Figure 49:
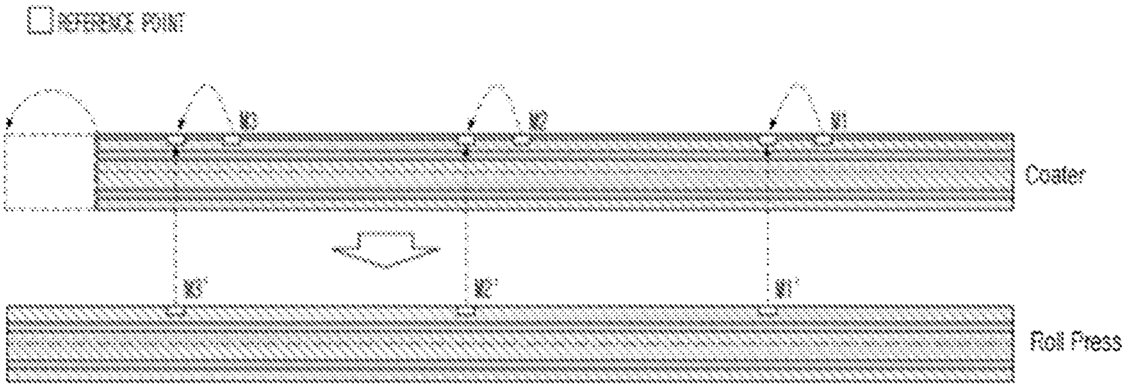
FIG. 49 is a schematic diagram showing that an exemplary electrode elongation during a roll press process after coating the electrode, according to aspects of the present disclosure.

FIG. 49 is a schematic diagram showing that the electrode is elongated in a roll press process after electrode coating, and FIG. 50 is a schematic diagram showing a method of tracking an electrode position according to another embodiment of the present disclosure.

As shown in FIG. 49, the electrode coated in the electrode coating process is rolled by a press roll (not shown) in the roll press process and elongated at a predetermined ratio. Therefore, when the electrode position in the previous process is tracked based on the cell ID coordinates of the unit electrode in the notching process, it is necessary to reflect a coordinate change due to the elongation of the electrode. That is, the mapping unit 2400 may reflect an increment of the electrode whose length is increased by the electrode elongation to accurately derive the electrode position in the electrode coating process from which the specific unit electrode is derived.

Figure 50A:
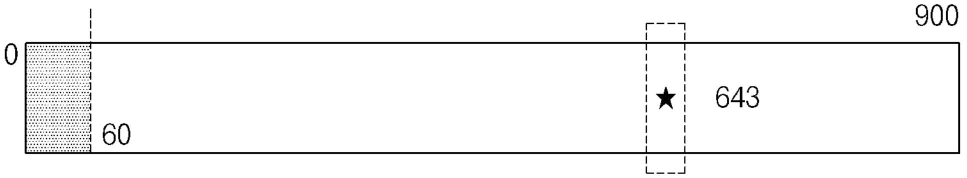
FIG. 50A is a schematic diagram showing an exemplary process of tracking a position of an electrode with a system or apparatus for manufacturing a battery, according to aspects of the present disclosure.
Figure 50B:
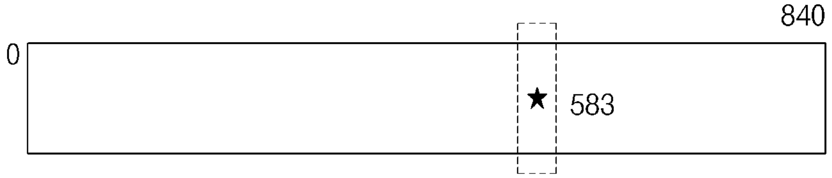
FIG. 50B is a schematic diagram showing an exemplary process of tracking a position of an electrode with a system or apparatus for manufacturing a battery, according to aspects of the present disclosure.
Figure 50C:
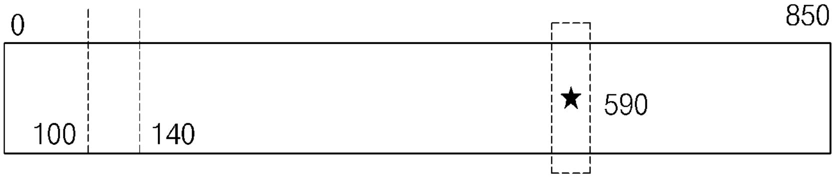
FIG. 50C is a schematic diagram showing an exemplary process of tracking a position of an electrode with a system or apparatus for manufacturing a battery, according to aspects of the present disclosure.

FIG. 50 shows an embodiment in which the electrode position is tracked in consideration of the electrode elongation by the roll press. FIG. 50C shows that the unit electrode with the cell ID of 5000 was originated from 590 meters in the roll press process by reflecting the electrode removal during the roll press process in FIG. 48, and the electrode length at this time was 850 meters. In FIG. 48, the electrode elongation by the roll press is not considered, but in FIG. 50, the electrode position of the electrode coating process is tracked in consideration of the electrode elongation.

FIG. 50A is a roll map displayed in absolute coordinates in the coating process, which shows that 60 meters of the electrode are removed from the electrode of 900 meters after the electrode coating process is completed. FIG. 50B is a roll map displayed in relative coordinates in the coating process by reflecting the removal portion of 60 meters after completion. In the roll map of FIG. 50B, the electrode length (coordinates) becomes 840 meters. When the electrode elongation occurs by the roll press, the roll map of the roll press process is not consistent with the roll map of the electrode coating process. Therefore, it is necessary to correct the roll map by as much as the electrode elongation or to calculate electrode coordinates in consideration of an increase in length of the electrode according to the electrode elongation.

Referring back to FIG. 50C, the coordinates of 590 meters in the electrode having a length of 850 meters in the roll press process are the electrode position of the roll press process from which a specific unit electrode in the notching process is derived.

The coordinates of 590 meters of the electrode in the roll press process is divided by a predetermined ratio (850/840) in which the electrode is elongated becomes 583 meters. That is, 583 meters become the electrode position of the electrode coating process from which the unit electrode of the notching process is derived. However, in this case, since the electrode of 60 meters was removed after the coating process, the actual electrode coordinates of the coating process should be calculated by adding an electrode length of the removed portion after the coating process. When 60 meters of the removal portion are added after the coating process, the electrode length of the coating process becomes 900 meters, and the electrode coordinates of the electrode coating process from which the unit electrode is derived becomes 643 meters so that the tracking of the electrode position is completed.

One or more aspects of FIGS. 1-50C may be incorporated into or combined with one or more aspects of the embodiments disclosed in reference to FIGS. 51-55 herein. Accordingly, some elements of FIGS. 51-55 may be similar to elements of FIGS. 1-50C, and thus similar or identical reference numerals may be used to depict those elements. Further, detailed disclosure of the similar or identical elements already described may be omitted hereinafter for brevity. However, such omissions are not disclaimers or disavowals, and except to the extent that the similar or identical elements that are already described are inconsistent with the express disclosure herein, in which case the language in the present disclosure hereinafter controls.

A lithium secondary battery includes a positive electrode and a negative electrode that are a pair of electrodes, a separator that insulates the positive electrode and the negative electrode from each other, and an electrolyte. Each of the positive electrode and the negative electrode, which are electrodes of the secondary battery, is manufactured by forming a tab on an electrode substrate, which is obtained by applying electrode slurry on a surface of a current collector manufactured as a thin aluminum or copper plate and drying a resultant structure, and cutting the resultant electrode substrate in an appropriate size. The electrode slurry is a mixture of a solvent, an active material, a conductive material, a binder, etc. and is applied on the surface of the current collector to form the electrode substrate. For example, the electrode slurry (paste) is prepared by mixing an active material with other solid particles and milling an obtained mixed particulate material with a dispersion medium such as NMP or water.

Figure 51:
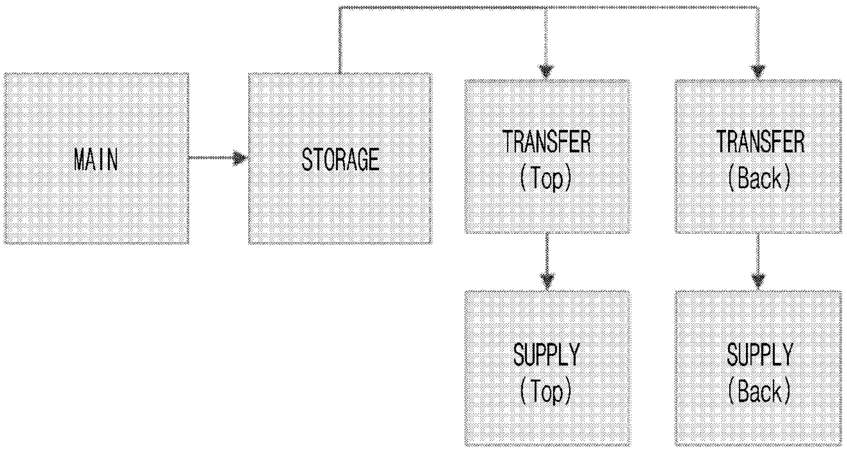
FIG. 51 is a schematic diagram showing an exemplary slurry transfer process between a plurality of tanks installed between a mixer and a coater, according to aspects of the present disclosure.

The electrode slurry is prepared by introducing and mixing components in a mixer and is transferred to a main tank, for example, using a slurry batch container. Thereafter, the electrode slurry is sequentially transferred to a storage tank, a transfer tank, and a supply tank and is finally supplied to a coater (coating die) for coating the electrode slurry on the current collector. FIG. 51 is a schematic diagram showing the transfer of slurry between a plurality of tanks.

However, lot information, i.e., a slurry batch ID, of electrode slurry introduced into the plurality of tanks from a current mixer is managed based on a storage tank other than a supply tank for supplying the electrode slurry to a coater. That is, slurry (logistics) is actually transferred through a main tank, a storage tank, a transfer tank, and a supply tank, but in a current logistics controller or management system, lot information is managed in the storage tank at a midpoint and thus the lot information cannot be tracked at a final supply tank stage at which electrode slurry is introduced into the coater.

Figure 52:
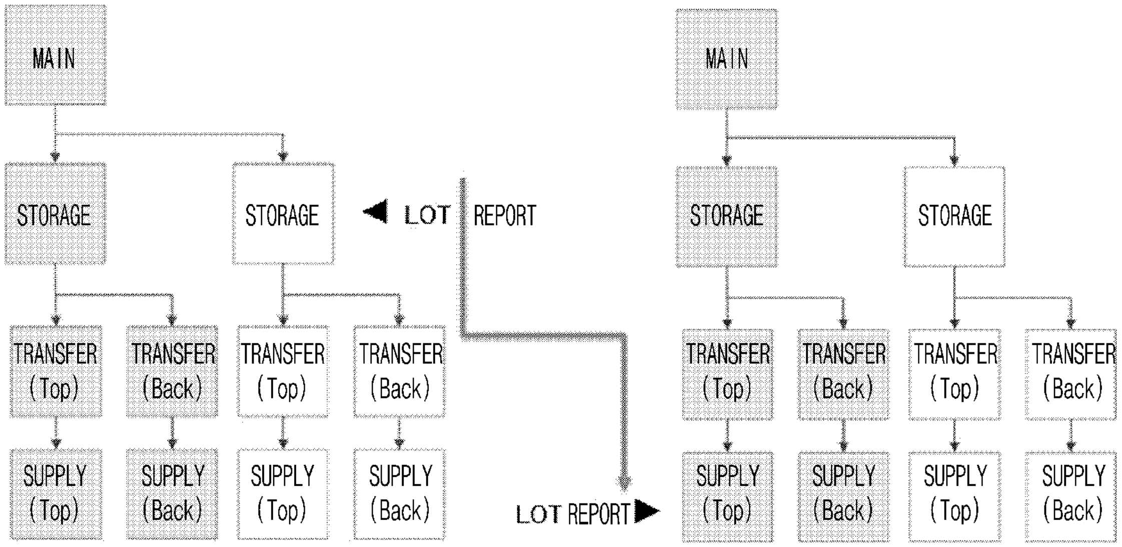
FIG. 52 is a schematic diagram showing a comparison between two exemplary electrode slurry lot information tracking and management mechanisms, in accordance with the present disclosure.

For example, in a process in which the main tank, the storage tank, the transfer tank, and the supply tank are connected through a single pipe, lot information can be tracked in the supply tank even when the lot information is managed in the storage tank, but in a process in which one pipe splits into multiple tanks as shown in FIG. 52, data (lot information) cannot be identified in a final supply tank.

Therefore, in order to solve this problem, it is necessary to develop a technique for tracking lot information of electrode slurry transferred from a main tank to a supply tank and finally managing the lot information by checking the lot information at a stage of the supply tank.

FIG. 52 is a schematic diagram showing the difference between the related art and an electrode slurry lot information tracking management mechanism of the present disclosure.

Referring to FIG. 52A, in the related art, lot information of electrode slurry is managed with respect to a storage tank rather than a supply tank for actually supplying electrode slurry to a coater. That is, at a storage tank stage, the lot information of the electrode slurry is checked and reported to an MES of a factory. Therefore, according to the related art, lot information cannot be tracked at a final supply tank stage.

Referring to FIG. 52B, according to the present disclosure, lot information of electrode slurry is managed in a final supply tank. To this end, according to the present disclosure, lot information of electrode slurry is allocated and recorded for individual tanks as described below. In addition, the lot information of the final supply tank that supplies the electrode slurry to a coater may be detected by referring to a history of the lot information recorded for each of the tanks. Therefore, according to the present disclosure, lot information can be tracked at a final supply tank stage, and lot information detected at a supply tank stage can be transmitted to an MES of a factory to use the lot information to control quality of the electrode slurry used or track the electrode slurry and manage quality or a defect of an electrode or a battery manufactured using the electrode slurry.

The lot information is identification information for identifying data such as type, composition, etc. of the electrode slurry supplied from a mixer to a main tank. For example, the lot information may include a lot number, lot ID, batch ID, etc. of the electrode slurry. Generally, the lot information such as the batch ID is provided on a batch container of the electrode slurry supplied to the main tank from the mixer. The lot information may be recognized by scanning an identification tag (e.g., barcode) on the batch container or recognized by a sensor installed between the mixer and the main tank. The recognized lot information may be transmitted to a controller (a PLC) for controlling the transfer of the electrode slurry, and the controller of the present disclosure may identify the lot information to be used for lot information tracking management.

Figure 53:
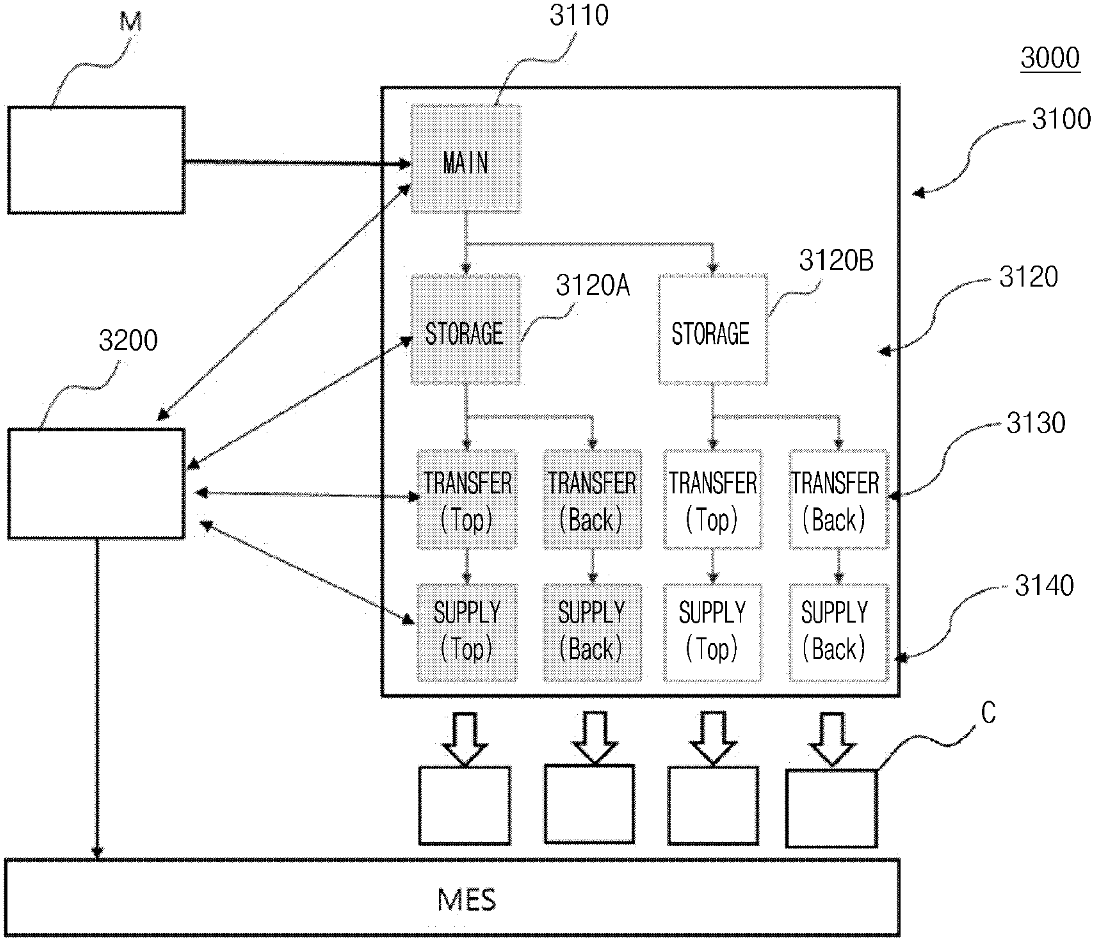
FIG. 53 is a block diagram showing a system for manufacturing a battery, according to aspects of the present disclosure.

FIG. 53 is a block diagram showing a battery manufacturing system 3000 according to one embodiment of the present disclosure.

The battery manufacturing system 3000 according to the present disclosure is intended to manage lot information of electrode slurry when the electrode slurry is transferred to a coater from a mixer M that mixes materials of the electrode slurry to produce the electrode slurry.

A type of electrode slurry to be applied and a surface of a current collector on which the electrode slurry is coated may vary, and the amount of the electrode slurry coated by a coater may also vary according to a coating rate or timing. Therefore, it is difficult to transfer the electrode slurry directly to the coater from the mixer M, and a plurality of tanks 3100 are arranged between the mixer M and the coater. That is, the plurality of tanks 3100 are connected between the mixer M and the coater through a pipe, and configured to sequentially transfer the electrode slurry supplied from the mixer M to the coater.

As shown in FIG. 53, the electrode slurry from a higher tank may be split and transferred to a plurality of lower tanks among the plurality of tanks 3100 in a supply order. As described above, lot information is easy to detect at a stage of a supply tank 3140 in a process in which a main tank 3110 to the supply tank 3140 are single line connected, but lot information is not easy to track at a stage of the final supply tank 3140 when electrode slurry is split and transferred sequentially to lower tanks as shown in FIG. 52. To solve this problem, in the present disclosure, lot information of the electrode slurry supplied to each tank is allocated and recorded for each tank, and lot information of the supply tank 3140 is detected by referring to a history of the lot information at a final supply tank stage as will be described below.

There are cases in which the electrode slurry is applied on only one surface of a current collector, but in most cases, the electrode slurry is applied on top and back surfaces of the current collector to increase a capacity and to manufacture a stacked cell. FIG. 53 shows that electrode slurry is split into top slurry to be applied on the top surface of the current collector and back slurry to be applied on the back surface of the current collector and the top slurry and the back slurry are transferred to a plurality of sub tanks. Slurry may be split directly when the slurry is transferred from a highest tank to a next-highest tank or may be split when the slurry is transferred to a middle or lower tank after the next-highest tank. There may be a large number of cases of the split of the electrode slurry and an arrangement and design of the plurality of tanks according to the split of the electrode slurry in conjunction with the number, arrangement, type, etc. of coaters. That is, in addition to that shown in FIG. 53, a split line of the electrode slurry and a tank line or arrangement according to the split line may be designed in various ways.

FIG. 53 shows a line of the main tank 3110, a storage tank 3120, a transfer tank 3130, and the supply tank 3140 to describe a typical example of the transfer of the electrode slurry from the mixer M to the coater C. The main tank 3110 is a start point of the transfer of the electrode slurry, and the lot information of the electrode slurry introduced into the main tank 3110 may be easily identified. Therefore, according to the present disclosure, the lot information of the electrode slurry from the storage tank 3120 to the supply tank 3140 may be tracked and managed. The plurality of tanks 3100, which are lot information tracking management targets, may include the storage tank 3120 to which the electrode slurry is supplied from the main tank 3110, the transfer tank 3130 to which the electrode slurry is supplied from the storage tank 3120, and the supply tank 3140 to which the electrode slurry is supplied from the transfer tank 3130 and which supplies the electrode slurry to the coater C. In FIG. 53, the electrode slurry from the main tank 3110 is supplied to two storage tanks 3120A and 3120B and is split into top slurry and back slurry in each of the storage tanks 3120A and 3120B, and the top slurry and the back slurry are supplied to a top slurry supply tank and a back slurry supply tank. The top slurry and the back slurry are transferred from the transfer tanks 3130 to the supply tank 3140 in 1:1 correspondence and are supplied to the coaters C. However, this is only an example of an arrangement of a main tank, a storage tank, a transfer tank, and a supply tank, and an arrangement of tank lines for supplying slurry is variable. According to the present disclosure, lot information of the electrode slurry at a supply tank stage may be detected in response to various arrangements of tank lines.

In the present disclosure, a controller 3200 identifies lot information of the electrode slurry and allocates and records lot information of the electrode slurry supplied to each tank for each tank, and detects lot information of a final supply tank, which supplies the electrode slurry to the coater, by referring to a history of the lot information recorded for each tank.

The controller 3200 may be, for example, the controller 3200 (PLC) for controlling the transfer of the electrode slurry. The controller 3200 for controlling the transfer of the electrode slurry may control the transfer of the electrode slurry by controlling an opening and closing valve (not shown) installed on a pipe connecting tanks. Alternatively, when a cover is attached to each tank, the controller 3200 may also control the cover to be opened or closed. A PLC is a typical example of the controller 3200.

When the mixer M and the main tank 3110 are connected through the pipe, the controller 3200 transfers the electrode slurry by opening the valve on the pipe or controlling a cover to be opened when the cover is installed on the main tank 3110. Alternatively, when slurry from the mixer M is transferred to the main tank 3110 through a slurry batch container (not shown), the controller 3200 may control the transfer of the slurry batch container through a conveyor. Alternatively, the controller 3200 may control pipes installed among the main tank 3110, the storage tank 3120, the transfer tank 3130, the supply tank 3140, and the coater C to be opened or closed to supply the electrode slurry to the coater C. The transfer of slurry through the pipe using the valve is well known and thus detailed description thereof is omitted here.

Because the controller 3200 controls the transfer of the electrode slurry, lot information of the electrode slurry introduced into a corresponding tank may be obtained when the electrode slurry is transferred from the mixer M to the main tank 3110 and when the electrode slurry is transferred between tanks.

There may be a case in which it is difficult to transfer the electrode slurry directly to the main tank 3110 from the mixer M due to the difference in capacity between the mixer M and the main tank 3110 or the like. Thus, the electrode slurry from the mixer M may be transferred to the main tank 3110 using a slurry batch container. In this case, an identification tag (e.g., barcode) (not shown) storing information (lot information or the like) about corresponding electrode slurry may be provided on the slurry batch container, and the main tank 3110 may scan the identification tag to obtain the lot information of the electrode slurry. To this end, the main tank 3110 may include an identification tag scanner (e.g., a barcode scanner) (not shown). Alternatively, the identification tag scanner may be installed in a place adjacent to the main tank 3110. The identification tag scanner may transmit identified lot information of the electrode slurry to the controller 3200 so that the controller 3200 may identify the lot information of the electrode slurry.

Identification of lot information of the electrode slurry and allocation of lot information to each tank by the controller 3200 may be performed by detecting a signal of the opening and closing valve applied to the transfer of the electrode slurry by the controller 3200. For example, an electronic opening and closing valve such as a solenoid valve is installed on a connection pipe between the plurality of tanks 3100. The controller 3200 may detect the transfer of electrode slurry corresponding to certain lot information between tanks when the solenoid valve is opened. Therefore, the controller 3200 may allocate and record the lot information of the detected electrode slurry on each tank.

As described above, the controller 3200 for controlling the transfer of electrode slurry may identify certain lot information of electrode slurry from an "open" signal from the identification tag scanner or the solenoid valve, and allocate the identified lot information to each tank and record the same. As shown in FIG. 53, such lot information is allocated and recorded for each tank according to the flow of electrode slurry in a plurality of tank lines connected downstream from upstream. Such lot information is sequentially recorded until a stage of the final supply tank 3140 according to transfer of slurry. Therefore, the controller 3200 according to the present disclosure is capable of identifying and detecting lot information of electrode slurry at a final supply tank stage at which electrode slurry is supplied to the coater by referring to a history of the lot information recorded for each tank.

A process of allocating and recording lot information of electrode slurry for each tank will be described in detail below.

Figure 54:
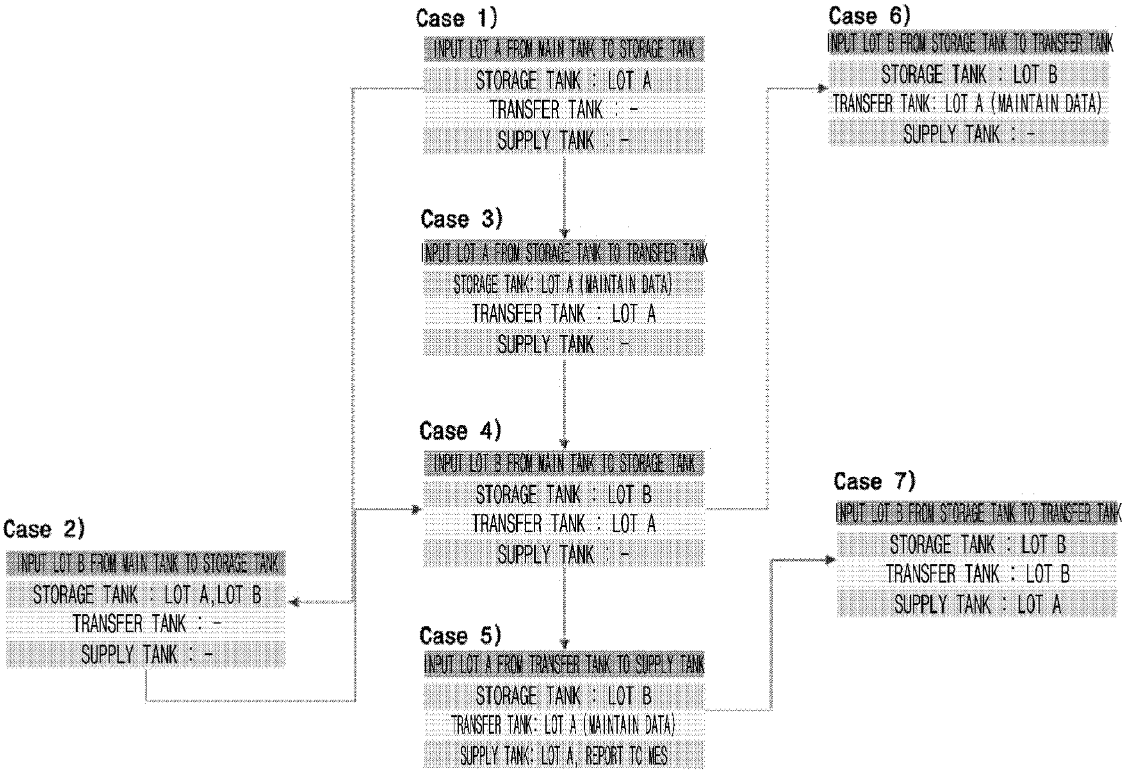
FIG. 54 is a schematic diagram showing an exemplary process of allocating and recording lot information of electrode slurry, according to aspects of the present disclosure.

FIG. 54 is a schematic diagram showing a process of allocating and recording lot information of electrode slurry according to the present disclosure.

In the present disclosure, the controller 3200 allocates and records lot information of the electrode slurry for each tank according to a unique algorithm.

Although FIG. 53 shows that electrode slurry is split and transferred to tanks, basically, the algorithm of the controller 3200 is subjected to the transfer of slurry with respect to one vertical tank transfer line. That is, lot information of electrode slurry is allocated and recorded based on an assumption that the main tank 3110, the storage tank 3120, the transfer tank 3130, and the supply tank 3140 are connected in series for each tank. Lot information of the electrode slurry of the final supply tank 3140 may be detected by finding the flow of the electrode slurry in tank transfer lines connected in series.

Such a lot information allocation algorithm applied to a serial tank transfer line may also apply to an electrode slurry split line. That is, when the main tank 3110, which is a higher tank, is split into the storage tanks 3120A and 3120B, the serial tank transfer line is split into two tank transfer lines, i.e., A tank transfer line consisting of the main tank 3110, the storage tank 3120A, a lower transfer tank and a lower supply tank and B tank transfer line consisting of the main tank 3110, the storage tank 3120B, a lower transfer tank, and a lower supply tank. In this case, the lot information allocation algorithm is applied to the A tank transfer line and the B tank transfer line. When the electrode slurry is split again at a stage of a tank (e.g., the transfer tank 3130) at a midpoint between the A tank transfer line and the B tank transfer line, the number of serial tank transfer lines may be increased according to the split of the electrode slurry, and the lot information allocation algorithm may also be applied to the increased number of serial tank transfer lines to detect lot information at a final supply tank stage. Generally, electrode slurry is 1/1 split in correspondence with each tank and thus the lot information allocation algorithm of the present disclosure is also applied based on an assumption that the electrode slurry is 1:1 split.

Referring to FIG. 54, when lot information is allocated to and recorded on each tank by the controller 3200, the lot information allocated to each tank is maintained without being updated when there is no history of introducing the electrode slurry into a subsequent tank, and when electrode slurry is additionally introduced from a higher tank in a state in which there is no history of introducing the electrode slurry into the subsequent tank, lot information of the additionally introduced electrode slurry is additionally allocated to each tank, in addition to the lot information allocated to each tank.

Specifically, lot information allocated to each tank is maintained without being updated when there is no history of introducing electrode slurry into a next tank (allocation principle 1).

It is assumed that electrode slurry of lot A is introduced into the main tank 3110 at a stage before Case 1 of FIG. 54. Information of lot A is transmitted to the controller 3200 by the identification tag scanner, and the controller 3200 allocates the information of lot A to the main tank 3110. Case 1 of FIG. 54 indicates that the electrode slurry of lot A is introduced from the main tank 3110 to the storage tank 3120 and there is no history of introducing electrode slurry into subsequent tanks (a transfer tank and a supply tank). In this case, the information of lot A allocated to the storage tank 3120 is maintained according to allocation principle 1.

When electrode slurry from a higher tank is introduced in a state in which there is no history of injecting electrode slurry into a subsequent tank, lot information of the additionally introduced electrode slurry is additionally allocated to each tank, in addition to the lot information allocated to each tank (allocation principle 2).

In Case 2 of FIG. 54, when electrode slurry of lot B is introduced into the storage tank 3120 in a state in which the electrode slurry of lot A has been introduced into the storage tank 3120, information of lot B is allocated to the storage tank 3120 in addition to the information of lot A, because slurry is not introduced from the storage tank 3120 into a subsequent tank (allocation principle 2).

The lot information allocation algorithm according to the present disclosure further includes the following allocation principles. The lot information allocated to each tank is maintained without being updated when, although there is a history of introducing electrode slurry into a subsequent tank, electrode slurry is not introduced from a tank higher than the subsequent tank (allocation principle 3).

When there is a history of introducing electrode slurry into a subsequent tank and electrode slurry is introduced from a tank higher than the subsequent tank, the lot information allocated to each tank is updated with lot information of the electrode slurry introduced from the higher tank (allocation principle 4).

In Case 3 of FIG. 54, the electrode slurry of lot A is transferred to the transfer tank 3130 from the storage tank 3120 to which the information of lot A has been allocated. However, in this case, the information of lot A allocated to the storage tank 3120 is not directly deleted and is maintained according to allocation principle 3 because no slurry is introduced into the storage tank 3120 from the main tank 3110, which is a higher tank.

In Case 4, when the electrode slurry of lot B is introduced from the main tank 3110 into the storage tank 3120, the lot information of the storage tank 3120 is updated (allocation principle 4). In this case, there is a history of introducing slurry into the transfer tank 3130 in Case 3 and electrode slurry is introduced into the storage tank 3120 from the main tank 3110, which is a higher tank, in Case 4, allocation principle 4 applies and thus the lot information of the storage tank 3120 is updated from lot A to lot B.

Meanwhile, when the lot information of the additionally introduced electrode slurry is additionally allocated in addition to the lot information allocated to each tank, the lot information allocated to each tank is deleted and only the lot information of the additionally introduced electrode slurry is maintained for each tank according to the first-in first-out principle (allocation principle 5). This corresponds to the case in that the electrode slurry is transferred from Case 2 to Case 4.

When the information of lot A and the information of lot B are allocated to the storage tank 3120 in Case 2, and when the electrode slurry is transferred from the storage tank 3120 to the transfer tank 3130 as in Case 4, the electrode slurry of lot A is transferred to the transfer tank 3130 according to the first-in first-out principle and thus the information of lot A in the storage tank 3120 is deleted and only the information of lot B is maintained.

The transfer of slurry between the storage tank 3120, the transfer tank 3130, and the supply tank 3140 that are located between the main tank 3110 and the coater C can be described using allocation principles 1 to 5. Therefore, these allocation principles can be implemented as an algorithm or a program, and lot information can be allocated to and recorded on each tank, and lot information of the final supply tank 3140 can be detected by referring to a history of the recorded lot information. To this end, a program or software related to allocation principles 1 to 5 may be installed in the controller 3200 or the controller 3200 may be connected to a storage device storing the software.

Referring to Case 5, slurry of lot A of Case 4 is supplied from the transfer tank 3130 to the supply tank 3140. In this case, the information of lot A allocated to the transfer tank 3130 is maintained according to allocation principle 3. Because lot information of the final supply tank 3140 is identified (detected) as lot A, the controller 3200 detects the lot information. The controller 3200 reports the detected lot information to an MES.

While slurry is transferred from Case 4 to Case 6, the electrode slurry of lot B is additionally introduced into the transfer tank 3130 from the storage tank 3120. In this case, the information of lot B is allocated to the transfer tank 3130 in addition to the information of lot A according to allocation principle 2.

When it is assumed that slurry is being transferred from Case 5 to Case 7, the electrode slurry of lot B is introduced into the transfer tank 3130 from the storage tank 3120. This corresponds to allocation principle 4 and thus lot information allocated to the transfer tank 3130 is updated with lot B.

As described above, according to the present disclosure, electrode slurry may be transferred, variable lot information of each tank may be recorded, and lot information of a final supply tank may be detected by referring to a history of the lot information according to a unique lot information allocation algorithm.

Figure 55:
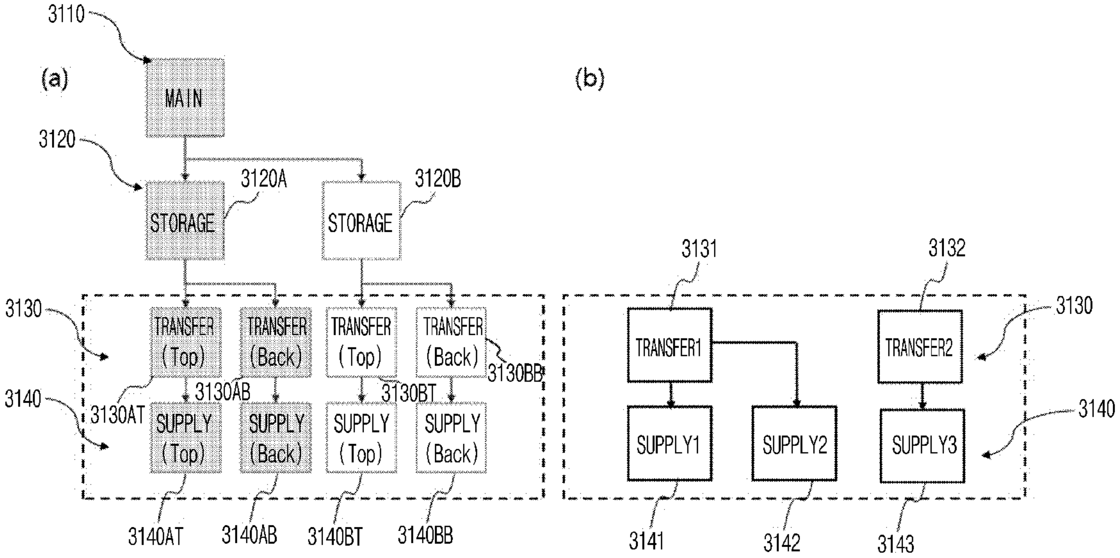
FIG. 55 is a schematic diagram showing a system for manufacturing a battery, according to aspects of the present disclosure.

FIG. 55 is a schematic diagram showing a battery manufacturing system according to another embodiment of the present disclosure.

The controller 3200 of the battery manufacturing system 3000 according to the present disclosure may record and manage identification information of a higher tank, which introduces electrode slurry into a final supply tank 3140, in association with lot information of the electrode slurry transferred to the final supply tank 3140.

According to the present disclosure, lot information may be allocated and recorded for each tank that transfers electrode slurry, and lot information of the supply tank 3140 may be detected using an algorithm of allocation principles 1 to 5 described above. Details of the arrangement and design of a tank transfer line including the storage tank 3120, the transfer tank 3130, and the supply tank 3140 between the main tank 3110 and the coater C are stored in the controller 3200 and thus identification information (tank ID) of each tank of the tank transfer line is also stored in the controller 3200.

The controller 3200 may allocate lot information to each tank and record data of the lot information and the identification information of each tank is input to the controller 3200, and thus the identification information of each tank may match the lot information input to each tank. In particular, identification information of a higher tank for introducing electrode slurry into the final supply tank 3140 may also be recorded and managed. Specifically, referring to FIG. 55A, in a part indicated with a box of broken lines, lot information of electrode slurry introduced into each supply tank 3140 may be identified using the allocation algorithm, and identification information of a transfer tank higher than each supply tank 3140 may be recorded and managed by matching the identification information with the lot information.

For example, when electrode slurry of lot A and electrode slurry of lot B diverge to storage tanks 3120A and 3120B in FIG. 55A, a supply tank 3130AT that supplies top slurry of the electrode slurry of lot A, a supply tank 3130AB that supplies back slurry of the electrode slurry of lot A, a supply tank 3130BT that supplies top slurry of the electrode slurry of lot B, and a supply tank 3130BB that supplies back slurry of the electrode slurry of lot B can be identified at a stage of a supply tank. In addition, tank IDs of transfer tanks 3140AT, 3140AB, 3140BT, and 3140BB, which are tanks for introducing electrode slurry into supply tanks, may be recorded by the controller 3200 to correspond to the supply tanks 3130AT, 3130AB, 3130BT, and 3130BB. Specifically, an ID of a transfer tank may be recorded in association with an ID and slurry lot information of a supply tank.

Alternatively, when lines of transfer tanks and supply tanks are configured as shown in FIG. 55B, a first transfer tank 3131 may be connected with a first supply tank 3141 to introduce electrode slurry into the first supply tank 3141 (a combination of a first supply tank and a first transfer tank), the first transfer tank 3131 may be connected with a second supply tank 3142 to introduce electrode slurry into the second supply tank 3142 (a combination of a second supply tank and the first transfer tank), and the second transfer tank 3132 may be connected with a third supply tank 3143 to introduce electrode slurry into the third supply tank 3143 (a combination of a third supply tank and the second transfer tank). According to the present disclosure, information about an arrangement of each tank may be identified from information about a tank transfer line stored in the controller 3200, and lot information allocated to each tank may be connected with the information about the arrangement of each tank. Therefore, the controller 3200 may record and manage identification information of a higher tank for introducing electrode slurry into a final supply tank in connection with lot information of the electrode slurry of the final supply tank.

In addition, the present disclosure provides an electrode slurry lot information tracking management method which is a method of managing electrode slurry lot information when electrode slurry is transferred from a mixer M to a coater through a plurality of tanks connected through a pipe.

First, the lot information of the electrode slurry supplied from the mixer M is identified and recorded. In this case, in the main tank 3110 among the plurality of tanks 3100, an identification tag on an electrode slurry transfer container (batch container) may be scanned to identify the lot information of the electrode slurry. To this end, an identification tag scanner may be provided at a side of the main tank 3110, and lot information identified by the scanner may be transmitted to and recorded by the controller 3200.

Next, when the electrode slurry is transferred sequentially through the tanks 3100, lot information of the electrode slurry supplied to each of the tanks 3100 is allocated to and recorded on each of the tanks 3100. The allocation and recording of the lot information may be performed by the controller 3200 for transferring the electrode slurry between tanks.

The allocation of the lot information may be performed according to allocation principles 1 to 5 described above.

Lastly, lot information of a final supply tank 3140 that supplies electrode slurry to the coater is detected by referring to a history of the lot information recorded for each tank. The controller 3200 may detect the lot information of the final supply tank 3140 by referring to the lot information recorded by each tank according to allocation principles 1 to 5. The detected lot information may be transmitted to an MES of a factory to be used to control the quality of the electrode slurry, manage electrodes and final products, and analyze causes of defects.

According to the present disclosure, the controller 3200 may identify the type of electrode slurry introduced for each coater by detecting electrode slurry lot information at a final supply tank stage. In addition, the electrode slurry lot information may be transmitted to an MES of a server or factory to be used for quality control of electrodes and batteries. Specifically, when a defect such as a defective exterior occurs in an electrode coated with electrode slurry by a certain coater, the quality of the electrode slurry may be tracked by identifying lot information of the electrode slurry of the electrode. When a defect occurs in a battery that is a final product, a cause of the defect may be found by tracking lot information of an electrode and electrode slurry.

During the manufacturing process of the negative electrode of the battery cell, since the laser device may mark a unique physical ID on the foil of the negative electrode, it is possible to secure the traceability of each of the plurality of negative electrodes based on the marked physical ID. However, since the foil of the positive electrode is made of an aluminum material, there is a problem that fire, soot, or dust is generated upon marking and thus it is impossible to generate the physical ID. Therefore, there is a problem that it is impossible to secure the traceability of each positive electrode.

One of embodiments of the present disclosure provides a system and a method for manufacturing a battery, which are capable of tracking the data of a positive electrode by generating a virtual ID based on specification information on the positive electrode.

The terms, such as first, second, A, B, (a), and (b) may be used to describe components of the embodiments of the present disclosure. The terms are only for the purpose of distinguishing one component from another, and the nature, sequence, order, or the like of the corresponding components is not limited by the terms. In addition, unless otherwise defined, all terms (including technical and scientific terms) used herein have the same meanings as those commonly understood by those skilled in the art to which embodiments disclosed in the present disclosure pertains. The terms defined in a generally used dictionary should be construed as meanings that match with the meanings of the terms from the context of the related technology and are not construed as an ideal or excessively formal meaning unless clearly defined in the present disclosure.

One or more aspects of FIGS. 1-55 may be incorporated into or combined with one or more aspects of the embodiments disclosed in reference to FIGS. 56-62 herein. Accordingly, some elements of FIGS. 56-62 may be similar to elements of FIGS. 1-55, and thus similar or identical reference numerals may be used to depict those elements. Further, detailed disclosure of the similar or identical elements already described may be omitted hereinafter for brevity. However, such omissions are not disclaimers or disavowals, and except to the extent that the similar or identical elements that are already described are inconsistent with the express disclosure herein, in which case the language in the present disclosure hereinafter controls.

Figure 56:
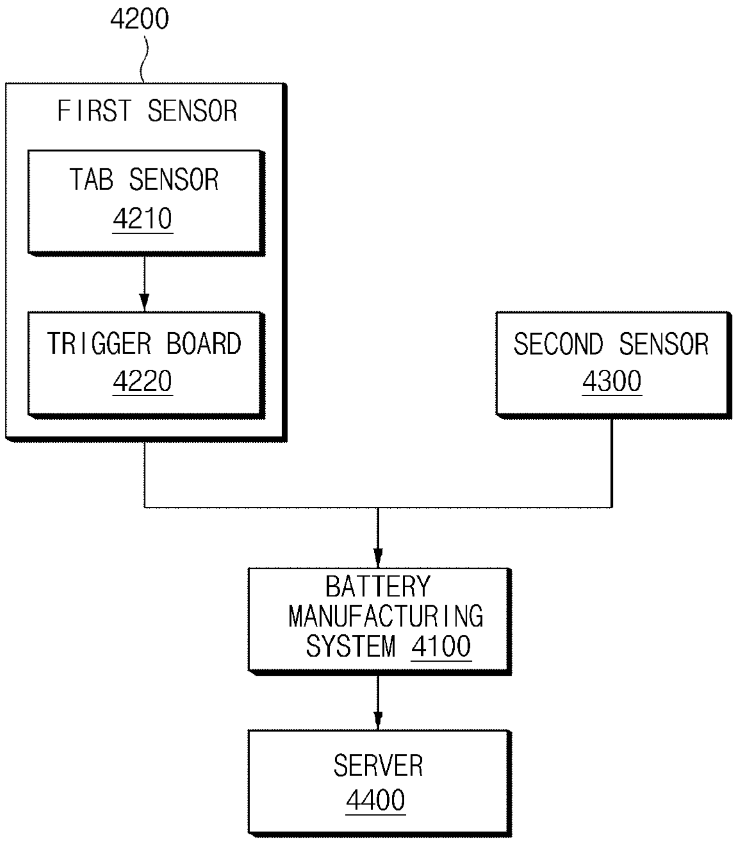
FIG. 56 is a block diagram showing an exemplary battery process system according, to aspects of the present disclosure.

FIG. 56 is a view for a general description of a battery process system according to one embodiment of the present disclosure.

According to various embodiments, the battery may include a battery cell, which is a basic unit of the battery that may be used by charging and discharging electrical energy. The battery cell may be a lithium ion (Li-ion) battery, a lithium ion (Li-ion) polymer battery, a nickel cadmium (Ni—Cd) battery, a nickel-metal hydride (Ni-MH) battery, and the like, but is not limited thereto. The battery cell may supply power to a target device (not shown). To this end, the battery cell may be electrically connected to the target device.

Here, the target device may include an electrical, electronic, or mechanical device operated by receiving power from a battery pack (not shown) including a plurality of battery cells. For example, the target device may be not only small products, such as a digital camera, a P-DVD, a MP3P, a cell phone, a PDA, a portable game device, a power tool, and E-bike, but also large-sized products requiring high power, such as an electric vehicle or a hybrid electric vehicle, a power storage device for storing surplus power generation power or renewable energy, or a power storage device for backup, but is not limited thereto.

The battery cell may include an electrode assembly, a battery case for accommodating the electrode assembly therein, and an electrolyte solution injected into the battery case to activate the electrode assembly. The electrode assembly is formed by interposing a separator between a positive electrode plate formed by coating a positive electrode current collector with a positive electrode active material and a negative electrode plate formed by coating a negative electrode current collector with a negative electrode active material, and the electrode assembly may be manufactured in a jelly roll type, a stack type, or the like according to the type of battery case and accommodated inside the battery case. The battery case serves as an exterior material for maintaining and protecting the shape of the battery from an external impact, and the battery cell may be classified into cylindrical, prismatic, and pouch types according to the type of the battery case.

According to an embodiment, the battery cell may be manufactured through a series of manufacturing processes including an electrode manufacturing process, an assembly process, and a formation process. Here, the assembly process may include an operation of assembling a positive electrode plate and a negative electrode plate manufactured through the electrode manufacturing process and injecting an electrolyte solution therebetween, and include a notching operation, a winding operation, an assembly operation, and a packaging operation.

The notching operation of the assembly process may be defined as an operation of cutting the positive plate and the negative plate according to the shape of the battery in order to manufacture a positive electrode tab and a negative electrode tab. In the notching operation, non-coating or uncoated parts of the roll-shaped positive electrode plate and negative electrode plate that have completed the electrode manufacturing process are cut off, and the roll-shaped positive electrode plate and negative electrode plate are notched according to various shapes of batteries.

Hereinafter, an example in which a battery process system is applied to the assembly process will be described. For example, the battery process system may be used in the notching operation of the assembly process, but is not limited thereto.

Referring to FIG. 56, the battery process system may include a battery manufacturing system 4100, a first sensor 4200, a second sensor 4300, and a server 4400.

The battery manufacturing system 4100 may collect and manage data of the electrode generated in the battery manufacturing process in real time. For example, the battery manufacturing system 4100 may collect and analyze data or graph data generated in the battery process system, such as a process progress situation of the battery process system, whether an alarm has occurred, a temperature, a pressure, and quantity.

The battery manufacturing system 4100 may track each electrode to manage data of each of at least one electrode generated during the process of manufacturing an electrode assembly. First, for the negative electrode, a physical ID in in the form of a barcode may be generated for a negative electrode tab from a laser device in the notching operation of the battery assembly process. That is, each negative electrode may be marked with an unique physical ID in the notching operation, and a barcode ID marked on a positive electrode tab may be recognized through a barcode reader (BCR) device. Therefore, since each of the plurality of negative electrodes matches the physical ID, it is possible to secure the traceability of the data in an upper level system based on the physical ID. In the case of the negative electrode, the battery manufacturing system 4100 may manage each negative electrode based on the physical ID marked on the negative electrode tab.

Meanwhile, in the case of the positive electrode, the battery manufacturing system 4100 may receive data of each of one or more positive electrodes from the first sensor 4200 and the second sensor 4300 of the battery process system and track and manage the positive electrode based on the received data.

Specifically, the battery manufacturing system 4100 may receive specification information on at least one positive electrode from the first sensor 4200 capable of checking the specification information on the positive electrode.

The first sensor 4200 may include a tab sensor 4210 and a trigger board 4220. First, the tab sensor 4210 may determine specification information on the positive electrode tab. Specifically, the tab sensor 4210 may determine a length, that is, a pitch of each positive electrode tab. The tab sensor 4210 may transmit the detected length of each positive electrode tab to the trigger board 4220. The trigger board 4220 may generate count information on the positive electrode tab based on the length of each positive electrode tab received from the tab sensor 4210. That is, the trigger board 4220 may increase a count value for each received length of each positive electrode tab. The trigger board 4220 may increase a binary coded decimal (BCD) code by 1 whenever the count value for each length of each positive electrode tab increases. The trigger board 4220 may convert the generated count value for each length of each positive electrode tab into the form of BCD code and transmit the converted count value to the battery manufacturing system 4100.

In addition, the battery manufacturing system 4100 may receive position coordinates of at least one electrode from the second sensor 4300 capable of determining position coordinates of the positive electrode.

The second sensor 4300 may calculate position coordinates of each of one or more electrodes. The second sensor 4300 may include an encoder installed in the rewinder RW of a notching device for notching at least one electrode. The second sensor 4300 may calculate the position coordinates of the electrode based on a linear movement distance of the electrode.

The battery manufacturing system 4100 may generate virtual identification information on each of one or more positive electrodes based on the specification information and position coordinates of the positive electrode. That is, the battery manufacturing system 4100 may track and manage the data on the positive electrode based on the virtual identification information on the positive electrode generated based on the specification information and position coordinates of the positive electrode.

In addition, the battery manufacturing system 4100 may transmit the data on the positive electrode tracked based on the virtual identification information on the positive electrode to the server 4400, which is an upper level system. Here, the server 4400 may integrate the data on the positive electrode received from the battery manufacturing system 4100 such as quality, defects, and inspection information on each positive electrode, and manage the integrated data. The server 4400 may include, for example, a cloud computing technology.

Hereinafter, an operation of generating the virtual identification information on the electrode and collecting and managing the data of the electrode in the battery manufacturing system 4100 will be described. In addition, hereinafter, an example for a positive electrode as the electrode is described, but the present disclosure is not limited thereto.

Figure 57:
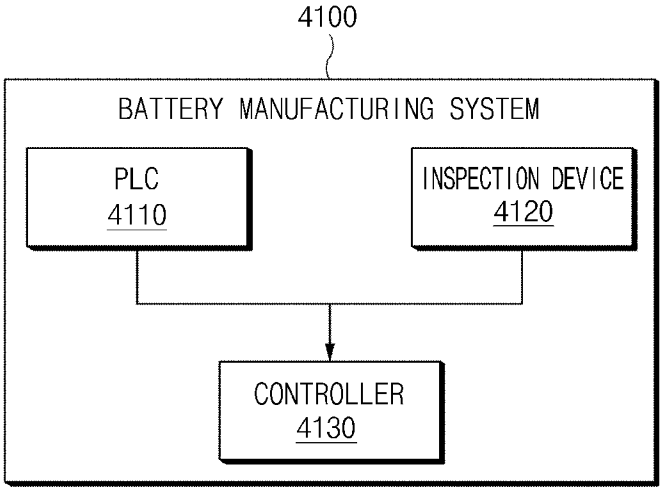
FIG. 57 is a block diagram showing an exemplary system for manufacturing a battery, according to aspects of the present disclosure.

FIG. 57 is a flowchart showing a configuration of the battery manufacturing system 4100 according to one embodiment of the present disclosure.

Referring to FIG. 57, the battery manufacturing system 4100 may include a PLC 4110, an inspection device 4120, and a controller 4130.

The PLC 4110 may be defined as a control device used for maintaining, managing, automatically controlling, and monitoring the battery process system. For example, the PLC 4110 may manage the driving of an electrode notching device (not shown).

The PLC 4110 may receive a plurality of control signals. The PLC 4110 may simultaneously or sequentially process the plurality of control signals using embedded software. The software of the PLC 4110 may be stored in a volatile or non-volatile memory. The software of the PLC 4110 may process the input control signals in real time.

The PLC 4110 may receive specification information on at least one electrode from the first sensor 4200. Specifically, the PLC 4110 may receive a length, that is, pitch information of at least one electrode tab from the first sensor 4200.

The PLC 4110 may generate count information on the at least one electrode generated based on the length of the at least one electrode from the first sensor 4200. Specifically, the PLC 4110 may receive a quantity count value of at least one electrode according to the length of the electrode from the first sensor 4200. Here, the quantity count value of the electrode may include a BCD code.

Figure 58:
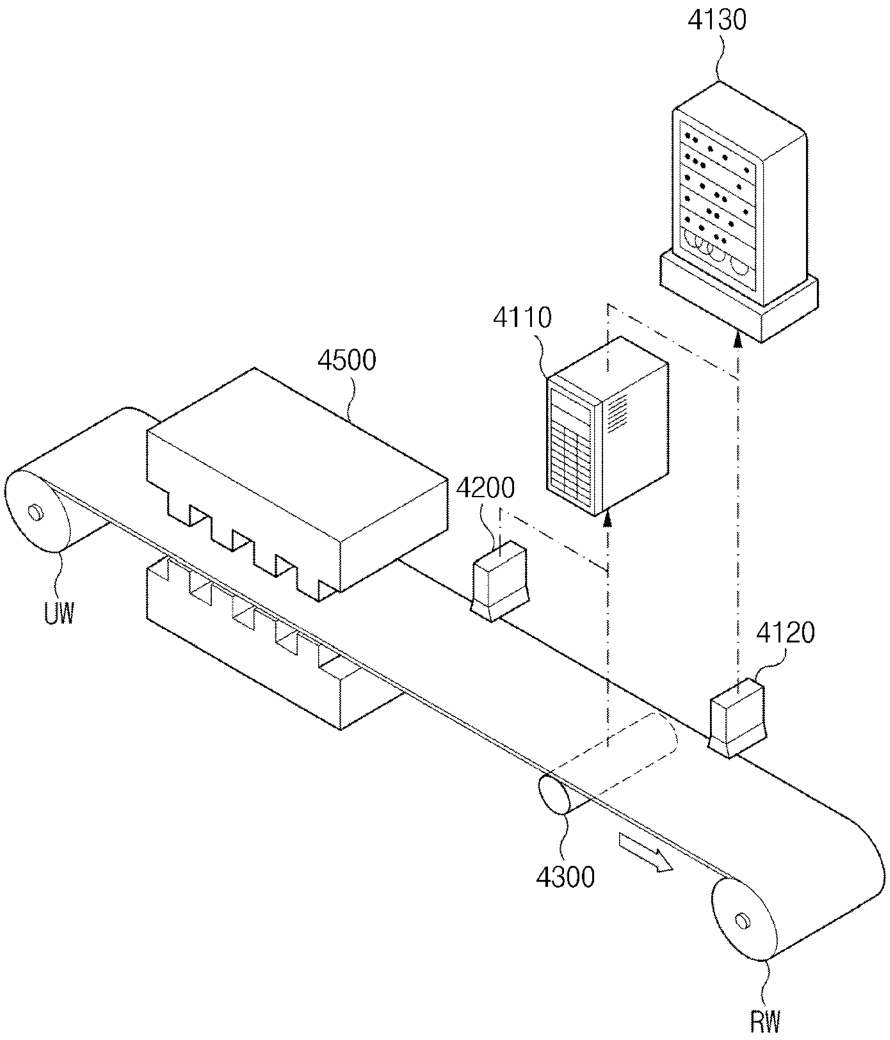
FIG. 58 is a schematic diagram showing an exemplary notching process, according to aspects of the present disclosure.

The PLC 4110 may receive position coordinates of the at least one electrode from the second sensor 4300. Here, the second sensor 4300 may include an encoder installed in the notching device for notching the at least one electrode. FIG. 58 is a view for describing the notching process according to one embodiment of the present disclosure.

Referring to FIG. 58, a notching device 4500 may cut and process the electrode. The electrode includes a coating part coated with an electrode active material and a non-coating part without the electrode active material. The notching device 4500 may cut the non-coating part provided on the electrode, and an electrode tab may be processed.

The first sensor 4200 may generate specification information including a length of the electrode tab processed through the notching device 4500 and a quantity count value according to the length of the tab.

The second sensor 4300 may calculate the position coordinates of the at least one electrode. Here, the second sensor 4300 may include an encoder installed in a rewinder RW of the notching device 4500 for notching the at least one electrode. According to the embodiment, here, the encoder may be installed outside an unwinder UW or the rewinder RW of the notching device 4500. In addition, according to the embodiment, the encoder may be embedded in the unwinder UW or the rewinder RW of the notching device.

The second sensor 4300 may calculate the position coordinates of each of the one or more electrodes based on the number of pulses input from the encoder. Specifically, the encoder may be installed in a driving motor for driving the rewinder RW of the notching device to calculate a movement distance of the electrode according to the number of rotations of the driving motor. The encoder may capture light passing through a plurality of slits of a rotating plate of the driving motor and generate pulse signals. The second sensor 4300 may calculate the number of rotations of the driving motor based on the pulse signals input from the encoder and calculate a linear movement distance at which the electrode has moved between the unwinder UW and the rewinder RW based on the number of rotations of the driving motor. The second sensor 4300 may calculate the position coordinates of the electrode based on the linear movement distance of the electrode.

The PLC 4110 may receive the position coordinates of the at least one electrode from the second sensor 4300 including the encoder. According to the embodiment, the PLC 4110 may receive coordinates of a roll map of the at least one electrode from the second sensor 4300 including the encoder.

Figure 59:
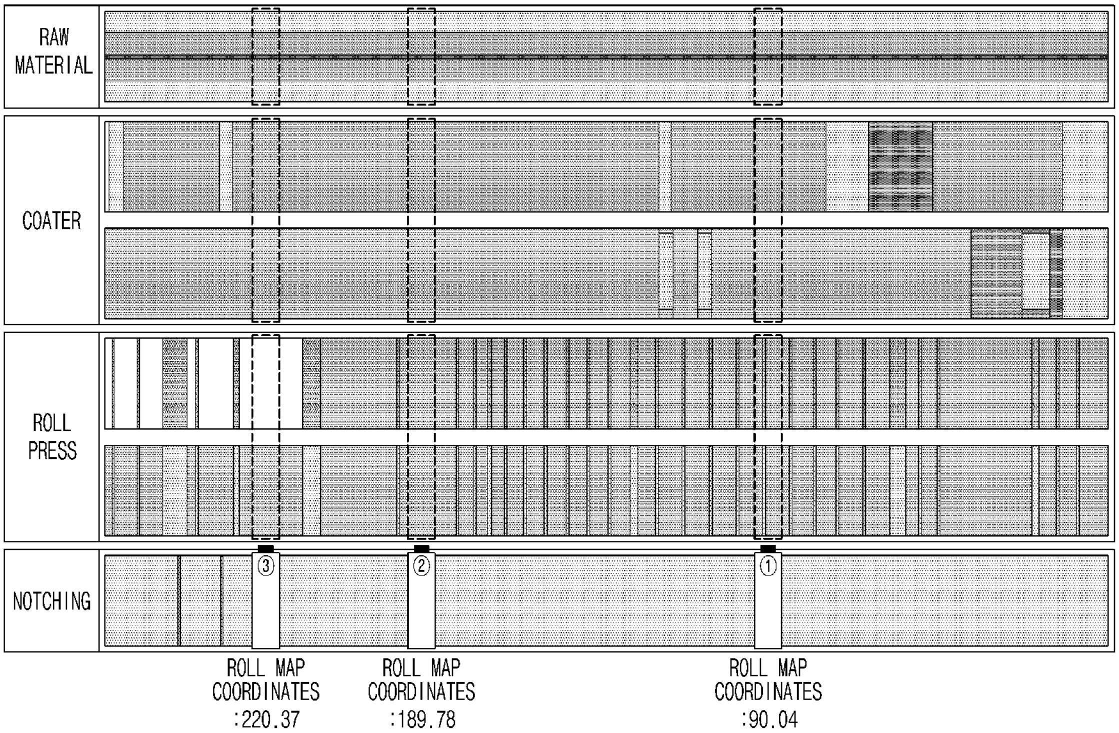
FIG. 59 is a schematic diagram showing coordinates of a roll map, according to aspects of the present disclosure.

FIG. 59 is a view showing the coordinates of the roll map according to one embodiment of the present disclosure.

Referring to FIG. 59, the PLC 4110 may receive the coordinates of the roll map of the at least one electrode from the second sensor 4300 including the encoder. Here, the roll map means displaying data on quality or defects of the electrode, or electrode manufacturing in the electrode manufacturing process on a roll map bar imitating an electrode in a roll-to-roll state. When a battery is manufactured with the electrode manufactured in the electrode manufacturing process and defects occur in the battery, electrode manufacturing history data is required to identify whether the defects have occurred by any cause. The roll map may record the electrode manufacturing history data of consecutive electrode manufacturing processes such as the electrode coating process, the roll press process, and the notching process and specify the cause of defects in the correlation with following processes.

For example, during the electrode notching process, the roll map may be displayed on the roll map bar in a bar shape imitating a moving actual electrode installed between the unwinder UW and the rewinder RW of the notching device 4500 in the roll-to-roll state. In addition, the roll map may be displayed on a screen in synchronization with a path of the electrode moving between the unwinder UW and the rewinder RW of the notching device 4500.

The second sensor 4300 may generate the position coordinates, that is, the coordinates of the roll map of the at least one notched electrode moving between the unwinder UW and the rewinder RW.

For example, the PLC 4110 may receive "220.37" as coordinates of a roll map of an electrode ③ shown in FIG. 59 from the second sensor 4300. In addition, for example, the PLC 4110 may receive "189.78" as coordinates of a roll map of an electrode ② shown in FIG. 59 from the second sensor 4300. In addition, for example, the PLC 4110 may receive "90.04" as coordinates of a roll map of an electrode ① shown in FIG. 59 from the second sensor 4300.

The PLC 4110 may generate identification information on each of one or more electrodes based on specification information on each of the one or more electrodes received from the first sensor 4200 and position coordinates of each of the one or more electrodes received from the second sensor 4300. Specifically, the PLC 4110 may generate a virtual ID of each of the one or more electrodes based on specification information on at least one positive electrode tab received from the first sensor 4200 and coordinates of a roll map of the at least one positive electrode received from the second sensor 4300.

The inspection device 4120 may inspect the at least one electrode and generate inspection information. Here, the inspection device 4120 may include, for example, a vision inspection sensor. Here, the vision inspection sensor may determine a shape, size, character, pattern, or the like of an inspection target using an industrial camera like a human eye and inspect physical faults or the presence or quality of missing parts. The inspection device 4120 may inspect the quality of the at least one electrode using the vision inspection sensor and generate the inspection information. Specifically, the inspection device 4120 may capture the electrode to acquire a captured image and analyze the image of the electrode to inspect the presence of defects or quality. Here, the defect may include various defects such as an alignment defect and a size defect as well as an electrode defect and an electrode quality defect.

The inspection device 4120 may measure pitches of a plurality of tabs formed by notching by the notching device 4500.

The inspection device 4120 may receive the specification information on the at least one electrode from the first sensor 4200. The inspection device 4120 may add the received specification information on the at least one electrode to the generated inspection information on the at least one electrode. The inspection device 4120 may add the specification information on the at least one electrode to the inspection information on the at least one electrode and transmit the added information to the controller 4130.

The controller 4130 may receive the specification information on each of the at least one electrode and the virtual identification information on the at least one electrode from the PLC 4110. In addition, the controller 4130 may receive the specification information on the at least one electrode and the inspection information on the at least one electrode from the inspection device 4120. The controller 4130 may match and manage the virtual identification information on the at least one electrode received from the PLC 4110 and the inspection information of the at least one electrode received from the inspection device 4120. Specifically, the controller 4130 may match and manage an virtual ID of the at least one electrode and the inspection information on the at least one electrode.

The controller 4130 may match the virtual ID of the at least one electrode with the inspection information on the at least one electrode and generate integrated inspection information on the at least one electrode.

FIG. 60 is a view showing integrated inspection data according to one embodiment of the present disclosure.

Referring to FIG. 60, the controller 4130 may integrate a notching time, a virtual electrode ID, an ID of a lot input ("INPUT Lot ID") to form the electrode, and roll map coordinate information of each of the at least one notched electrode and generate the integrated inspection data. Here, the INPUT Lot ID is a lot number of the electrode roll when the electrode roll is installed between the unwinder UW and the rewinder RW in the roll-to-roll state.

The controller 4130 may transmit the generated integrated inspection information to the server 4400. Here, the server 4400 may be, for example, a SPC device. Here, the SPC is a management method and device for efficiently operating a process in a statistical method to achieve a quality or productivity target required for the process. The server 4400 may statistically manage the integrated inspection data of each of the at least one electrode acquired through the controller 4130 to check the quality and position coordinates of the electrode and monitor a manufacturing status of the electrode together.

As described above, according to the battery manufacturing system according to one embodiment of the present disclosure, it is possible to generate the virtual ID based on the specification information of the positive electrode, thereby securing the traceability of the data on the positive electrode.

The battery manufacturing system may generate the virtual ID of the positive electrode in the same method as a system for tracking a negative electrode and transmit data to an upper level system, thereby securing the traceability of the positive electrode and the negative electrode and providing an analysis environment.

In addition, the battery manufacturing system may integrate all data on the positive electrode generated and collected in the notching process, such as equipment data as well as the inspection data on the positive electrode and integrally manage the integrated data in the upper level system.

Figure 61:
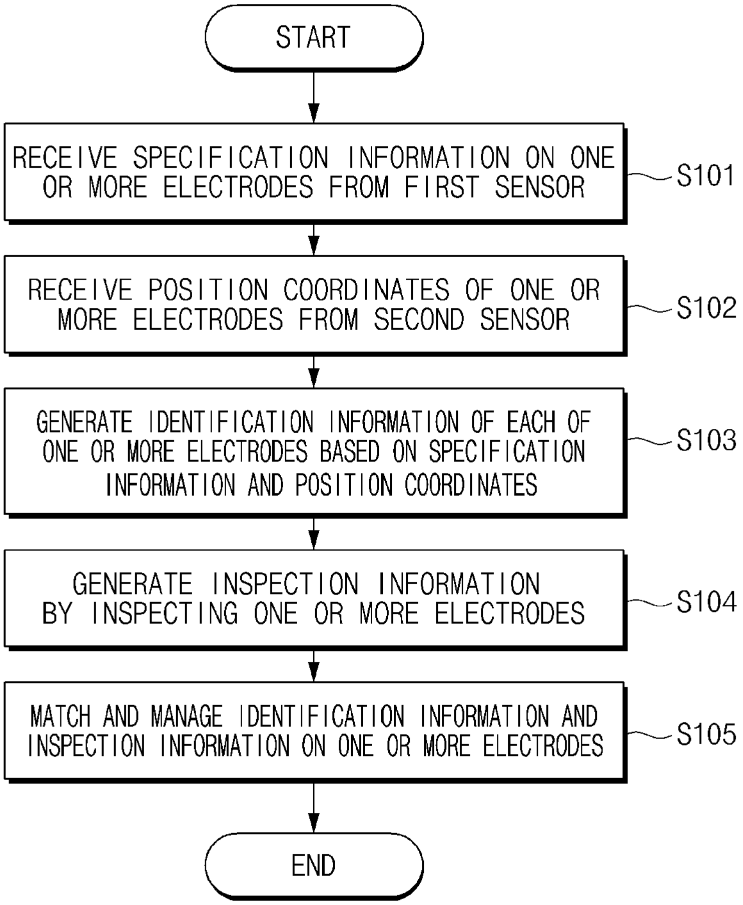
FIG. 61 is a flowchart showing an exemplary method of manufacturing a battery, according to one embodiment disclosed in this document.

FIG. 61 is a flowchart showing a method of manufacturing a battery according to one embodiment of the present disclosure.

Hereinafter, a method of manufacturing a battery will be described with reference to FIGS. 56 to 60.

The battery manufacturing system 4100 will be briefly described below to avoid duplication of description because it may be substantially the same as the battery manufacturing system 4100 described with reference to FIGS. 56 to 59.

Referring to FIG. 61, the method of manufacturing a battery may include receiving the specification information of the one or more electrodes from the first sensor 4200 (S101), receiving the position coordinates of the one or more electrodes from the second sensor 4300 (S102), generating the identification information of each of the one or more electrodes based on the specification information and the position coordinates (S103), inspecting the one or more electrodes and generating the inspection information (S104), and matching and managing the identification information and the inspection information of the one or more electrodes (S105).

In operation S101, the PLC 4110 may receive the specification information of the one or more electrodes from the first sensor 4200. The PLC 4110 may be defined as a control device used for maintaining, managing, automatically controlling, and monitoring the battery process system. For example, the PLC 4110 may manage the driving of the electrode notching device.

In operation S101, the PLC 4110 may receive a plurality of control signals. The PLC 4110 may simultaneously or sequentially process the plurality of control signals using embedded software. In operation S101, the software of the PLC 4110 may be stored in a volatile or non-volatile memory. The software of the PLC 4110 may process the input control signals in real time.

In operation S101, the PLC 4110 may receive the specification information of the one or more electrodes from the first sensor 4200. Specifically, the PLC 4110 may receive a length, that is, pitch information of at least one electrode tab from the first sensor 4200.

In operation S101, the PLC 4110 may generate the count information of the at least one electrode generated based on the length of the at least one electrode from the first sensor 4200. In operation S101, specifically, the PLC 4110 may receive the quantity count value of the at least one electrode according to the length of the electrode from the first sensor 4200. Here, the quantity count value of the electrode may include the BCD code.

In operation S102, the PLC 4110 may receive the position coordinates of the at least one electrode from the second sensor 4300. Here, the second sensor 4300 may include the encoder installed in the notching device for notching the at least one electrode.

In operation S102, the second sensor 4300 may calculate the position coordinates of the at least one electrode. Here, the second sensor 4300 may include the encoder installed in the rewinder RW of the notching device 4500 for notching the at least one electrode.

In operation S102, the second sensor 4300 may calculate the position coordinates of each of the one or more electrodes based on the number of pulses input from the encoder. The second sensor 4300 may calculate the number of rotations of the driving motor based on the pulse signals input from the encoder and calculate the linear movement distance at which the electrode has moved between the unwinder UW and the rewinder RW based on the number of rotations of the driving motor. The second sensor 4300 may calculate the position coordinates of the electrode based on the linear movement distance of the electrode.

In operation S102, the PLC 4110 may receive the position coordinates of the at least one electrode from the second sensor 4300 including the encoder. According to the embodiment, the PLC 4110 may receive the coordinates of the roll map of the at least one electrode from the second sensor 4300 including the encoder. Here, the roll map is data related to quality, defects, or manufacturing in the electrode manufacturing process displayed on a roll map bar imitating an electrode in a roll-to-roll state. When a battery is manufactured with the electrode manufactured in the electrode manufacturing process and defects occur in the battery, manufacturing history data on the electrode is required to identify cause of the defects. The roll map may record the electrode manufacturing history data on consecutive electrode manufacturing processes such as the electrode coating process, the roll press process, and the notching process and specify the cause of defects in the correlation with following processes.

In operation S102, the second sensor 4300 may generate the position coordinates, that is, the coordinates of the roll map of the at least one notched electrode moving between the unwinder UW and the rewinder RW.

In operation S103, the PLC 4110 may generate the identification information of each of the one or more electrodes based on the specification information of each of the one or more electrodes received from the first sensor 4200 and the position coordinates of each of the one or more electrodes received from the second sensor 4300. In operation S103, specifically, the PLC 4110 may generate the virtual ID of each of the one or more electrodes based on the specification information of at least one positive electrode tab received from the first sensor 4200 and the coordinates of the roll map of the at least one positive electrode received from the second sensor 4300.

In operation S104, the inspection device 4120 may inspect the at least one electrode and generate the inspection information. Here, the inspection device 4120 may include, for example, the vision inspection sensor. In operation S104, the inspection device 4120 may inspect the quality of the at least one electrode using the vision inspection sensor and generate the inspection information. Specifically, the inspection device 4120 may capture the electrode to acquire the captured image and analyze the image of the electrode to inspect the presence of defects or quality.

In operation S104, the inspection device 4120 may measure pitches of the plurality of tabs formed by being notched by the notching device 4500.

In operation S104, the inspection device 4120 may receive the specification information of the at least one electrode from the first sensor 4200. In operation S104, the inspection device 4120 may add the received specification information on the at least one electrode to the generated inspection information on the at least one electrode. In operation S104, the inspection device 4120 may add the specification information of the at least one electrode to the inspection information of the at least one electrode and transmit the added information to the controller 4130.

In operation S105, the controller 130 may receive the specification information of each of the at least one electrode and the virtual identification information of the at least one electrode from the PLC 4110.

In operation S105, in addition, the controller 4130 may receive the specification information of the at least one electrode and the inspection information of the at least one electrode from the inspection device 4120.

In operation S105, the controller 4130 may match and manage the virtual identification information on the at least one electrode received from the PLC 4110 and the inspection information on the at least one electrode received from the inspection device 4120. In operation S105, specifically, the controller 430 may match and manage the ID of the at least one electrode and the inspection information on the at least one electrode.

In operation S105, the controller 4130 may match the ID of the at least one electrode with the inspection information on the at least one electrode and generate the integrated inspection information of the at least one electrode. In operation S105, the controller 4130 may integrate a notching time, a virtual electrode ID, an ID of a lot input to generate the electrode, and roll map coordinate information of each of the at least one notched electrode and generate the integrated inspection data. Here, the ID of the input lot is a lot number of the electrode roll when the electrode roll is installed between the unwinder UW and the rewinder RW in the roll-to-roll state.

In operation S105, the controller 4130 may transmit the generated integrated inspection information to the server 4400. Here, the server 4400 may be, for example, an SPC device. Here, the SPC is a management method of efficiently operating a process in a statistical method or a device and system for executing the corresponding method to achieve the quality or productivity target required in the process.

In operation S105, the server 4400 may statistically manage the integrated inspection data of each of the at least one electrode acquired through the controller 4130 to check the quality and the position coordinates of the electrode and monitor a manufacturing status of the electrode together.

Figure 62:
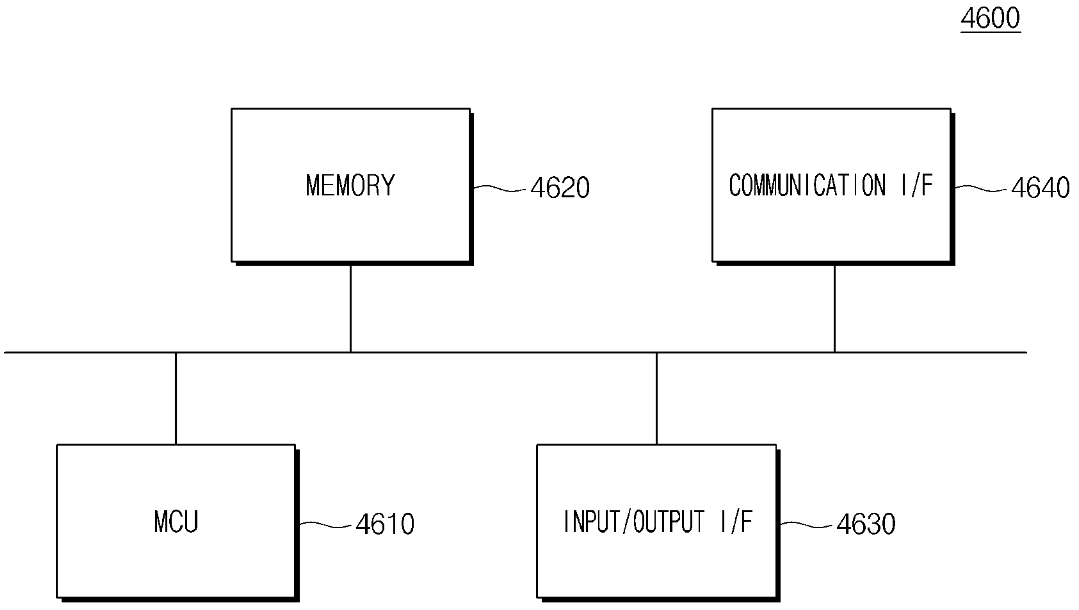
FIG. 62 is a block diagram showing an exemplary hardware configuration of a computing system for implementing a system for manufacturing a battery, according aspects of the present disclosure.

FIG. 62 is a block diagram showing a hardware configuration of a computing system for implementing a battery manufacturing system according to one embodiment of the present disclosure.

Referring to FIG. 62, a computing system 4600 according to the one embodiment of the present disclosure may include a micro controller unit (MCU) 4610, a memory 4620, an input/output I/F 4630, and a communication OF 4640.

The MCU 4610 may be a processor for executing various programs (e.g., programs for determining the specification information on the positive electrode) stored in the memory 4620, processing operation data of these programs, and performing the functions of the above-described battery manufacturing system 4100 shown in FIG. 57.

The memory 4620 may store various programs related to the operation. In addition, the memory 4620 may store the operation data.

A plurality of memories 4620 may be provided, as necessary. The memory 4620 may be a volatile memory or a non-volatile memory. As the memory 4620 of the volatile memory, a RAM, a DRAM, a SRAM, or the like may be used. As the memory 4620 of the non-volatile memory, a ROM, a PROM, an EAROM, an EPROM, an EEPROM, a flash memory, or the like may be used. Examples of the listed memories 4620 are merely illustrative and are not limited to these examples.

The input/output I/F 4630 may be an interface for connecting an input device (not shown) such as a keyboard, a mouse, or a touch panel and an output device such as a display (not shown) with the MCU 4610 and allowing the input and output devices and the MCU 4610 to transmit and receive data.

The communication I/F 4640 is a component capable of transmitting and receiving various data to and from the server and may be various devices capable of supporting wired or wireless communication. For example, programs, various data, or the like for resistance measurement and abnormality diagnosis may be transmitted or received from a separately provided external server through the communication I/F 4640.

As described above, the computer program according to one embodiment of the present disclosure may also be implemented as a module for performing the respective functions of the battery manufacturing system 4100 described with reference to FIGS. 56 and 57, for example, by being recorded in the memory 4620 and processed by the MCU 4610.

The process of manufacturing a battery proceeds in time series according to a predetermined process order, and process data collected corresponding to the battery for each process may be reported to an upper level controller in time series. The upper level controller may analyze the reported process data to predict the quality of the corresponding battery or analyze a cause of quality degradation. For the accuracy of such analysis, consistency between the battery and the process data needs to be ensured.

One or more aspects of FIGS. 1-62 may be incorporated into or combined with one or more aspects of the embodiments disclosed in reference to FIGS. 63-68 herein. Accordingly, some elements of FIGS. 63-68 may be similar to elements of FIGS. 1-62, and thus similar or identical reference numerals may be used to depict those elements. Further, detailed disclosure of the similar or identical elements already described may be omitted hereinafter for brevity. However, such omissions are not disclaimers or disavowals, and except to the extent that the similar or identical elements that are already described are inconsistent with the express disclosure herein, in which case the language in the present disclosure hereinafter controls.

One of the embodiments of the present disclosure provides a system and method for manufacturing a battery capable of ensuring the consistency between the process data reported to the upper level controller and the battery.

Figure 63:
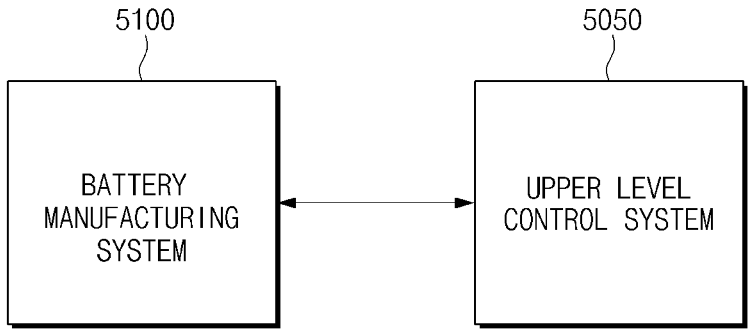
FIG. 63 is a block diagram showing an exemplary system for manufacturing a battery and an exemplary upper level control system, according to aspects of the present disclosure.

FIG. 63 is a block diagram of a battery manufacturing system and an upper level control system according to one embodiment of the present disclosure.

FIG. 63 shows a battery manufacturing system 5100 and an upper level control system 5050.

The battery manufacturing system 5100 may be a process system for manufacturing a battery capable of storing power. For example, the battery may be manufactured in the form of a battery pack, and the battery pack may be manufactured by performing an electrode manufacturing process of forming an positive electrode and a negative electrode of the battery, an assembly process of stacking electrode plates according to a shape (e.g., cylindrical, prismatic, or pouch shape) of the battery, injecting an electrolyte therebetween, and sealing the electrode plates, an activation process of activating the assembled battery using electric energy, and a pack process of modularizing and manufacturing battery cells in units of packs. According to the present disclosure, the battery manufacturing system 5100 is described as a process system for performing a notching and drying (NND) process and/or a lamination process during the assembly process, but the scope of the present disclosure is not limited thereto.

The upper level control system 5050 may receive the process data with which a battery manufacturing process performed by the battery manufacturing system 5100 may be monitored from the battery manufacturing system 5100 and analyze the cause of the quality degradation of the battery based on the process data. To this end, the upper level control system 5050 may transmit and receive data in communication with the battery manufacturing system 5100. Here, the process data may include operation results and/or test results of batteries in each process performed by the battery manufacturing system 5100. According to one embodiment, the upper level control system 5050 may be an ECS system and/or an equipment data collection (EDC) system.

Figure 64:
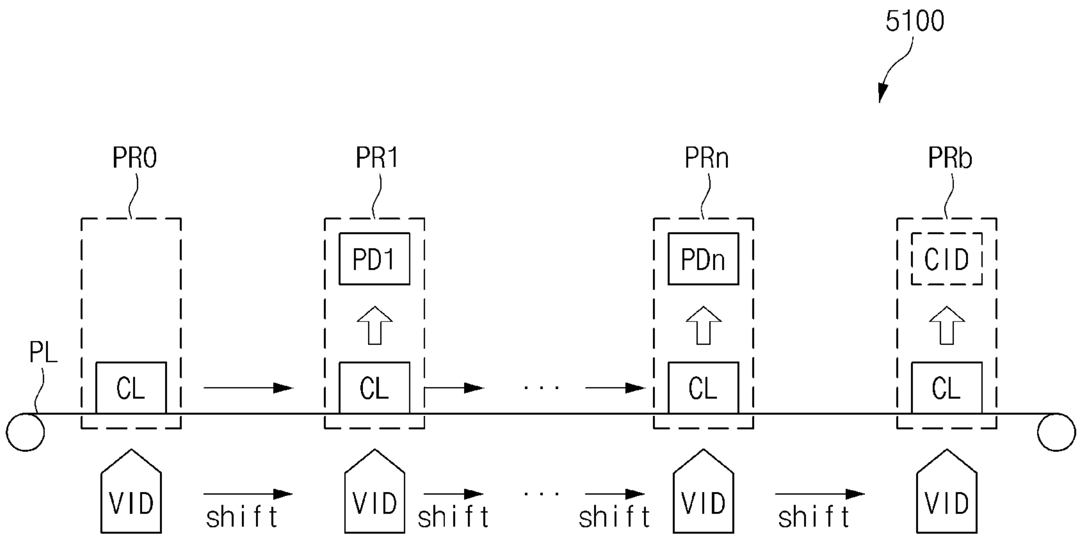
FIG. 64 is schematic diagram showing an exemplary process sequence performed in a system for manufacturing a battery, according to aspects of the present disclosure.
Figure 65:
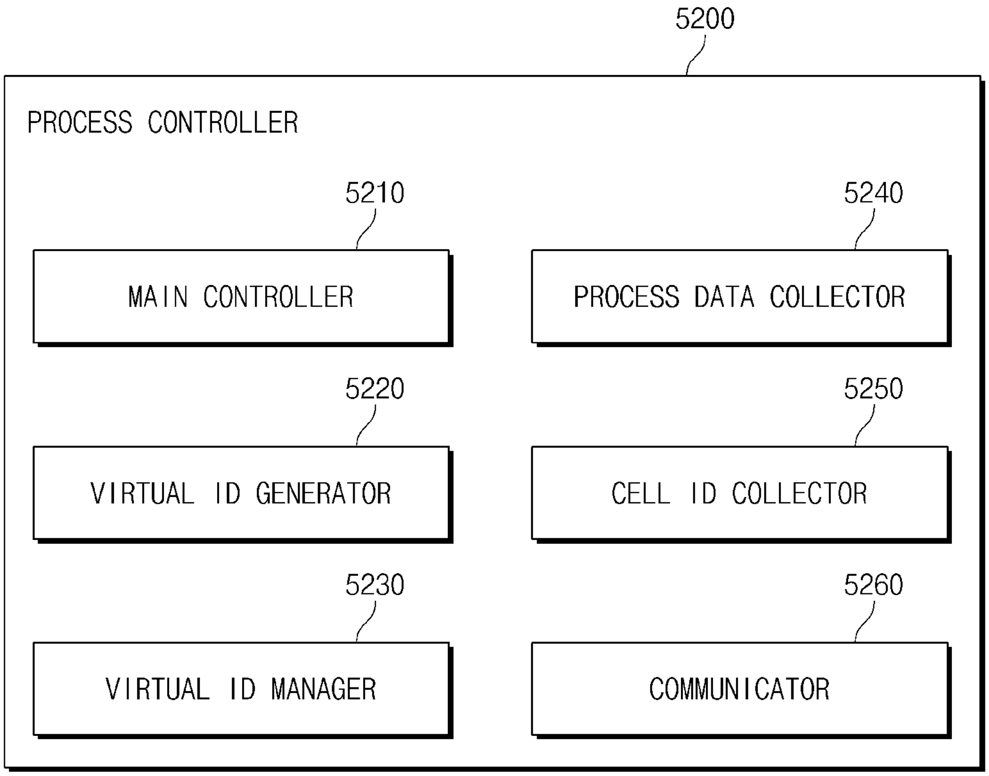
FIG. 65 is a block diagram showing an exemplary process controller for controlling a system for manufacturing a battery, according to aspects of the present disclosure.

FIG. 64 is a view schematically showing a process order performed by the battery manufacturing system in FIG. 63. FIG. 65 is a block diagram showing a configuration of a process controller for controlling the battery manufacturing system in FIG. 63. FIG. 66 is a view for describing a method of processing process data collected in the battery manufacturing system in FIG. 63.

Referring to FIGS. 64 to 66, a process order performed by the battery manufacturing system 5100 is schematically shown in FIG. 64, and FIG. 65 shows a configuration of a process controller 5200 capable of controlling processes performed by the battery manufacturing system 5100. The process controller 5200 may be a component included inside the battery manufacturing system 5100, but the scope of the present disclosure is not limited thereto and at least a part of the process controller 5200 may also be positioned outside the battery manufacturing system 5100.

The process controller 5200 may include a main controller 5210, a virtual ID generator 5220, a virtual ID manager 5230, a process data collector 5240, a cell ID collector 5250, and a communicator 5260. According to one embodiment, the process controller 5200 may be a PLC.

The main controller 5210 may control the overall operation of the process controller 5200 and in particular, control the overall flow of the process, such as a process order, a current status, of each battery cell CL. Unless specifically mentioned in the following description, an operation of the process controller 5200 may be an operation performed by the main controller 5210. Operations of the remaining components of the process controller 5200 will be described below with reference to FIG. 64.

As shown in FIG. 64, the battery manufacturing system 5100 may include a process line PL, and each process may be sequentially performed on the process line PL. That is, when the battery cell CL is input on the process line PL, first to $n^{th}$ (n is an integer of 2 or more) processes PR1 to PRn may be sequentially performed from a start process PR0, and a barcode process PRb as a final process may be performed. The battery cell CL may also have a shape in which the electrode, the separator, and the electrolyte solution are completely assembled in a specific shape (cylindrical, prismatic, pouch shape, or the like) and may be in a state of including only some components (e.g., the electrode and the separator) before completely assembled, but in the present disclosure, the battery cell CL will be described with the concept that the state before completely assembled is also included in the battery cell CL.

In the start process PR0, a process (e.g., cleaning) for preparing the first to $n^{th}$ processes PR1 to PRn performed on the battery cell CL may be performed, and the virtual ID generator 5220 may generate a virtual ID VID corresponding to the battery cell CL. The virtual ID VID is information for identifying the battery cell CL and may be generated, for example, using a time at which the battery cell CL is input to the process line PL, but the scope of the present disclosure is not limited thereto. The virtual ID generator 5220 may provide the virtual ID VID generated corresponding to the battery cell CL to the virtual ID manager 5230. The virtual ID manager 5230 may match an initially received virtual ID VID with process operation information indicating the start process PR0 and store a matching result. The process operation information may be information indicating which process among of the entire process is being currently performed on the battery cell CL corresponding to the virtual ID VID.

When the start process PR0 is completed, the battery cell CL may move to the first process PR1, and the virtual ID manager 5230 may also shift the virtual ID VID of the battery cell CL to the first process PR1 in synchronization with the movement of the battery cell CL. Here, shifting may mean replacing the process operation information of the start process PR0 matched with the virtual ID VID with process operation information of the first process PR1 and storing the process operation information. That is, the object of such shift is to match the process operation information corresponding to the virtual ID VID of the battery cell CL with the process being performed on the battery cell CL.

Process equipment (not shown) for performing the first process PR1 may generate process data PD1 including operation results and/or test results of the battery cell CL while the first process PR1 is performed, and the process data collector 5240 may match the process data PD1 received from the process equipment (not shown) for performing the first process PR1 with the virtual ID VID with reference to the information stored in the virtual ID manager 5230 and store a matching result. That is, when receiving the process data PD1 received from the process equipment (not shown) for performing the first process PR1, the process data collector 5240 may receive the virtual ID VID matched with the process operation information of the first process PR1 from the virtual ID manager 5230, match the virtual ID VID with the process data PD1, and store a matching result.

When the start process PR1 is completed, the battery cell CL may move to the second process PR2, and the virtual ID manager 5230 may also shift the virtual ID VID of the battery cell CL to the second process PR2 in synchronization with the movement of the battery cell CL.

Process equipment (not shown) for performing the second process may generate process data PD2 including operation results and/or test results of the battery cell CL while the second process PR2 is being performed, and the process data collector 5240 may match the process data PD2 received from the process equipment (not shown) for performing the second process PR2 with the virtual ID VID with reference to the information stored in the virtual ID manager 5230 and store a matching result. That is, when receiving the process data PD2 received from the process equipment (not shown) for performing the second process PR2, the process data collector 5240 may receive the virtual ID VID matched with process operation information of the second process PR2 from the virtual ID manager 5230, match the virtual ID VID with the process data PD2, and store a matching result.

That is, the shift operation of the virtual ID manager 5230 and the process data storage operation of the process data collector 5240 may be sequentially performed on each of the first to $n^{th}$ processes PR1 to PRn until the $n^{th}$ process PRn is completed.

Figure 66A:
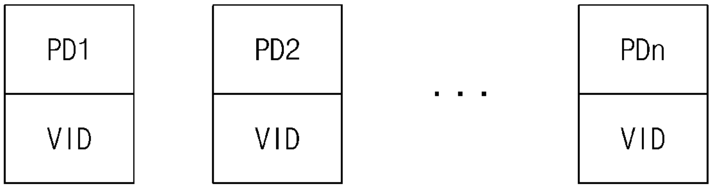
FIG. 66A is a block diagram showing an exemplary method of processing process data collected in a system for manufacturing a battery, according to aspects of the present disclosure.

As shown in FIG. 66A, when the $n^{th}$ process PRn is completed, the process data collector 5240 may store the virtual ID VID matched with each of the process data PD1 to PDn of the battery cell CL.

When the $n^{th}$ process PRn is completed, the battery cell CL may move to the barcode process PRb, and the virtual ID manager 5230 may also shift the virtual ID VID of the battery cell CL to the barcode process PRb in synchronization with the movement of the battery cell CL.

A process for finishing (e.g., cleaning) may be performed on the battery cell CL in the barcode process PRb, and a barcode reader (not shown) may read a cell ID CID in the form of a barcode attached to the batter cell CL. In the present disclosure, the cell ID CID is shown as being attached to the battery cell CL in the form of a barcode, but the scope of the present disclosure is not limited thereto, and the cell ID CID may be attached to the battery cell CL in another form (e.g., a QR code or an identification number), and in this case, the barcode reader (not shown) may be replaced with a device capable of reading cell ID CID in another form.

Meanwhile, the cell ID CID in the form of a barcode may be attached to the battery cell CL while any one of the first to $n^{th}$ processes PR1 to PRn is performed. Here, the cell ID CID in the form of a barcode may also be directly attached to the battery cell CL or may also be attached to a device for carrying the battery cell CL according to another embodiment.

The barcode reader (not shown) may read the cell ID CID in the form of a barcode attached to the battery cell CL, extract the cell ID CID, and transmit the extracted cell ID CID to the cell ID collector 5250.

When receiving the cell ID CID, the cell ID collector 5250 may extract the virtual ID VID matched with the process operation information of the barcode process PRb with reference to the information stored in the virtual ID manager 5230 and transmit the extracted virtual ID VID and the cell ID CID to the main controller 5210.

When receiving the virtual ID VID and cell ID CID from the cell ID collector 5250, the main controller 5210 may receive the process data PD1 to PDn on the batter cell CL matched with the virtual ID VID from the process data collector 5240 to match the process data PD1 to PDn on the battery cell CL with the cell ID CID thereof and generate process information PI on the battery cell CL.

Figure 66B:
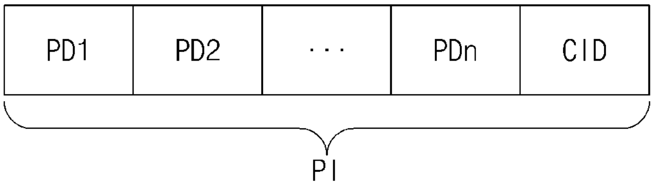
FIG. 66B is a block diagram showing an exemplary method of processing process data collected in a system for manufacturing a battery, according to aspects of the present disclosure.

That is, in FIG. 66A, the process data collector 5240 may match each of the process data PD1 to PDn on the battery cell CL with the virtual ID VID thereof and store a matching result, and the main controller 5210 may receive the process data PD1 to PDn, which is collected in each process performed on the battery cell CL matched with the virtual ID VID received together with the cell ID CID in time series, from the process data collector 5240 to match the process data PD1 to PDn on the battery cell CL with the cell ID CID thereof and generate the process information PI on the battery cell CL as shown in FIG. 66B.

The communicator 5260 may establish a wired communication channel and/or a wireless communication channel between the process controller 5200 and the upper level control system 5050 and transmit and receive data with the upper level control system 5050 through the established communication channel. For example, the communicator 5260 may transmit and receive data with another device based on at least one radio access technology (RAT). The communicator 5260 may transmit (or report) the process information PI including the process data PD1 to PDn and the cell ID CID of the battery cell CL to the upper level control system 5050.

According to the present disclosure, the process controller 5200 may give and manage the virtual ID VID to the battery cell CL and match the process data PD1 to PDn with the virtual ID VID whenever each process is completed and temporarily store a matching result, and then extract the process data PD1 to PDn corresponding to the battery cell CL through the virtual ID VID matched with the cell ID CID of the battery cell CL and generate the process information PI, thereby securing the consistency between the process data PD1 to PDn and the battery cell CL. The process information PI with consistency secured may be transmitted to the upper level control system 5050, and the upper level control system 5050 may inquire the cell ID CID to retrieve the process data PD1 exactly matched to the battery cell CL, thereby increasing the accuracy of the quality-related analysis for the battery cell CL.

When the process data PD1 to PDn are reported to the upper level control system 5050 in time series without using the virtual ID VID and then the upper level control system 5050 uses a method of estimating the process data PD1 to PDn corresponding to the battery cell CL from a time at which each process has been completed or the like, there is a concern that a lot of time and resources may be consumed and the consistency between the data may be degraded.

Figure 67:
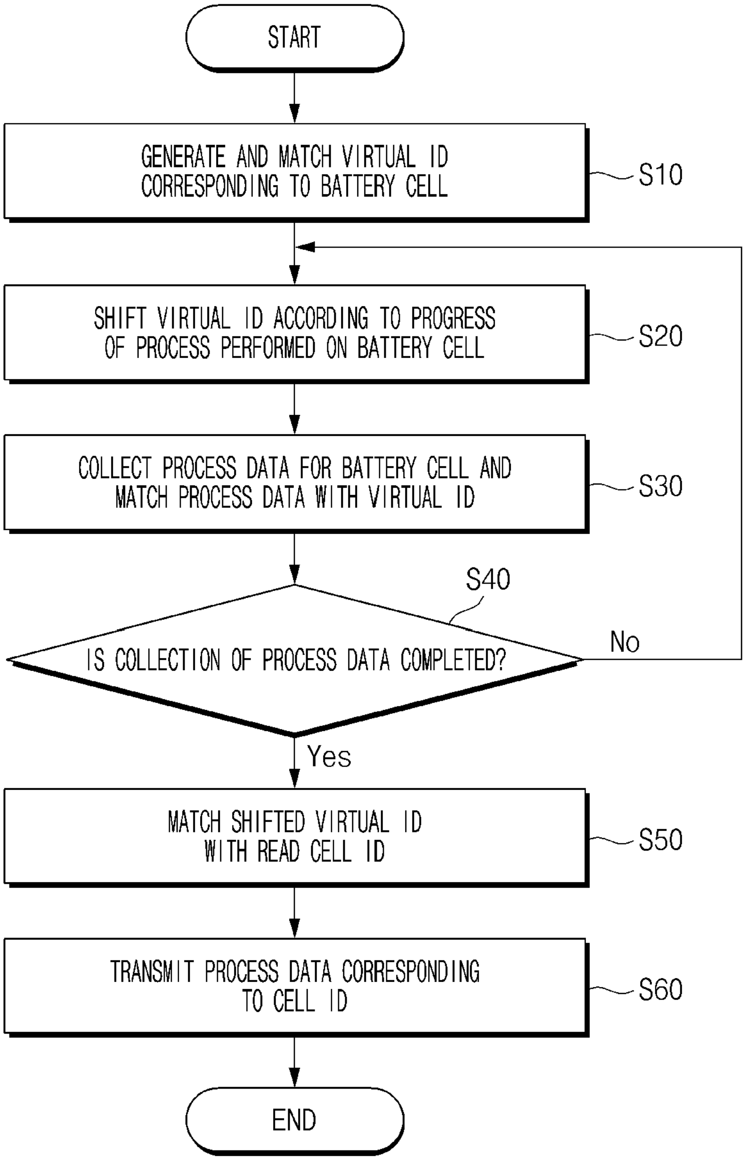
FIG. 67 is a flowchart showing an exemplary method of manufacturing a battery, according to aspects of the present disclosure.

FIG. 67 is a flowchart showing a method of manufacturing a battery according to one embodiment of the present disclosure.

Referring to FIG. 67, in the start process PR0, the virtual ID generator 5220 may generate the virtual ID VID corresponding to the battery cell CL. The virtual ID generator 5220 may provide the virtual ID VID generated corresponding to the battery cell CL to the virtual ID manager 5230, and the virtual ID manager 5230 may match the first received virtual ID VID with the process operation information of the start process PR0 and store a matching result (S10).

When the start process PR0 is completed, the battery cell CL may move to the first process PR1, and the virtual ID manager 5230 may also shift the virtual ID VID of the battery cell CL to the first process PR1 in synchronization with the movement of the battery cell CL (S20). That is, the virtual ID manager 5230 may set process operation information so that the process operation information matched with the virtual ID VID of the battery cell CL may indicate the process being performed on the battery cell CL.

The process equipment (not shown) performing the first process PR1 may generate the process data PD1 on the battery cell CL while the first process PR1 is performed, and the process data collector 5240 may match the process data PD1 received from the process equipment (not shown) performing the first process PR1 with the virtual ID VID corresponding to the process operation information of the first process PR1 with reference to the information stored in the virtual ID manager 5230 and store a matching result (S30).

Operations S20 and S30 may be repeatedly performed before the $n^{th}$ process PRn in which the collection of the process data may be completed is completed (No in S40).

When the $n^{th}$ process PRn in which the collection of the process data may be completed is completed (Yes in S40), the battery cell CL may move to the barcode process PRb, and the virtual ID manager 5230 may also shift the virtual ID VID of the battery cell CL to the barcode process PRb in synchronization with the movement of the battery cell CL.

In the barcode process PRb, the barcode reader (not shown) may read the cell ID CID in the form of a barcode attached to the battery cell CL, extract the cell ID CID, and transmit the extracted cell ID CID to the cell ID collector 5250.

When receiving the cell ID CID, the cell ID collector 5250 may extract the virtual ID VID matched with the process operation information of the barcode process PRb with reference to the information stored in the virtual ID manager 5230, match the extracted virtual ID VID with the cell ID CID, and transmit a matching result to the main controller 5210 (S50).

When receiving the virtual ID VID and cell ID CID from the cell ID collector 5250, the main controller 5210 may receive the process data PD1 to PDn on the batter cell CL matched with the virtual ID VID from the process data collector 5240 to match the process data PD1 to PDn on the battery cell CL with the cell ID CID thereof and generate the process information PI on the battery cell, and transmit the generated process information PI to the upper level control system 5050 (S60).

According to the present disclosure, the method of manufacturing a battery has been described centering on one battery cell CL, but the system 5100 for manufacturing the battery may simultaneously perform processes for a plurality of battery cells, and the method of manufacturing a battery described in the present disclosure may be applied to each of a plurality of battery cells. Of course, in this case, the plurality of battery cells may have different virtual IDs VIDs and cell IDs CIDs.

Figure 68:
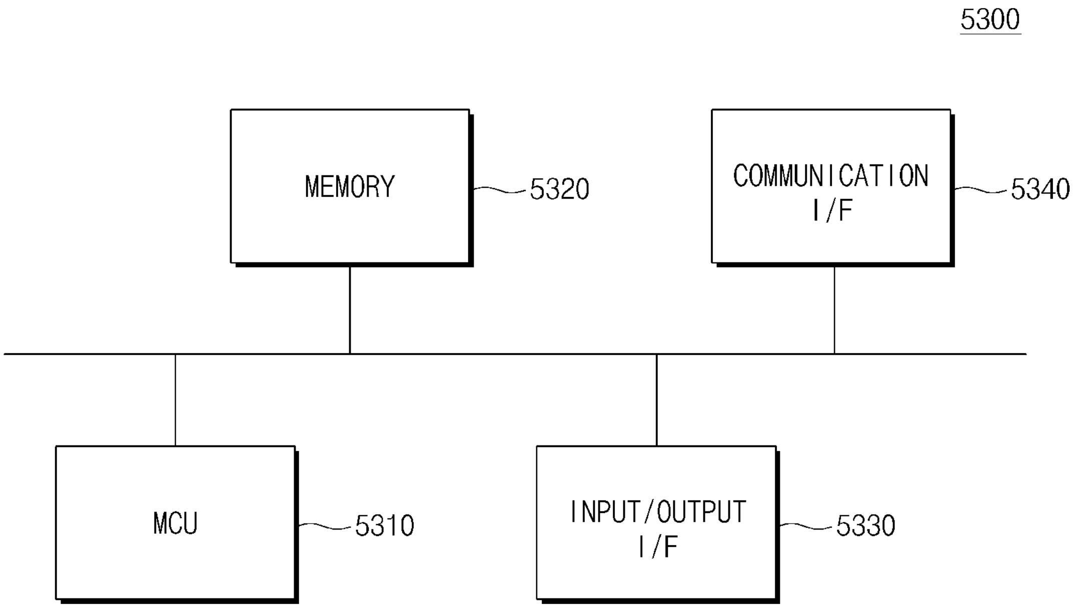
FIG. 68 is a block diagram showing an exemplary hardware configuration of a computing system for performing a method of operating a system for manufacturing a battery, according to aspects of the present disclosure.

FIG. 68 is a block diagram showing the hardware configuration of a computing system for performing a method of operating the battery manufacturing system according to one embodiment of the present disclosure.

Referring to FIG. 68, a computing system 5300 according to one embodiment of the present disclosure may include a micro controller unit (MCU) 5310, a memory 5320, an input/output I/F 5330, and a communication I/F 5340.

According to one embodiment, the computing system 5300 may be a system for performing an operation of the battery manufacturing system 5100 or the process controller 5200 (hereinafter referred to as "corresponding device").

The MCU 5310 may be a processor for executing various programs stored in the memory 5320.

For example, the MCU 5310 may be a processor for processing various data and/or signals required to perform the operation of the process controller 5200.

The memory 5320 may store various programs and/or data required to manage and control the corresponding device. A plurality of memories 5320 may also be provided, as necessary.

The memory 5320 may be a volatile memory or a non-volatile memory. As the memory 5320 of the volatile memory, a RAM, a DRAM, a SRAM, or the like may be used. As the memory 5320 of the non-volatile memory, a ROM, a PROM, an EAROM, an EPROM, an EEPROM, a flash memory, or the like may be used. Examples of the above-listed memories 5320 are merely illustrative and are not limited to these examples.

The input/output I/F 5330 may be an interface for connecting an input device (not shown), such as a keyboard, a mouse, or a touch panel, and an output device, such as a display (not shown) with the MCU 5310 and allowing the input and output devices and the MCU 5310 to transmit and receive data.

The communication I/F 5340 is a component capable of transmitting and receiving various data to and from external components including the server and may be various devices capable of supporting wired or wireless communication.

As described above, the computer program according to one embodiment of the present disclosure may also be implemented as a module for performing the respective functions shown in FIGS. 63 to 67 by being recorded in the memory 5320 and executed and processed by the MCU 5310.

A roll map is a useful tool capable of displaying a position of a moving electrode as coordinate values in an electrode manufacturing process and an assembly process. Process data for individual processes of performing various processes on the moving electrode may match the coordinate values, and a matching result may be displayed on the roll map. Therefore, in a plurality of roll-to-roll processes, such as a notching process of forming a tab on the electrode as well as the electrode manufacturing process, such as a coating process, a roll press process, or a slitting process, it is possible to intuitively and easily analyze and manage the quality of the electrode. In addition, since the electrode may be displayed by being specified in units of coordinate values, when the coordinate value is connected to an identification mark (e.g., an electrode ID) indicating a specific unit electrode, it is possible to easily analyze and track quality change histories of the electrode and an upper level assembly (e.g., an electrode assembly or a battery cell, module, and pack including the electrode assembly) including the same from the assembly process after the electrode manufacturing process to an activation process and following processes of module/pack processes. In addition, when a problem subsequently occurs in the upper level assembly, it is possible to identify a manufacturing history of a specific electrode included in the upper level assembly using the identification mark and the data of the coordinate values corresponding thereto. Therefore, it is possible to subsequently track quality. As a result, according to the roll map, it is possible to easily analyze and manage the quality of the manufacture target in all manufacturing processes from the time of manufacturing an electrode to a final manufacturing process of the battery pack.

In the roll map, coordinate values indicating a position of an electrode is basically displayed on a planar surface (roll map bar) imitating the electrode, and the coordinate values match process data of the electrode manufacturing process or the notching process, and a matching result is displayed. The process data is data acquired according to the progress of a process performed on the electrode in the electrode manufacturing process or the notching process.

However, when the process data is actually matched with the coordinate values of the roll map, there is a case in which all of these data may not be displayed on limited coordinates when the number or amount of data is too large. Furthermore, depending on the use or purpose of a system for generating a roll map, there is a case in which it is impossible to apply all process data to the roll map. For example, an MES of a factor has a main purpose of managing the production of manufacturing targets. Therefore, the MES has software, a server, a control device, and the like necessary for production management, and there is a limit to allocating the server or the like of the MES to processing or storing data for generating the roll map in addition to the production management. When the MES uses more data processing capacity than necessary in order to acquire and store process data necessary for generating the roll map in addition to the production management, which is the main purpose, an operation of the MES itself may not be normally performed. Alternatively, an operation speed of the roll map may be reduced due to an excessive data processing load.

One or more aspects of FIGS. 1-68 may be incorporated into or combined with one or more aspects of the embodiments disclosed in reference to FIGS. 69-81 herein. Accordingly, some elements of FIGS. 63-68 may be similar to elements of FIGS. 1-68, and thus similar or identical reference numerals may be used to depict those elements. Further, detailed disclosure of the similar or identical elements already described may be omitted hereinafter for brevity. However, such omissions are not disclaimers or disavowals, and except to the extent that the similar or identical elements that are already described are inconsistent with the express disclosure herein, in which case the language in the present disclosure hereinafter controls.

A battery manufacturing system according to one embodiment of the present disclosure is intended to solve such a problem by dividing the roll map into a first roll map and a second roll map.

Figure 69:
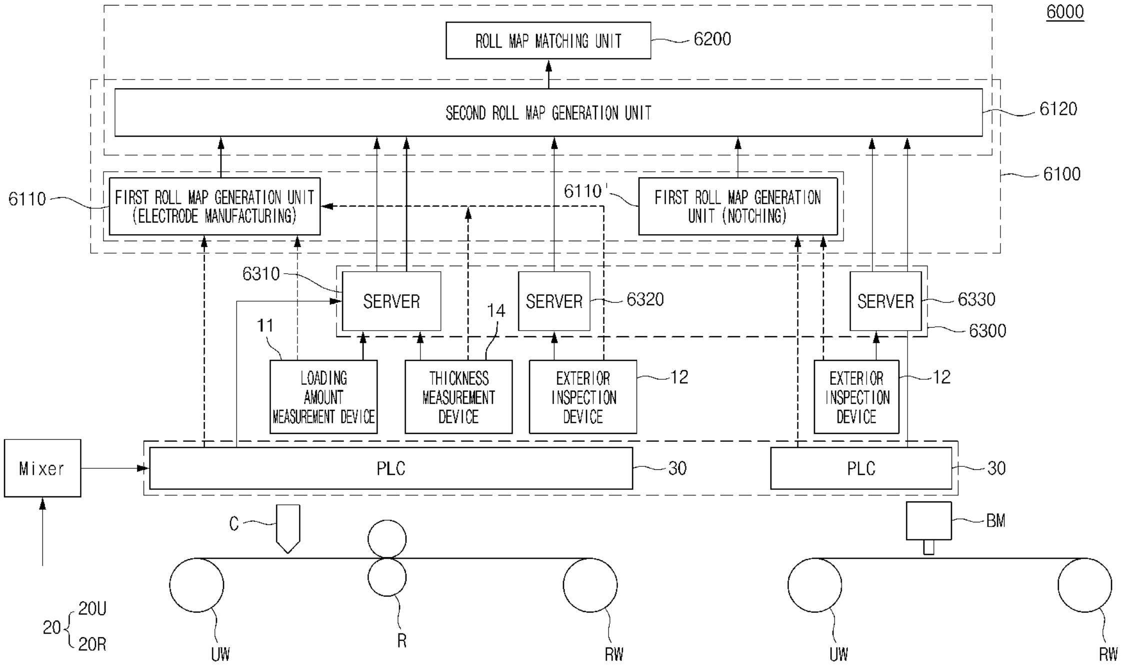
FIG. 69 is a schematic diagram of a system for manufacturing a battery, according to aspects of the present disclosure.
Figure 70A:
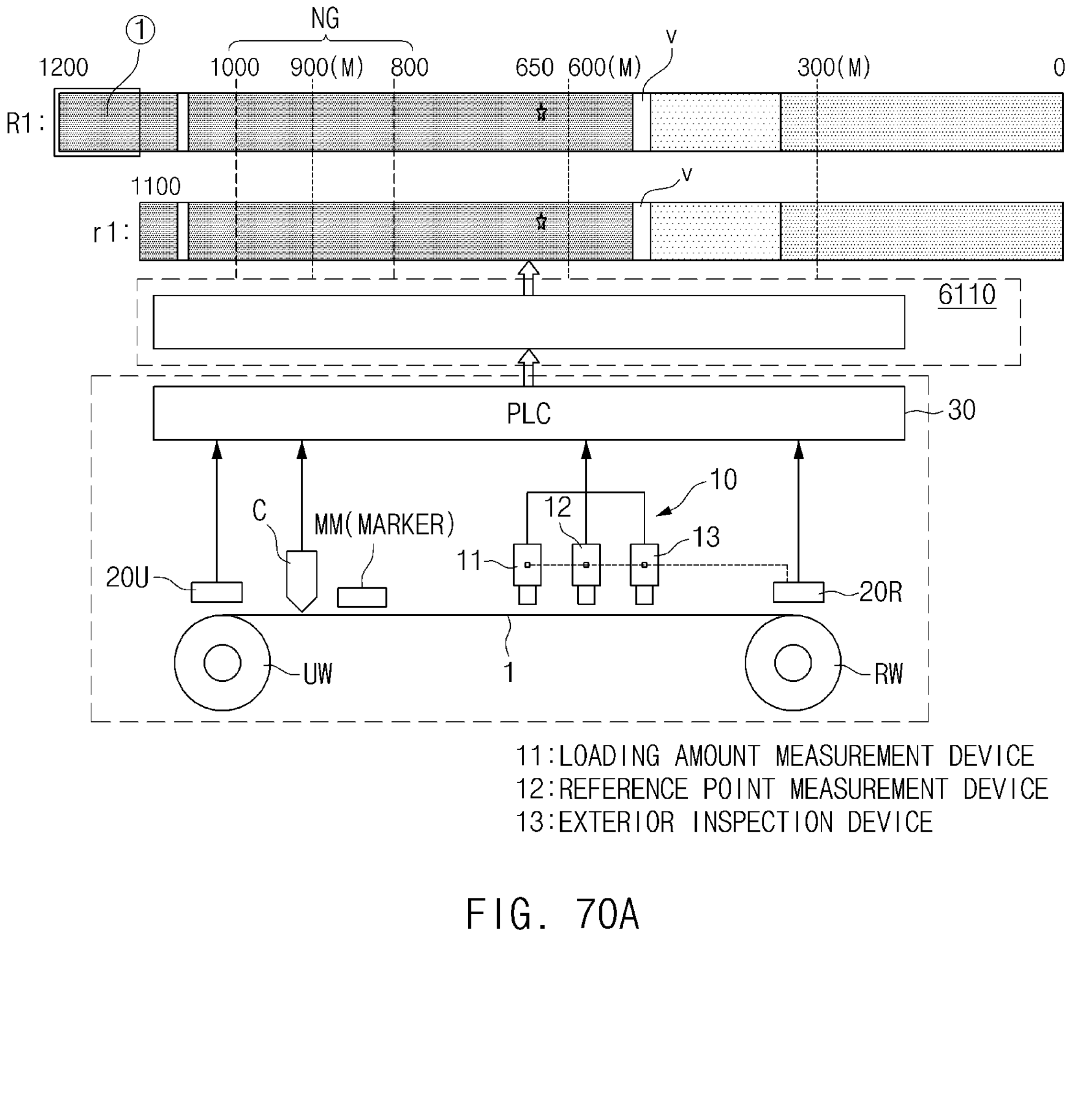
FIG. 70A is a schematic diagram showing an exemplary process of generating a roll map in an electrode manufacturing process, according to aspects of the present disclosure.
Figure 70B:
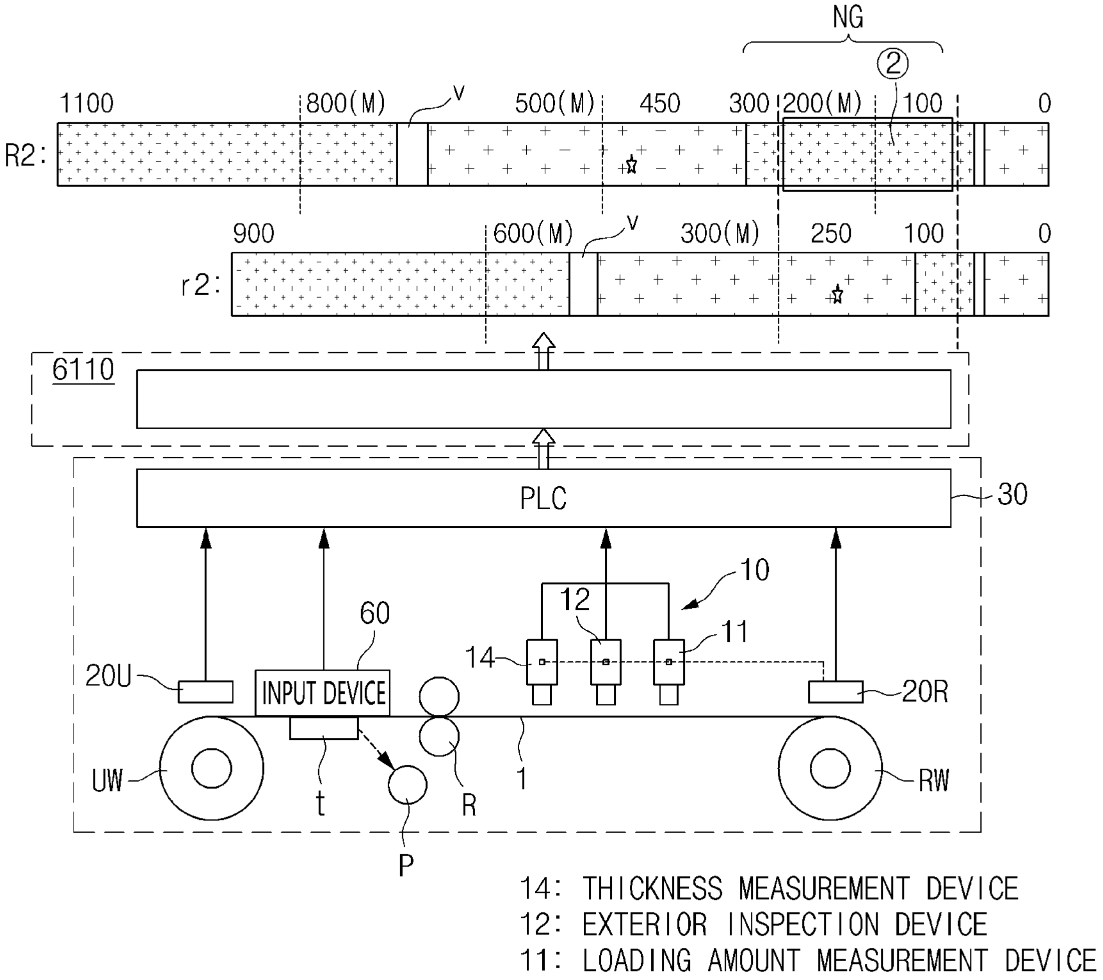
FIG. 70B is a schematic diagram showing an exemplary process of generating a roll map in an electrode manufacturing process, according to aspects of the present disclosure.
Figure 70C:
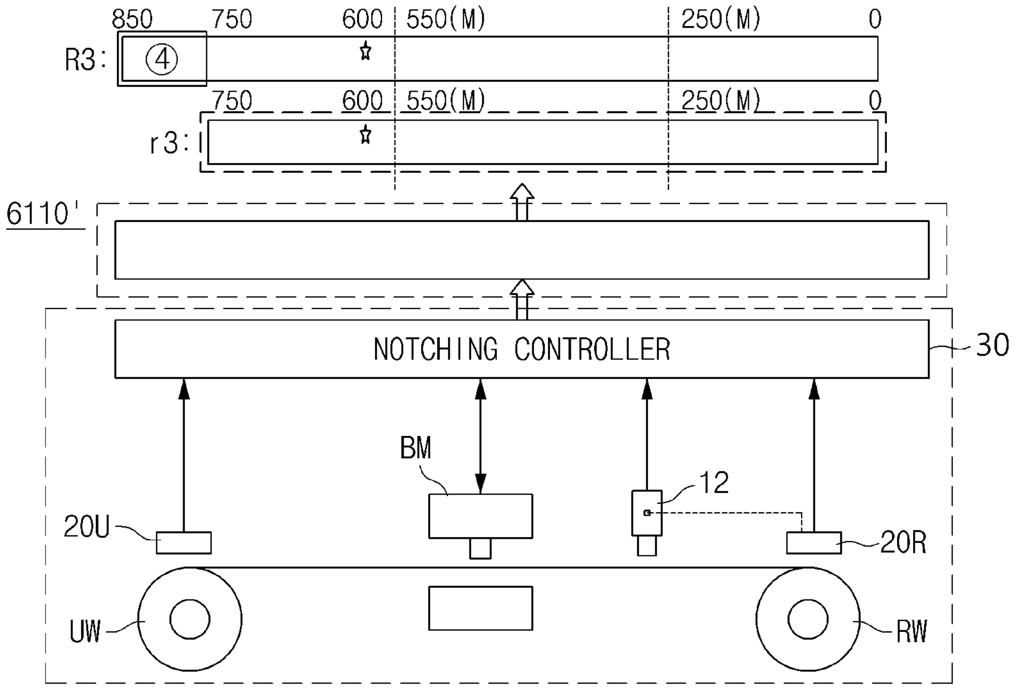
FIG. 70C is a schematic diagram showing an exemplary process of generating a roll map in an electrode manufacturing process and a notching process, according to aspects of the present disclosure.
Figure 71:
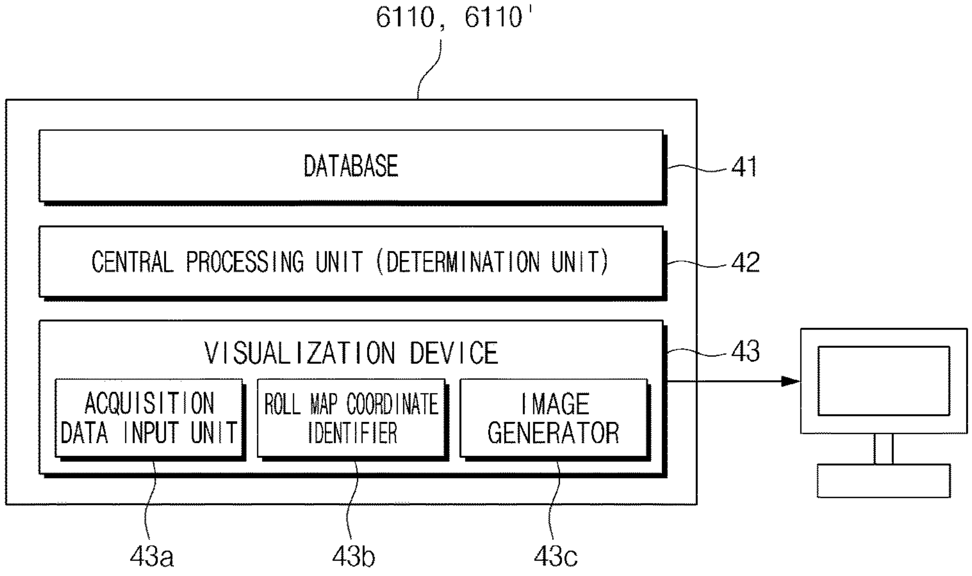
FIG. 71 is a schematic diagram showing an exemplary visualization device of a roll map generation unit, according to aspects of the present disclosure.
Figure 72:
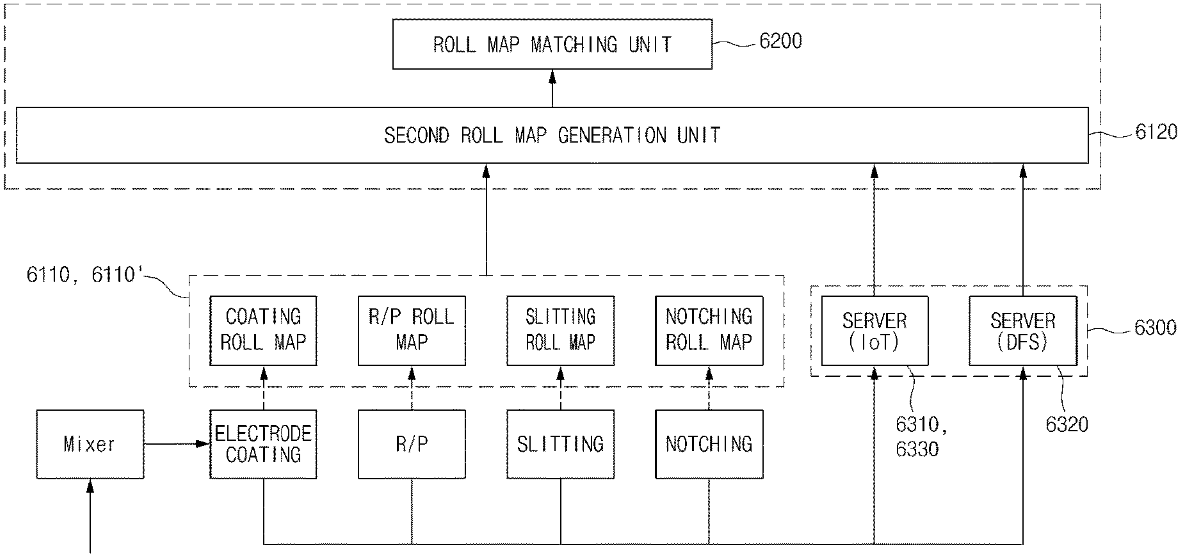
FIG. 72 is a block diagram showing an exemplary system for manufacturing a battery, according to aspects of the present disclosure.

FIG. 69 is a configuration diagram of a battery manufacturing system according to one embodiment of the present disclosure, FIG. 70 is a schematic diagram showing generation of a first roll map of an electrode manufacturing process and a notching process, FIG. 71 is a schematic diagram of a visualization device included in a first roll map generation unit, and FIG. 72 is a data flowchart of the battery manufacturing system according to one embodiment of the present disclosure.

The battery manufacturing system according to the present disclosure includes a first roll map generation unit 6110 for generating a first roll map RI, which includes data of the coordinate values indicating a position of an electrode and some of process data generated according to the progress of processes performed on the electrode and matching coordinate values, with respect to at least one process, and a second roll map generation unit 6120 for generating a second roll map RII, which includes the data of the coordinate values and some data of the first roll map and further includes additional data associated with some data and matching the coordinate values, with respect to at least one process.

Referring to FIG. 69, the first roll map generation unit 6110 makes up the first roll map RI including the data of the coordinate values indicating the position of the electrode and some data of the process data generated according to the progress of the processed performed on the electrode and matching the coordinate values.

In the present disclosure, the first roll map RI includes only some data of the process data acquired while the processes are performed.

The process data includes at least one of equipment data acquired in each piece of process equipment, process-related inspected and/or measured data acquired in each process, and time-series data acquired in each process.

The equipment data is data acquired from the PLC 30 (equipment control device, for example, a PLC unit) for performing each process. The PLC is a control device used for maintaining, managing, automatically controlling, and monitoring a process system in each process, such as an electrode manufacturing process, an assembly process, an activation process, and module/pack processes. The PLC controls, for example, the driving of a motor required for moving the electrode, the adjustment of a rotating speed of the motor, and the like. Alternatively, the PLC manages parameters required for each process. For example, the PLC may manage an electrode drying temperature and/or an electrode temperature in the electrode coating process and may adjust a roll press pressure and the like in the roll press process. Therefore, the equipment data may include all parameters managed by the PLC 30 in each process.

In addition, the process data may include the process-related inspected and/or measured data acquired in each process. For example, in the electrode coating process, an electrode slurry loading amount may be measured, or reference points marked on the electrode may be measured. In the roll press process, a thickness of the electrode after pressing may be measured. In addition, the exterior inspection device 12 (vision inspection device) or the like may be commonly adopted in the coating process, the roll press process, the slitting process, the notching process, and the like. As described above, the inspected and/or measured data includes all data inspected or measured by a predetermined inspection device, measurement device, or inspection and measurement device in each process. That is, the inspected and/or measured data includes operation results and/or test results performed in each process.

The process data may also include the time-series data acquired in each process. For example, the PLC may control the sequence of each process and the overall flow of the process. Therefore, it is possible to acquire events that occur according to the temporal flow of the process or a data generation time point (acquisition point). That is, the data (time-series data) on the data generation time point may be obtained for all data acquired in each process.

The process data is generated according to the progress of the process performed on the electrode, and the process data is acquired for each individual process.

The roll map matches the process data with the data of the coordinate values indicating the position of the electrode and visualizes and displays a matching result.

FIG. 70 shows a process of generating a first roll map of the coating process, the roll press process, and the notching process.

Such series of processes may be performed by a so-called roll-to-roll process in which an electrode moves between an unwinder UW and a rewinder RW.

Each process may be controlled by the PLC 30, and the PLC may control the driving of the unwinder and the rewinder. The PLCs in each process may be collectively referred to as an integrated PLC.

In the unwinder UW and/or the rewinder RW, a position measurement device 20 capable of acquiring a position of an electrode in a longitudinal direction according to amounts of rotation of the unwinder UW and the rewinder RW as coordinate values of the electrode in the longitudinal direction is installed. For example, rotary encoders 20U and 20R may be adopted as the position measurement device. The rotary encoders 20U and 20R are installed in a motor driving unit for driving the unwinder UW and the rewinder RW to detect an electrode movement distance according to the number of rotations (amount of the rotation) of a motor. Therefore, the positions of each electrode in the longitudinal direction according to the electrode movement distance may be acquired as coordinate values. The rotary encoder may directly transmit the acquired data of the coordinate values to the first roll map generation unit 6110 or transmit the acquired data of the coordinate values to the first roll map generation unit 6110 through the PLC 30. Therefore, it is possible to acquire the data of the coordinate values indicating the position of the electrode in each process.

In addition, in each roll-to-roll process, an inspection and/or measurement device 10 for inspecting and/or measuring the electrode moving between the unwinder and the rewinder is provided. The type or number of inspection and/or measurement devices may be the same or different as shown in FIG. 69. For example, in the coating process, the electrode loading amount data is acquired by a loading amount measurement device 11. In the roll press process, thickness data of the electrode is acquired by a thickness measurement device 14. In all processes shown in FIG. 69, the exterior inspection device 12 is provided to acquire exterior data of the electrode.

In addition, as described above, the PLC 30 collects the equipment data and the time-series data generated or acquired in each process.

The above-described process data may be connected to the data of the coordinate values in advance or matched in the first roll map generation unit 6110.

For example, all process data acquired in each process may be transmitted to the PLC 30, and the PLC may connect (map) some of the process data with the data of the coordinate values. Alternatively, depending on the type of inspection and/or measurement device 10, there is a case in which the inspection and/or measurement device 10 itself connects (maps) the data of the coordinate values with the inspected and/or measured data in conjunction with the position measurement device 20.

Meanwhile, coordinate values of the moving electrode in a width direction may be acquired by the inspection and/or measurement device 10.

Coordinate values of an electrode part for which the inspected and/or measured data has been acquired in the width direction may be acquired by the inspection and/or measurement device 10. For example, the inspection and/or measurement device 10, such as the exterior inspection device 12 shown in FIG. 69, may include a program capable of scanning and inspecting the exterior of the electrode in the width direction of the entire electrode 1. Alternatively, the inspection and/or measurement device itself may be movably installed in the width direction of the electrode. Alternatively, a plurality of inspection and/or measurement devices may be installed in the width direction of the electrode. Therefore, the inspection and/or measurement devices 10 may acquire the process data (e.g., the loading amount data or the exterior defect data) on each point of the electrode in the width direction and also acquire position data (coordinate values) in the width direction for which the current data has been acquired. Therefore, each inspection and/or measurement device 10 may acquire both the coordinate values in the longitudinal direction and the coordinate values in the width direction of the electrode 1 for which the inspected and/or measured data has been acquired and transmits the coordinate values to the first roll map generation unit 6110 to be described below.

The process data acquired in each process may match the data of the coordinate values indicating the position of the electrode in the first roll map generation unit 6110.

The first roll map generation unit 6110 may store the acquired process data or include a database 41 in which data on quality, dimensions, or the like of the electrode are stored (see FIG. 71). In addition, the roll map generation unit 6110 may include a central processing unit 42 for processing the acquired data and instructing the visualization device 43 provided in the first roll map generation unit 6110 to visualize the data.

The first roll map generation unit 6110 may include the visualization device 43 for defining a visualization region to form the first roll map on which the electrode 1 is imitated and which displays coordinate values on the defined region. The visualization device 43 may match the data of the coordinate values with the process data and display a matching result. The visualization device 43 may be connected to the central processing unit 42 to visualize and display the process data and the data of the coordinate values according to instructions from the central processing unit.

As shown in FIG. 71, the visualization device 43 may include an acquisition data input unit 43*a*, a roll map coordinate identifier 43*b*, and an image generator 43*c*.

First, the acquisition data input unit 43*a* may receive data from the central processing unit 42.

The roll map coordinate identifier 43*b* may define the visualization region to form the roll map and define coordinate values of pixels within the visualization region for each data element of the acquired source data. In this case, when data on specifications, such as a lot number, a length, and a width of the electrode roll, is input to the controller 30, the DB, a server (not shown), or the like by registering information on the electrode roll, the roll map coordinate identifier 43*b* may calculate and determine the visualization region of the roll map according to a predetermined conversion scale from data on a size of the electrode 1. Alternatively, the roll map coordinate identifier 43*b* may also calculate and determine the visualization region of the roll map according to the predetermined conversion scale from the above-described data of the coordinate values of the electrode 1 in the longitudinal direction and the width direction.

The roll map coordinate identifier 43*b* may map the acquired inspected and/or measured data with the data of the coordinate values of the electrode 1 (in the width direction and the longitudinal direction) and allocate the mapped data on the visualization region (roll map) according to the coordinates of the pixels.

The image generator 43*c* may express the mapped data elements allocated to the coordinates of each pixel in the visualization region as at least one legend. Therefore, the first roll map RI according to the present disclosure may be generated by implementing the process data to be visually displayed at coordinates of pixels (coordinates on the first roll map) corresponding to each position data (data of the coordinate values) of the actual electrode 1 in a shape, form, or color designated for each data in the visualization region called the roll map by the image generator 43*c*.

The first roll map generation unit 6110 may be, for example, a data processing system, such as an MES, or one component of the system. Alternatively, the first roll map generation unit 6110 may be software having operating logic of the data processing system, hardware including the corresponding software, a mechanical device, or the like.

In the electrode 1 manufacturing process, an electrode MES for managing a series of electrode manufacturing processes, such as coating, roll press, and slitting, may be provided, and the electrode MES or one component of the electrode MES may become the first roll map generation unit 6110 in the electrode manufacturing process.

In addition, in the assembly process, an assembly MES may be provided, and the assembly MES or one component of the assembly MES may become, for example, a first roll map generation unit 6110' in the notching process.

The first roll map RI of each process may be generated by the MES.

For example, under the MES environment, it is difficult to use all of the process data to generate the first roll map RI for the original operation of the MES. When the amount or number of process data is large, it may affect the operation of the MES itself or may consume a lot of time to match data for generating the roll map, thereby reducing an operation speed of the roll map.

In the present disclosure, in order to solve this problem, the roll map including only some of the process data, that is, the first roll map RI is generated. Here, some data may be, for example, at least one of a representative value of specific process data, an average value, and a determination value based on the process data.

For example, when the electrode moves into each process, a temperature of the electrode may vary depending on the position of the electrode. Alternatively, the electrode loading data in the coating process and the electrode thickness data in the roll press process may be acquired over a specific section or entire section of the electrode. When the entire data (raw data) is sent directly to the first roll map generation unit 6110 or 6110', the generation of the roll-map is delayed, and the operation of the first roll map generation unit 6110 or 6110' or the system including the same may be overloaded. In the present disclosure, in order to avoid this, when the roll map is initially generated, the first roll map RI is generated by matching only some of the process data with the data of the coordinate values of the electrode. That is, when only important or small-size data among the process data is selected and matches the data of the coordinate values, the first roll map RI may be quickly generated without applying a large load to the system.

Thousands of raw data are generated just by scanning the above-described loading amount data and thickness data once by a predetermined measurement device. When scanning the loading amount data and the thickness data thousands of times, the number of data increases exponentially. Therefore, when an average value of the specific data is obtained and the average value is displayed on the first roll map RI, the amount of data to be processed can be greatly reduced. Alternatively, it is possible to obtain the same effect by displaying only representative values capable of representing a plurality of loading amount data or thickness data. For example, a maximum value, a minimum value, a median value, and the like of the specific data may be determined as the representative values according to the process. Statistically or according to the quality characteristics of the electrode, a value well indicating the attribute of the specific data may be determined as the representative value.

In addition, after determining the quality of a plurality of pieces of data, only a determination value determined to be defect or good may be displayed on the first roll map RI. One or more of the representative value, the average value, and the determination value may match the coordinate values, and a matching result may be displayed on the roll map. In this case, some data may be displayed over the entire section of the roll map bar imitating the electrode or may also be displayed only in some sections.

Some data may be a specific type of data among the process data. For example, only the inspected and/or measured data among the time-series data, the equipment data, and the inspected and/or measured data may be displayed on the roll map, and the remaining data may not be displayed. Alternatively, only some data (exterior data) of the inspected and/or measured data may be displayed, and the remaining data may not be displayed. That is, some data displayed on the first roll map RI may be some types of data among the process data or may be extracted data extracted from the specific data, such as a representative value of selected specific data.

Referring to FIG. 72, the flow of some data is indicated by a dotted line. In FIG. 72, the first roll map generation unit 6110 (e.g., the electrode MES) of the electrode manufacturing process (coating, roll press, or slitting process) is positioned to be connected to the PLCs 30 of each process, and the first roll map generation unit 6110' (e.g., the assembly MES) is positioned to be connected to the PLC 30 of the notching process. The electrode MES and the assembly MES are combined to form the first roll map generation units 6110 and 6110' according to the present disclosure. Among the process data, some data of the time series data and the equipment data are each transmitted to the first roll map generation units 6110 and 6110'. In addition, some data of the inspected and/or measured data acquired from various inspection and/or measurement devices 10 are transmitted to the first roll map generation units 6110 and 6110'.

Figure 73:
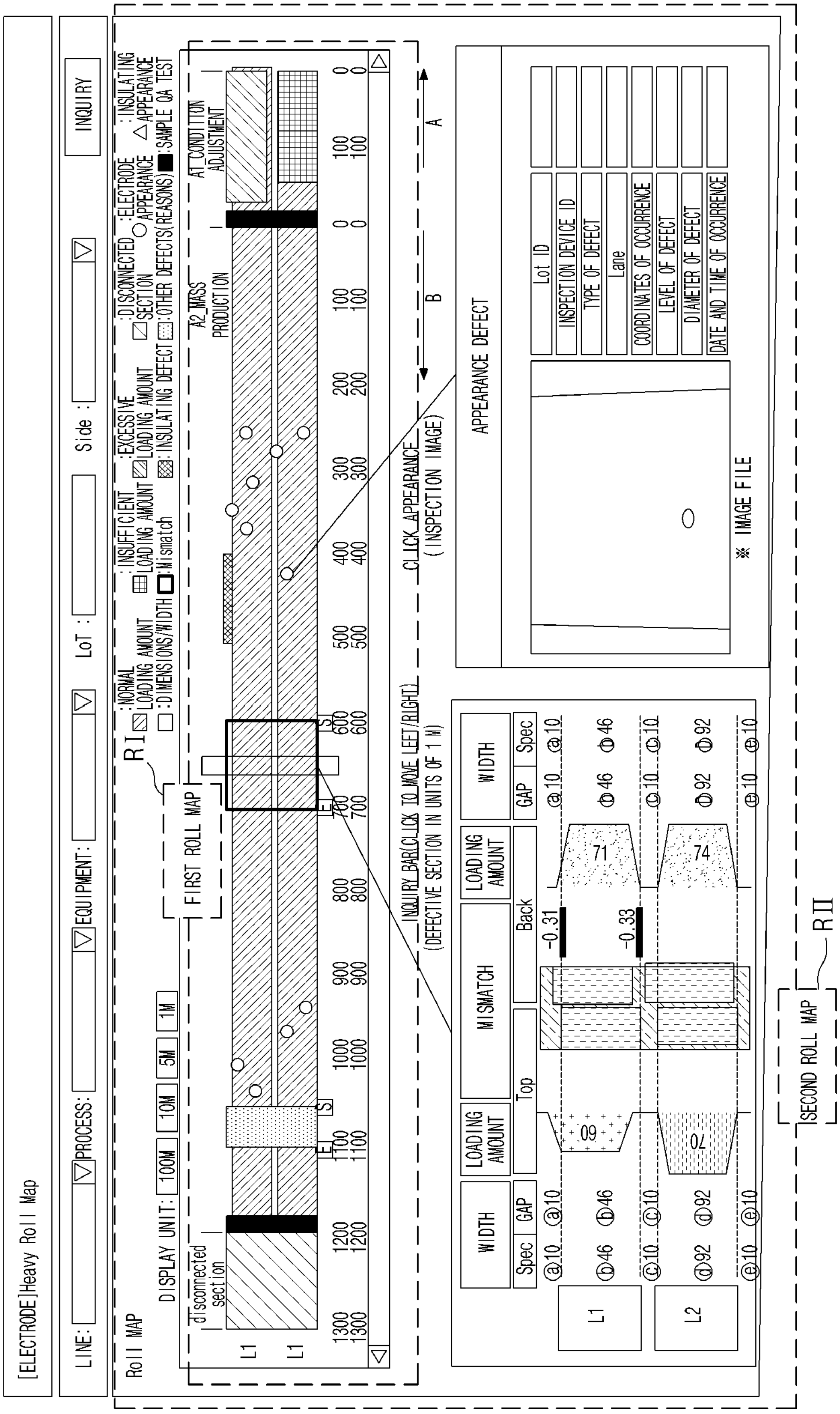
FIG. 73 is a schematic diagram showing an exemplary roll map, according to aspects of the present disclosure.

FIG. 73 shows the first roll map RI. That is, a state displayed by varying a color, a contrast, a hatching, or the like in a specific section of the first roll map RI indicates an average value, a representative value, a determination value, or the like in the specific electrode section or the entire electrode section. Therefore, it is possible to intuitively and easily identify the state of the electrode in the corresponding process.

As shown in FIG. 73, the system for manufacturing a battery according to the present disclosure includes the data of the coordinate values and some data of the first roll map RI and includes the second roll map generation unit 6120 for generating the second roll map RII further including the additional data.

The additional data may be at least one of image data of an electrode, raw data acquired for a specific section or the entire section of the electrode, processed data of the process data, and processed data of the raw data. That is, the second roll map RII may be made up by adding mainly large-size data to the first roll map RI.

Since the image data generally has a large size, the image data may be stored in a separate server 6330 as additional data, loaded from the server 6330, as necessary, and displayed on the first roll map RI. In addition, by also loading all raw data of a specific parameter (e.g., a thickness of an electrode), for example, by comparing all raw data with average value data of the parameter, it is possible to identify a change trend of the corresponding parameter.

In addition, the processed data of the process data or the processed data of the raw data may also be used as the additional data. For example, the loading amount may also be simply displayed in color or contrast, but may be displayed graphically or by being processed as a graph so that loading amounts for each electrode lane and each electrode surface may be clearly displayed at a glance. Alternatively, as necessary, the loading amount may be displayed together with a loading amount according to a width of the electrode or displayed in connection with another parameter, such as mismatch. As described above, data obtained by visually and statistically processing some data or processing some data to another form for quality analysis and control may be determined as additional data and displayed on the second roll map RII. In this case, a predetermined program for processing some data may be provided in the second roll map generation unit 6120. Alternatively, the program is provided in the servers 6310 and 6330 for storing the raw data and the like, and the server may process the additional data and also match the data processed by the second roll map generation unit 6120 with the data of the coordinate values and display a matching result.

Alternatively, the second roll map RII may be generated by adding other types of data (e.g., the time series data or the equipment data) to the first roll map RI as the additional data in addition to some types of data (e.g., the inspected and/or measured data) among the process data.

The added data may be associated with some data and match the coordinate values. For example, when the average value of the loading amount data is displayed on the first roll map RI, the second roll map RII may be generated by displaying the entire raw data of the loading amount data in the electrode section of the corresponding coordinate values. Alternatively, when exterior defects are displayed on the first roll map RI, the second roll map RII may be generated by loading an exterior image corresponding to a coordinate value or a coordinate range of the exterior defect.

Alternatively, the time-series data indicating a time point at which the corresponding data has been acquired may be loaded at the coordinate value for which some inspected and/or measured data has been acquired and displayed on the second roll map RII.

Alternatively, among the equipment data, parameters closely related to the loading amount or the thickness of the electrode, for example, electrode temperature data may be loaded and displayed on the second roll map RII in connection with the corresponding data.

As described above, according to the present disclosure, the second roll map RII may be generated by mainly displaying small-size data on the first roll map RI as some data and additional large-size data associated with some data in relation to the first roll map RI.

The second roll map generation unit 6120 may be another component of the above-described MES system. For example, additional data may be processed and displayed by adding a large-capacity server in the MES. Alternatively, the second roll map generation unit 6120 may be a system separate from the first roll map generation unit 6110 or an upper level control system. For example, the SPC or one component of the SPC may be used as the second roll map generation unit 6120. Here, the SPC is a management method or system of efficiently operating a process in a statistical method to achieve the quality or productivity target required in the process. In this case, the first roll map RI may be generated by matching the data of the coordinate values with some data in the first roll map generation unit 6110, and the second roll map RII may be generated by matching the additional data with the coordinate values of the first roll map RI in the second roll map generation unit 6120, which is the SPC. The first roll map generation unit 6110 may transmit or receive data to and from the second map generation unit 6120, and thus data (the coordinate values, some data, or the first roll map itself) of the first roll map RI is sent to the second roll map generation unit 6120. The second roll map RII includes the data of the first roll map RI and additional data. Similar to the first roll map RI generation unit, the second roll map generation unit 6120 may also include a database, a central processing unit, and a visualization device.

In FIGS. 69 and 72, some data sent to the first roll map generation unit 6110 is indicated by dotted lines, and the additional data sent to the second roll map generation unit 6120 is indicated by solid lines.

FIG. 69 shows that the electrode moves between one unwinder and one rewinder in order to briefly display the electrode manufacturing process. However, in reality, a plurality of detailed processes requiring a plurality of unwinders and rewinders are performed. FIG. 72 shows the simplified flow of corresponding data when the plurality of detailed processes are performed in time-series.

A separate server 6300 may be provided to store additional large-size data. For example, a first server 6310 may be provided to store the additional data of the electrode manufacturing process excluding image data. Alternatively, a second server 6320 dedicated for storing the image data may be provided. In addition, a third server 6330 may be provided to store the additional data in the notching process. As shown in FIG. 72, in order to store all additional data other than the image data, the first server 6310 and the third server 6330 may also be integrated.

The servers may be connected to the controllers 30 and inspection and/or measurement devices 10 in each process to store the additional data. In addition, the servers may transmit the data received from the controllers and the inspection and/or measurement devices to the second roll map generation unit 6120. As described above, the flow of the additional data is indicated by solid lines in FIGS. 69 and 72.

The second roll map generation unit 6120 generates the second roll map RII by displaying the additional data on the first roll map RI. The first roll map RI and the second roll map RII are generated for at least one process. When a plurality of processes are performed, it is necessary to perform quality control and tracking according to the position of the electrode by matching the data of the coordinate values of the roll map between the preceding and following processes. To this end, as will be described below, the system 6000 for manufacturing the battery may include a roll map matching unit 6200.

Figure 74:
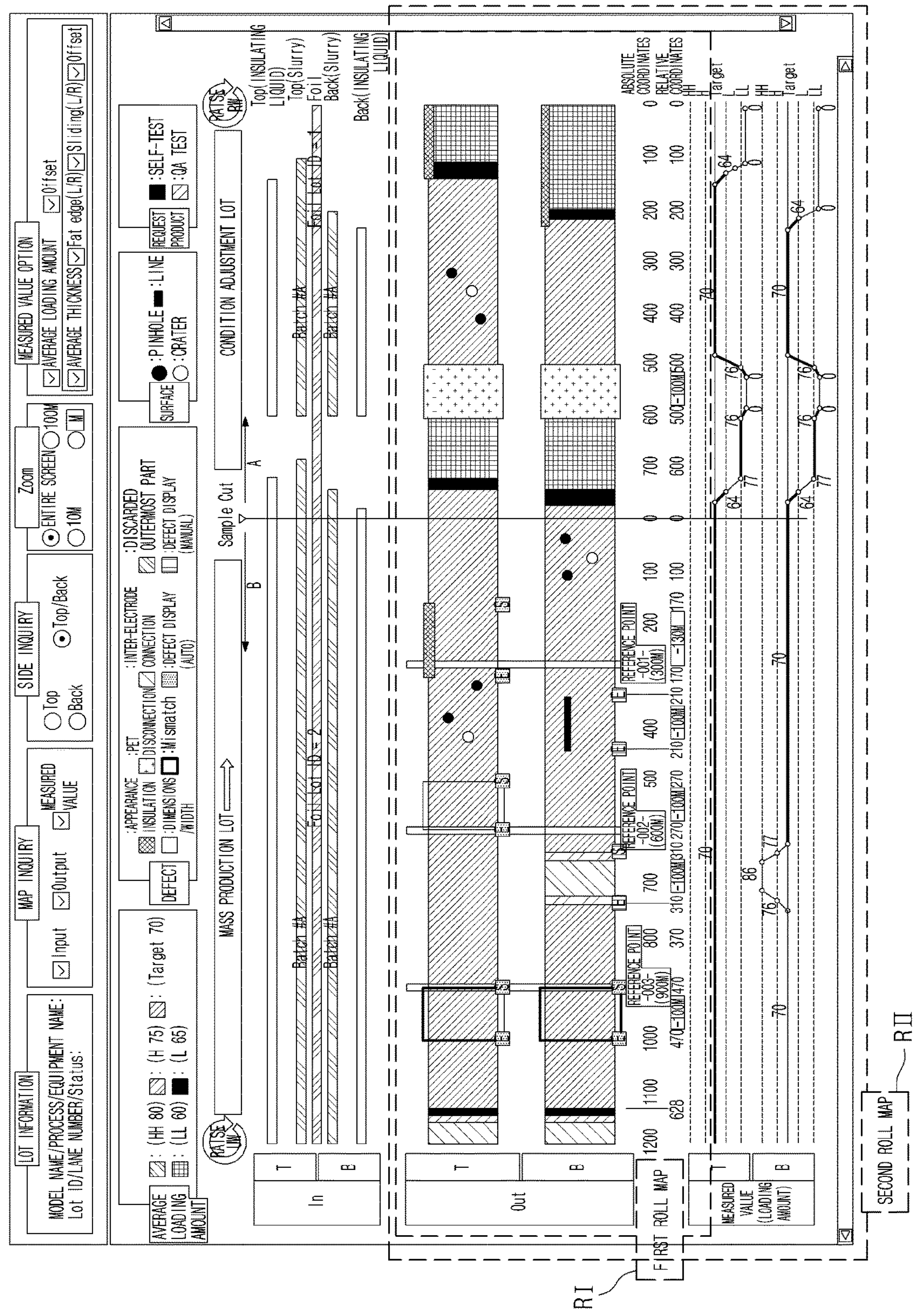
FIG. 74 is a schematic diagram showing an exemplary roll map, according to aspects of the present disclosure.

FIGS. 73 and 74 show examples of the first roll map RI and the second roll map RII. FIG. 73 shows the first roll map RI imitating two electrode lanes L1 and L2. The data of the coordinate values is displayed at a lower end of the first roll map RI and matches each coordinate value to display exterior and loading amount data of the electrode by varying a contrast or a hatching.

The additional data on the specific section of the first roll map RI is displayed at a lower left end of the first roll map RI. Detailed data on loading amount-mismatch-electrode width is displayed for two electrode lanes at the lower left end of the first roll map RI. In addition, detailed images of the exterior defect at a specific place of the first roll map RI is displayed at a lower right end of the first roll map RI. The first roll map RI is made up by the first roll map generation unit 6110. Including the first roll map RI shown in the upper part of FIG. 73, the additional data shown in the lower part thereof is added by the second roll map generation unit 6120, and to this end, the second roll map generation unit 6120 may be connected to the first server 6310 and the second server 6320 to generate comprehensive information (i.e., the second roll map RII) in which required additional data is connected to the coordinate value and some data of the first roll map RI.

The upper part of FIG. 74 shows the first roll map RI displaying the loading amount data by varying a hatching with respect to the top and back surface of the electrode. The coordinate values are displayed at the lower end of the first roll map RI. The processed data on the loading amounts for the top and back surfaces processed as a graph is displayed under the first roll map RI. Therefore, it is possible to more easily identify the change in the loading amount according to the length of the electrode.

Meanwhile, FIGS. 69 and 72 show an electrode material that is input into the electrode coating process from a mixer. That is, the material is input into a coater from the mixer in the coating process in order to manufacture the electrode. In this case, at least one of the following data may be sent to the PLC in the coating process:

1) Data on specifications of the input material for manufacturing the electrode;
2) Process data for a mixing process of the input material; and
3) Path data on a moving path through which the mixed input material is moved to the electrode coater.

Referring to FIG. 53, a plurality of tanks are disposed between the mixer (M) and the coated).

Specifically, the specifications of the input material for manufacturing the electrode may be lot information of an electrode slurry produced in the mixer, a batch ID of a batch container, or the like. The data on the specifications of the input material for manufacturing the electrode may be displayed in a barcode or other expression format on a conveying tool introduced into the mixer or a slurry batch container moving from the mixer to the tank (main tank).

In addition, the process data for the mixing process of the input material may include equipment data acquired by a mixing controller in the mixing process and inspected and/or measured data of the mixing process.

In addition, as shown in FIG. 53, the moving path from the mixer to the coater may be a plurality of tank moving paths disposed between the mixer and the coater. Data on the path may be acquired by a controller for detecting electrode slurry lot information shown in and described with reference to FIG. 53.

The system 6000 for manufacturing the battery according to the present disclosure may be connected to the mixer controller and a slurry lot information detection controller to display the above-described data on the input material on the first roll map RI or the second roll map RII.

Therefore, the data on the input material for manufacturing the electrode may be managed by being matched with the coordinate values of the first roll map RI and the second roll map RII and data matching the coordinate values by the first roll map generation unit 6110 or the second roll map generation unit 6120.

Meanwhile, specifications, such as a lot number, a length, and a width of a current collector roll (coating process) or an electrode roll (roll press, slitting, or notching process) coated with the electrode slurry are also sent to the first and second roll map generation units 6110 and 6120 and managed by being matched with the coordinate values of the roll map and other process data.

As a result, data on all processes from the electrode manufacturing (coating, roll pressing, or slitting) process by the mixing of the input material for manufacturing the electrode, the movement of the input material, such as slurry, and the input material to the notching process may be displayed on the first roll map RI and the second roll map RII. Therefore, it is possible to easily perform quality control and tracking of all processes from the mixing to the notching.

Meanwhile, the system for manufacturing a battery according to one embodiment of the present disclosure may include the roll map matching unit 6200 for matching the coordinate values of the first roll map RI or the second roll map RII between the plurality of processes.

Specifically, the system includes the roll map matching unit 6200 for performing at least one of the following operations:

i) Matching the coordinate values of the first roll map RI of the preceding process with the coordinate values of the first roll map RI of the following process so that an actual electrode represented by the first roll map RI of the preceding process corresponds to an actual electrode represented by the first roll map RI of the following process; and
ii) Matching the coordinate values of the first roll maps RI of each process with the coordinate values of the first roll map RI of the final process so that an actual electrode represented by the first roll map RI of the final process among the plurality of processes corresponds to an actual electrode represented by the first roll maps RI of each process before the final process.

Also, the system includes the roll map matching unit 6200 for performing at least one of the following operations:

i) Matching the coordinate values of the second roll map RII of the preceding process with the coordinate values of the second roll map RII of the following process so that an actual electrode represented by the second roll map RII of the preceding process corresponds to an actual electrode represented by the second roll map RH of the following process; and
ii) Matching coordinate values of the roll maps of each process with the coordinate values of the second roll map RH of the final process so that an actual electrode represented by the second roll map RH of the final process among the plurality of processes corresponds to an actual electrode represented by the second roll map RH of each process before the final process.

As described above, the roll map matching unit 6200 may match the coordinate values of the first roll map RI or the coordinate values of the second roll map RH of the preceding and following processes, the final process, or each process and compare pieces of information on each process based on the same actual electrode. This will be described below.

Figure 75:
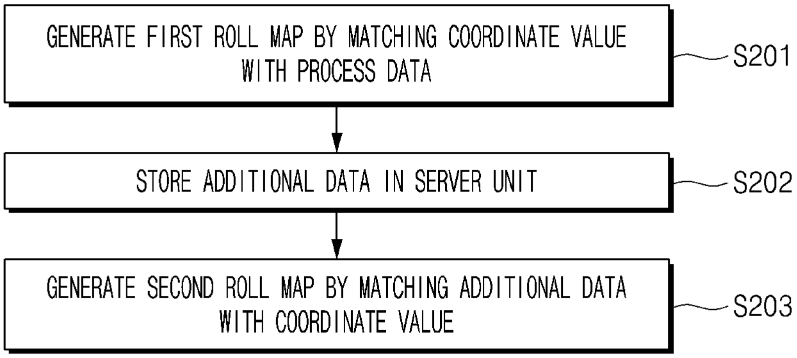
FIG. 75 is a flowchart showing an exemplary method of manufacturing a battery, according to aspects of the present disclosure.

Referring to FIG. 75, a method of manufacturing a battery according to the present disclosure includes generating a first roll map RI, which includes data of the coordinate values indicating a position of an electrode and some data of process data matching the coordinate value and generated according to a proceeding of a process performed on the electrode, for at least one process (S201), storing additional data associated with some data (S202), and generating a second roll map RII, which includes the additional data in addition to the data of the coordinate values and some data of the first roll map RI, for at least one process by matching the additional data with the coordinate values (S203).

As described above, in each process, the data of the coordinate values and the process data are acquired by a position measurement device, such as a rotary encoder, a PLC, or an inspection and/or measurement device. The data of the coordinate values and the process data are made up as the first roll map RI by a predetermined coordinate conversion and visualization tool in the first roll map generation units 6110 and 6110', which is the MES or one component of the MES. In this case, in order to reduce a data processing capacity of the first roll map generation unit, only some of the process data, such as a representative value, an average value, and a determination value, match the coordinate values of each process.

The additional data associated with some data is stored by the server 6300 by the PLC or the inspection and/or measurement device. The server may be provided within the first roll map generation units 6110 and 6110' or provided separately from the first roll map generation unit 6110. A plurality of servers may be provided according to the type of data to be added.

The additional data stored in the server may match the coordinate values of the first roll map RI and displayed on the first roll map RI or separately from the first roll map RI. A roll map including the data of the coordinate values and some data of the first roll map RI and the additional data is referred to as the second roll map RII. The second roll map generation unit 6120 may be an upper level control system separately from the first roll map generation unit 6110 or one component of the system. The second roll map generation unit 6120 may be connected to the server in which the additional data is stored to receive the additional data from the corresponding server and generate the second roll map RII.

The roll map may be generated for each process. However, in the roll-to-roll process, since the electrode wound in the preceding process is unwound in the following process, the start and end portions of the electrode are reversed by going through the roll-to-roll processes such as the end portion of the roll map representing the electrode roll of the preceding process becoming the start portion of the roll map representing the electrode roll of the following process. In addition, in the case of a double-sided electrode in which an electrode active material is coated on both side surfaces of the electrode, the surfaces of the electrode may be reversed such as the top electrode of the preceding process becoming the back electrode in the following process. That is, the start/end reversal and the surface reversal of the electrode may occur according to the winding direction of the electrode in the preceding process and the unwinding direction of the electrode in the following process. Since the roll maps of each process are generated based on the reversed electrodes, the coordinates of the roll maps of each process are also reversed. Furthermore, the length of the electrode is changed, such as the electrode being cut in the longitudinal direction by removing the defect section or the broken section through the series of roll-to-roll processes and connected several times. Since the roll maps of each process reflect such reversal and a change in length, coordinate values are each different.

In the final process (e.g., the notching process) of the electrode manufacturing process, only the remaining electrodes (survival electrodes) excluding the electrode parts removed in the previous process are left. Since a battery is manufactured with the survival electrodes, when a problem occurs in a finished or semi-finished battery, it is possible to track the cause of the problem with reference to the roll map of the final electrode. In addition, it is possible to reversely track the electrode part, which has caused the problem, with reference to the above-described roll maps of each process.

However, as described above, since the start and end portions and/or the surfaces of the electrode are reversed and the length is changed in the series of roll-to-roll processes, the coordinates of the roll maps of each process do not match each other. Therefore, even when the roll maps are generated for each process, it is difficult to track the cause of the occurrence of the problem compared to a roll map of a final survival electrode.

In order to solve the above problems, there is provided the system for manufacturing a battery capable of easily identifying the data on quality or defects of the survival electrode left in the final process by matching the coordinate values of the roll maps of the preceding and following processes or matching the coordinate values of the roll maps of each process with the coordinate values of the final process in the series of roll-to-roll processes.

Figure 76:
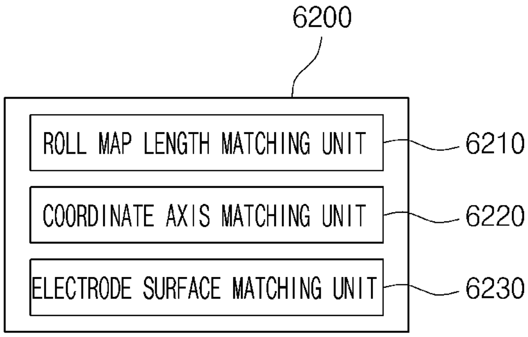
FIG. 76 is a block diagram showing an exemplary roll map matching unit included in a system for manufacturing a battery, according to aspects of the present disclosure.
Figure 77:
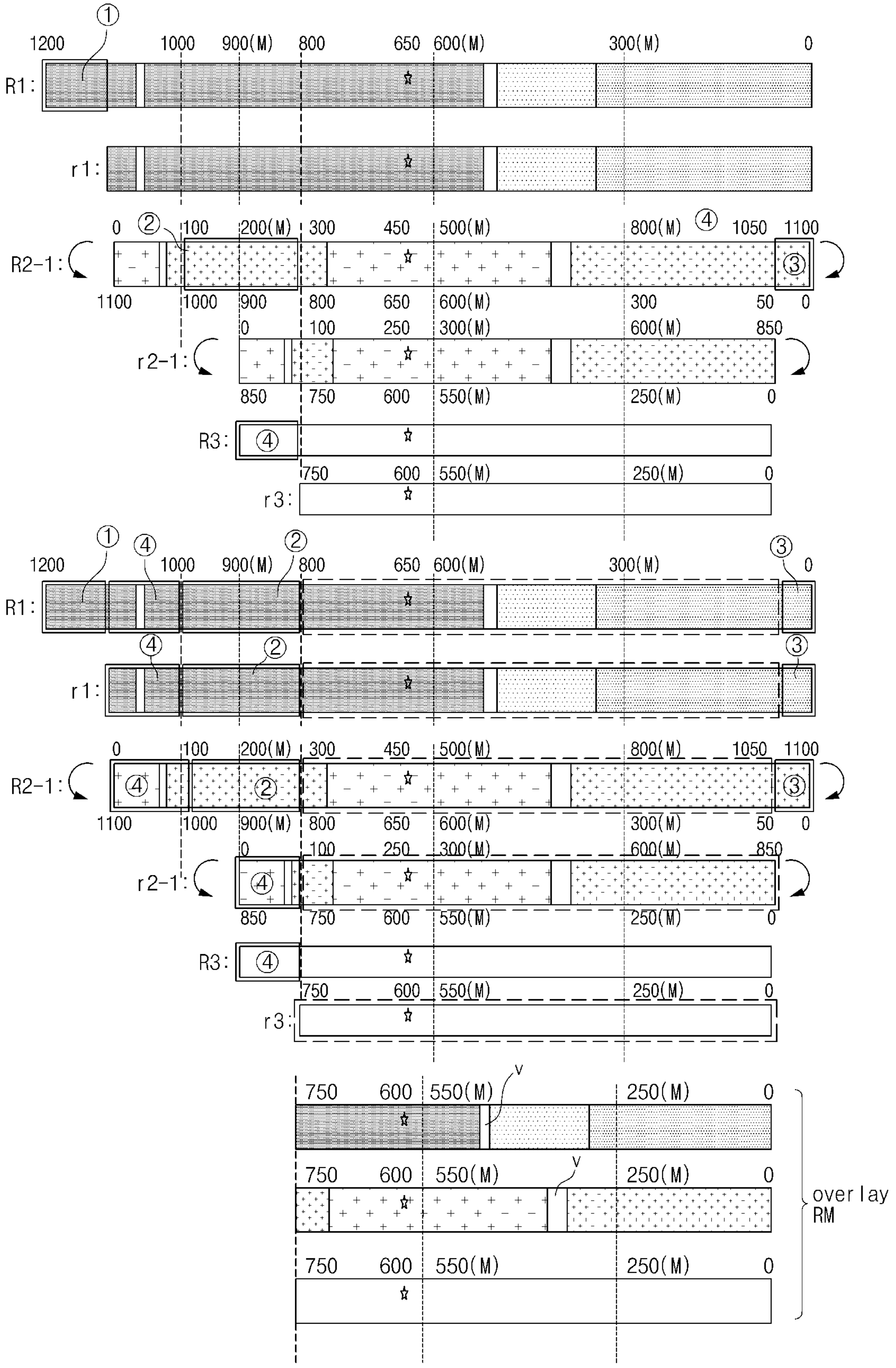
FIG. 77 is a schematic diagram showing an exemplary process of matching a roll map length and coordinate axes by a roll map matching unit, according to aspects of the present disclosure.
Figure 78:
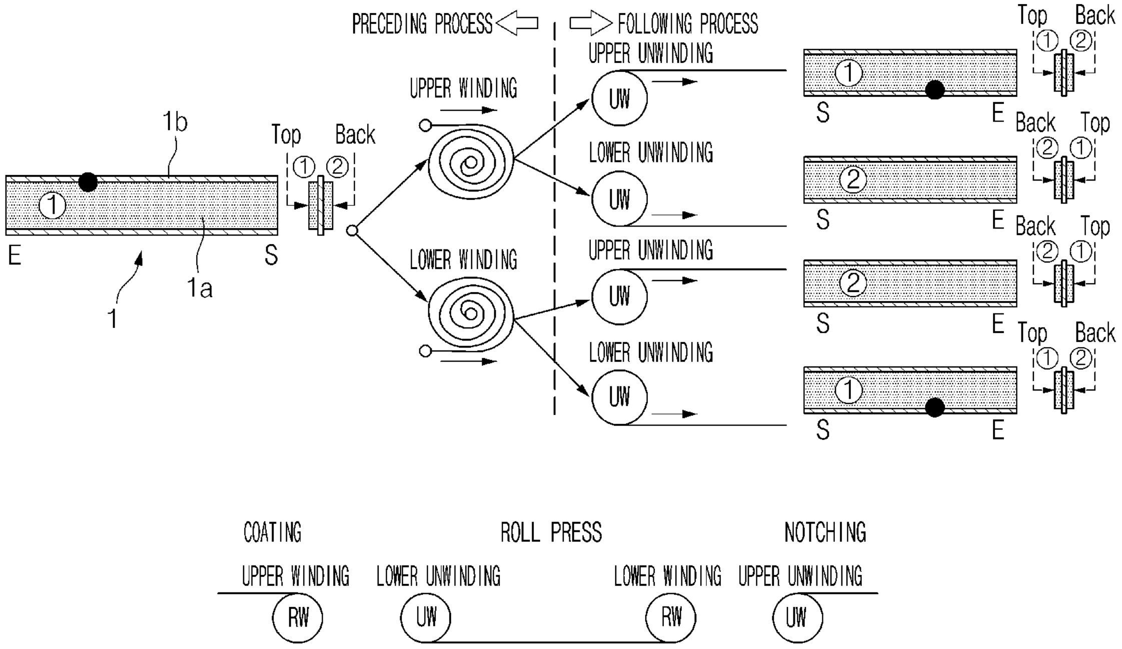
FIG. 78 is a schematic diagram showing an exemplary electrode reversal process, according to aspects of the present disclosure.

FIG. 76 is a schematic diagram of a roll map matching unit included in a system for manufacturing a battery according to one embodiment of the present disclosure, FIG. 77 is a schematic diagram showing a roll map length and coordinate axis matching process by the roll map matching unit, and FIG. 78 is a schematic diagram showing surfaces of an electrode that are reversed between the preceding and following processes.

The system 6000 for manufacturing the battery according to another embodiment of the present disclosure includes a roll map generation unit 6100 for generating a roll map, which includes data of the coordinate values indicating a position of an electrode and process data generated according to a proceeding of a plurality of processes performed on the electrode and matching the coordinate value, for each process, and the roll map matching unit 6200 for performing at least one of the following operations:

i) Matching the coordinate values of the roll map of the preceding process with the coordinate values of the roll map of the following process so that the actual electrode represented by the roll map of the preceding process corresponds to the actual electrode represented by the roll map of the following process; and ii) Matching the coordinate values of the roll maps of each process with the coordinate values of the roll map of the final process so that the actual electrode represented by the roll map of the final process among the plurality of processes and the actual electrode represented by the roll maps of each process before the final process.

As described above, the data of the coordinate values may be acquired by the position measurement device 20, such as a rotary encoder. In addition, the process data may be acquired by the PLCs 30 and the inspection and/or measurement devices 10 of each process. The roll map generation unit 6100 makes up the roll map by matching the process data to the data of the coordinate values (see FIG. 70). To this end, the roll map generation unit 6100 may include a database, a central processing unit, and a visualization device (see FIG. 71).

As described above, the process data may include at least one of equipment data acquired in each piece of process equipment, process-related inspected and/or measured data acquired in each process, and time-series data acquired in each process.

Meanwhile, the roll map generation unit 6100 may include the first roll map generation unit 6110, the second roll map generation unit 6120, or both the first roll map generation unit 6110 and the second roll map generation unit 6120 as shown in FIG. 69. That is, the first roll map generation unit 6100 may include the first roll map generation unit 6110 for generating the first roll map RI including the data of the coordinate values indicating the position of the electrode and some data of the process data generated according to the progress of the processed performed on the electrode and matching the coordinate values.

In addition, the roll map generation unit 6100 may further include the second roll map generation unit 6120 for generating the second roll map RII including the data of the first roll map RI and further including the additional data associated with some data of the process data and matching the coordinate values (see FIGS. 69 and 72).

Since the first roll map generation unit 6110 and the second roll map generation unit 6120 have been described above, detailed descriptions thereof will be omitted.

The roll map generation unit 6100 may generate at least one of an absolute coordinate roll map displaying coordinate values of an electrode part removed during each process, between the processes, and after a final process and a remaining electrode part excluding the removed electrode part together on a roll map and a relative coordinate roll map displaying only the coordinate value of the survival electrode part excluding the removed electrode part on the roll map.

The absolute coordinate roll map is shown at the uppermost end of each process drawing in FIG. 70, and the relative coordinate roll map is shown thereunder. That is, an absolute coordinate roll map R1 of the coating process is shown in FIG. 70A, and a relative coordinate roll map r1 is shown thereunder.

An absolute coordinate roll map R2 of the roll press process is shown in FIG. 70B, and a relative coordinate roll map r2 is shown thereunder. An absolute coordinate roll map R3 of the notching process is shown in FIG. 70C, and a relative coordinate roll map r3 is shown thereunder.

Since the relative coordinate roll maps r1, r2, and r3 represent the survival electrodes that have survived after the corresponding process has been ended, the relative coordinate roll maps r1, r2, and r3 become roll maps representing actual electrodes.

In the coating process of FIG. 70A, a roll map for an electrode with a total length of 1200 m is shown. Reference points M are marked at points of 300, 600, and 900 meters, which are 25%, 50%, and 75% points of the electrode, and each of the reference points M is displayed on the roll map of the corresponding coordinate values based on the data detected by the reference point measurement device 12. In addition, the loading amount is also displayed by varying a contrast over the corresponding coordinate section. However, a section v displayed in white without contrast means a section not inspected by the loading amount measurement device 11. When the electrode moves in the roll-to-roll state, the section in which the inspection device may not acquire data may occur due to various causes, such as fluctuation of the electrode, sensitivity of the inspection device, and problems in data communication.

Meanwhile, coordinates of right ends of the roll maps R1 and r1 have coordinate values of zero as start portions and coordinates of left ends thereof have coordinate values of 1200 meters as end portions. The winding of the rewinder RW starts at the start portion, and an encoder value (coordinate value) of the rewinder RW at this time is zero. When the winding is ended, the encoder value of the rewinder becomes 1200. However, when the electrode 1 was wound by 1100 meters, the end of the electrode was actually cut by 100 meters. As described above, cutting the electrode after the electrode roll completed is referred to as "removal after completion." Meanwhile, the defect section or the like is also cut and the electrode 1 is connected during the corresponding process, which is referred to as "current process removal." The roll map also displays information on a change in length of the electrode. Such a change in length of the electrode may be identified by detecting (inspecting) a change in distance between the reference points M. The absolute coordinate roll map R1 also displays the electrode with the length of 100 meters removed after completion, but the relative coordinate roll map r1 displays only the remaining electrodes (survival electrodes) excluding the removed electrode. In the relative coordinate roll map, the end portion of the electrode is expressed as 1100 meters.

Since the end portion of the electrode was removed by 100 meters at the end of the coating process or after the coating process was completed, the coordinate value of the end portion of the absolute coordinate roll map R2 of the roll press process was also 1100 meters. In addition, since the start and end portions of the electrode roll of the coating process and the roll press process were reversed, the coordinates of the roll map of the roll press process were also reversed. Therefore, the coordinate value of the reference point M of the coating process and the coordinate value of the reference point M of the roll press process were also changed. In addition, the coordinates of the start point were also changed from (650, 0.4) to (450, 0.2) according to the start/end reversal. In the roll press process, a section between 800 to 1000 meters marked as the defect section NG in the coating process, which is the preceding process, was reversed to become a section between 100 to 300 meters. The defect section is removed from a table t of a defect section processing port and discarded to the defect removal port P (scrap port).

The matters on the removal of the defect section NG may be reported to the PLC 30 and the roll map generation unit 6100 by the input device 60. Since the defects in the section between 100 to 300 meters were removed, the point of 200 meters (M), which was the reference point in the defect section, was also removed.

Only coordinates of the survival electrodes left after the defect sections have been removed are displayed on the relative coordinate roll map r2 in FIG. 70B.

In the notching process, an electrode tab is formed by punching the electrode moving in the roll-to-roll state using a punching tool BM. In addition, the reference point measurement device 12 may be provided to check a change in length of the electrode before and after the notching process or during the notching process.

In the notching process after the roll press process, the start/end reversal of the electrode 1 occurred. Therefore, the coordinates of the star were re-changed from (450, 0.2) to (600, 0.4). In addition, the end portion of the electrode was removed by 100 meters after notching. The coordinates of the removed electrode part are displayed on an absolute coordinate roll map R3 of the notching process together, but only the coordinates of the roll map of the remaining survival electrodes are displayed on a relative coordinate roll map r3. Through the coating process, the roll press process, and the notching process, a part of the electrode was removed a total of four times. Therefore, it can be seen that the electrode with a length of 1200 meters finally became a length of 750 meters.

Meanwhile, in the notching process, unlike the coating process or the roll press process, it is not necessary to separately generate the roll maps of the top and back surfaces of the electrode. In the notching process, only punching is performed without performing any special treatment on the top and back surfaces of the electrode. Therefore, as in the preceding process, only the reference point measurement device related to the change in length is installed without installing a complicated inspection and/or measurement device displaying the state of the electrode. That is, the properties of the top and back surfaces of the electrode may be sufficiently identified by the roll maps of the coating process and the roll press process, and in the notching process, the properties of the top and back surfaces are not particularly changed by notching. Therefore, in the notching process, it is sufficient to generate a roll map of a single planar surface displaying only the coordinate values on the coordinate planar surface regardless of the top and back surfaces of the electrode.

According to the present disclosure, the roll map matching unit 6200 is provided to compare the roll maps of each process with the same criterion or the same coordinate values. The roll map matching unit 6200 matches the coordinate values of the roll maps of the preceding and following processes or matches the coordinate values of the roll maps of each process among the plurality of processes with the coordinate values of the roll map of the final process.

The matching of the coordinate values of the roll maps of the preceding and following processes may be regarded as being included in a process of matching the coordinate values of the roll maps of each process with the coordinate values of the roll map of the final process in a broad sense. Therefore, hereinafter, the process of matching the coordinate values of the roll maps will be described based on the latter.

A case in which the plurality of series of roll-to-roll processes are performed is assumed.

In this case, the roll maps of each process are matched so that the actual electrode represented by the roll map of the final process among the plurality of processes correspond to each actual electrode represented by the roll maps of each process before the final process. That is, the roll maps are matched so that the actual electrode (survival electrode) of the final process corresponds to the actual electrode of each process before the final process. The matching of the roll maps are performed by matching the coordinate values of the roll maps of each process with the coordinate values of the roll map of the final process.

Referring to FIG. 76, the roll map matching unit 6200 may include a roll map length matching unit 6210, a coordinate axis matching unit 6220, and an electrode surface matching unit 6230.

FIG. 77 is a schematic diagram showing a roll map matching process according to the present disclosure.

FIG. 77 shows the absolute coordinate roll map R1 and the relative coordinate roll map r1 of the coating process, the absolute coordinate roll map R2 and the relative coordinate roll map r2 of the roll press process, and the absolute coordinate roll map R3 and the relative coordinate roll map r3 of the notching process sequentially from the top. Each of the roll maps are made up by the roll map generation unit 6100 in FIG. 69.

As described above, the relative coordinate roll map represents the actual electrodes in each process excluding the electrode parts removed during each process or between the respective processes. Therefore, the roll map matching operation of the roll map matching unit 6200 is to match the coordinate values of the relative coordinate roll maps of each process before the final process with the coordinate value of the relative coordinate roll map of the final process.

In the series of roll-to-roll processes, actual electrodes are removed before or after each process or in the corresponding process for reasons, such as defects or non-uniform quality. Therefore, the coordinate value of the roll map of the final process and the coordinate values of the roll maps of each process are changed. The important thing is that the coordinate values of the roll maps of each process should match the coordinate value of the roll map of the final process so that the actual electrode (survival electrode) represented by the roll map of the final process matches each actual electrode represented by the roll maps of each process. When the length of the electrode is not changed between the start and final processes of the roll-to-roll processes, the roll map length matching is not required. However, due to the characteristics of the mass production process, the start and end portions of the electrode often have non-uniform quality, and a test production part or the like before mass production is often removed. Therefore, in reality, the length of the electrode is inevitably changed between the start and final processes for any reason. In consideration of this, the roll map matching unit 6200 includes the roll map length matching unit 6210 according to the change in length of the electrode.

In order to match the lengths of the roll maps, it is necessary to remove all coordinate sections corresponding to actual electrode parts cumulatively removed in the series of roll-to-roll processes from the roll maps of each process. In addition, by correcting the coordinate values of the remaining coordinate sections left from the removal of the roll maps of each process to correspond to the coordinate value of the roll map of the final process, the lengths of the roll maps of each process may match the length of the roll map of the final process.

In addition, when a start direction of a coordinate axis of a roll map of a specific process before the final process is reversed from a start direction of the coordinate axis of the roll map of the final process according to the winding direction of the electrode in the rewinder RW of the preceding process and the unwinding direction of the electrode in the unwinder UW of the following process, the roll map matching unit 6200 matches the start direction of the coordinate axis of the roll map of the specific process with the start direction of the coordinate axis of the roll map of the final process. To this end, the roll map matching unit 6200 may include the coordinate axis matching unit 6220 for matching coordinate axes.

As described above, due to the characteristics of the roll-to-roll processes, the start/end reversal in which the start and end portions are reversed inevitably occurs in the roll map of the preceding process and the roll map of the following process. Since the coordinate axis matching is to match the (start) direction of the coordinate axis of the roll map of the final process, it is sufficient to match only the start direction of the coordinate axis of the roll map of the specific process, which is opposite to the start direction of the coordinate axis of the roll map of the final process, among the preceding processes before the final process. For example, the roll map of the process, which coincides with the direction of the coordinate axis of the roll map of the final process, among the preceding processes does not need to perform such a coordinate axis matching operation.

Referring to FIG. 77, there were a total of four electrode removal operations in the entire roll-to-roll process as follows:

① Removal of the end portion by 100 meters when the coating process is ended;

② Removal of the defect section by 200 meters during the roll press process;

③ Removal of the end portion by 50 meters after the roll press process; and

④ Removal of the end portion by 100 meters after the notching process is ended.

The relative coordinate roll map r3 of the notching process, which is the final process, became a total of a length of 750 meters due to the removal of the electrode four times. In addition, the coordinates in the longitudinal direction of the star point, which is the electrode part for comparison, were 600 meters, and the coordinates in the width direction were 40 cm (0.4 m).

In order to match the length of the roll map of the final process, all coordinate sections of the electrode parts removed four times in the entire roll-to-roll process were removed from the relative coordinate roll maps of each process. In this case, portions indicated by dotted boxes in FIG. 77 become portions of the roll map represented by the finally surviving actual electrodes.

In this case, since the start direction of the coordinate axis of the roll map of the coating process is the same as the start direction of the coordinate axis of the roll map of the notching process, the coordinate axis matching is not required. However, since the start direction of the coordinate axis of the roll map of the roll press process is reversed and different from the start directions of the coordinate axes of the roll maps of the coating process and the notching process, the coordinate axis matching operation is required.

In FIG. 77, upper ends of the absolute coordinate roll map R2 and the relative coordinate roll map r2 of the roll press process displays coordinate values before the coordinate axes are matched. When these coordinate values are reversed (corrected) like the lower end of the corresponding roll map, the coordinate values become the same as the start direction of the coordinate axis of the roll map of the notching process. According to the matching of the coordinate axes of the roll maps, the coordinate values of the reference points, the coordinate value of the defect section, and the coordinate values of the star points of the absolute coordinate roll map and the relative coordinate roll map of the roll press process are all changed. Specifically, both the longitudinal axis and the transverse axis, which are the coordinate axes of the roll map of the roll press process, match the directions of the coordinate axes of the notching process. In FIG. 77, the symbols indicated by R2-1 and r2-1 indicate that the coordinate axes of the absolute coordinate roll map R2 and the relative coordinate roll map r2 of the roll press process are reversed. That is, R2-1 indicates the absolute coordinate roll map of the roll press process in which the coordinate axes are reversed, and r2-1 indicates the relative coordinate roll map of the roll press process in which the coordinate axes are reversed.

In FIG. 77, the roll-to-roll processes are formed of the odd number of times (three times), and the directions of the coordinate axes of the roll maps of the first process (coating process) and the final process (notching process) are matched. Therefore, the coordinate axes of the roll map of the second process (roll press process) formed of the even number of times in which the directions of the coordinate axes have been reversed match the coordinate axes of the roll map of the final process. However, when the entire roll-to-roll process is formed of the even number of times by adding the process, unlike FIG. 77, coordinate axes of a roll map of an odd-numbered process, such as a first process, need to match coordinate axes of a roll map of a final process, which is an even-numbered process.

As described above, the coordinate axis matching is performed relatively based on the final process.

At the lower end of FIG. 77, roll maps finally matched by the roll map matching operation are shown. The coordinate section corresponding to the removed electrode section was removed from the roll maps of the coating process and the roll press process, and the directions of the coordinate axes of the roll map were also matched with the directions of the coordinate axes of the roll map of the notching process. Therefore, the coordinate value of the roll map of the notching process, which is the final process, is accurately matched with the coordinate values of the roll maps of the coating process and the roll press process, which are the preceding processes. All of the coordinate values of the longitudinal and transverse axes of the star points are also matched in the three roll maps matched as 600 meters and 0.4 meters.

As described above, the roll map in which the coordinate values of the roll maps of each process are arranged side by side to match the coordinate values of the roll map of the survival electrode of the final process and viewed at once is referred to as "overlay roll map." The roll map matching unit 6200 according to the present disclosure is for eventually generating the overlay roll map. When the overlay roll map is displayed on the display unit, the quality history or manufacturing history of the final survival electrode may be identified at a glance. Referring to FIG. 77, it can be seen from the (overlay) roll map of the roll press process that the battery manufactured with the electrodes at the star points was derived from the electrode having the rolled thickness (e.g., the rolled thickness in a normal range) indicated by a specific hatching in the roll press process. In addition, it can be seen from the roll map of the coating process that the battery manufactured with the electrodes at the star points was derived from the electrode having an excessive loading amount coated more than the normal range in the coating process. For example, when ignition occurs in the battery manufactured with the electrodes at the star points, it can be determined that there is a problem with the corresponding electrode from the manufacturing history of the coating process. Alternatively, the star points may be exterior or other defect portions. That is, when a problem occurs in the removed electrode at the star point and this is caused by a poor exterior, it is possible to simply identify from the overlay roll map which electrode part caused the portion corresponding to the exterior defect in the electrode manufacturing process.

As described above, according to the present disclosure, by generating the roll maps of each process and matching the roll maps of each process by the roll map matching unit 6200, it is possible to easily identify data on quality or defects of the survival electrode surviving in the final process.

In addition, it is possible to easily identify the inspection history in the electrode manufacturing process using the matched roll map (overlay roll map).

In addition, according to the present disclosure, even when the start and end portions of the electrode roll are reversed or the length of the electrode is changed through the series of roll-to-roll processes, by generating the overlay roll map through the above-described matching of the lengths of the roll maps and matching of the coordinate axes, it is possible to intuitively and quickly track a problem with the quality of the electrode when the problem occurs.

Meanwhile, when the top surface of the electrode in the preceding process is reversed to the back surface of the electrode in the following process according to the winding direction of the electrode in the rewinder RW of the preceding process and the unwinding direction of the electrode in the unwinder UW of the following process, the matching unit 6200 may match the roll map by reflecting the surface reversal.

As shown in FIG. 78, there is a case in which the top and back surfaces of the electrode may be reversed in the preceding and following processes according to the winding and unwinding directions of the electrode in the preceding and following processes.

In this case, information on the reversal of the surfaces of the electrode is stored in the roll map matching unit 6200. For example, the PLCs 30 of each process retains information on the winding and unwinding directions of the electrode because it controls the electrode movement and the winding and unwinding of the electrode. The roll map matching unit 6200 may receive the information on the surface reversal from the PLC and store the information in the electrode surface matching unit 6230.

The electrode surface matching unit 6230 of the roll map matching unit 6200 matches the roll map of the top surface of the electrode in the preceding process with the roll map of the back surface of the electrode in the following process according to the information.

FIG. 78 shows an example of generating an overlay roll map by the surface matching. Referring to FIG. 78, in the rewinder RW of the coating process, the electrode is wound in the upper winding direction and unwound in the lower unwinding direction in the roll press process. That is, the top surface of the electrode in the coating process is reversed to the back surface of the electrode in the roll press process. The electrode surface matching unit 6230 receives and records the information on the surface reversal from the controller 30. For example, a control logic value when the surface reversal (top/back reversal) does not occur between the preceding and following processes may be set to zero, and a control logic value when the surface reversal occurs may be set to 1.

In addition, in the rewinder RW of the roll press process, the electrode is wound in the lower winding direction and unwound in the upper unwinding direction in the unwinder W of the notching process. In this case, the surface reversal of the electrode occurs again, and in this case, the control logic value of 1 is set again by the electrode surface matching unit 6230. However, since the roll map of the notching process is made up as only a roll map of a single planar surface regardless of the surface of the electrode, there is not a big problem even when the reversal information is not reflected at the time of generating the overlay map when there occurs the surface reversal between the roll press process and the notching process. Referring to FIG. 78, it can be seen that the start/end reversal has also occurred between the coating process and the roll press process and between the roll press process and the notching process.

FIG. 79 shows one example of the overlay roll map in which the roll map length matching and the coordinate axis matching are performed by reflecting the change in length of the electrode and the change in coordinate axes.

Figure 79A:
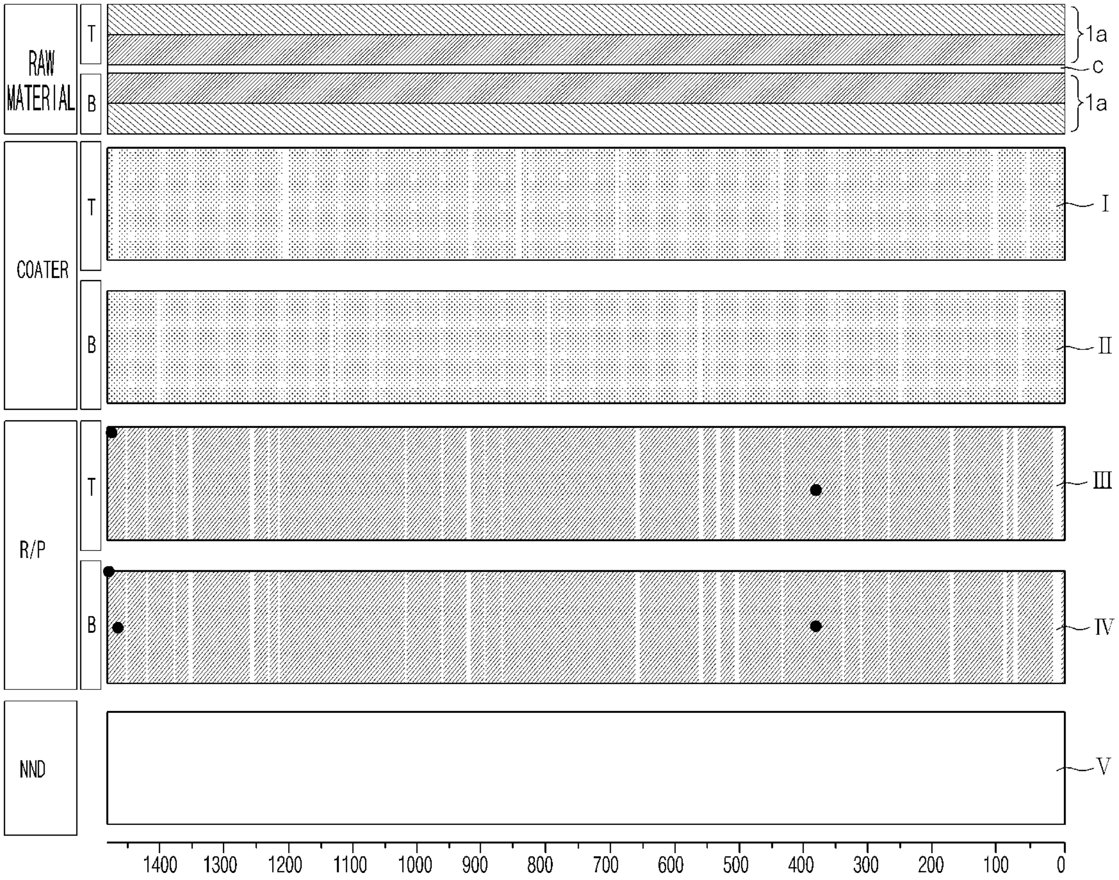
FIG. 79A is a schematic diagram showing an exemplary overlay roll map, according to aspects of the present disclosure.
Figure 79B:
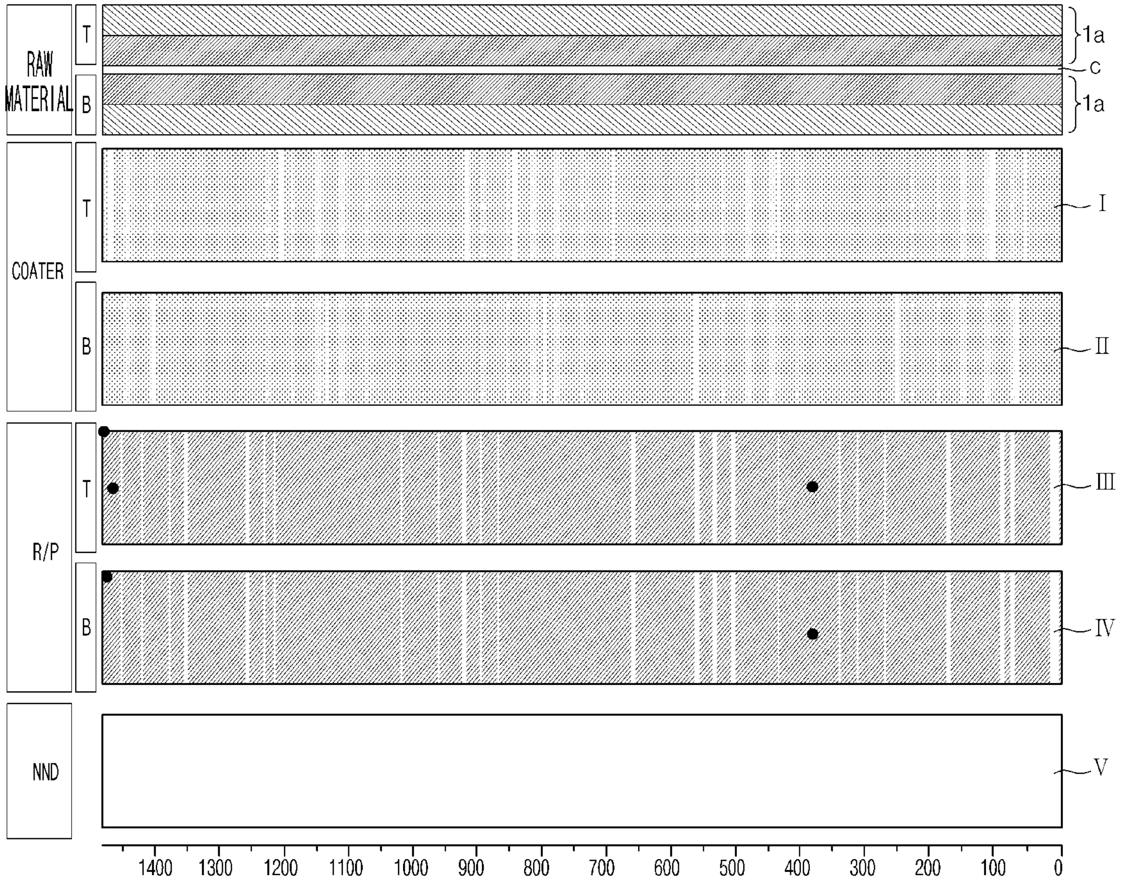
FIG. 79B is a schematic diagram showing an exemplary overlay roll map, according to aspects of the present disclosure.

FIG. 79A shows an overlay roll map when the surface reversal does not occur between the coating process and the roll press process, and FIG. 79B shows an overlay roll map when the surface reversal occurs.

Referring to FIG. 79A, since no surface reversal has occurred, a roll map I of the top surface T of the electrode of the coating process corresponds to a roll map III of the top surface T of the electrode of the roll press process.

In this case, control logic 0 is set in the electrode surface matching unit 6230. That is, the roll map I of the top surface of the electrode indicated by T in the coating process corresponds to the roll map III of the top surface of the electrode indicated by T in the roll press process. In this case, since the overlay roll maps of the top surfaces of the electrodes between the coating process and the notching process are formed of I, III, and V, it is possible to identify quality and product histories between the respective processes. Likewise, the overlay roll maps of the back surfaces B of the electrodes are formed of II, IV, and V.

Referring to FIG. 79B, since no surface reversal has occurred, the roll map I of the top surface T of the electrode of the coating process corresponds to the roll map IV of the back surface B of the electrode of the roll press process. In this case, control logic 1 is set in the electrode surface matching unit 6230. That is, the roll map I of the top surface of the electrode indicated by T in the coating process corresponds to the roll map IV of the back surface of the electrode indicated by B in the roll press process. In this case, since the overlay roll maps of the top surfaces of the electrodes between the coating process and the notching process are formed of I, IV, and V, it is possible to identify quality and product histories between the respective processes. Likewise, by also reflecting the surface reversal information to the back surface of the electrode, the roll map II of the back surface of the electrode of the coating process corresponds to the roll map III of the top surface T of the electrode of the roll press process. Therefore, the overlay roll map of the back surface of the electrode is formed of II, III, and V.

As described above, when the electrode surface matching unit 6230 provides the information on the surface reversal and does not match the surface reversal between the roll maps, there occurs a problem that roll maps representing surfaces of completely different actual electrodes are compared in the coating process and the roll press process. In this case, since the consistency of quality tracking using the overlay roll map is damaged, the quality tracking may be performed accurately.

The roll map matching unit 6200 according to the present disclosure may perform electrode surface matching in addition to the above-described roll map length matching and coordinate axis matching. Therefore, by generating the overlay roll map by the roll map matching of a predetermined logic even when the top and back surfaces of the electrode are reversed in the series of roll-to-roll processes, it is possible to quickly and intuitively track a problem with the quality of the electrode when the problem occurs.

The roll map matching unit 6200 may receive data from, for example, the first roll map generation unit 6110 and match the coordinate values of the first roll map RI of the preceding process and the first roll map RI of the following process or match the coordinate values of the first roll maps RI of each process among the plurality of processes with the coordinate values of the first roll map RI of the final process.

In addition, the roll map matching unit 6200 may receive data from, for example, the second roll map generation unit 6120 and match the coordinate values of the second roll map RII of the preceding process and the second roll map RII of the following process or match the coordinate values of the second roll maps RII of each process among the plurality of processes with the coordinate values of the second roll map RII of the final process.

Figures 80, 81:
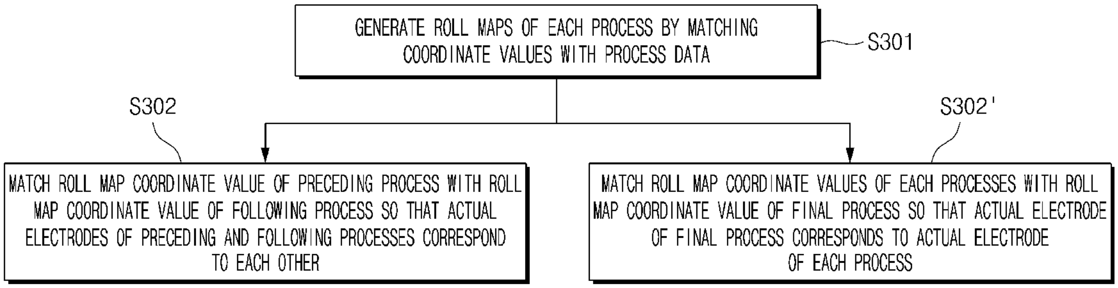
FIG. 80 is a flowchart showing an exemplary method of manufacturing a battery, according to aspects of the present disclosure.
FIG. 81 is a table showing an exemplary matching data obtained by a system for manufacturing a battery, according to aspects of the present disclosure.

FIG. 80 shows a method of manufacturing a battery according to the present disclosure. The method of manufacturing a battery according to the present disclosure includes generating a roll map, which includes data of the coordinate values indicating a position of an electrode and process data generated according to a proceeding of a plurality of processes performed on the electrode and matching the coordinate value, for each process (S301), and performing at least one of the following matchings:

I) Matching the coordinate values of the roll map of the preceding process with the coordinate value of the roll map of the following process so that the actual electrode represented by the roll map of the preceding process corresponds to the actual electrode represented by the roll map of the following process (S302); and ii) Matching the coordinate values of the roll maps of each process with the coordinate values of the roll map of the final process so that the actual electrode represented by the roll map of the final process among the plurality of processes and the actual electrode represented by the roll maps of each process before the final process ('S302').

For example, the first roll map RI or the second roll map RII of each process may be made up by matching the data of the coordinate values of each process with the process data by the first roll map generation unit 6110 and/or the second roll map generation unit 6120 shown in FIGS. 69 and 72.

In addition, the roll map matching unit 6200 may match the coordinate values of the roll maps of the preceding and following processes or match the coordinate values of the roll maps of each process among the plurality of processes with the coordinate values of the roll map of the final process. As described above in the matching process, the lengths of the roll maps may be matched to match the following process or the final process. To this end, the roll map matching unit 6200 may include the roll map length matching unit 6210. In addition, when the coordinate axes of the roll map are reversed as the progress of the process, the coordinate axis matching considering this is performed together with the roll map length matching. To this end, the roll map matching unit 6200 may include the coordinate axis matching unit 6220. In addition, when the surfaces of the electrode are reversed between the preceding and following processes according to the progress of the process, the surface matching for matching the surface of the roll map with the reversed state is performed. To this end, the roll map matching unit 6200 may include the electrode surface matching unit 6230.

The roll map generation unit 6100 and the roll map matching unit 6200 may be a data processing system (an MES, an SPC, or a DW) or one component of the corresponding system.

For example, the roll map generation unit 6100 and the roll map matching unit may be one component of the MES. In this case, as shown in FIG. 69, the roll map generation unit 6100 may be connected to the PLC, the position measurement device, and the inspection and/or measurement device in each process to exchange data for generating the roll map.

However, since the main purpose of the MES is production management, it is difficult to retain excessive data. Considering this point, the MES or the roll map generation unit that is a component thereof, for example, the first roll map generation unit 6110 may generate the first roll map to which only relatively small-size data is allocated. When the MES has a server with a large data processing capacity, the MES may include both the first roll map generation unit 6110 and the second roll map generation unit 6120. However, when it is difficult to install the server with the large data processing capacity due to the configuration of the MES, the second roll map generation unit 6120 may be a separate upper level control system or one component of the upper level control system. Likewise, the roll map matching unit 6200 may also be a separate upper level control system or one component of the upper level control system when there is no appropriate server.

For example, the second roll map generation unit 6120 and/or the roll map matching unit 6200 may be installed in the upper level control system, such as an SPC. That is, the second roll map generation unit 6120 or the roll map matching unit 6200 may be the SPC or one component of the SPC. In this case, the second roll map Rh may be made up by the second roll map generation unit 6120 belonging to the upper level control system by adding data to the first roll map RI. In addition, the roll map matching unit 6200 in the SPC may receive necessary data from the first roll map generation unit 6110 and the second roll map generation unit 6120 and match the first roll map or the second roll map of the plurality of processes. Therefore, the coordinates of the roll maps between the plurality of processes may be corrected based on the same criterion and displayed in the form of, for example, an overlay roll map. Therefore, it is possible to easily identify the coordinate values of the plurality of processes and electrode corresponding parts in each process corresponding to the coordinate values. Furthermore, it is also possible to easily identify the process data of each process matched to each electrode corresponding part (coordinate values).

Meanwhile, the roll map matching unit 6200 may also be a control system higher than the SPC. For example, the roll map matching unit 6200 may be a data warehouse DW for converting and managing the data accumulated in the database in data in a common format. The data warehouse enables data-based decision-making and analysis by integrating data from multiple sources.

The roll map length matching unit 6210, the coordinate axis matching unit 6220, and the electrode surface matching unit 6230 may be software capable of performing predetermined calculation and matching operations or a computing system in which the software is embedded. For example, each matching unit may be a real-time system, such as an embedded computer system (ECS), and among them, a microcomputer may be adopted as each matching unit. The roll map length matching unit 6210, the coordinate axis matching unit 6220, and the electrode surface matching unit 6230 may mutually perform wired and wireless communication. In FIG. 76, the matching units are separately shown for functional classification. However, for efficient computing processing, one or more of the matching units may be integrated. For example, since both the roll map length matching and the coordinate axis matching are related to the conversion of the coordinate value, the roll map length matching and the coordinate axis matching may be integrally operated as one matching unit. Therefore, a detailed configuration of the roll map matching unit 6200 is not limited to the example of FIG. 76.

Meanwhile, FIGS. 69 and 72 show an electrode material that is input into an electrode coating process from a mixer. In this case, at least one of data on specifications of an input material for manufacturing the electrode, process data for a mixing process of the input material, and path data on a moving path through which the mixed input material moves to an electrode coater may match each matched coordinate value of the overlay roll map and the process data of each process matching the coordinate values and managed.

Since the data on the specifications, the process data for the mixing process of the input material, and the path data on the moving path have been described above with reference to FIG. 53, a detailed description thereof will be omitted.

The system for manufacturing a battery according to the present disclosure may be connected to the mixer controller and the slurry lot information detection controller to display the above-described data on the input material on the first roll map or the second roll map. In addition, the data may be displayed by matching the respective coordinate values and the process data of the overlay roll map displayed by matching the first and second roll maps.

In FIG. 81, data acquired in the plurality of processes are displayed in association with each other (i.e., by matching each other). For reference, the data shown in FIG. 81 is displayed in alphabetical characters so that only the type of data may be distinct and is not displayed in specific numerical values or the like.

In FIG. 81, in mixing and tank movement, the data on the specifications (e.g., an electrode roll lot number and a slurry lot number), data on a tank movement path and the like are shown.

Data on each roll map of the electrode manufacturing process and the notching process is also displayed by being matched with the data on the mixing and tank movement processes. The data of the coordinate values may be coordinate values matched on, for example, the overlay roll map through the above-described roll map matching process.

The inspected and/or measured data may be inspected and/or measured data on the electrode parts of each process corresponding to the corresponding coordinate values. For example, in the coating process, D1 may be loading amount data at a coating process coordinate value C1, and in the roll press process, D2 may be electrode thickness data at a roll press coordinate value C2. In this case, C1 and C2 indicate positions of the same actual electrode.

The equipment data may be, for example, temperature data acquired from the electrode parts of each process corresponding to the corresponding coordinate values.

The time-series data may indicate a time point at which each data has been acquired. As described above, the equipment data and the time-series data may be acquired by the PLC of each process.

As described above, according to the system 6000 for manufacturing a battery and the method of manufacturing the same according to the present disclosure, following process data matching the coordinate values of the roll map of the following process and preceding process data matching the coordinate values of the preceding process matching the coordinate values of the roll map of the following process may be matched and managed.

Alternatively, final process data matching the coordinate value of the roll map of the final process and the process data of each process matching the coordinate values of each process matching the coordinate values of the roll map of the final process may be matched and managed.

That is, when the plurality of processes are performed, necessary data may be identified in connection with each other via the coordinate values of the electrode moving in each process. Therefore, it is possible to easily perform quality control, analysis, monitoring, tracking, and the like in the electrode manufacturing process and the assembly process.

In addition, it is possible to overcome the limitations of a general PLC processing only time series data and other data in connection with each other. When the time-series data is used as a reference for comparison, it is not possible to specifically identify a change occurring between the preceding and following processes. In addition, in many cases, the time series data and data generated by events of each process do not exactly correspond. In this case, a separate processing operation is required to match the time series data with each generated data. Such an operation is not only time-consuming, but also less accurate.

According to the present disclosure, by matching the coordinate values between the plurality of processes and matching the respective coordinate values with the respective process data and using matching results in manufacturing the battery, it is possible to manufacture the battery more comprehensively, intuitively, and efficiently throughout battery manufacturing.

The first roll map, the second roll map, and/or the overlay roll map may be stored in a storage medium.

The roll maps may be stored in the database of the roll map generation unit 6100 or a separate storage medium. The database or the storage medium may be, for example, a memory. A plurality of memories may also be provided, as necessary. The memory may be a volatile memory or a non-volatile memory. As the memory of the volatile memory, a random access memory (RAM), a dynamic RAM (DRAM), a static RAM (SRAM), or the like may be used. As the memory of the non-volatile memory, a read only memory (ROM), a programmable ROM (PROM), an electrical alterable ROM (EAROM), an erasable programmable ROM (EPROM), an electrically erasable programmable ROM (EEPROM), a flash memory, or the like may be used. Examples of the above-listed memories are merely illustrative and are not limited to these examples. Alternatively, the storage medium may be a hard disk, a CD-ROM, a USB memory, a solid state drive (SSD), or the like.

The roll map and related data stored in the storage medium may be freely used in battery manufacturing, quality control, analysis, and problem tracking.

One or more aspects of FIGS. 1-81 may be incorporated into or combined with one or more aspects of the embodiments disclosed in reference to FIGS. 82-90 herein. Accordingly, some elements of FIGS. 82-90 may be similar to elements of FIGS. 1-81, and thus similar or identical reference numerals may be used to depict those elements. Further, detailed disclosure of the similar or identical elements already described may be omitted hereinafter for brevity. However, such omissions are not disclaimers or disavowals, and except to the extent that the similar or identical elements that are already described are inconsistent with the express disclosure herein, in which case the language in the present disclosure hereinafter controls.

Figure 82:
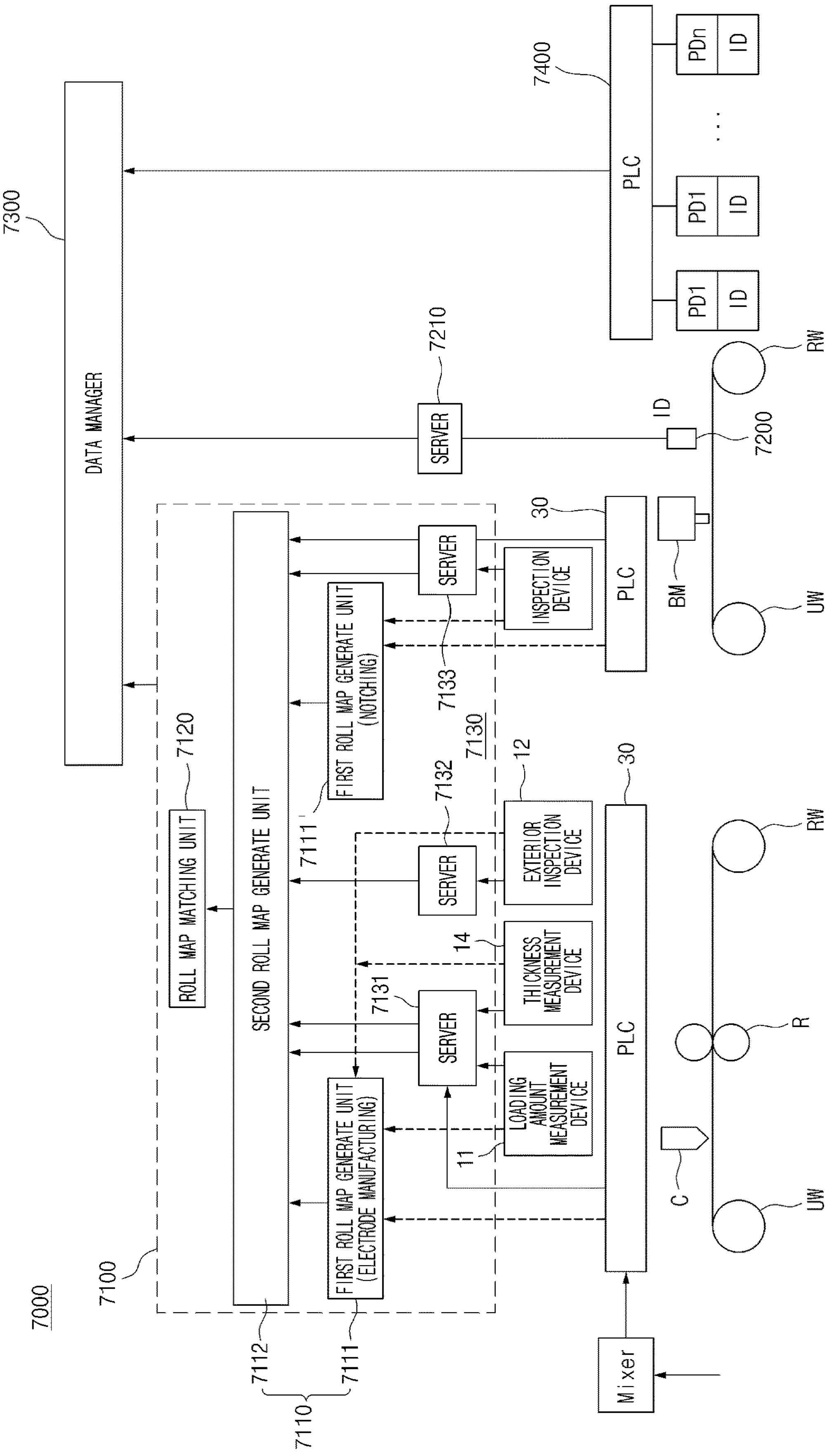
FIG. 82 is a schematic diagram showing an exemplary system for manufacturing a battery, according to aspects of the present disclosure.

FIG. 82 is a configuration diagram of a system for manufacturing a battery according to another embodiment of the present disclosure.

A system 7000 for manufacturing a battery according to still another embodiment of the present disclosure includes a data of a coordinate value server 7100 for storing coordinate values indicating a position of an electrode moving during a process performed on the electrode, an identification mark providing unit 7200 for providing an identification mark to the electrode at a predetermined interval, and a data manager 7300 for matching and managing a coordinate value of the data of the coordinate value server 7100 corresponding to the identification mark and the identification mark.

The system 7000 for manufacturing the battery allows data associated with the roll map to be used in the following process after the identification mark is generated as well as a process of generating the identification mark by connecting the above-described coordinate values of the roll map and the process data matching the coordinate values with the identification mark of the electrode. In addition, the system 7000 for manufacturing the battery may monitor almost all production processes of the battery by matching the process data of the following process matching the identification mark with the process data of the process before the identification mark is generated based on the coordinate values of the roll map and the identification mark.

The coordinate values may be coordinate values of the roll map displayed on the roll map on which the electrode 1 moving between the unwinder UW and the rewinder RW is imitated. For example, in the electrode manufacturing process of the electrode coating process of coating the electrode slurry, the roll press process of rolling the electrode, and the slitting process of cutting the rolled electrode, the roll map on which the electrode 1 moving in a roll-to-roll manner may be made up is imitated. Data of the coordinate values indicating the position of the electrode may be given on such a roll map. The coordinate values of the roll map may be acquired by the position measurement device 20 (e.g., the rotary encoder) installed on the unwinder UW or the rewinder RW and the PLC 30 or the inspection and/or measurement device 10 installed in each process. For example, the coordinate values of the electrode in the longitudinal direction may be acquired by the rotary encoder. For example, the coordinate values of the electrode in the width direction may be acquired by the inspection and/or measurement device 10.

The data of the coordinate value server 7100 according to the present disclosure stores the coordinate values of the roll map indicating the position of the moving electrode during the process performed on the electrode.

Referring to FIG. 82, the data of the coordinate value server 7100 may include a roll map generation unit 7110, a roll map matching unit 7120, or servers 7130 for storing necessary data.

For example, the roll map generation unit 7110 connected to various inspection and/or measurements 10 and position measurement devices 20 may receive and store the data of the coordinate values indicating the position of the electrode 1 moving between the unwinder UW and the rewinder RW. In this case, the coordinate values and the process data may be matched and displayed on the visualization region called the roll map. One displaying only some of the process data for the roll map is referred to as "the first roll map RI," and one adding and displaying the additional data associated with some data and matching the coordinate values on the first roll map is referred to as "the second roll map RE." The roll map generation unit 7110 may include a first roll map generation unit 7111 and/or a second roll map generation unit 7112. The first and second roll map generation units may be implemented in one integrated data processing system. Alternatively, the first and second roll map generation units may belong to separate data processing systems, respectively. For example, the first roll map generation unit 7111 may be positioned in the MES, and the second roll map generation unit 7112 may be positioned in the SPC. That is, the first roll map generation unit 7111 may be the MES or one component of the MES, and the second roll map generation unit 7112 may be the SPC or one component of the SPC.

The process data includes at least one of equipment data acquired in each piece of process equipment, process-related inspected and/or measured data acquired in each process, and time-series data acquired in each process.

The equipment data may be acquired from the PLC 30 for performing each process. Therefore, the equipment data may include all parameters managed by the PLC in each process.

The inspected and/or measured data includes all data inspected or measured by a predetermined inspection device, measurement device, or inspection and measurement device in each process.

The process data may also include the time-series data acquired in each process. That is, the data (time-series data) on the data generation time point may be obtained from the all data acquired in each process. The PLC 30 for controlling and managing the flow of each process may acquire the time-series data.

The process data is generated according to the progress of the process performed on the electrode, and the process data is acquired for each individual process.

The roll map matches the process data with the data of the coordinate values indicating the position of the electrode and visualizes and displays a matching result.

As described above, the data of the coordinate value server 7100 may store the coordinate values of the roll map in each process and the process data matched therewith.

In a series of roll-to-roll processes, as described above with reference to FIG. 70, the length of the electrode may be changed between the processes by the current process removal and the removal after process, the start and end portions of the electrode may be reversed, and the surfaces of the electrode may be reversed. Therefore, the data of the coordinate value server 7100 may include the roll map matching unit 7120 for matching the coordinate values of the roll maps of each process to be compared with each other based on the same criterion in consideration of the change in length, the start/end reversal, and the surface reversal.

The roll map matching unit 7120 includes a roll map length matching unit, a coordinate axis matching unit, and an electrode surface matching unit and matches the coordinate values of the roll maps of a preceding process or a plurality of processes with an actual electrode of a following process or a final process.

Therefore, the data of the coordinate value server 7100 may store the coordinate values of the roll map of the preceding process and the coordinate values of the roll map of the following process matched by the roll map matching. Alternatively, the coordinate values of the roll map of each process among the plurality of processes may match the coordinate values of the roll map of the final process and stored.

Considering the data processing capacity, the roll map matching unit 7120 may be an upper level control system (e.g., the SPC) separate from the MES or one component of the upper level control system.

Both the second roll map generation unit 7112 and the roll map matching unit 7120 may be installed in one integrated system (SPC). In this case, the second roll map RII may be made up by the second roll map generation unit 7112 belonging to the upper level control system by adding additional data to the made-up first roll map RI. In addition, the roll map matching unit 7120 in the SPC may receive necessary data from the first roll map generation unit 7111 and the second roll map generation unit 7112 and match the first roll maps RI or the second roll maps RII of the plurality of processes. Therefore, the coordinate values of the roll maps between the plurality of processes may be corrected based on the same criterion, and for example, data may be expressed as the overlay roll map.

The server unit 7130 (e.g., an image data storage server 7132) necessary for storing data for generating the second roll map RII may be additionally included raw data storage servers 7131 and 7133. Therefore, the data of the coordinate value server 7100 may store one or more of the following roll maps:

a) the first roll map RI including the data of the coordinate values indicating the position of the electrode and some data of the process data generated according to the progress of the process performed on the electrode and matching the coordinate value;

b) the second roll map including the data of the coordinate values and some data of the first roll map and further including additional data associated with some data and matching the coordinate value;

c) the overlay roll map arranging the roll maps of preceding and following processes in which the coordinate values of the roll maps are matched side by side; and d) an overlay roll map in which the roll maps of each process in which the coordinate values of the roll map of each process match the coordinate value of the roll map of the final process are arranged side by side.

Figure 83:
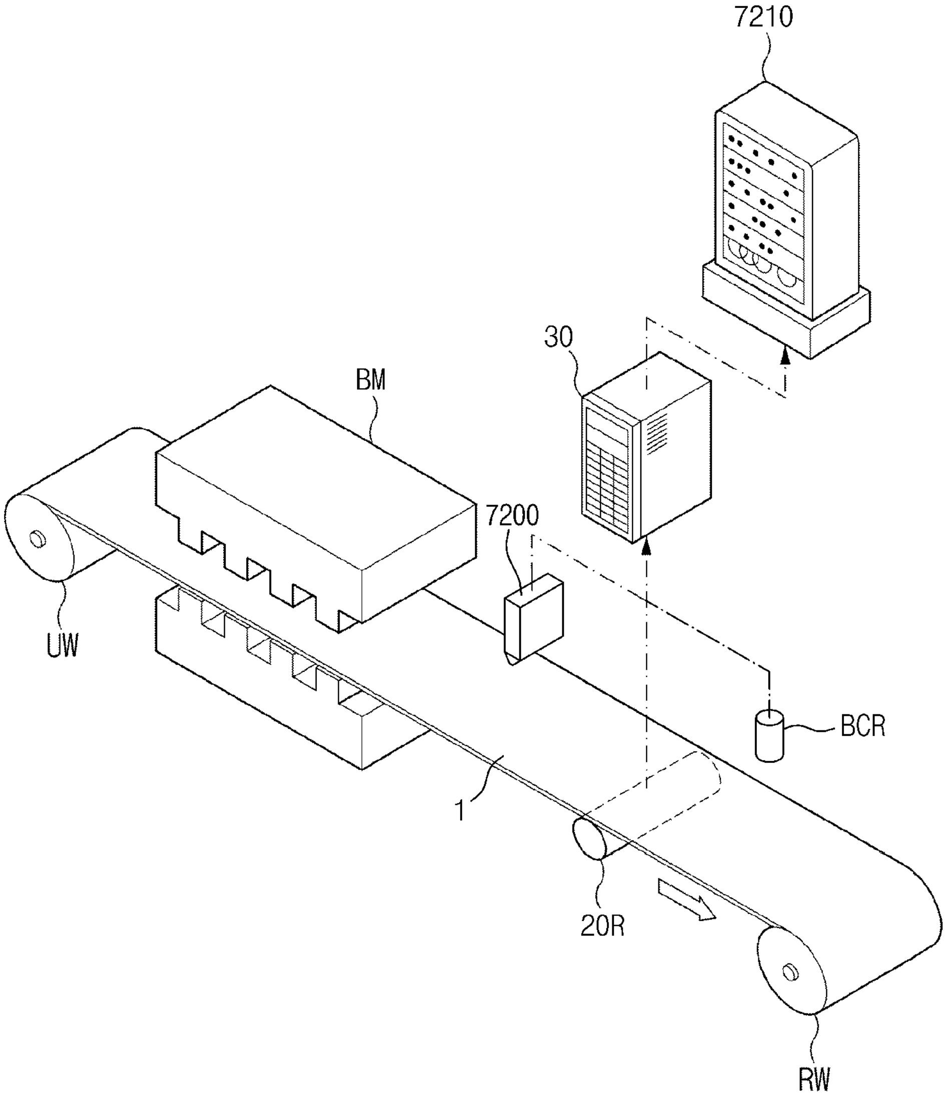
FIG. 83 is a schematic diagram showing an exemplary process of providing an identification mark to an electrode.
Figure 84:
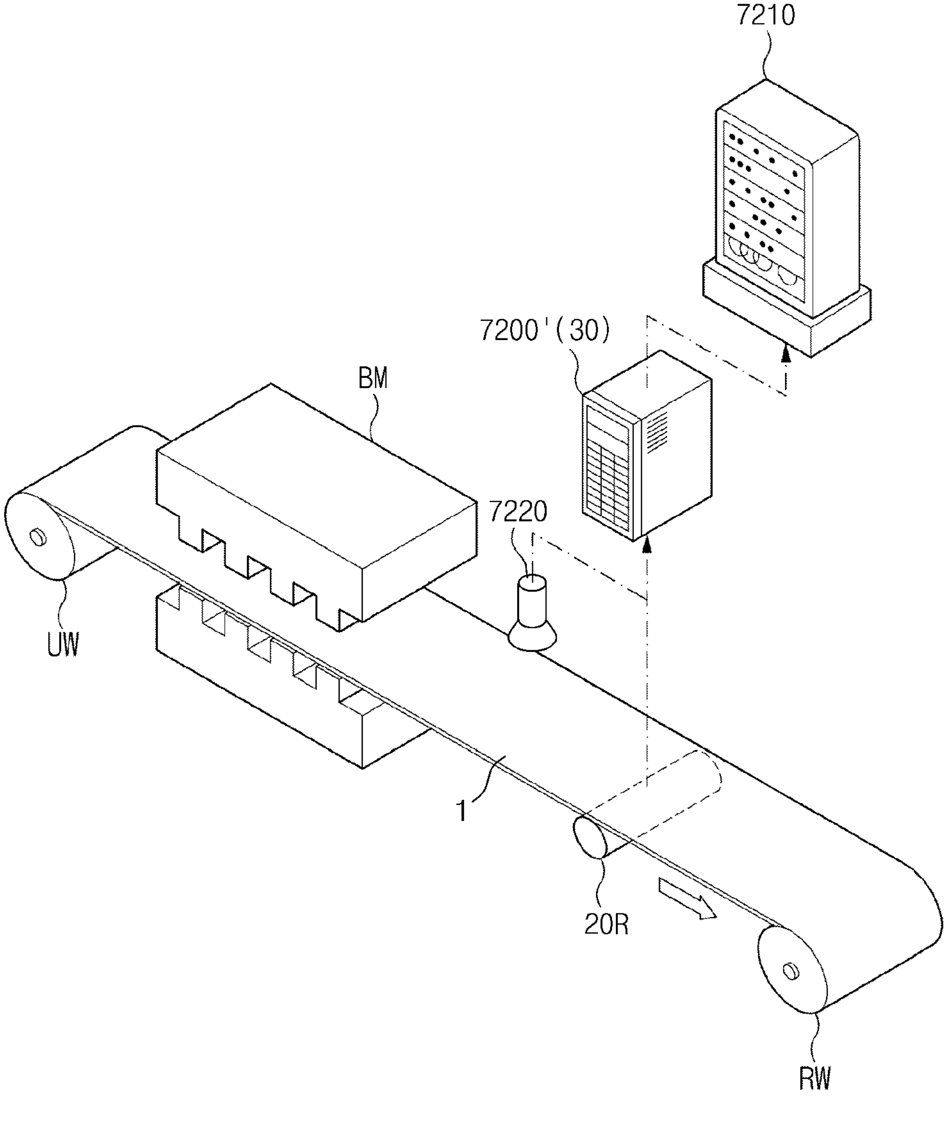
FIG. 84 is a schematic diagram showing an exemplary process of generating a virtual identification mark for an electrode, according to aspects of the present disclosure.
Figure 85:
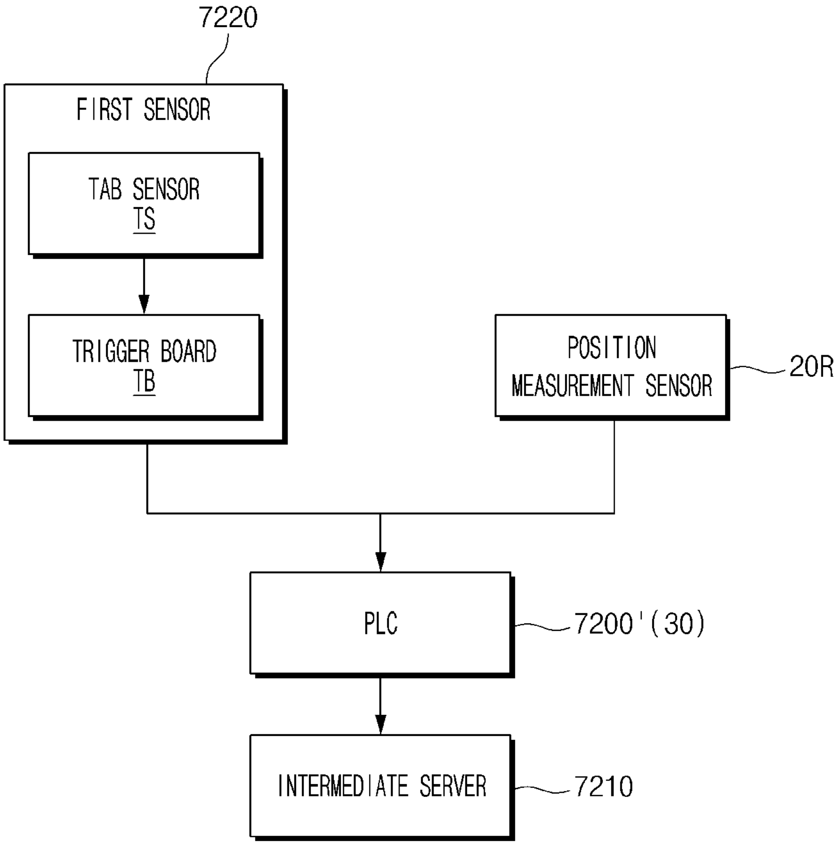
FIG. 85 is a block diagram showing an exemplary process of generating a virtual identification mark for an electrode, according to aspects of the present disclosure.

FIG. 83 is a schematic diagram showing a process of giving an identification mark to an electrode, and FIGS. 84 and 85 are schematic diagrams showing a process of giving a virtual identification mark to the electrode.

After a series of electrode manufacturing processes, an identification mark may be given to a predetermined position on the electrode. For example, the identification mark may be given to an electrode tab part. The electrode tab may be formed by notching a portion of a current collector not coated with electrode slurry. The notching process may also be performed on the electrode moving between the unwinder UW and the rewinder RW. Therefore, the roll map (notching process roll map) may be made up in the process of giving the identification mark. Therefore, it is possible to acquire the coordinate values of the roll map not only in one preceding process or the plurality of preceding processes (e.g., coating, roll press, and slitting) before the process of giving the identification mark but also in the notching process of giving the identification mark and match the coordinate values of each roll map with the process data of each process. The data of the coordinate value server 7100 may also store a roll map of the electrode manufacturing process and a roll map of the notching process. In addition, an overlay roll map may be made up by correcting the coordinates of the roll map of the preceding process before the notching process to match the roll map of the notching process (see FIG. 79). Therefore, the data of the coordinate value server 7100 may store the coordinate values of the roll maps and the process data of the process of generating the identification mark and all processes before the process of generating the identification mark, the coordinate values of the overlay roll map matched between the processes, and the like.

In addition, the system 7000 for manufacturing the battery according to the present disclosure includes an identification mark providing unit 7200 for providing the identification mark to the electrode 1 at predetermined intervals.

The identification mark may be an electrode ID actually marked on the electrode or a virtual electrode ID virtually provided every predetermined pitch.

FIGS. 82 and 83 show the ID marker 7200 for marking the electrode ID on the electrode at predetermined pitches as the identification mark providing unit.

As the ID marker 7200, for example, an inkjet-type ink marker or a laser-type laser marker may be used, but the present disclosure is not limited thereto. An appropriate marker may be selected and used in the range of excellent visibility and no damage to the electrode.

A barcode may be provided as the electrode ID, which is the identification mark, but the present disclosure is not limited thereto, and other types of identification marks capable of identifying the electrode, such as a QR code and an identification number, may also be adopted.

Referring to FIG. 83, in the notching process, the electrode 1 moves between the unwinder UW and the rewinder RW and is punched by the puncher BM to form an electrode tab on the electrode 1. After the notching process, the ID marker 7200 may mark the electrode ID on each electrode tab, for example, by a laser. In this case, the ID marker 7200 may be connected to a position measurement sensor (e.g., the rotary encoder 20R installed on the rewinder) to acquire the coordinate values of the electrode tab corresponding to the electrode ID to be marked. That is, the ID marker 7200 or the notching PLC 30 connected to the ID marker may receive an encoder value at the time of ID marking from the position measurement sensor, and the encoder value becomes a position coordinate value of the corresponding electrode ID. This is referred to as "a first position coordinate value" to be distinct from the coordinate values of the electrode of the preceding process.

Alternatively, when the corresponding ID is recognized by an ID recognizer, such as a barcode reader (BCR), after the electrode ID is marked by the ID marker 7200, the first position coordinate value corresponding to the electrode ID may be acquired. In this case, the ID recognizer (BCR) and the position measurement sensor are connected, and the encoder value (first position coordinate value) at the time of ID marking may be acquired from the ID recognizer (BCR) or the position measurement sensor in the notching PLC 30 connected to the ID recognizer (BCR).

Meanwhile, the ID marker 7200 or the ID recognizer (BCR) may be provided with a tab sensor and a trigger board to acquire sequence (count) information of the electrode ID.

The tab sensor may determine a length, that is, a pitch of each electrode tab. The trigger board may increase a count value based on the length of each electrode tab received from the tab sensor. The trigger board may convert the count value for each length of the electrode tab into a form of a BCD code and send the converted count value to the ID marker 7200, the ID recognizer (BCR), or the notching PLC 30.

As described above, the ID marker 7200 or the ID recognizer (BCR) may receive specification information (pitch information) of the electrode, acquire the count value (sequence information) for each corresponding pitch, and mark or recognize an ID for each electrode tab of the corresponding pitch.

The notching PLC 30 may connect (map) the sequence of the electrode ID with the first position coordinate value. The connected electrode ID and first position coordinate value are transmitted to the data manager 7300 to be described below.

The electrode ID, the first position coordinate value, the pitch information, and the like may pass a predetermined intermediate server 7210 before being transmitted to the data manager 7300. In the intermediate server 7210, the process data acquired in the notching process may match the first position coordinate value, the electrode ID, and the like. Therefore, the electrode ID, the first position coordinate value, and the process data of the notching process may be transmitted from the intermediate server 7210 to the data manager 7300.

Alternatively, the matching of the process data of the notching process with the electrode ID and the first position coordinate value may be performed using the information stored in the data of the coordinate value server 7100. For example, the data of the coordinate value server in FIG. 82 stores the process data acquired in the notching process and the notching process roll map in which the data of the coordinate values are matched. Therefore, when the first position coordinate value corresponding to the electrode ID is identified, the process data corresponding to the first position coordinate value may be acquired from the roll map. In this case, the notching PLC 30 or the like may transmit only the electrode ID and the first position coordinate value to the data manager 7300 without going through the intermediate server 7210. The data manager 7300 may receive the data of the coordinate values and the process data from the data of the coordinate value server 7100 and match the electrode ID with the first position coordinate value. At this time, an operation of matching the first position coordinate values with the coordinate values in the process before the notching process stored in the data of the coordinate value server 7100 may be performed. The operation may be performed by the roll map matching unit 7120.

Therefore, the data manager 7300 may match and manage the first position coordinate value corresponding to the electrode ID and the coordinate value of the data of the coordinate value server 7100 corresponding to the first position coordinate value and/or the process data matching the coordinate values. In addition, the process data of the notching process may also match the coordinate values of the preceding process, the first position coordinate value, and the electrode ID using the notching process roll map or the intermediate server 7210. In addition, the process data of the preceding process matching the coordinate values and the like and the process data of the notching process may be matched.

As described above, the data manager 7300 may match and manage the identification mark and the coordinate values of the data of the coordinate value server 7100 corresponding to the identification mark (electrode ID).

The data manager 7300 may be a data processing system, such as an MES, an SPC, or a DW, or a component thereof.

The data of the coordinate value server 7100 and the data manager 7300 may be implemented in one integrated data processing system. However, since the purposes and data processing capacities of each data processing system are different, the data of the coordinate value server 7100 and the data manager 7300 may also be positioned in separate data processing systems.

For example, the data of the coordinate value server 7100 may be installed in the MES or SPC system, and the data manager 7300 may be installed in the DW. In this case, the DW may be an upper level control system of the SPC.

As described above, the DW is a data warehouse for converting and managing data accumulated in a database into data in a common format and enables data-based decision-making and analysis by integrating data from multiple sources. Therefore, as in the present disclosure, it is easy to match and manage the process data of the electrode manufacturing process and the assembly process and the coordinate values and the electrode IDs. As will be described below, the identification mark and the coordinate values may be associated with data of the following processes after the identification mark is generated. The data matching and management operation may require vast data processing and computing ability. From this point of view, it is preferable to adopt the DW, which is an upper level control system, or a component of the DW as the data manager 7300.

FIGS. 84 and 85 are schematic diagrams showing a process of providing a virtual identification mark to the electrode.

As described above, in the case of the negative electrode tab, by marking the electrode ID, it is possible to secure the traceability of the electrode ID based on the marked electrode ID. However, in the case of a positive electrode current collector made of, for example, aluminum, fire or soot may occur upon marking. As described above, when it is difficult to generate a physical ID, a virtual identification mark (virtual electrode ID) may be provided as follows.

A virtual identification mark providing unit 7200' may be, for example, the PLC 30 of the notching process. In the specification of the present disclosure, the PLC of each process, including the PLC of the notching process, is indicated by reference numeral 30. However, in the embodiment, since the PLC also serves as the virtual identification mark providing unit 7200', in the embodiment, the PLC will be described interchangeably using a reference number, such as 7200' or 30. In order to generate the virtual electrode ID, it is necessary to specify specification information (pitch information) and count information on each electrode tab. To this end, the PLC 7200' or 30 may receive specification information on at least one electrode (e.g., a positive electrode) from the first sensor 7220.

The first sensor 7220 may include a tab sensor TS and a trigger board TB. First, the tab sensor TS may determine specification information on the positive electrode tab. Specifically, the tab sensor TS may determine a length, that is, a pitch of each positive electrode tab. The tab sensor TS may transmit the detected length of each positive electrode tab to the trigger board TB. The trigger board TB may generate count information on the positive electrode tab based on the length of each positive electrode tab received from the tab sensor TS. The trigger board TB may increase a BCD code by 1 whenever the count value for each length of the positive electrode tab increases. The trigger board TB may convert the generated count value for each length of the positive electrode tab into the form of BCD code and transmit the converted count value to the PLC 7200' or 30.

In addition, the PLC 7200' or 30 may receive the coordinate values of the position of at least one electrode from a second sensor, which is the position measurement sensor (e.g., the rotary encoder 20R). The PLC 7200' or 30 may generate a virtual identification mark, that is, a virtual electrode ID, for each of the at least one positive electrode, based on the specification information and the position coordinate value. The virtual electrode ID and the position coordinate value of the corresponding ID may be transmitted to the data manager 7300 directly or through the intermediate server 7210 from the PLC 7200' or 30.

Therefore, the data manager 7300 may match and manage the position coordinate value corresponding to the virtual electrode ID and the coordinate value of the data of the coordinate value server 7100 corresponding to the position coordinate value and/or the process data matching the coordinate value. In addition, the current process data of the notching process may match the coordinate values of the preceding process before the notching process using the notching process roll map or the intermediate server 7210. In addition, the process data of the preceding process matching the coordinate values and the like and the process data of the notching process may also be matched.

The data manager 7300 may match the data of the coordinate values and the process data of each process of the electrode tracked based on the above-described electrode ID or virtual ID and manage the data through the quality, presence of defects, and inspection information on each electrode. The data manager 7300 may include, for example, a cloud computing technology and/or an artificial intelligence technology.

Figure 86:
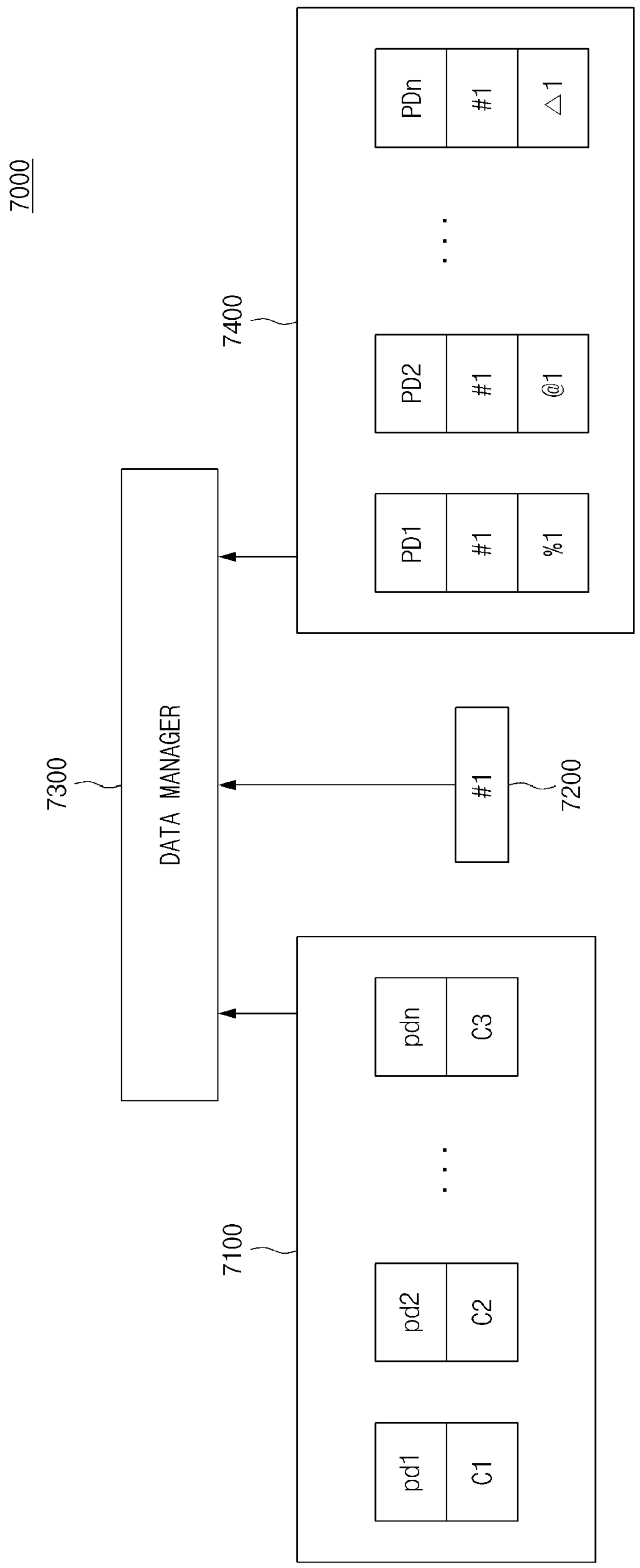
FIG. 86 is a flowchart showing an exemplary data processing by a system for manufacturing a battery, according to aspects of the present disclosure.
Figure 87:
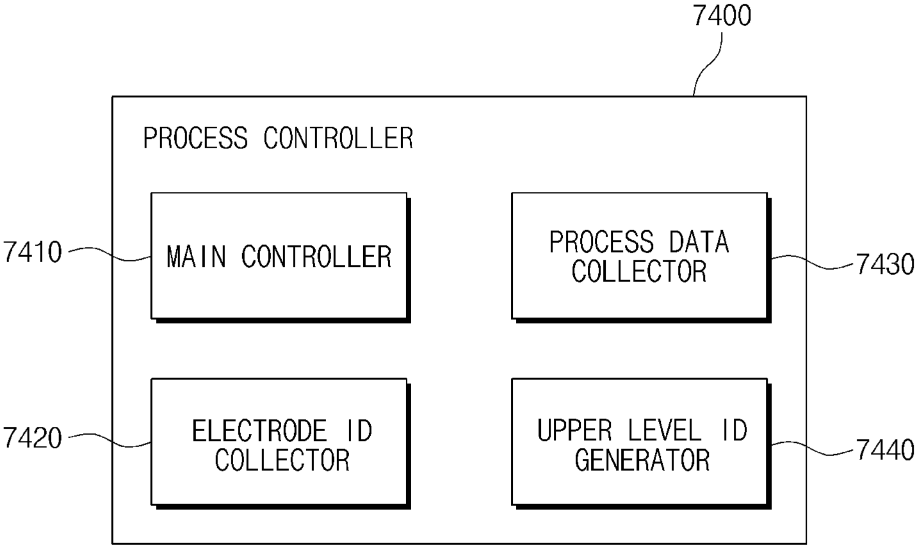
FIG. 87 is a block diagram showing an exemplary process data matching unit, according to aspects of the present disclosure.

FIG. 86 is a data flowchart according to a system for manufacturing a battery according to still another embodiment of the present disclosure, and FIG. 87 is a schematic diagram of a following process data matching unit.

As described above, the system 7000 according to the present disclosure may generate the electrode ID (virtual ID or actual ID) and integrally match and manage not only the process data of the electrode ID generation process but also the process data of the preceding process before the electrode ID generation process. In this case, the coordinate values corresponding to the electrode ID may be acquired in each of the preceding process and the electrode ID generation process. The coordinate values of each process may be matched to represent the same actual electrode parts by the roll map matching unit 7120.

Furthermore, according to the present disclosure, it is possible to manage data acquired from the following process after the identification mark (electrode ID) is generated via the identification mark. Referring to FIG. 86, in a following process after the electrode ID is generated, unit electrodes having the electrode ID perform predetermined processes. For example, an electrode having a specific actual electrode ID or a virtual electrode ID may be cut to become a unit electrode.

The unit electrodes (positive electrodes or negative electrodes) are stacked in a lamination process to become an electrode assembly.

Alternatively, the unit electrode may be wound to form the electrode assembly in the form of a jelly roll J/R.

The electrode assembly is stored in an electrode case, and an electrolyte is injected to form a battery cell semi-finished product (e.g., a packaging cell). Such a battery cell semi-finished product finally becomes a battery cell after going through a predetermined process (e.g., formation processes, such as activation and aging) for providing the characteristics of the battery.

A laminate may be formed by stacking battery cells, and a battery module may be formed by accommodating the laminate in a module housing. By installing the battery module in a pack case, a battery pack that may be applied to an energy storage system (ESS) or a vehicle device may be manufactured.

As described above, even after the identification mark is provided, the electrode mainly passes a stack process, a formation process, and a module and pack process and passes detailed processes even in each process.

In the progress of these processes, since the electrode has each ID, process data acquired from the corresponding process and the electrode ID may be matched and stored.

The system for manufacturing a battery according to the present disclosure may include, for example, a process controller 7400 as shown in FIG. 87. The process controller 7400 may be a process controller in charge of each following process. Specifically, the process controller may be a PLC unit. The PLC may be defined as a control device used for maintaining, managing, automatically controlling, and monitoring a process system for manufacturing a battery. Such a process controller may include a main controller 7410 as shown in FIG. 87. The main controller 7410 may control the overall operation of the process controller and the flow of the entire process. In addition, the process controller 7400 may include an electrode ID collector 7420 and a process data collector 7430. In the case of a physical ID, the electrode ID collector 7420 may be, for example, the barcode reader (BCR). In the case of a virtual electrode ID, the electrode ID collector 7420 may be a process server connected to the virtual electrode ID storage device, such as the above-described PLC, the intermediate server, or the data manager of the notching process, to receive corresponding virtual electrode ID information for each process. In addition, the process data collector 7430 may be a predetermined inspection and/or measurement device installed for each process. For example, in the activation process, predetermined inspected and/or measured data may be acquired from a measurement device for measuring charge/discharge capacities, a temperature, and the like of an activation target cell. Alternatively, the PLC itself of each process may collect process data, such as equipment data and time-series data.

In the process controller 7400, the process data may match the electrode ID. The matched electrode ID and the respective following process data may be transmitted to the data manager 7300. The data manager 7300 may match the electrode ID and the respective following process data with the coordinate values stored in the data of the coordinate value server 7100 and/or the (preceding) process data matching the coordinate values.

The respective following process data may also be transmitted to the data manager 7300 for each process and match the coordinate values and the process data matching the coordinate values. However, two or more process data may also be transmitted to the data manager 7300 in the form of a process information package combined for one electrode ID. For example, it is also possible to match one formation process data with the electrode ID in combination with the respective process data of a plurality of detailed processes in the formation process and transmit a matching result to the data manager 7300.

Meanwhile, as the following processes are performed, a plurality of electrodes are combined to become an electrode assembly, or the electrode assembly is re-combined to become a larger unit (e.g., a battery cell, a battery cell laminate, a battery module, or a battery pack). These upper level units including the electrode with the identification mark may be referred to as "upper level assemblies." A plurality of electrodes are included in the upper level assembly. As necessary, a new identification mark may be provided by combining the plurality of electrodes together. That is, the upper level identification mark capable of identifying the upper level assembly may be provided. For example, the upper level identification marks, such as an assembly ID, a cell ID, a module ID, and a pack ID, may be respectively provided to the electrode assembly, the battery cell, the module, and the pack. Each of the upper level identification marks may match a lower identification mark. Ultimately, each of the upper level identification mark may match each electrode ID of the electrodes included in the corresponding upper level assembly. Generally, one upper level identification mark will match the plurality of electrode identification marks (the electrode IDs or the virtual electrode IDs). The process controller of the following process may have such an upper level identification mark generator, that is, an upper level ID generator 7440. The upper level ID generator 7440 may also generate an actual ID or a virtual ID. The upper level ID generator may be the above-described ID marker. Alternatively, another virtual ID generator capable of specifying an upper level assembly by generating predetermined count information using the tab sensor or the trigger board may be used as the upper level ID generator.

Figure 88:
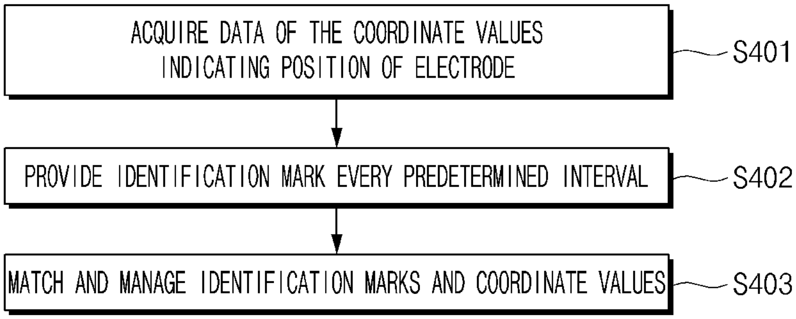
FIG. 88 is a flowchart showing an exemplary method of generating an identification mark for a battery, according to aspects of the present disclosure.
Figure 90:
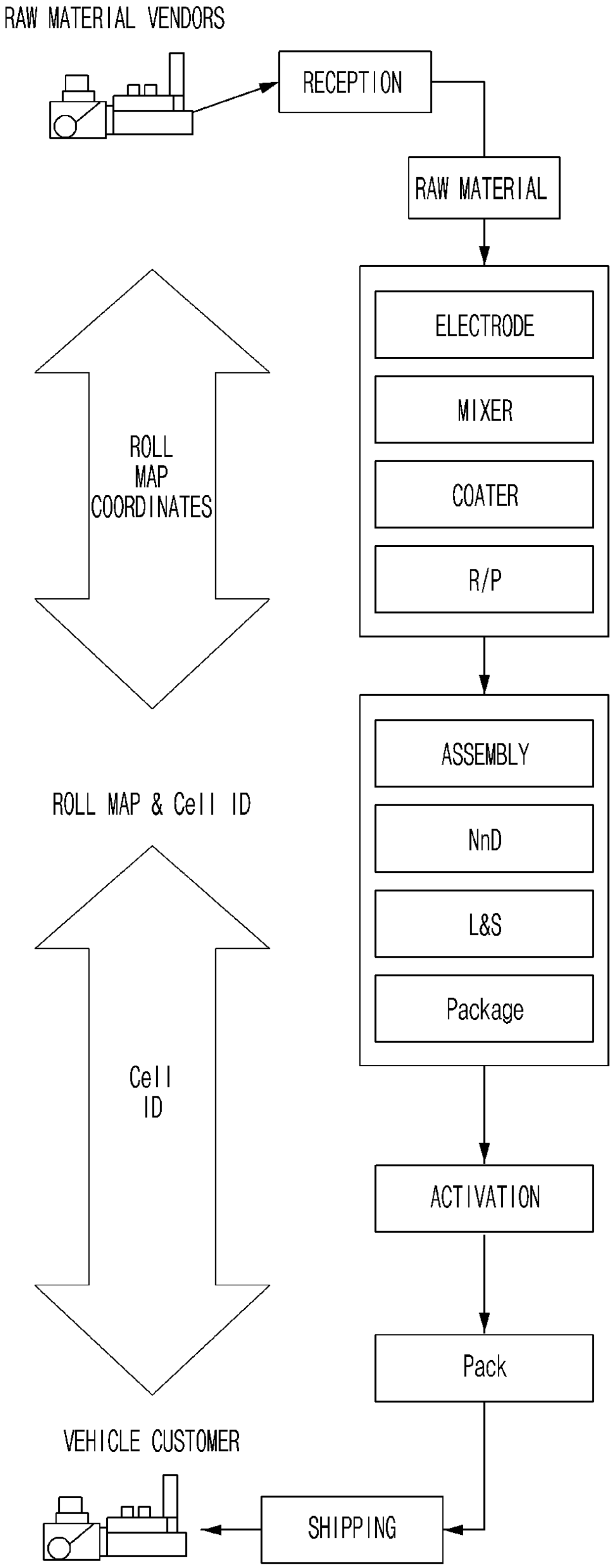
FIG. 90 is a schematic diagram showing an exemplary electrode tracking process by a system for manufacturing a battery, according to aspects of the present disclosure.

FIG. 88 is a flowchart of a method of manufacturing a battery according to still another embodiment of the present disclosure. FIG. 89 is a schematic diagram showing an example of data matching by the system for manufacturing a battery according to the present disclosure, and FIG. 90 is a schematic diagram showing a data management process by the system for manufacturing a battery according to the present disclosure.

The method of manufacturing a battery according to the embodiment includes acquiring data of the coordinate values indicating a position of an electrode moving in a process (S401), providing an identification mark to the electrode every predetermined pitch (S402), and matching and managing a coordinate value corresponding to the identification mark and the identification mark (S403).

The position of the electrode moving in the electrode manufacturing process, the notching process, or the like may be acquired as an encoder value, such as a rotary encoder, and this may be acquired as, for example, coordinate values of a roll map. Such data of the coordinate values may be stored in the data of the coordinate value server 7100 provided with the roll map generation unit 7110 and the roll map matching unit 7120.

In addition, identification marks may be provided to the electrode at predetermined intervals (e.g., pitch intervals). The identification mark may generate a virtual ID by marking an actual ID or providing a coordinate value to count information of the corresponding pitch. Any ID has a predetermined coordinate value.

The identification marks have coordinate values in the process of providing the identification mark, and the process coordinate values may match coordinate values of the previous process. For example, the roll map matching unit 7120 may match and manage the coordinate values of each process.

In addition, the coordinate values of each process match the process data of each process by a visualization tool, such as a roll map. Therefore, the process data of each process may be comprehensively matched using the identification mark and the coordinate values of each process matching the identification mark.

The data manager 7300 may match the coordinate values, identification marks, and process data (preceding process, notching process, and following process) and further include a predetermined analysis program, visualization program, and statistical program. Therefore, it is possible to analyze or statisticize quality, defects, causes of problems, and the like based on the matched data. Therefore, according to the system and method for manufacturing the battery according to the present disclosure, it is possible to provide a comprehensive production management and quality analysis tool throughout almost all production processes of the battery.

As described above, at least one of data on specifications of an input material for manufacturing the electrode, process data for a mixing process of the input material, and path data on a moving path through which the mixed input material moves to an electrode coater may match each matched coordinate value of the overlay roll map and the process data of each process matching the coordinate values and managed.

In addition, the data manager 7300 may also receive the data on the specifications, the process data for the mixing process of the input material, and the path data on the moving path and may match the identification mark and the coordinate values of the data of the coordinate value server 7100 and managed.

In FIG. 89, data acquired in the plurality of processes are displayed in association with each other (i.e., by matching each other). For reference, the data shown in FIG. 89 is displayed in alphabetical characters so that only the type of data may be distinct and is not displayed in specific numerical values or the like.

FIG. 89 shows the data on the mixing and tank movement (e.g., an electrode roll lot number and a slurry lot number), data on a tank movement path and the like.

Data (coordinate values and process data) on each roll map of the electrode manufacturing process and the notching process is also displayed by being matched with the data on the mixing and tank movement operations. The data of the coordinate values may be coordinate values matched on, for example, the overlay roll map through the above-described roll map matching process.

In addition, the electrode ID in the notching process matches the electrode coordinate values in the preceding process before notching. Therefore, it is possible to retrieve the process data in the coating, roll press, and slitting processes of the electrode part (coordinates of the electrode) corresponding to the electrode ID.

In addition, the electrode ID matches the process data of an activation process, a module process, and a pack process, which are following processes of notching. In addition, the electrode ID matches an ID (ID (%1) of the activation process, an upper level ID (@1) of the module process, and an upper level ID (▲1) of the pack process. The display of the IDs shown in FIG. 89 is only an exemplary display for distinguishing each ID, but the present disclosure is not limited thereto. As necessary, the IDs of each process may be differently displayed in a different format (e.g., a barcode, a QR code, or an identification number).

FIG. 90 is a schematic diagram showing an electrode management process by the system for manufacturing a battery according to the present disclosure. As shown, according to the system 7000 and method for manufacturing the battery according to the embodiment, the process of manufacturing an electrode from the operation of inputting the electrode manufacturing material and the following processes thereafter may be managed by connecting the data of almost all processes based on the coordinate values of the roll map and the identification mark (electrode ID).

Therefore, it is possible to comprehensively perform quality control, analysis, monitoring, tracking, and the like in the electrode and battery manufacturing process.

One or more aspects of FIGS. 1-90 may be incorporated into or combined with one or more aspects of the embodiments disclosed in reference to FIGS. 91-96 herein. Accordingly, some elements of FIGS. 91-96 may be similar to elements of FIGS. 1-96, and thus similar or identical reference numerals may be used to depict those elements. Further, detailed disclosure of the similar or identical elements already described may be omitted hereinafter for brevity. However, such omissions are not disclaimers or disavowals, and except to the extent that the similar or identical elements that are already described are inconsistent with the express disclosure herein, in which case the language in the present disclosure hereinafter controls.

Figure 91:
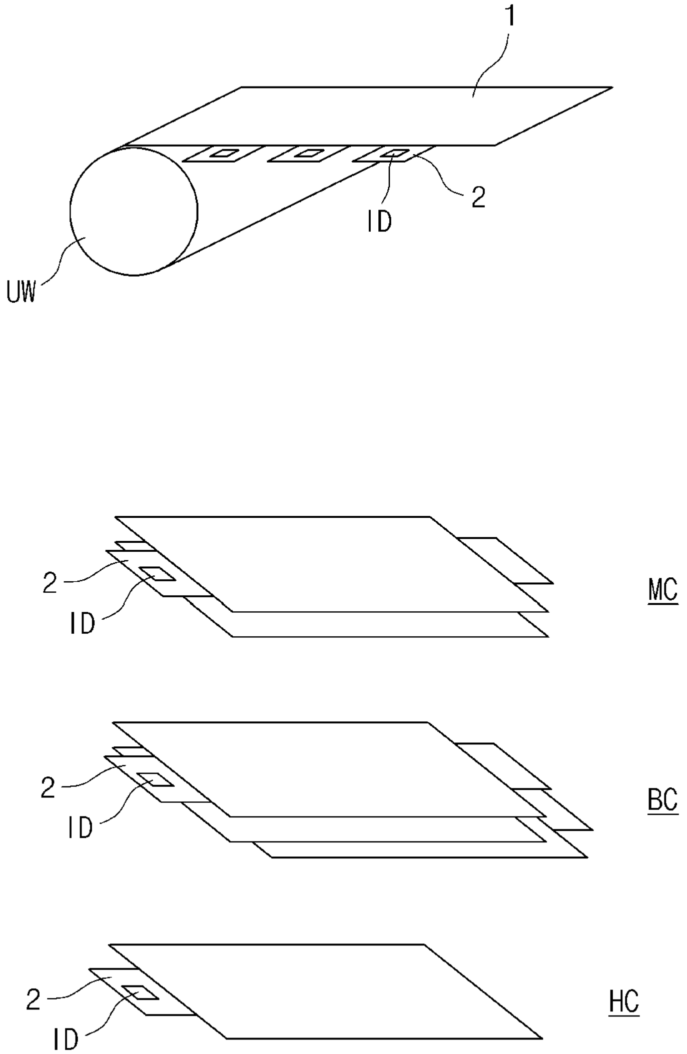
FIG. 91 is a schematic diagram showing an exemplary electrode and an exemplary electrode assembly provided with an electrode identification mark, according to aspects of the present disclosure.
Figure 92:
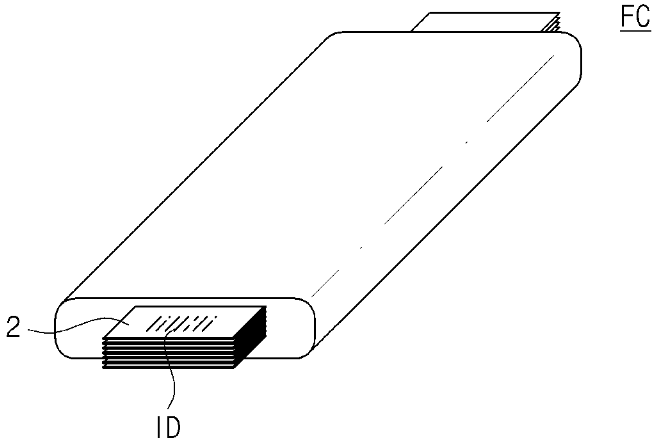
FIG. 92 is a schematic diagram showing an exemplary folding cell and a stacked cell provided with an electrode identification mark, according to aspects of the present disclosure.
Figure 93:
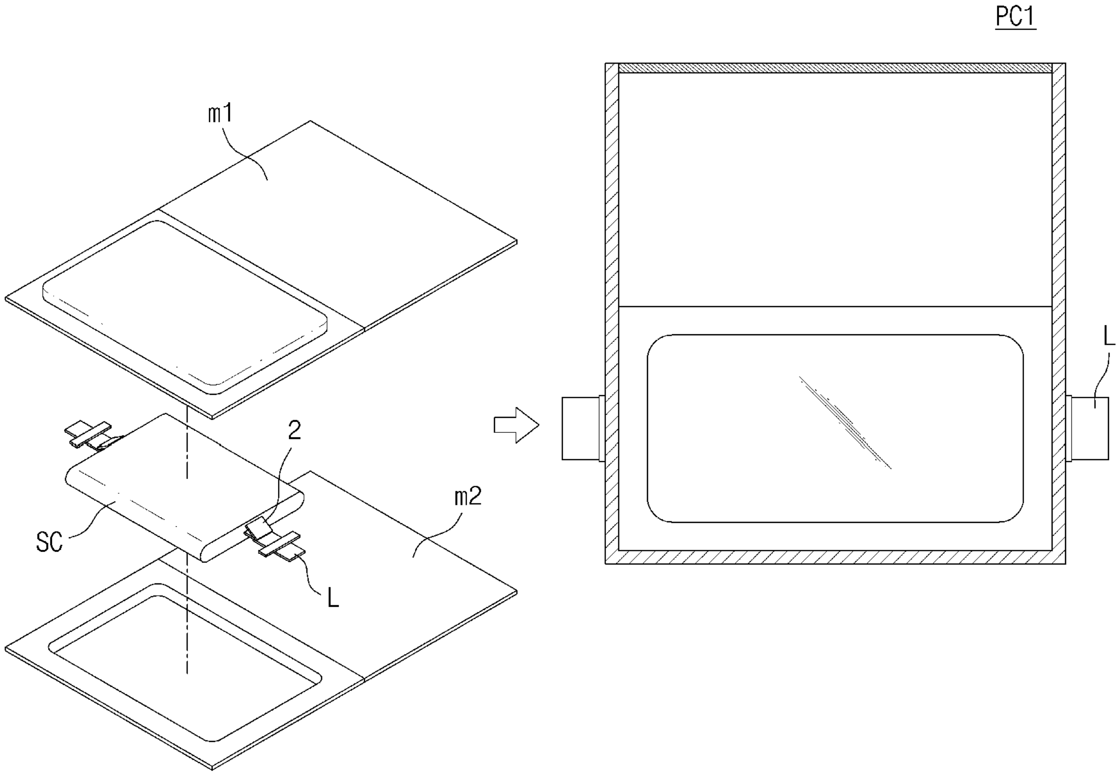
FIG. 93 is a schematic diagram showing an exemplary packaging cell provided with an electrode identification mark, according to aspects of the present disclosure.
Figure 94:
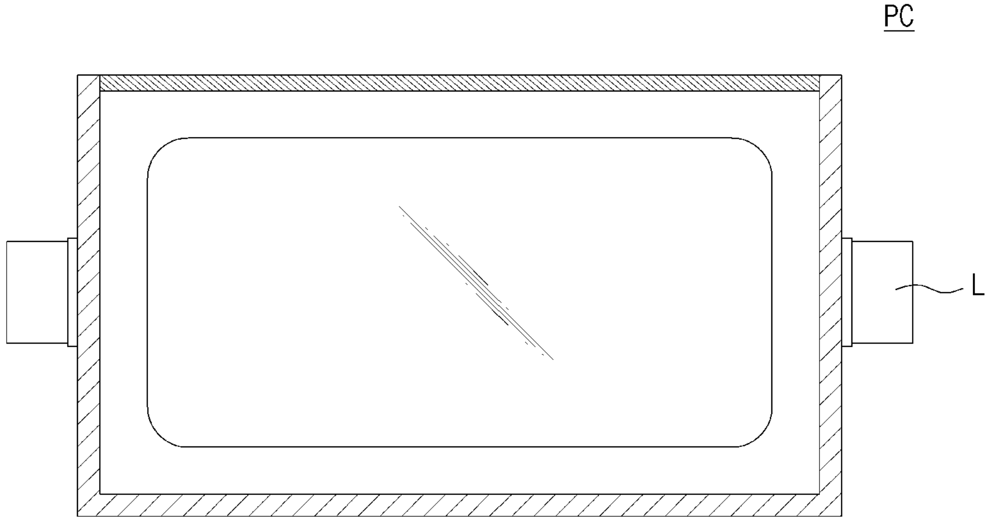
FIG. 94 is a schematic diagram showing an exemplary battery cell provided with an electrode identification mark, according to aspects of the present disclosure.
Figure 95:
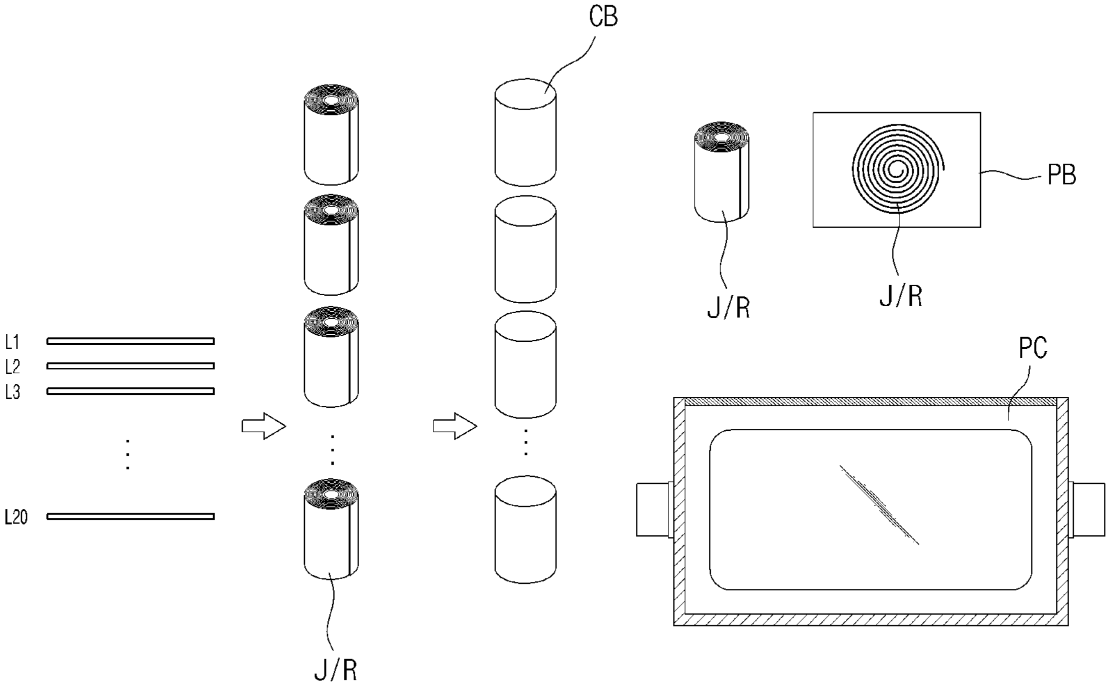
FIG. 95 is a schematic diagram showing an exemplary battery cell with an electrode identification mark, according to aspects of the present disclosure.
Figure 96:
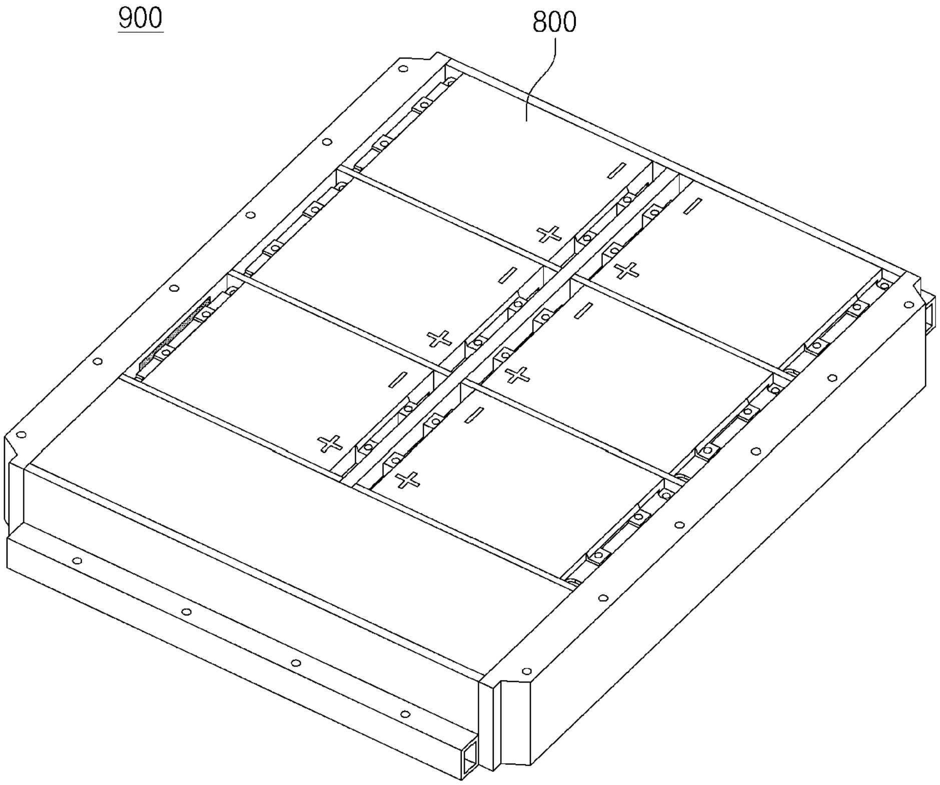
FIG. 96 is a schematic diagram showing an exemplary a battery module and a battery pack, according to aspects of the present disclosure.

FIG. 91 is a schematic diagram of an electrode and an electrode assembly with an electrode identification mark, FIG. 92 is a schematic diagram of a folding cell and a stacked cell SC with the electrode identification mark, FIG. 93 is a schematic diagram of a packaging cell with the electrode identification mark, FIG. 94 is a schematic diagram of a battery cell with the electrode identification mark, FIG. 95 is a schematic diagram of another type of battery cell with the electrode identification mark, and FIG. 96 is a schematic diagram of a battery module and a battery pack.

FIG. 91 shows an electrode ID marked on the tab 2 of the electrode 1 punched in the notching process. As described above, the electrode ID includes not only a physical ID actually marked, but also a virtual electrode ID provided by a notching PLC or the like.

The electrode ID matches coordinate values, for example, coordinate values of the roll map stored in the data of the coordinate value server 7100. In addition, the electrode ID may also match the process data of each process matching the coordinate values of the roll map. That is, the electrode ID may match each process data of the electrode manufacturing process, the assembly process, and several following processes via the roll map coordinate value. Therefore, when an electrode having such an electrode ID or an upper level assembly including the electrode is obtained, by analyzing the electrode ID and subsequently analyzing the electrode parts (specified as the coordinate value) of each process from which the electrode ID is derived and the process data of each process matching the electrode parts, it is possible to perform quality analysis or find out the cause of the occurrence of the problem.

The lower part of FIG. 91 shows a mono cell MC, a bi-cell BC, and a half cell HC having the electrode. The half-cell HC is a cell formed by stacking one electrode and a separator, the mono cell MC is a cell formed by stacking two electrodes of different polarity with the separator interposed therebetween, and the bi-cell BC is a cell formed by stacking two electrodes with the same polarity and one electrode with a different polarity with the separator interposed therebetween. The half-cell HC, the mono cell MC, and the bi-cell BC constitute an electrode assembly by itself. However, the half-cell HC, the mono cell MC, and the bi-cell BC are stacked together or stacked with other types of electrode assemblies to form an upper level-dimensional electrode assembly. In this sense, the half-cell HC, the mono cell MC, and the bi-cell BC may be referred to as "a unit electrode assembly."

FIG. 92 shows that the unit electrode assemblies are stacked together to form a new type of electrode assembly. The plurality of unit electrode assemblies positioned in a long separator and sequentially folded may be referred to as "a folding-type electrode assembly (folding cell FC), and the unit electrode assemblies stacked together and combined by a combining tape X or the like may be referred to as "a stacked-type electrode assembly (stacked cell SC). All of the unit electrode assemblies and the upper level electrode assemblies include the electrode tab 2 with the electrode ID. Since the electrode assembly includes a plurality of electrodes, each electrode ID may match an assembly ID provided to the electrode assembly as the upper level identification mark. For example, the upper level ID may be physically printed on the combining tape, or a virtual upper level ID may be provided thereon. Alternatively, an electrode ID of a tab part of an uppermost electrode among the stacked electrodes may also be defined as a representative electrode ID or an upper level ID. The upper level ID may also be added to an exterior material for carrying or including the electrode or the electrode assembly.

FIG. 93 shows the battery cell semi-finished product formed by storing the electrode assembly in the battery case.

In a pouch cell in which the electrode assembly is stored in a pouch-type case, the electrode assembly is stored in the cases m1 and m2, an electrolyte is injected, and then the periphery of the case is sealed. Such an upper assembly has not yet been provided with the characteristics of the battery and needs to go through a formation process, such as an activation process or an aging. Therefore, this may be referred to as "a battery cell semi-finished product." A battery cell before becoming a final product may be referred to as "a packaging cell PC1 or the like."

FIG. 94 shows a battery cell manufactured as the pouch cell PC, which is a final product, by removing and sealing a gas collector after the formation process.

In the battery cell semi-finished product or the battery cell, the upper level ID may be provided to, for example, the cell cases m1 and m2.

Meanwhile, the above-described unit electrode or electrode assembly may be wound to form a so-called jelly roll type electrode assembly. The electrode assembly in the form of the jelly roll becomes the target of the present disclosure because it also has an electrode ID. The electrode assembly in the form of the jelly roll may be accommodated in a cylindrical or prismatic battery housing to form a cylindrical battery cell CB or a prismatic battery cell PB as shown in FIG. 95.

FIG. 96 shows that the battery cells are stacked together to form a battery cell stack 810, or the battery cell stack 810 is accommodated in module cases 820, 830, 840, and 850 to form a battery module 800. In addition, FIG. 96 shows that the battery module 800 is accommodated in the pack case to form a battery pack 900.

Even in this case, it is possible to match each electrode ID with the laminate ID, the module ID, or the pack ID provided as the upper level identification mark.

In FIGS. 91 to 96, each ID of the upper level assembly provided to the upper level assembly may be vertically and sequentially matched with an ID of a lower assembly. Finally, the upper level assembly may match the electrode ID, which is the lowest unit.

The electrode ID of the electrode provided in the upper level assembly matches the process data of each manufacturing process of the upper level assembly by the process controller 7400 or the like. In addition, the electrode ID matches the coordinate values of the data of the coordinate value server 7100 and the process data of the preceding process.

Therefore, the process data matching the roll map coordinate value based on the above-described electrode identification mark and roll map coordinate value may match the process data of the following process matching the identification mark.

Figure 97:
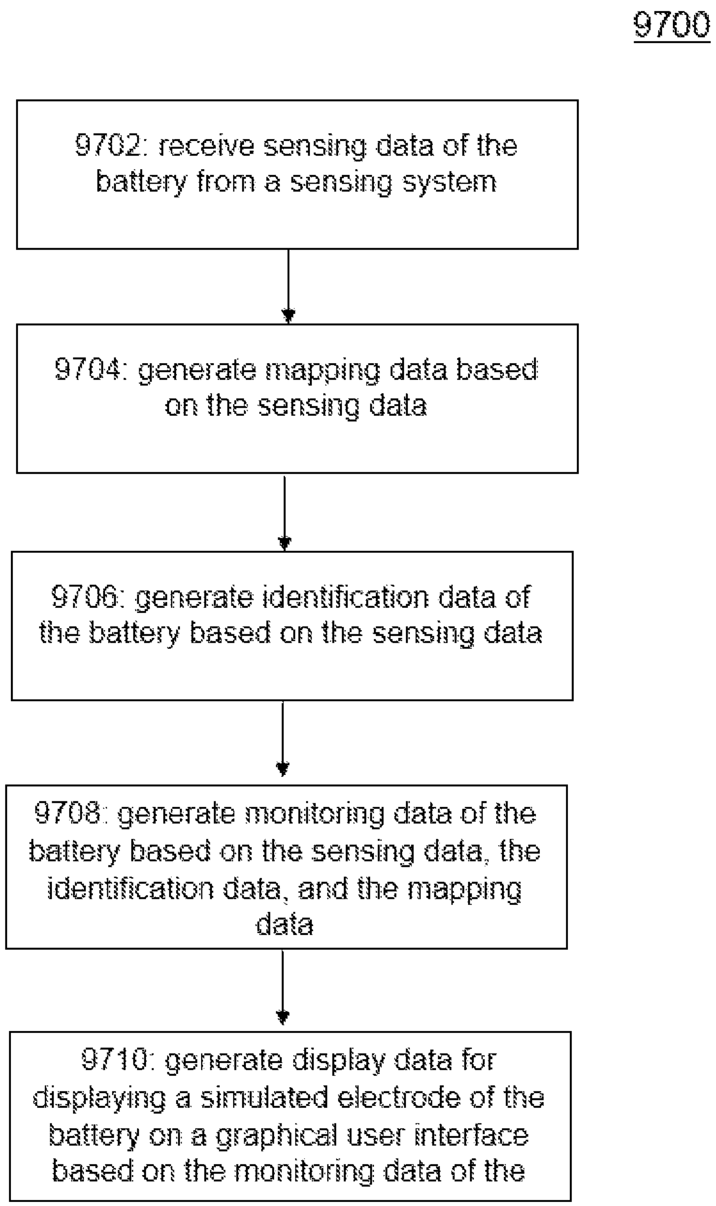
FIG. 97 is a flowchart showing an exemplary for executing tracking and monitoring of manufacturing data of one or more batteries and/or battery components, according to aspects of the present disclosure.

FIG. 97 depicts a flowchart of an exemplary method 9700 for executing tracking and monitoring manufacturing data of one or more batteries and/or battery components, according to aspects of the present disclosure. For example, the method 9700 may be performed according to one or more embodiments as well as one or more apparatuses and systems described in reference to FIGS. 1-96.

At step 9702, a server system (e.g., a battery monitoring server system or a roll map generating unit) may receive sensing data of the battery from a sensing system. The server system may be one or more server systems disclosed in reference to one or more embodiments of FIGS. 1-96. In one embodiment, the sensing data may include, but is not limited to, data corresponding to qualities, characteristics, defects, coordinates, positions, and/or conditions of one or more batteries and/or battery components, for example, an electrode of the battery. In one embodiment, the sensing data may be generated or detected by the sensing system. For example, the sensing system may include the one or more inspection and/or measurement devices disclosed in reference to one or more embodiments of FIGS. 1-96. At step 9704, the server system may generate mapping data based on the sensing data. In one embodiment, the mapping data may include data corresponding to one or more dimensions and/or one or more positions or locations of an electrode. For example, the one or more positions may include absolute or relative coordinates positions of the electrode. At step 9706, the server system may generate identification data of the battery based on the sensing data. In one embodiment, the identification data may include, but is not limited to, one or more visual and/or mapping indications disclosed in reference to FIGS. 1-96. For example, the visual and/or mapping indications may include, but is not limited to, a cell identification, a virtual identification, a battery identification, an electrode identification, a tab identification, a virtual cell identification, a virtual battery identification, a virtual electrode identification, a virtual tab identification disclosed in reference to one or more embodiments of FIGS. 1-96. In some embodiments, the mapping indication data of the battery may be utilized to track the battery or components of the battery before, during, and after the manufacturing of the battery or components of the battery in accordance with the present disclosure.

Still referring to FIG. 97, at step 9708, server system may generate monitoring data of the battery based on the sensing data, the identification data, and the mapping data. The monitoring data may include, for example, any suitable data displayed on the one or more roll maps disclosed in accordance with the embodiments of FIGS. 1-96. At step 9708, the server system may generate display data for displaying graphical information based on the monitoring data of the battery on a display. In one embodiment, the graphical information may include, but is not limited to, the sensing data, mapping data, cell identification data, and/or a graphically simulated electrode of the battery. In one embodiment, the graphical information may include one or more roll maps and the components of the roll maps disclosed and illustrated in reference to one or more embodiments of FIGS. 1-96.

In one embodiment, the sensing data, the identification data, and the mapping data may be effectively distributed for generating the roll maps. That is, a data load based on the amount or volume of data processed by the server system or the roll map generation unit may be reduced and data processing speed of the system for generating the roll map of the present disclosure may be managed effectively and efficiently.

In one embodiment, the server system may determine position data of a component of the battery between an unwinder and a rewinder of a battery manufacturing system. For example, the component of the battery may include an electrode or electrode medium. The electrode medium may include, for example, a substrate, film, a current collector, or any other suitable medium for manufacturing an electrode of a battery, but is not limited thereto. The position data may be determined based on the sensing data generated by the sensing system. The position data may be displayed on a graphical user interface on a display. Additionally, the sensing system may detect a movement of the electrode or electrode medium between the unwinder and the rewinder. The position data may include movement data corresponding to the detected movement of the electrode or electrode medium.

In one embodiment, the server system may determine characteristic data of the battery based on the sensing data. The characteristic data of the battery may be determined based on the sensing data generated by the sensing system. Additionally, the sensing system may detect an irregular characteristic on the electrode or electrode medium. The irregular characteristic may include a defect on the electrode or electrode medium. The server system may generate graphical information of the irregular characteristic on the simulated electrode.

In one embodiment, the sensing system may detect an identification indication of the battery. The identification data may include the identification indication. The identification indication may include, but is not limited to, a cell identification, a virtual identification, a battery identification, an electrode identification, a tab identification, a virtual cell identification, a virtual battery identification, a virtual electrode identification, a virtual tab identification disclosed in reference to one or more embodiments of FIGS. 1-96.

The steps 9702 to 9708 are exemplary, and other alternatives can also be provided where one or more steps may be added, one or more steps may be removed, or one or more steps may be provided in a different sequence without departing from the scope of the claims herein.

In general, any process discussed in this disclosure that is understood to be computer-implementable, such as the processes shown in references to FIGS. 1-97 and the systems and/or interfaces described in connection with FIGS. 1-97, may be performed or otherwise implemented by one or more processors of a computer system. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or another type of processing unit.

A computer apparatus or system described in reference to FIGS. 1-97, or any other system performing operation to facilitate tracking and monitoring of manufacturing data of one or more batteries and/or battery components, may include one or more computing devices. If the one or more processors of the computer system are implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

FIG. 98 illustrates an example of a computing device 9800 of a computer system. The computing device 9800 may include processor(s) 9810 (e.g., CPU, GPU, or other processing unit), a memory 9820, and communication interface(s) 9840 (e.g., a network interface) to communicate with other devices. Memory 9820 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 9820. The computing device 9800 may, in some embodiments, further include input device(s) 9850 (e.g., a keyboard, mouse, joystick, controller, or touchscreen) and output device(s) 9860 (e.g., a display, head-up display, AR display, VR display, printer). The aforementioned elements of the computing device 9800 may be connected to one another through a bus 9830, which represents one or more busses. In some embodiments, the processor(s) 9810 of the computing device 9800 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, configure and/or cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some, but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

The method steps and elements disclosed in references to the embodiments of FIGS. 1-97, individually or in combination, are significantly more than what is routine and/or conventional in the field of battery manufacturing, monitoring, and/or tracking technologies. That is the methods described in relation to the embodiments of FIGS. 1-97 have practical applications that yield improvements in the field of battery manufacturing, monitoring, and/or tracking technologies. Those improvements and advantages are disclosed hereinafter.

According to the present disclosure, since data on quality or defects can be displayed on a roll map bar displaying an imitated electrode in a roll-to-roll state, it is possible to visually and easily identify the data on quality or defects of an electrode manufacturing process at a glance.

In addition, according to the present disclosure, since the data on quality or defects is displayed on the roll map bar without being directly marked on an electrode or a secondary battery, it is possible to accurately display the data on quality or defects on a coating part as well as a non-coating part.

In addition, since the data is displayed on the roll map without being directly marked on the electrode or the battery, even when the electrode is assembled or the battery is manufactured with the electrode in a following process, it is possible to easily find the cause of a subsequent fault or defect from roll map data of the corresponding electrode as long as a lot number of the battery or electrode is known, thereby carrying out inter-process quality correlation analysis with high accuracy.

In an electrode manufacturing process according to the present disclosure, it is possible to accurately identify a loss amount and position of an electrode using a reference point. In addition, since the loss amount of the electrode is automatically and accurately measured without depending on the naked eye or feeling of an operator, it is possible to increase the reliability of loss amount data and effectively use such data information in the following process.

In addition, according to the present disclosure, by displaying the reference point on a roll map on which the electrode is imitated and which also displays information on a loss amount of the electrode on the roll map, it is possible to visually and easily the data on quality or defects at a glance in relation to the reference point.

In addition, in each detailed process of the electrode manufacturing process, since the roll map on which the reference points are displayed can be referred for quality, defect control, and performing the following process, it is possible to accurately perform processing, defect removal, or the like in the following process.

According to one embodiment of the present disclosure, it is possible to provide the roll map capable of visually identifying events on the quality or defects of each detailed process in the electrode manufacturing process in which the electrode moves in the roll-to-roll state and data on the events.

In addition, by correcting coordinates of the roll map of the preceding process, it is possible to use the roll map of the preceding process in the following process without any mistake.

In addition, it is possible to reliably and easily remove the defects occurring in the preceding process without omission in the following process using the roll map information.

According to one embodiment of the present disclosure, by matching coordinate values of roll maps of each process with coordinate value of a final process in a series of roll-to-roll processes, it is possible to easily identify the data on quality or defects of a survival electrode surviving in the final process.

In addition, it is possible to easily identify inspection history of the electrode manufacturing process using the matched roll map.

In addition, according to one embodiment of the present disclosure, by generating an overlay roll map by the roll map matching of a predetermined logic even when start and end portions of an electrode roll are reversed or top and back surfaces of the electrode roll are reversed while undergoing the series of roll-to-roll processes, it is possible to quickly and intuitively track a problem with the quality of the electrode when the problem occurs.

According to the present disclosure, in the electrode manufacturing process before a notching process, it is possible to track a position of an electrode from which a unit electrode of the notching process is derived.

In addition, since it is possible to identify from which electrode the unit electrode manufactured in the notching process has been derived in the electrode manufacturing process, analysis of a cause of defects or quality tracking of semi-finished or finished battery cells in a following process can be performed in units of cells up to the electrode manufacturing process.

According to one embodiment of the present disclosure, it is possible to identify lot information of electrode slurry at a supply tank stage. Therefore, it is possible to track the quality of the electrode slurry produced from a corresponding supply tank.

In addition, when an electrode has a defect or a battery manufactured with the electrode fails, it is possible to easily identify the defect or the cause of the failure.

According to a system for manufacturing a battery and a method of operating the same according to one embodiment disclosed in this document, it is possible to generate a virtual ID based on specification information on a positive electrode, thereby securing the traceability of data on the positive electrode.

According to a method and system for manufacturing a battery according to one embodiment disclosed in this document, it is possible to increase the reliability of the quality analysis of the battery through the accurate matching between process data and the battery.

According to the present disclosure, by effectively distributing data required for generating the roll map, it is possible to reduce a load of the data applied to a roll map generation unit. Therefore, it is possible to increase a data processing speed of a system for generating the roll map and more effectively manage data on the roll map.

In addition, by matching coordinate values of the roll maps made up in each process, it is possible to compare a change of an actual electrode when a plurality of processes are performed based on the same criterion. It is possible to easily identify the inspection history or a change in equipment data in the electrode manufacturing process using the matched roll map.

According to the present disclosure, it is possible to easily manage the quality of the electrode and an upper level assembly including the electrode based on an identification mark and coordinate values of the electrode in the following processes after assembly as well as in the electrode manufacturing process and the assembly process.

In addition, by connecting the identification marks to the coordinate values, it is possible to match and manage roll map data information and process data of the following process. Therefore, it is possible to track the quality of all processes from the electrode manufacturing process to a process before the final process.

In addition, various effects that may be directly or indirectly identified through this document can be provided.

The above description is merely the exemplary description of the technical spirit disclosed in this document, and those skilled in the art to which embodiments disclosed in this document pertain will be able to variously modify and change the present disclosure without departing from the essential characteristics of the embodiments disclosed in this document.

What is claimed is:

1. A method of tracking and monitoring manufacturing data of a battery, comprising:

receiving, by a server system, sensing data of the battery from a sensing system;

generating, by the server system, mapping data based on the sensing data;

generating, by the server system, identification data of the battery based on the sensing data;

generating, by the server system, monitoring data of the battery based on the sensing data, the identification data, and the mapping data; and generating, by the server system, display data for displaying a simulated electrode of the battery on a graphical user interface based on the monitoring data of the battery.

2. The method of claim 1, further comprising:

determining, by the server system, position data of an electrode of the battery between an unwinder and a rewinder of a battery manufacturing system; and displaying the graphical user interface on a display, wherein the position data is displayed on the graphical user interface.

3. The method of claim 2, wherein the position data is determined based on the sensing data generated by the sensing system.

4. The method of claim 2, further comprising detecting, by the sensing system, a movement of the electrode between the unwinder and the rewinder, wherein the position data includes movement data corresponding to the detected movement of the electrode.

5. The method of claim 2, further comprising determining, by the server system, characteristic data of the battery based on the sensing data.

6. The method of claim 5, wherein the characteristic data of the battery is determined based on the sensing data generated by the sensing system.

7. The method of claim 5, further comprising:
detecting, by the sensing system, an irregular characteristic on the electrode; and
generating graphical information associated with the irregular characteristic on the simulated electrode.

8. The method of claim 7, wherein the irregular characteristic comprises a defect on the electrode.

9. The method of claim 2, further comprising detecting, by the sensing system, an identification indication of the battery,
wherein the identification data comprises the identification indication.

10. The method of claim 9, detecting, by the sensing system, an irregular characteristic on the electrode,
wherein the identification indication corresponds with a position of the irregular characteristic on the electrode.

11. A computer system for tracking and monitoring manufacturing data of a battery, the system comprising:
a server system;
a memory storing instructions; and
one or more processors configured to execute the instructions to perform operations comprising:
receiving, by the server system, sensing data of the battery from a sensing system;
generating, by the server system, mapping data based on the sensing data;
generating, by the server system, identification data of the battery based on the sensing data;
generating, by the server system, monitoring data of the battery based on the sensing data, the identification data, and the mapping data; and
generating, by the server system, display data for displaying a simulated electrode of the battery on a graphical user interface based on the monitoring data of the battery.

12. The system of claim 11, wherein the operations further comprises:
determining, by the server system, position data of an electrode of the battery between an unwinder and a rewinder of a battery manufacturing system; and
displaying the graphical user interface on a display,
wherein the position data is displayed on the graphical user interface.

13. The system of claim 12, wherein the position data is determined based on the sensing data generated by the sensing system.

14. The system of claim 12, wherein the operations further comprise detecting, by the sensing system, a movement of the electrode between the unwinder and the rewinder,
wherein the position data includes movement data corresponding to the detected movement of the electrode.

15. The system of claim 12, wherein the operations further comprise determining, by the server system, characteristic data of the battery based on the sensing data.

16. The system of claim 15, wherein the characteristic data of the battery is determined based on the sensing data generated by the sensing system.

17. The system of claim 15, wherein the operations further comprise: detecting, by the sensing system, an irregular characteristic on the electrode; and generating graphical information associated with the irregular characteristic on the simulated electrode.

18. The system of claim 17, wherein the irregular characteristic comprises a defect on the electrode.

19. The system of claim 12, wherein the operations further comprise detecting, by the sensing system, an identification indication of the battery on the electrode; and
detecting, by the sensing system, an irregular characteristic on the electrode,
wherein the identification data comprises the identification indication, and
wherein the identification indication corresponds with an irregular characteristic on the electrode.

20. A non-transitory computer-readable medium storing instructions that, when executed by one or more processors of a computer system, cause the computer system to perform a method of executing tracking and monitoring of manufacturing data of a battery, the method comprising:
receiving sensing data of the battery from a sensing system;
generating mapping data based on the sensing data;
generating identification data of the battery based on the sensing data;
generating monitoring data of the battery based on the sensing data, the identification data, and the mapping data; and
generating display data for displaying a simulated electrode of the battery on a graphical user interface based on the monitoring data of the battery.

* * * * *